(12) United States Patent
Treyz et al.

(10) Patent No.: US 6,711,474 B1
(45) Date of Patent: Mar. 23, 2004

(54) AUTOMOBILE PERSONAL COMPUTER SYSTEMS

(76) Inventors: G. Victor Treyz, 868 Nantucket Ct., Sunnyvale, CA (US) 94087; Susan M. Treyz, 868 Nantucket Ct., Sunnyvale, CA (US) 94087

( * ) Notice: Subject to any disclaimer, the term of this patent is extended or adjusted under 35 U.S.C. 154(b) by 0 days.

(21) Appl. No.: 10/178,968

(22) Filed: Jun. 24, 2002

Related U.S. Application Data

(63) Continuation of application No. 09/490,331, filed on Jan. 24, 2000, now Pat. No. 6,526,335.

(51) Int. Cl.⁷ .............................................. G01C 21/00
(52) U.S. Cl. ....................... 701/1; 701/210; 455/456.1; 455/414.1
(58) Field of Search ........................... 701/1, 2, 29, 32, 701/33, 35, 36, 207, 210, 208, 213, 300; 307/9.1, 10.1; 342/357.09, 357.13, 825.15, 825.49, 357.1; 340/425.5, 992, 993; 455/456.1, 457, 414.11, 414.2, 414.3

(56) References Cited

U.S. PATENT DOCUMENTS

| | | | |
|---|---|---|---|
| 5,047,614 A | 9/1991 | Bianco | 235/385 |
| 5,054,569 A | 10/1991 | Scott et al. | 180/167 |
| 5,250,789 A | 10/1993 | Johnsen | 235/383 |
| 5,303,393 A | 4/1994 | Noreen et al. | 455/3.2 |
| 5,351,187 A | 9/1994 | Hassett | 364/401 |
| 5,424,524 A | 6/1995 | Ruppert et al. | 235/462 |
| 5,424,727 A | 6/1995 | Shieh | 340/928 |
| 5,455,823 A | 10/1995 | Noreen et al. | 370/50 |
| 5,664,231 A | 9/1997 | Postman et al. | 395/893 |
| 5,689,245 A | 11/1997 | Noreen et al. | 340/825.49 |
| 5,767,795 A | 6/1998 | Schaphorst | 340/988 |
| 5,794,164 A | 8/1998 | Beckert et al. | 701/1 |
| 5,794,207 A | 8/1998 | Walker et al. | 705/23 |
| 5,837,982 A | 11/1998 | Fujioka | 235/382 |
| 5,857,201 A | 1/1999 | Wright, Jr. et al. | 707/104 |
| 5,859,779 A | 1/1999 | Giordano et al. | 364/479.01 |
| 5,948,040 A | 9/1999 | DeLorme et al. | 701/201 |

(List continued on next page.)

FOREIGN PATENT DOCUMENTS

| | | | |
|---|---|---|---|
| WO | WO 99/09374 | 2/1999 | G01C/21/00 |
| WO | WO 00/41529 | 7/2000 | |
| WO | WO 00/45511 | 8/2000 | H03J/1/00 |
| WO | WO 00/52984 | 9/2000 | H05K/11/00 |
| WO | WO 00/72463 A2 | 11/2000 | H04B/7/00 |
| WO | WO 01/27831 A1 | 4/2001 | G06F/17/60 |
| WO | WO 01/43364 A1 | 6/2001 | H04L/12/28 |

OTHER PUBLICATIONS

Copies of pages from the OnStar® website as printed from the Internet on Jan. 10, 2000.

(List continued on next page.)

Primary Examiner—Tan Q. Nguyen
(74) Attorney, Agent, or Firm—G. Victor Treyz

(57) ABSTRACT

An automobile personal computer system is provided. A user of the system may wirelessly interact with merchants, communications facilities, information providers, computers at the home or office, and other entities. Such interactions may involve local wireless links and remote wireless links. Wireless communications may involve satellite transmissions, cellular transmissions, short-range wireless transmissions, etc. Products may be purchased using voice commands or by interacting with displays in the automobile. The automobile's location and functions may be monitored and controlled. Location information and other information particular to the user may be used to target promotions to the user. The user may obtain information on the goods or services available at a merchant while driving and may initiate a purchase transaction for those goods or services.

8 Claims, 121 Drawing Sheets

U.S. PATENT DOCUMENTS

| | | | |
|---|---|---|---|
| 5,949,345 A | 9/1999 | Beckert et al. | 340/815.41 |
| 5,952,941 A | 9/1999 | Mardirossian | 340/936 |
| 5,955,970 A | 9/1999 | Ando et al. | 340/928 |
| 5,959,577 A | 9/1999 | Fan et al. | 342/357.13 |
| 5,970,469 A | 10/1999 | Scroggie et al. | 705/14 |
| 5,970,474 A | 10/1999 | LeRoy et al. | 705/27 |
| 5,977,908 A | 11/1999 | Nichols | 342/357.08 |
| 5,979,757 A | 11/1999 | Tracy et al. | 235/383 |
| 5,995,898 A | 11/1999 | Tuttle | 701/102 |
| 6,009,363 A | 12/1999 | Beckert et al. | 701/33 |
| 6,014,634 A * | 1/2000 | Scroggie et al. | 705/14 |
| 6,091,956 A * | 7/2000 | Hollenberg | 455/456.5 |
| 6,101,483 A | 8/2000 | Petrovich et al. | 705/26 |
| 6,104,315 A | 8/2000 | Volkel et al. | 340/988 |
| 6,111,521 A | 8/2000 | Mulder et al. | 340/905 |
| 6,111,539 A | 8/2000 | Mannings et al. | 342/357.09 |
| 6,131,067 A | 10/2000 | Girerd et al. | 701/213 |
| 6,148,212 A | 11/2000 | Park et al. | 455/456 |
| 6,154,658 A * | 11/2000 | Caci | 455/466 |
| 6,163,270 A | 12/2000 | Silverman | 340/825.15 |
| 6,169,955 B1 * | 1/2001 | Fultz | 701/200 |
| 6,199,045 B1 * | 3/2001 | Giniger et al. | 705/1 |
| 6,233,506 B1 | 5/2001 | Obradovich et al. | 701/1 |
| 6,490,443 B1 * | 12/2002 | Freeny, Jr. | 455/406 |
| 6,574,603 B1 * | 6/2003 | Dickson et al. | 705/1 |

OTHER PUBLICATIONS

ZDNet "The Ultimate Spy Gear—Chapter 9: Putting a Tail on Someone" (printed from the Internet on Jan. 4, 2000).

Mark Moeller, "AutoPC Power: A look at the first year with Auto PC with Microsoft" Windows CE Power Magazine (printed from the Internet on Dec. 29, 1999).

Copies of pages from the website of Clarion Corporation as printed from the Internet on Dec. 29, 1999.

Clarion AutoPC 310C Owner's Manual, Copyright dated 1998 Clarion Co. Ltd.

* cited by examiner

EXPENSE REPORT
FOR TRIP TO PALO ALTO
JANUARY 1 - 7, 2000

| CATEGORY | TOTAL |
|---|---|
| GAS | $ 347.00 |
| FOOD | $ 485.00 |
| PARKING | $ 48.05 |
| TOLLS | $ 97.00 |
| LODGING | $ 1672.00 |

FIG. 63

AUTOMOBILE PERSONAL COMPUTER SYSTEMS

This application is a continuation of patent application No. 09/490,331, filed Jan. 24, 2000 now U.S. Pat. No. 6,526,335.

BACKGROUND OF THE INVENTION

This invention relates to vehicle computer systems, and more particularly, to vehicle computer systems such as automobile personal computer systems.

Automobile personal computers are presently available that allow users to obtain driving directions by supplying a starting address and a destination address. Users may also receive e-mail notifications, stock quotes, and traffic information. An open platform operating system has been used on these automobile personal computers to allow users to install third-party applications that have;been designed for the platform.

Although the presently available automobile personal computers provide various useful services, they are limited in their functionality.

It is therefore an object of the present invention to provide improved automobile personal computers and improved automobile personal computer systems.

SUMMARY OF THE INVENTION

This and other objects of the invention are provided in accordance with the principles of the present invention by providing automobile personal computer systems with enhanced features. An automobile personal computer for use in such systems may have wireless communications capabilities. The automobile personal computer may wirelessly communicate using local (short-range) wireless links and remote (long-range) wireless links. The automobile personal computer may be mounted in the dash of an automobile. A front panel may be provided that has buttons and a display. Supplemental displays may be provided for the passengers of the automobile.

The automobile personal computer may have various peripheral devices. Information on the location of the automobile may be obtained using a global positioning system receiver or other suitable arrangement. The automobile personal computer may be operated under voice control by using voice recognition to recognize voice commands. The automobile personal computer may also present text to the user through the automobile's sound system using voice-synthesis techniques.

A movable display may be used that may either be positioned toward the driver or away from the driver. Multiple display screens may be provided in the front-seat and rear-seat areas. The automobile personal computer may be linked with other computers or processors in the automobile. A client-server arrangement may be used in which the automobile personal computer serves as a server processor and rear-seat terminals serve as client processors.

The display of the automobile personal computer may have buttons arranged next to available options. A touch screen display may be used. Pointing devices such as track balls may be used.

Software may be installed on the automobile personal computer using various techniques. Settings for the automobile personal computer may be adjusted using computing devices that are separate from the automobile personal computer. A web-based user interface may be used to adjust settings.

Various services may be provided to the automobile personal computer from servers. Multiple services may be provided from a single service provider.

A wireless key chain device may be used to control the automobile. A remote control device that may be operated in the interior of the automobile may be used to control various automobile personal computer functions.

Various devices in the home such as computers, computing devices, web appliances and other in-home electronic devices may be used to interact with the automobile personal computer. For example, a touch screen device in the home may be used to start the automobile or perform other such functions. An in-home device for starting the automobile may have an integral telephone handset.

Users may be allowed to create customized passwords for the automobile personal computer. A password may be used to verify a user's identity.

The automobile personal computer may provide location-sensitive directions to the user. The automobile personal computer may also be used with custom driving directions. The display of visual information in the automobile may be controlled based on the location of the automobile. If desired, a kiosk may be used to display information on the location of a user's automobile. Location information may be used to adjust a clock in the automobile for different time zones.

Users may monitor the automobile using various sensors. E-mail reports on a driver's behavior may be provided to the user based on the readings from the sensors. The sensors may indicate that the automobile has been stolen. Stolen automobiles may be tracked with the automobile personal computer.

A driver's behavior may be monitored to assess fatigue using the automobile personal computer and a digital camera. A camera may also be used to monitor the interior of the automobile. The performance of the automobile may be monitored and information on the automobile's performance provided as web pages.

Voice messages may be forwarded with the automobile personal computer. E-mail may be forwarded to a user's automobile personal computer when the user is driving. The user may be provided with alerts that notify the user when certain content is available. The automobile personal computer may also allow the user to create voice memos and e-mail.

The automobile may be wirelessly controlled using a service provider. Various steps may be taken to ensure security when controlling an automobile over a wireless link.

In order for a user to locate the automobile, the user may obtain address or contextual location information from the automobile personal computer.

The automobile personal computer may be used to assist the user in making remote purchase transactions with merchants. The automobile personal computer may also be used in local wireless purchase transactions. Automobile occupants may use the automobile personal computer to order fast food or other such products over wireless links. Prices may be negotiated and financial commitments made over wireless links. The user may set up various payment arrangements for such transactions. In some transactions, a promotional software download may be provided to the automobile personal computer over a local wireless link. If desired, tours, audio clips, and video games may be downloaded.

The automobile personal computer may be used in a parking garage or other facilities with controlled access. The automobile personal computer may also be used with electronic parking meter systems and wireless gas pump arrangements. Toll collection functions may be provided using the automobile personal computer. The automobile personal computer may also be used to open garage doors.

The automobile personal computer may generate expense reports based on information the automobile personal computer may gather on payments that have been wirelessly made on parking, gas, tolls, lodging, and food.

The automobile personal computer may be used to assist the user in handling shopping lists. For example, shopping lists may be transferred from the home to the automobile and to a store.

Filtered traffic reports may be provided using location information. Information may be gathered on how the user accesses material with the automobile personal computer, how material is presented to the user, and how the user responds to the material. Targeted content such as targeted advertisements may be provided to the user. The targeted content may be based on a user's interests and location information.

Audio content for the automobile personal computer may be extracted from the Internet. Internet radio stations may be received with the automobile personal computer. If desired, audio advertisements may be used to provide users with subsidized Internet access.

Interactive audio may be provided to the user with the automobile personal computer. For example, audio preview clips may be provided. Users may also respond to polls.

Stock prices may be automatically provided to the user based on predefined threshold levels for price changes and the like. The automobile personal computer may also be used to provide roadside assistance features to the user. Operator-assisted features may be provided.

The automobile personal computer may be used to send a traffic report to a service. Language instruction, encyclopedias, contests, games, and digital photography features may be provided by the automobile personal computer. Images such as license plate images may be captured using a digital camera or video camera.

Data may be backed up and information may be updated using wireless links. The user may be allowed to select between various different languages when receiving text messages.

The automobile personal computer may be used to reduce noise in the interior of the automobile.

The automobile personal computer may also handle maintenance records. Maintenance and diagnostic information may be printed out using a printer in the automobile personal computer.

Dedicated buttons may be provided that link the user with various services including the services of the automobile manufacturer. The automobile personal computer may provide audio descriptions of button functions when the buttons are partially depressed or touched.

User computing devices such as personal computers or handheld computing devices may be used to move copies of audio files such as MP3 files between the automobile personal computer and such user computing devices. Screens may be provided with graphical interfaces that allow the user to move copies of audio files such as MP3 files between the automobile personal computer and the user computing device. Drop-down menus may be provided that reflect whether copy protection is being used. If desired, the user may arrange for the remote downloading of audio files or other files to the automobile personal computer. The user may e-mail audio files with the automobile personal computer.

A dealer or other service station facility and a service provider may communicate with an automobile personal computer. Dormant advertisements and other messages may be presented to a user with the automobile personal computer. E-mail advertisements and other notifications may be provided to the user by a service provider, dealer, or manufacturer.

The automobile personal computer may provider users with information on points-of-interest. Users may provide comments to be associated with the points-of-interest.

Further features of the invention, its nature and various advantages will be more apparent from the accompanying drawings and the following detailed description of the preferred embodiments.

BRIEF DESCRIPTION OF THE DRAWINGS

FIG. 63 is an illustrative expense report that may be provided by the automobile personal computer in accordance with the present invention.

DETAILED DESCRIPTION OF THE PREFERRED EMBODIMENTS

Figure 1:
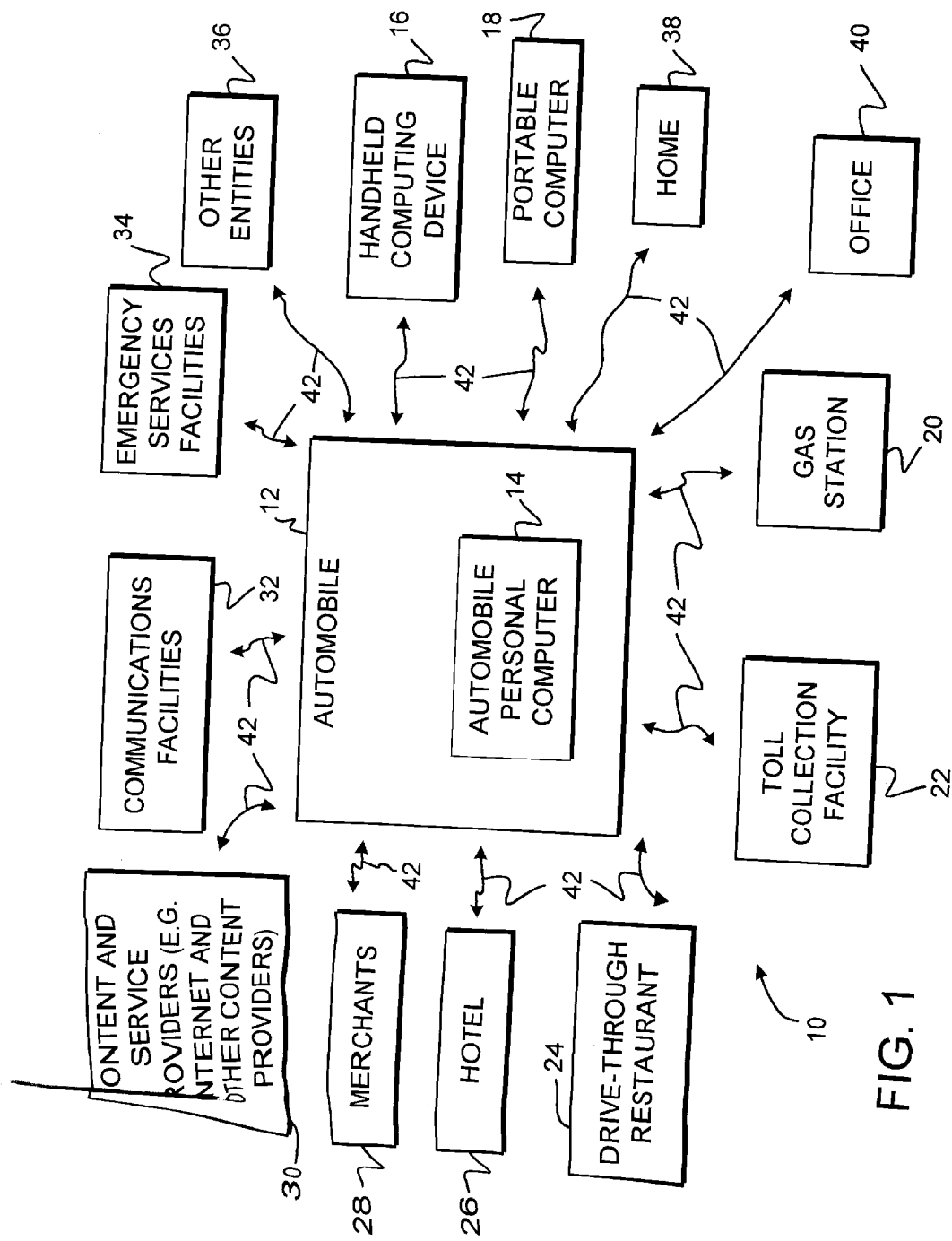
FIG. 1 is a schematic diagram showing an illustrative automobile personal computer system in which a vehicle with a personal computer may interact with various entities in accordance with the present invention.

An illustrative automobile personal computer system 10 is shown in FIG. 1. An automobile 12 contains an automobile personal computer 14 that communicates with numerous devices and facilities. Devices that automobile personal computer 14 may communicate with include handheld computing devices such as handheld computing device 16. Such a handheld computing device may, for example, be a personal digital assistant or a palm-sized computer. Other suitable handheld computing devices include cellular telephones with built-in computing capabilities, wrist watches with built-in computing capabilities, or any other such small and lightweight computing device.

Automobile personal computer 14 may also communicate with portable computers such as portable computer 18. Portable computer 18 may be a laptop computer, a notebook computer, or any other portable computer.

The automobile personal computer may also communicate with computing equipment in a gas station 20, toll collection facility 22, or drive-through restaurant 24. The automobile personal computer may communicate with hotels such as hotel 26 and other merchants 28. Internet content and other content and services may be obtained from content and service providers 30. Communications services such as e-mail, voice mail, paging services, and other messaging and communications services may be obtained by linking to communications facilities such as communications facilities 32. Emergency services may be obtained by linking with emergency services facilities 34. Other services may be obtained by communicating with various other entities 36. Computing equipment in the home 38 or office 40 may also communicate with the automobile personal computer.

Figure 2:
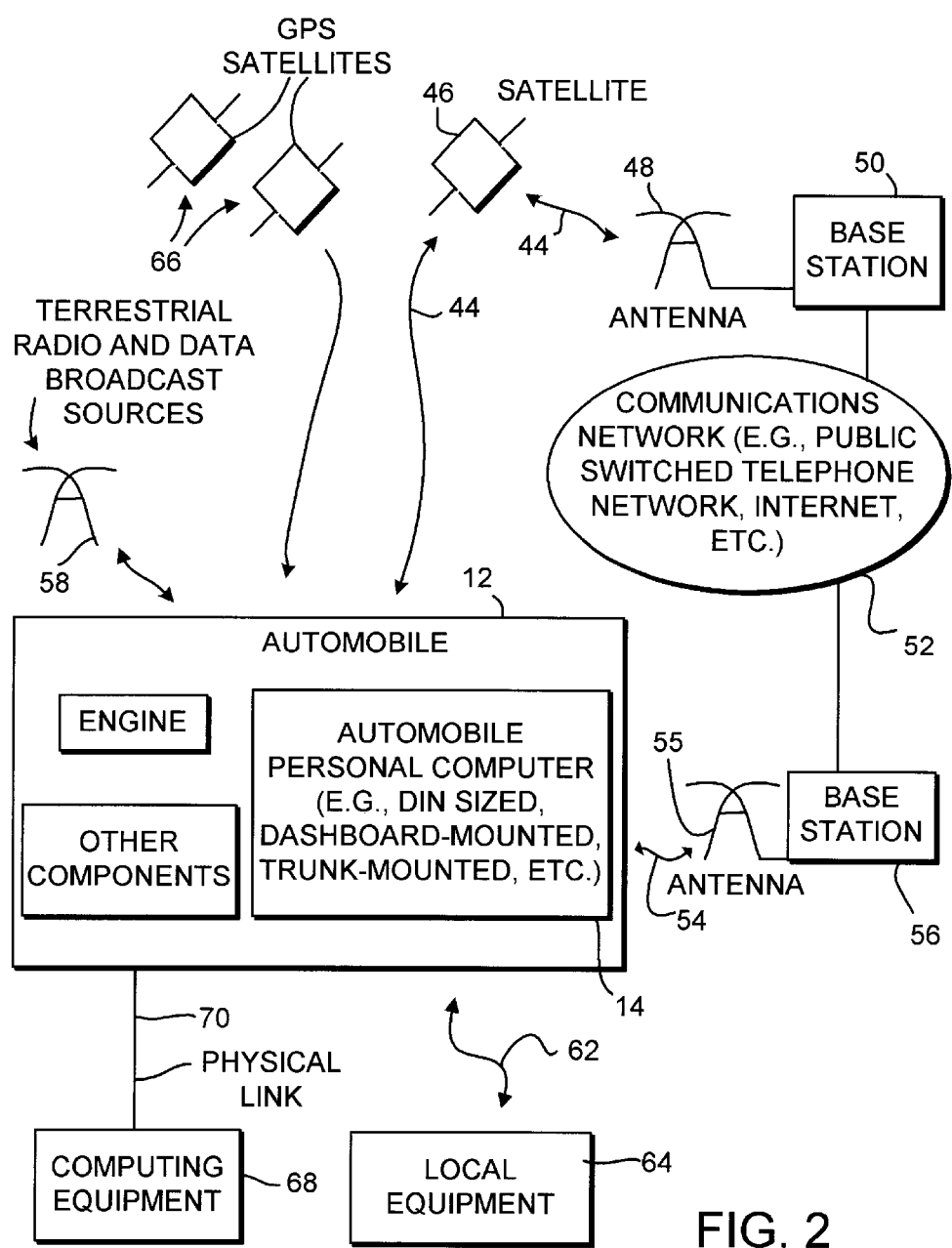
FIG. 2 is a schematic diagram showing some of the types of communications paths that may be involved with the automobile personal computer system in accordance with the present invention.

The communications paths 42 that are used to communicate with automobile personal computer 14 are often wireless links because automobile personal computer 14 is a mobile platform. As shown in FIG. 2, wireless links from the automobile personal computer may involve remote wireless links such as satellite link 44. Satellite link 44 uses satellite 46 and terrestrial antenna 48. Terrestrial antenna 48 may be associated with a base station 50 that is connected to a communications network 52.

Terrestrial wireless links such as terrestrial wireless link 54 may also be used to communicate with automobile personal computer 14. Wireless links such as link 54 may use terrestrial antennas such as antenna 55 and base stations such as base station 56. Base stations such as base station 56 may be cellular base stations such as cellular telephone base stations or any other suitable wireless terrestrial base stations.

The automobile personal computer 14 may receive information from terrestrial broadcast antennas such as antenna 58 over terrestrial radio and data links such as wireless broadcast link 60. Antennas such as antenna 58 may be FM antennas, AM antennas, or any other suitable terrestrial broadcast antennas.

Communications over links such as links 44, 54, and 60 usually involve substantial distances. For example, satellite communications links involve distances of many miles. Even terrestrial communications may involve wireless paths of many miles or at least fractions of miles. Paths such as paths 44, 54, and 60 are therefore often collectively referred to herein as "remote" links or paths. There are numerous wireless devices and facilities external to automobile 12 with which automobile personal computer 14 may communicate over remote wireless links. Automobile personal computer 14 may also communicate with wireless devices in the interior of automobile 14 using remote wireless links.

Wireless communications may also involve shorter paths such as link 62 between automobile personal computer 14 and local equipment 64. These communications are typically characterized by distances on the order of a small fraction of a foot to hundreds of feet (e.g., 500 feet) and are therefore often referred to herein as "local" links or paths. Local links may use any suitable protocols such as the Bluetooth local wireless protocol or any other local wireless protocol. There are numerous wireless devices and facilities external to automobile 12 with which automobile personal computer 14 may communicate over local wireless links. Automobile personal computer 14 may also communicate with wireless devices in the interior of automobile 14 using local wireless links.

Automobile personal computer 14 may also receive satellite signals from global positioning system (GPS) satellites 66. By analyzing these signals (e.g., with a GPS receiver), the automobile personal computer can determine the location of the automobile. The resolution of current GPS systems is purposefully limited by the government. If higher resolution is desired, a differential GPS (DGPS) system may be used. In DGPS systems, the known (e.g., surveyed) position of a base station may be used as a reference point. By comparing the known position of the base station to the position of the base station that is indicated by a GPS receiver at the station, the error of the GPS signal in the proximity of the base station can be determined. If an automobile is relatively close to such a base station (e.g., within a number of miles), the automobile's GPS location may be corrected by the same amount that was determined to be necessary to correct the base station's position.

If desired, the base station and the automobile may be in wireless communications (e.g., using a satellite link or terrestrial wireless link). The DGPS correction to the automobile's position may be made at the automobile (by supplying the needed correction data to the automobile from the base station), at the base station (e.g., by providing the automobile's raw GPS position to the base station), or may be performed elsewhere (e.g., by providing an appropriate facility with the error correction data from the base station over a communications network and by providing the automobile's GPS position data using wireless communications and a communication network path).

Other techniques may be used for determining the vehicles location if desired. For example, a rough position may of the automobile may be obtained by determining which terrestrial antennas (or more broadly which satellites) are receiving communications from the automobile. An approach of this type that uses terrestrial antennas may be sufficiently accurate to place the position of the automobile within a particular region of the country or a particular state, county or portion of a county. More precise location information may be obtained using time-of-flight and triangulation techniques. Such techniques may involve the use of multiple terrestrial antennas.

These approaches, a combination of these approaches, or any other suitable location-determination arrangements may be used if desired. Regardless of which type of location technology is used to determine the position of the automobile, the position of the automobile may be used by the automobile personal computer 14 and other devices associated with the automobile in providing various location-related services for the user.

Wireless communications with automobile personal computer 14 may be unidirectional (e.g., radio and data broadcasts, satellite radio and data broadcasts, GPS signals, etc.) Wireless communication with automobile personal computer 14 may also be bidirectional. Bidirectional links may support cellular voice and data traffic, Internet links over either satellite or terrestrial paths, and communications for other interactive services. Bidirectional communications arrangements may use different paths for transmitting and receiving data. For example, a satellite path may be used to deliver information to automobile personal computer 14, whereas automobile personal computer 14 may transmit signals over a terrestrial wireless path. A terrestrial wireless path may be used to deliver information to automobile personal computer 14, whereas automobile personal computer 14 may transmit signals over a satellite path. Different type of satellite paths may be used to form the uplink path and the downlink path to the automobile personal computer. The automobile personal computer may also send and receive terrestrial communications to and from different terrestrial antennas. For example, broadcast data may be distributed by one such terrestrial antenna, whereas communications from the user may be transmitted to another terrestrial antenna.

More than one path may be in use at a time and both unidirectional and bidirectional communications may be mixed. As just one example, the user may be simultaneously receiving satellite GPS signals, a satellite radio broadcast, and a terrestrial data broadcast, may have an open bidirectional cellular data link to a terrestrial antenna, while a local wireless transaction is being consummated over a short-range wireless link.

Various formats may be used to transmit and receive data from the automobile. Examples include cellular telephone transmissions, satellite telephone transmissions, e-mail transmissions, voice messaging transmissions, paging transmissions, digital radio transmissions, analog radio transmissions, data transmissions, control signals transmissions, alphanumeric messaging transmissions, voice mail transmissions, video transmission, and any other suitable types of transmission techniques for analog or digital information.

Radio frequency transmissions may use any suitable radio frequency. Wireless optical transmissions (which are typically short-range due to line-of-sight requirements) may use light of any suitable wavelength such as infrared light. Certain short-range wireless communications may also use acoustic signaling techniques.

Physical wiring may also be used. For example, automobile personal computer 14 may be connected to devices such as computing equipment 68 over a physical link 70. Physical links such as physical link 70 may use any suitable connector technology, such as telephone wires, universal serial bus (USB) cables, FireWire (IEEE-1394) cables, coaxial cable, buses, twisted pair wires, optical fibers, parallel bus cables, or any other suitable physical links. Physical links may be used in combination with wireless links.

The size and shape of automobile personal computer 14 and its location within automobile 12 depends on user and manufacturer preference. One suitable approach is to provide most of the components of automobile personal computer 14 in a chassis that is sized to fit into a standard car stereo slots (e.g., Deutsche Industrie Normen or DIN-sized slots) between the driver and front seat passenger. Other dashboard and front-seat mounting positions are possible (e.g., directly in front of the front-seat passenger, in a housing between the driver and front-seat passenger, near the roof-line of the automobile, etc.). Such non-standard positions may be preferred in automobiles with more proprietary automobile personal computer arrangements. Dashboard mounting is advantageous, because it allows dedicated buttons, touch panel controls, microphone inputs, and the like that may be an integral part of the computer housing to be provided within reach of the user. If desired, however, a trunk-mounted configuration may be used, provided that a user input interface (e.g., buttons and microphone, etc.) are provided within reach of the driver and front-seat passenger. A combination of such approaches may also be used. As an example, DIN-slot mounting may be used for the main body of the computer, whereas ancillary displays and controls may be provided in front of the front-seat passenger, on another dashboard location, in the rear-seat area, etc.

Figure 3:
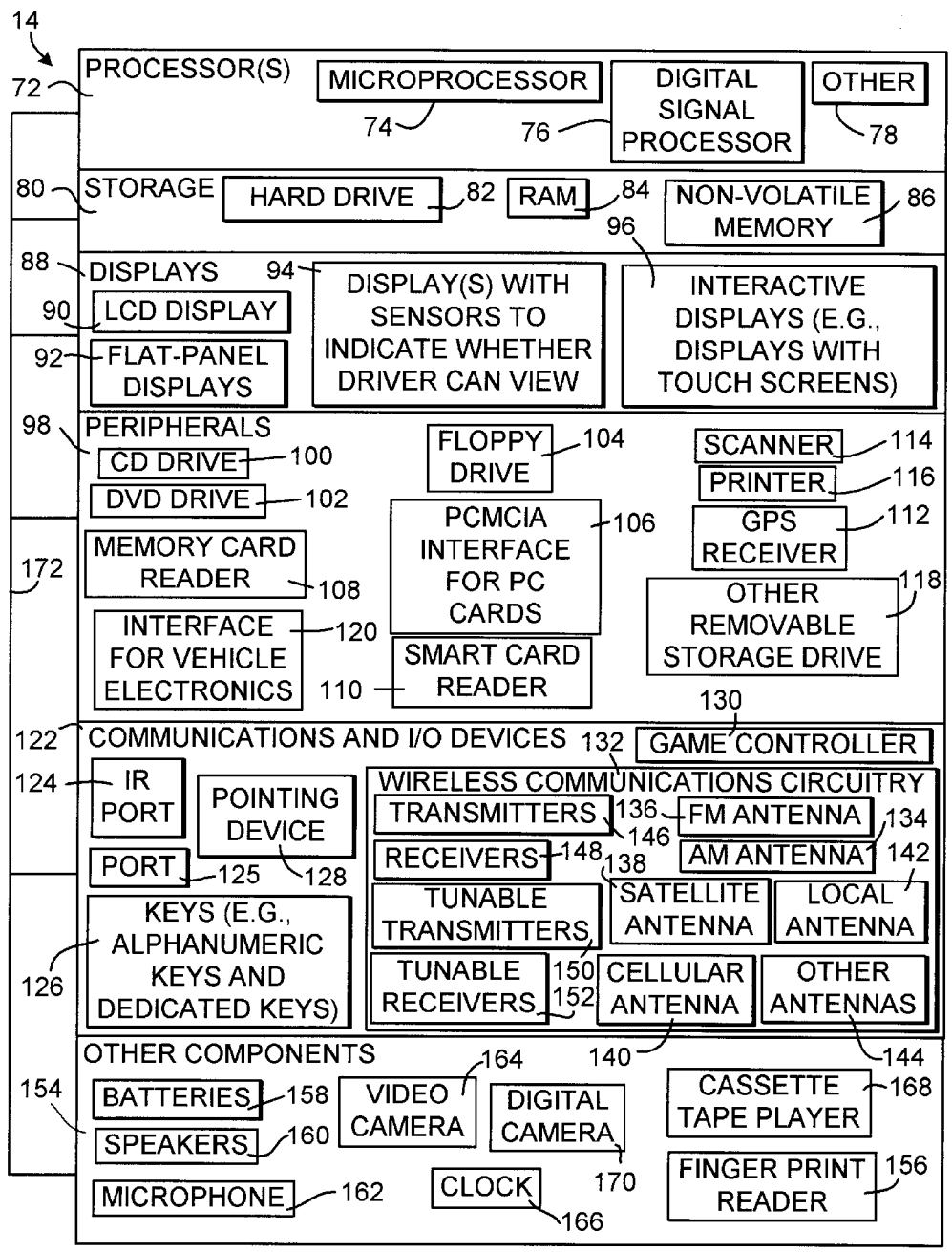
FIG. 3 is a schematic diagram showing the components of an illustrative automobile computer system in accordance with the present invention.

A schematic diagram of an illustrative automobile personal computer 14 is shown in FIG. 3. Computer 14 may have one or more processors 72 such as a microprocessor 74, a digital signal processor 76, and other suitable processors 78. Storage 80 may include a hard disk drive 82, random-access memory 84, non-volatile memory 86, and any other suitable memory and storage devices. Processors 72 or dedicated circuitry (e.g., analog-to-digital and digital-to-analog converters) in automobile personal computer 14 may support functions such as the decoding of MP3 files or other digital audio, the decoding of streaming Internet audio, voice-recognition functions, voice-synthesis functions, multimedia functions such as handling compressed digital video, streaming Internet multimedia content, etc.

Displays 88 may include one or more liquid crystal displays 90, flat panel displays 92, displays 94 with sensors that indicate whether the display is faced toward the driver or is positioned so that it cannot be viewed by the driver, and interactive displays 96 such as displays with touch screens or nearby dedicated buttons or the like.

Peripherals 98 used by computer 14 may include a compact disc (CD) drive 100 and a digital video disc (DVD) drive 102. Drives 100 and 102 may be read-only or may permit writing operations. Peripherals 98 may also include a floppy disk drive 104, a PCMCIA interface 106 for PC cards, a memory card reader 108 (e.g., for compact flash cards, smart media cards, memory stick cards, etc.) A smart card reader 110 may be provided to read smart cards or the like. A GPS receiver 112 may be used to receive GPS satellite signals. A scanner 114 may be provided (e.g., to scan in documents for messages, receipts, photographs, or other materials).

Peripherals 98 may also include a printer 116. Printer 116 may be any suitable printer, such as a compact version of a letter-sized printer, a small form-factor printer that prints on narrow rolls of paper, or any other suitable printer. Printer 116 may be a laser printer, an ink-jet printer, an dye sublimation printer, a thermal printer, etc. If desired, printer 116 may be located away from the driver (e.g., near the front-seat passenger, near the rear-seat passengers, or in the trunk) to avoid distracting the driver while the automobile is in motion. Printer 116 may be used with scanner 114 to provide send-and-receive fax capabilities.

Other peripherals 98 that may be provided include other removable storage devices 118 (e.g., storage devices that support removable media other than floppy disks or solid state memory cards). An interface 120 may be provided that allows personal computer 14 to interact with the automobile's electronics (e.g., the diagnostic system, automobile sensors, control devices, etc.)

Automobile personal computer 14 may include communications and input/output devices 122 such as an infrared communications port 124 for interacting over short distances with handheld computing devices and portable computers and the like. Ports such as port 125 may be used to connect peripherals and other devices to automobile personal computer 14. Port 125 may be a USB port, a parallel port, a FireWire port, or any other suitable port. Ports such as port 125 may be provided in the interior portions of the automobile personal computer and on the faceplate, dashboard, or other driver-accessible and passenger-accessible locations.

Communications and input/output devices 122 may include keys 126. Keys 126 may include numeric keys, letter keys, function keys, etc. Telephone-type keys may be used that have numbers and associated sets of letters. A full set of letter keys may be provided if miniature keys are used or if a keypad is located in a position in which space is less of an issue (e.g., in the rear seat or in the glove compartment, etc.). The keys may be provided as a keyboard, as a keypad, or in any other suitable arrangement. A keypad or keyboard may be provided that is housed in the glove compartment or similar structure, the dashboard, a rear-seat console, the back of the front seats, etc. A user in the automobile may also interact with automobile personal computer 14 using interactive displays such as interactive displays 96, which may be touch sensitive, capable of recognizing handwriting, etc. Input devices such as pointing device 128 (e.g., a trackball, mouse, touchpad, etc.) and game controller 130 (e.g., a joystick, wheel, foot pedal, etc.) may be provided. Certain devices (e.g., joysticks for video games) are more suitable for rear-seat passengers, but may be provided in the front seat area if precautions are taken to ensure the driver is not distracted by any accompanying content hat is being displayed.

Automobile personal computer 14 may have wireless communications circuitry 132. Antennas such as AM antenna 134 and FM antenna 136, satellite antenna 138, cellular antenna 140, local antenna 142, and other antennas 144 may be provided. Different antennas may be optimized for different types of communications (e.g., unidirectional or bidirectional communications, satellite-based, remote terrestrial lo communications, local communications, etc.) and different RF frequencies. If desired, hybrid antennas may be provided that serve multiple types of communications and therefore allow certain antennas to be consolidated. Such hybrid antennas may be optimized to handle a wider range of frequencies than a dedicated antenna might otherwise be configured to handle.

Wireless communications circuitry 132 may have transmitters 106 and receivers 148 (e.g., RF transmitters and RF receivers connected to antennas 134, 136, 138, 140, 142, and 144). Tunable RF transmitters 150 and tunable RF receivers 152 may also be provided.

Automobile personal computer 14 may have other components 154. Such components may include a fingerprint reader 156 for verifying the identity of the user based on the user's fingerprint when the user touches the fingerprint reader input pad. One or more batteries 158 may be provided (e.g., to provide a backup source of power or to allow certain components to be more portable than would be possible if they were connected to a power supply and to prevent security features in automobile personal computer 14 from being bypassed by unplugging the main automobile battery).

Sound from the automobile personal computer 14 may be provided to the user through speakers 160. Speakers 160 may be part of the automobile's sound system (e.g., the sound system that is used to play music, etc.), may be separate computer speakers, may be supplemental or ancillary headphones or speakers, may be a combination of such speakers, or may use any other suitable audio speaker arrangement.

Voice commands from the user and other audio information may be received by the automobile personal computer using one or more microphones such as microphone 162. One or more video cameras 164 may be provided. The video cameras may be, for example, mounted to face traffic behind the automobile, in front of the automobile, or to the side of the automobile. Video cameras may also be directed inward to capture video images of the interior of the automobile. A clock 166 may be provided. Time information for the automobile personal computer 14 may be obtained from a discrete clock circuit, part of a more complex circuit such as a processor or application-specific integrated circuit, a remote clock, or any other suitable hardware and software suitable of keeping track of time. Information on the current time may be displayed on a dedicated clock display or may be displayed on a general-purpose display.

Another component that may be provided is a cassette tape player 168. Components such as the cassette tape player may be operated through automobile personal computer 14 or may be maintained as separate devices within the automobile.

A digital camera 170 may be used to take images. Digital camera 170 may capture images of the same type that video camera 164 captures. Digital camera 170 may be mounted on the interior or exterior of the car. Suitable interior mounting locations include the front dashboard (e.g., on movable mount that may be configured to face the exterior of the automobile or may be configured to face the user), the rear window (e.g., to face traffic following the automobile), side windows (e.g., facing the exterior), the rear-seat area, etc. If desired, digital camera 170 and video camera 164 may be connected to automobile personal computer 14 by a physical communications link or a wireless link. These arrangements, particularly the wireless arrangements, may permit more freedom of movement than arrangements in which such components are mounted to the automobile.

If desired, a wireless link may allow a photographer or videographer to roam away from the car (e.g., while the car is parked) while sending moving or still images to the automobile personal computer. In this situation, the digital camera or video camera may be provided with a wireless transmitter or transmitter-receiver that is capable of communicating with automobile personal computer over a local or remote wireless link. The transmitter or transmitter-receiver may be integrated into the housing of the digital camera or video camera. Images and video provided over such wireless links and images and video provided over physical links may be stored at the automobile personal computer 14 and transmitted from the automobile personal computer 14 to an appropriate recipient at a later time, or may be distributed in real time (e.g., over a wireless Internet connection or the like that is formed between automobile personal computer 14 and a suitable recipient). Images and video may be transmitted over such remote wireless links using any suitable technique. For example, images and video may be sent using e-mail.

One or more busses 172 or other interconnection arrangements may be used to interconnect the components of automobile personal computer 14.

The components of the automobile personal computer 14 that are shown in FIG. 3 are merely illustrative. Other suitable components may be used if desired. Moreover, some of these components (e.g., the peripherals) may sometimes be provided as separate devices that are attached to the automobile personal computer, rather than forming a subcomponent of the automobile personal computer 14 itself. Arrangements in which some of the components of FIG. 3 are integrated into the automobile personal computer 14 and some of the components of FIG. 3 are provided as separate components may be used if desired.

Many functions that may be provided using the automobile personal computer system involve monitoring and controlling automobile functions. Traditionally, automobiles have had dedicated electronic control systems for controlling and monitoring automobile functions. Even if an automobile personal computer such as automobile personal computer 14 is provided in an automobile, it may be desirable to retain such electronic control systems for driving-related and other crucial functions. The automobile personal computer 14 may use interface circuitry to connect to the vehicle electronics directly, through such traditional electronic control systems, or using a combination of these arrangements. If desired, for example, automobile personal computers may use interface circuitry such as interface 120 to connect to a communications bus such as those used by automobile electronic control systems.

Figure 4:
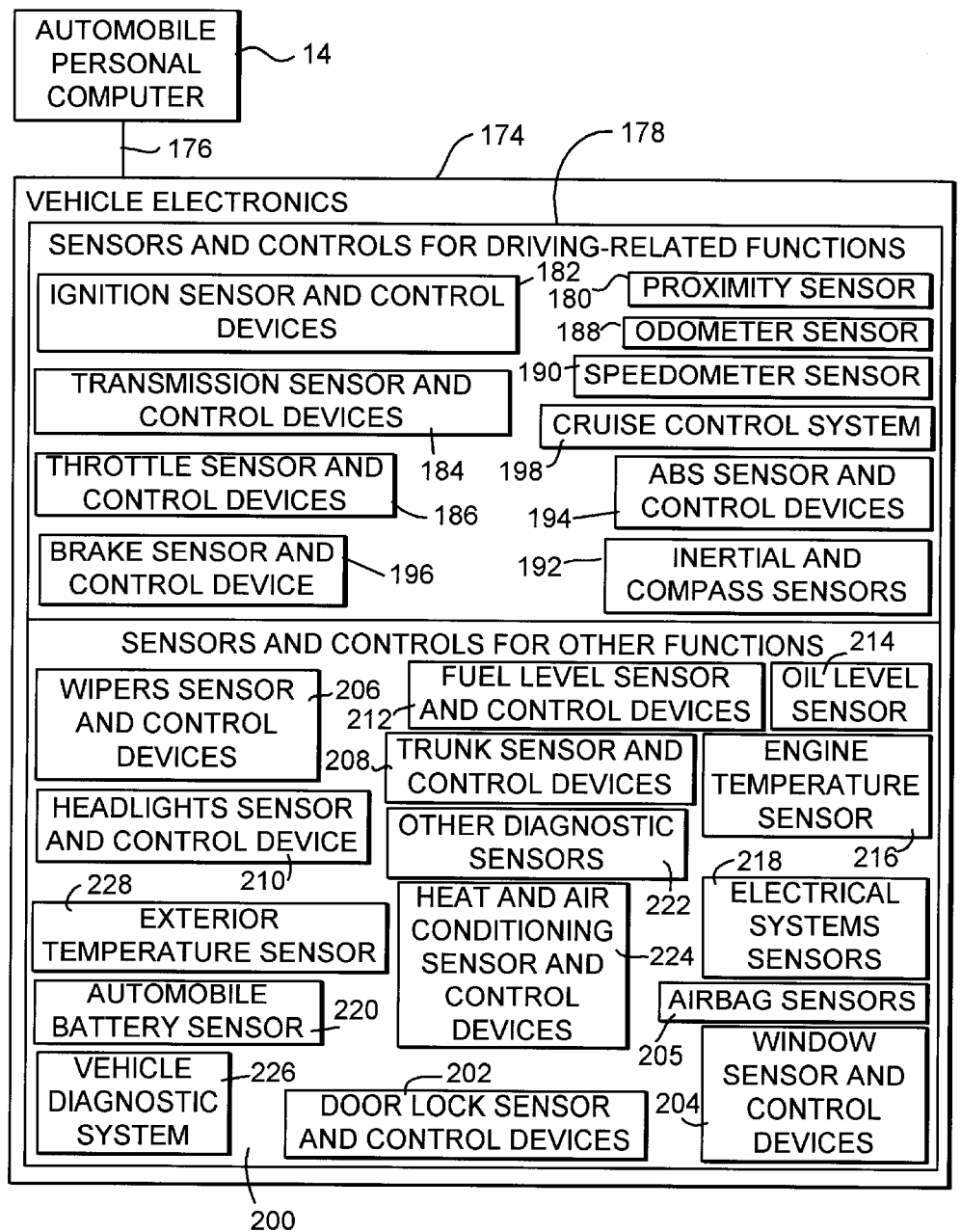
FIG. 4 is a schematic diagram showing how the automobile personal computer may interact with other components of the automobile in accordance with the present invention.

As shown in FIG. 4, automobile personal computer 14 may be interconnected with vehicle electronics 174 via communications paths 176. Communications paths 176 may involve interface circuitry, busses, direct wire paths, wireless connections, and any other suitable communications paths and devices.

Vehicle electronics 174 may include sensors and controls 178 for driving-related functions such as a proximity sensor 180 that determines the distance of the automobile from other objects (e.g., stationary objects or other vehicles). Vehicle electronics 174 may also include ignition sensor and control device 182, transmission sensor and control device 184, throttle sensor and control device 186, odometer sensor 188, speedometer sensor 190, inertial and compass sensors 192, antilock brake system sensor and control device 194, brake sensor and control device 196, cruise control system 198, and other suitable sensor and control devices.

Vehicle electronics 174 may include sensors and controls 200 for other functions such as door lock sensor and control devices 202, window sensor and control devices 204, airbag sensors 205, wipers sensor and control device 206, trunk sensor and control device 208, headlights sensor and control device 210. Vehicle electronics 174 may also include fuel sensor 210, oil-level sensor 214, engine temperature sensor 216, electrical systems sensors 218, automobile battery sensor 220, and other diagnostic sensors 222. Vehicle diagnostic system 226 may also be connected to some or all of these sensors. Vehicle diagnostic system 226 may be used to generate various diagnostic messages (text or code) that may be accessed by mechanics when the automobile is being serviced. Information from vehicle diagnostic system 226 may be provided to automobile personal computer over communications path 176.

Certain sensors may be installed only by the manufacturer. Other sensors may be installed by the user or other personnel after the car has been delivered to the user. As just one example, an exterior temperature sensor 228 may be added to the automobile to allow the automobile personal computer 14 to monitor the temperature outside of the automobile. Exterior temperature sensor 228 and other such add-on accessories may communicate with automobile personal computer 14 wirelessly or over a wired path. In certain situations, accessories and other devices may be more easily installed using wireless configurations rather than wired configurations. If desired, exterior temperature sensor 228 may be installed in automobile 12 when automobile 12 is being manufactured.

Figure 5:
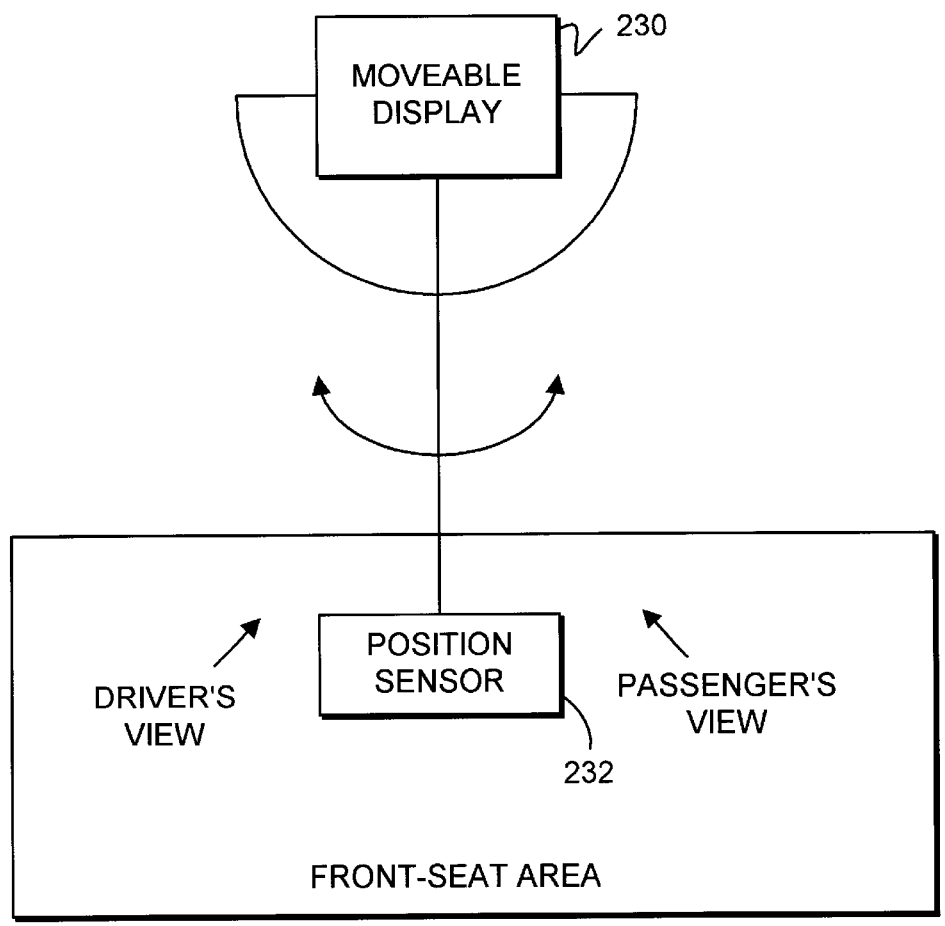
FIG. 5 is a diagram showing how a movable display may be used with the automobile personal computer system in accordance with the present invention.

In order to avoid distracting the driver, it may be necessary to only display driving-related information or the like to the driver when the car is being operated. As shown in FIG. 5, a movable display such as movable display 230 may be provided in the front seat area that has a position sensor 232. The position sensor 232 may be used to determine when the driver is able to view display 230. When display 230 is viewable by the driver, the content of display 230 may be restricted to driving-related information or the like (e.g., driving directions). When display 232 is viewable by the front-seat passenger, but not by the driver, any suitable information may be displayed.

Figure 6:
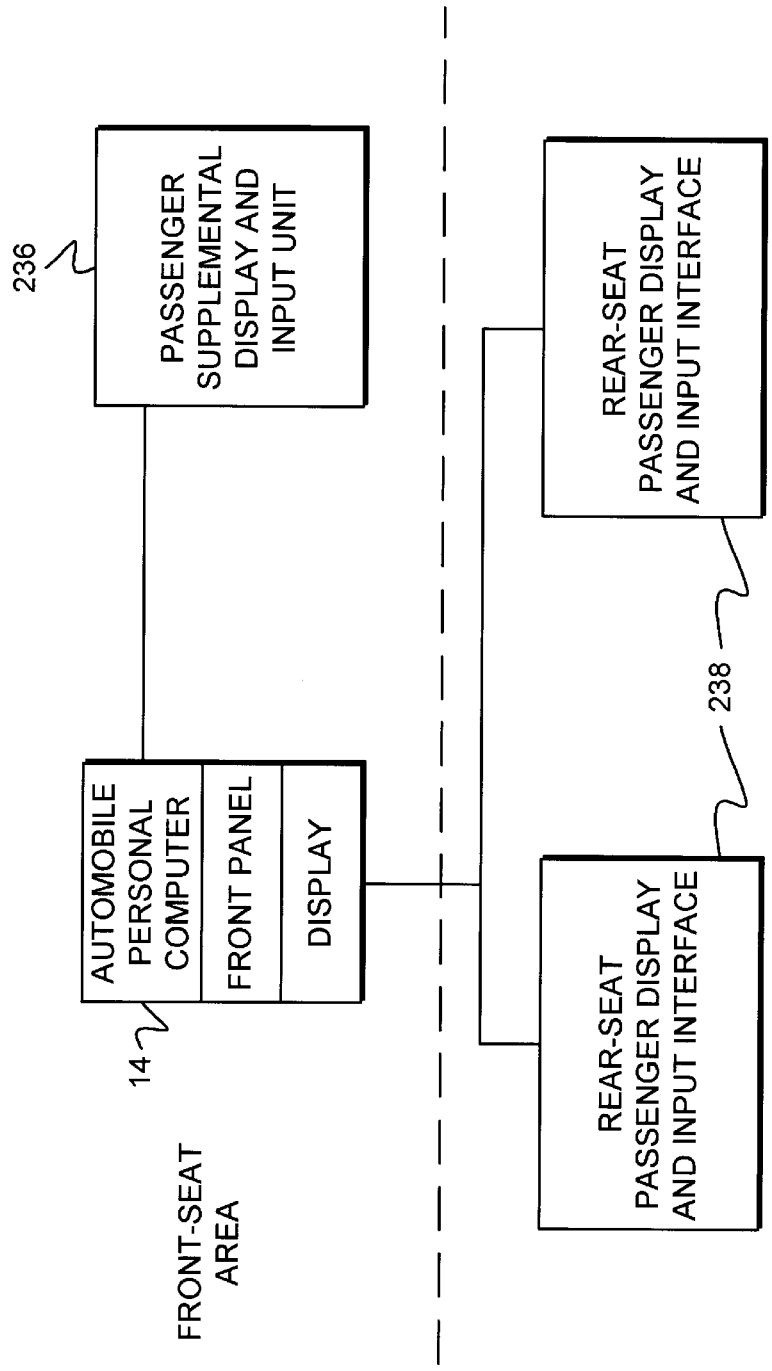
FIG. 6 is a schematic diagram showing how an automobile personal computer may be configured to have multiple display screens in the front and rear seats in accordance with the present invention.

As shown in FIG. 6, the automobile personal computer system may use an arrangement in which automobile personal computer 14 has a front-panel display that is viewable by the driver and a passenger supplemental display and input unit 236. Each rear-seat passenger may have access to a rear-passenger display and input interface 238. This arrangement may allow passengers in the automobile to have easy access to the functions of the automobile personal computer 14.

Figure 7:
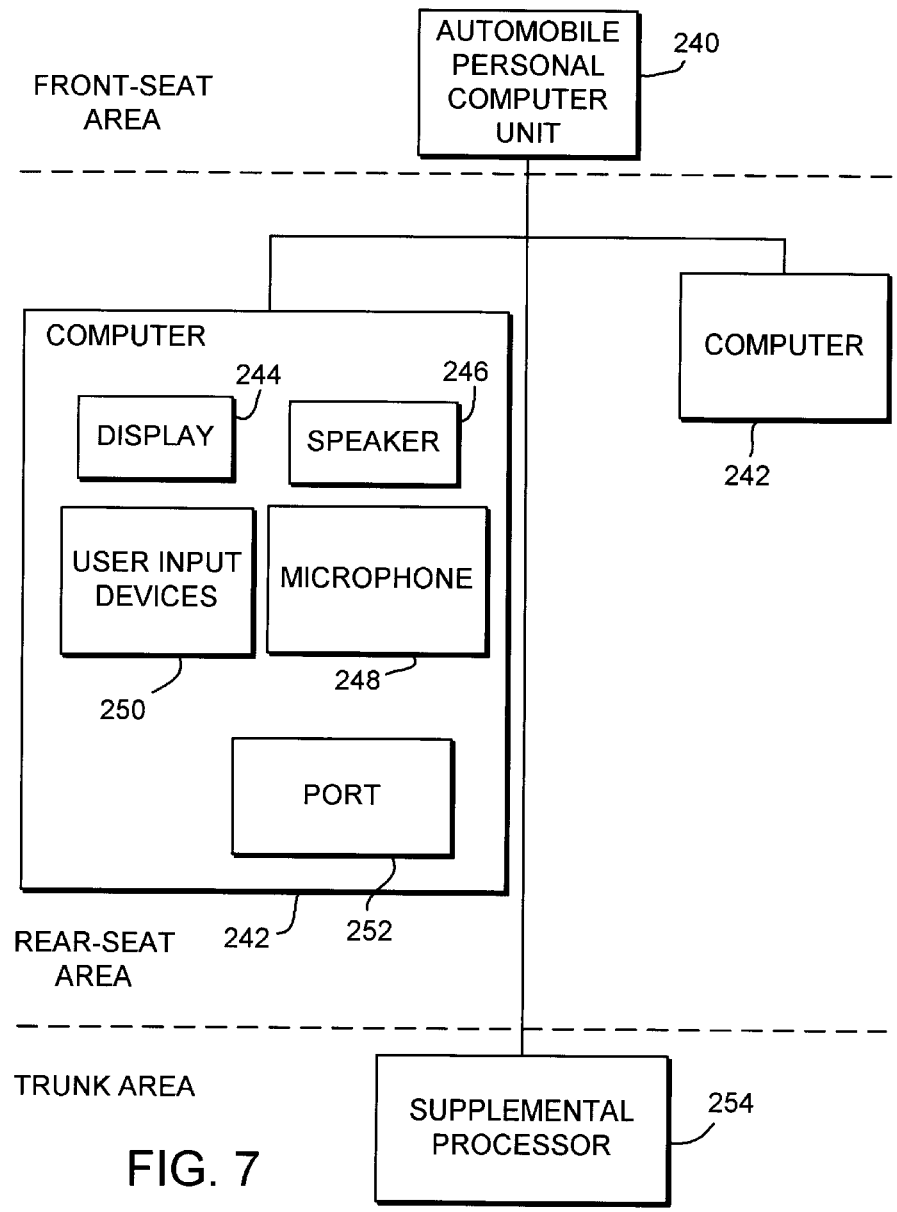
FIG. 7 is a schematic diagram showing how the automobile personal computer may be used in arrangement in which there are multiple linked computers in accordance with the present invention.

The automobile personal computer system may use various multiple-processor arrangements. As just one example, a front-seat automobile personal computer unit 240 may be connected with one or more rear-seat computers 242 as shown in FIG. 7. Each rear-seat computer 242 may have a display 244, a speaker 246 (which may be operated as part of the automobile's sound system), a microphone 248, and user input devices such as keys, pointing devices, game controllers, etc. Each rear-seat computer 242 may also have a port such as port 252 (e.g., a USB port) and may have additional features such as card readers, etc. A supplemental processor 254 may be mounted in the trunk area of the automobile.

Various architectures may be used with an arrangement such as the arrangement of FIG. 7. For example, automobile personal computer unit 240 or supplemental processor 254 may be configured as a server and the remaining computers may be configured as clients. Web browsers may be used to access the server from the clients, thereby forming an intranet within the automobile. This type of configuration may make it possible for occupants of the automobile to seamlessly access local information and wireless Internet information using the same user interface. This example is merely illustrative. Any suitable type of system architecture may be used to connect multiple processors running in the automobile personal computer environment.

Figure 8:
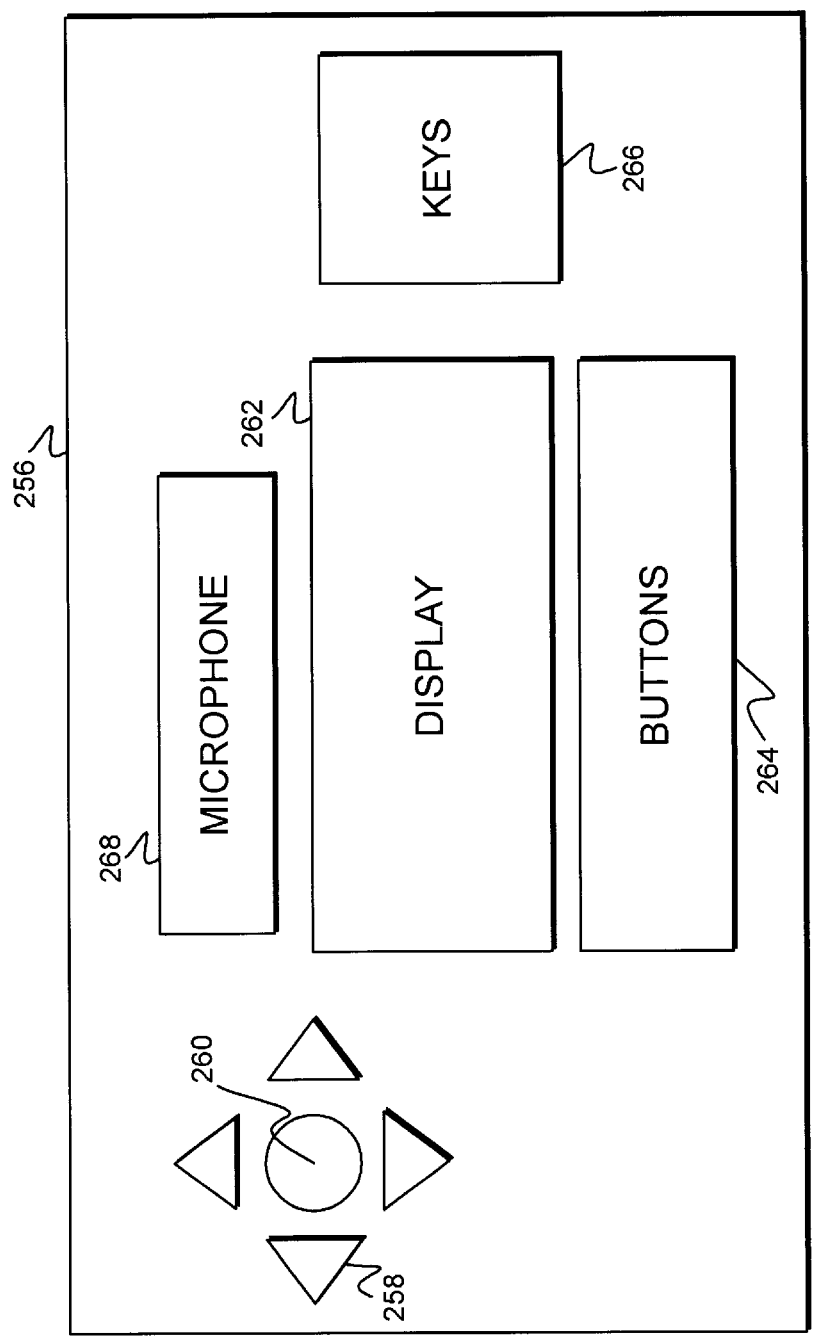
FIG. 8 shows an illustrative front panel for an automobile personal computer in accordance with the present invention.

An illustrative front-panel configuration for the automobile personal computer 14 is shown in FIG. 8. If desired, front-panel 256 may be provided as part of a removable faceplate as a theft-deterrent. Arrow buttons or keys 258 and select or enter button 260 allow the user to select desired options on display 262. Buttons 264 such as task buttons, number buttons, dedicated buttons, and other suitable buttons may be used to operate the computer. Keys 266 (which are also sometimes referred to as buttons) may be configured as an alphanumeric keypad or other suitable arrangement. Display 262 may be a touch screen or other suitable display.

A microphone 268 may be provided as part of front-panel 256. Front-panel 256 may be sized to accommodate installation of automobile personal computer 14 in a standard car stereo slot in the dashboard or other dashboard location if desired.

Figure 9:
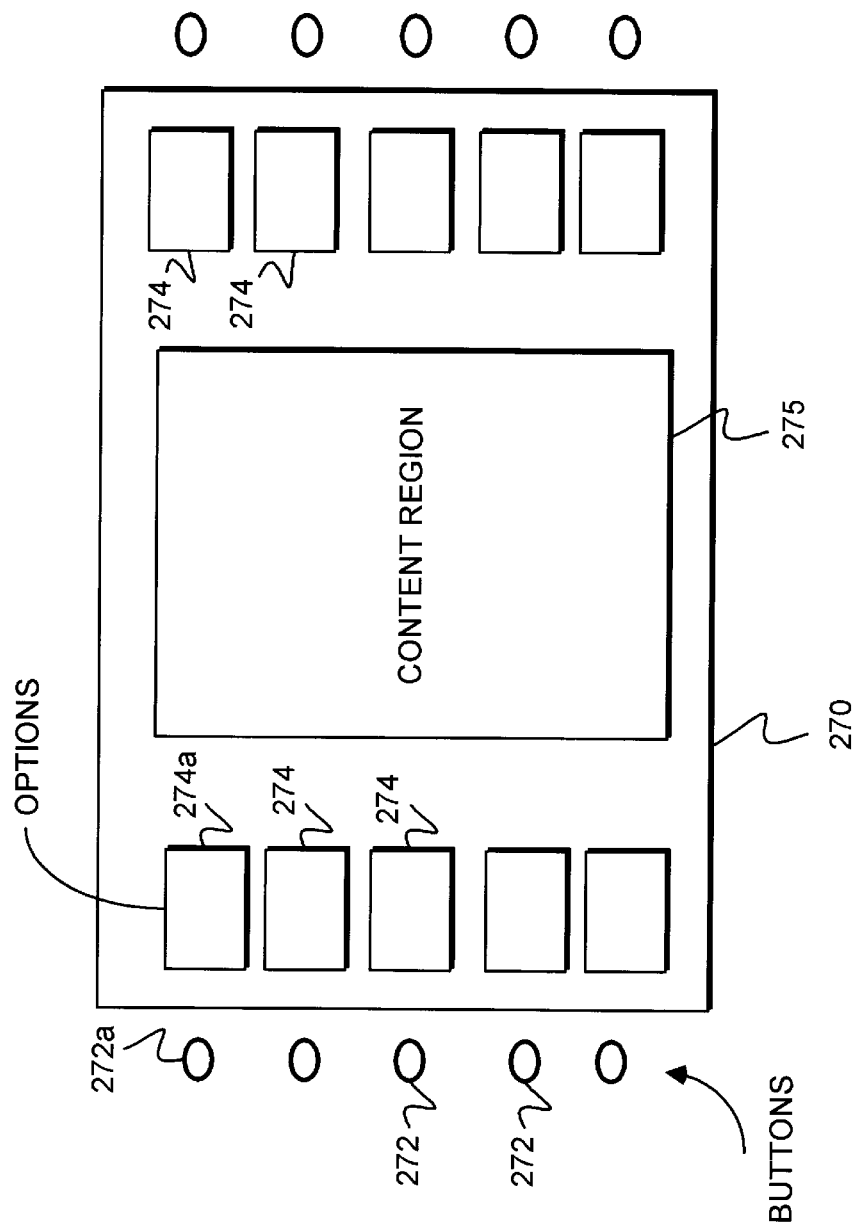
FIG. 9 shows an illustrative display with dedicated keys adjacent to displayed options in accordance with the present invention.

Another arrangement is shown in FIG. 9. In the example of FIG. 9, display 270 is surrounded by buttons 272. Options 274 may be displayed on display 270 so that they are aligned with respective buttons. For example, option 274a is displayed immediately adjacent to button 272a. This arrangement makes it clear to the user that an option may be selected by pressing the its associated button. Content may be displayed in region 275.

Figure 10:
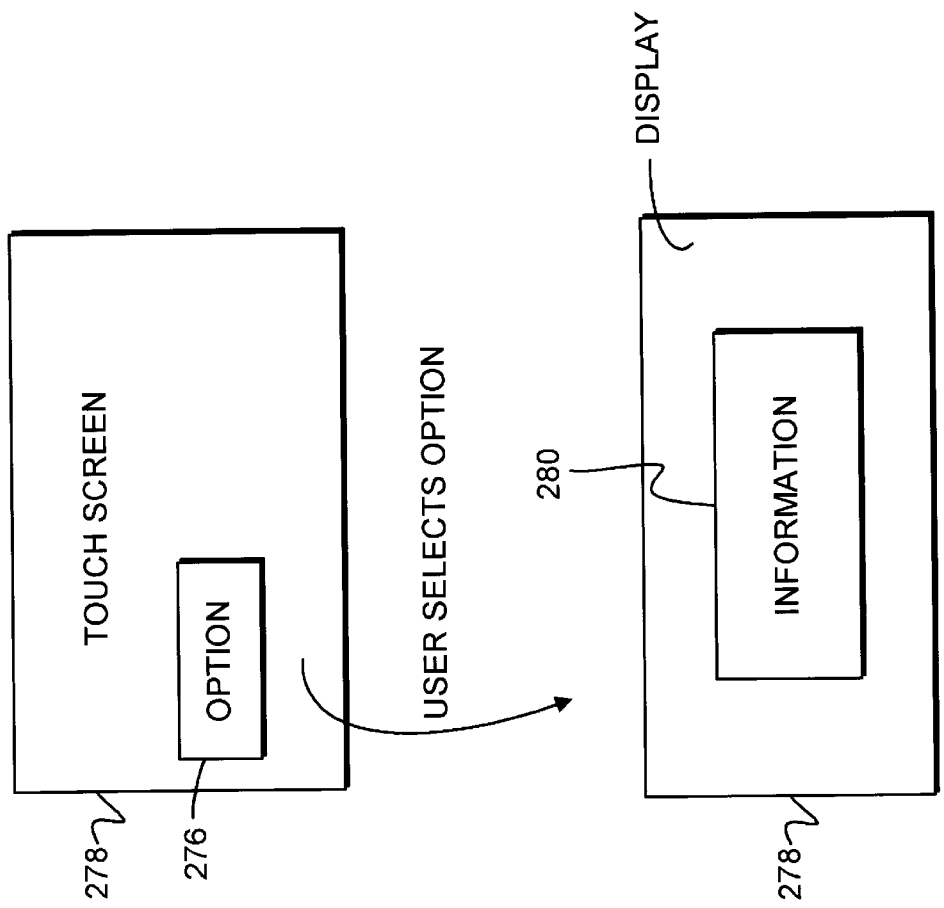
FIG. 10 shows an illustrative touch-screen display arrangement in accordance with the present invention.

If a touch screen display is provided, options may be selected by pressing the appropriate area of the display. As shown in FIG. 10, for example, when option 276 on touch screen 278 is selected by pressing on option 276 (e.g., with a finger, pen, or the like) the automobile personal computer 14 may display information 280 on display 278 or may take any other suitable action.

Figure 11:
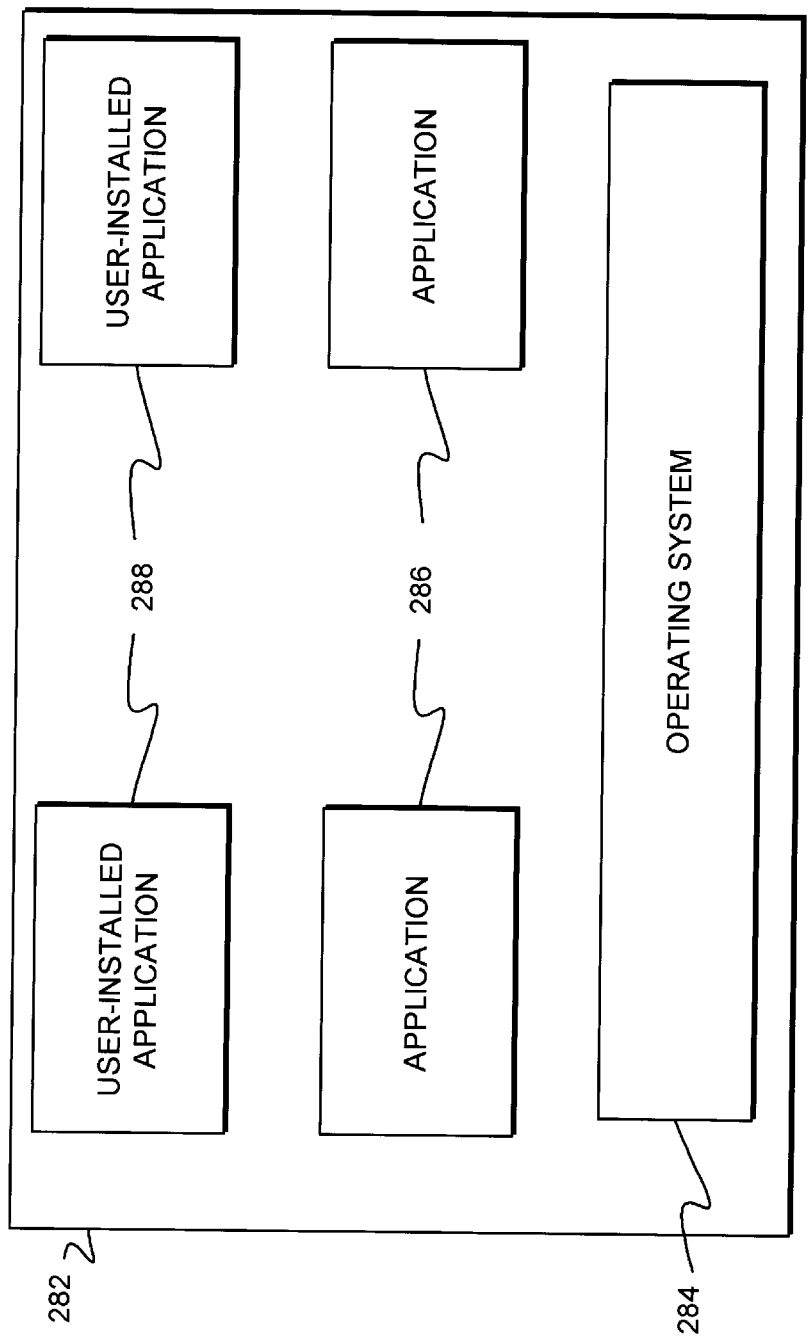
FIG. 11 shows an illustrative software arrangement for the automobile personal computer in accordance with the present invention.

FIG. 11 shows how automobile personal computer 14 may use software 282 such as operating system 284 and applications 286 and 288 to provide various features of the automobile personal computer system to the user. Operating system 284 may be an open platform operating system such as Windows CE or Linux, variants of such operating systems, or any other suitable operating systems. Applications 286 may be installed by the manufacturer of automobile 12 if automobile personal computer 14 is provided by the manufacturer of the automobile 12. If operating system 284 is an open platform operating system, additional applications 288 may be easily installed by the user or a third party installer.

Figure 12:
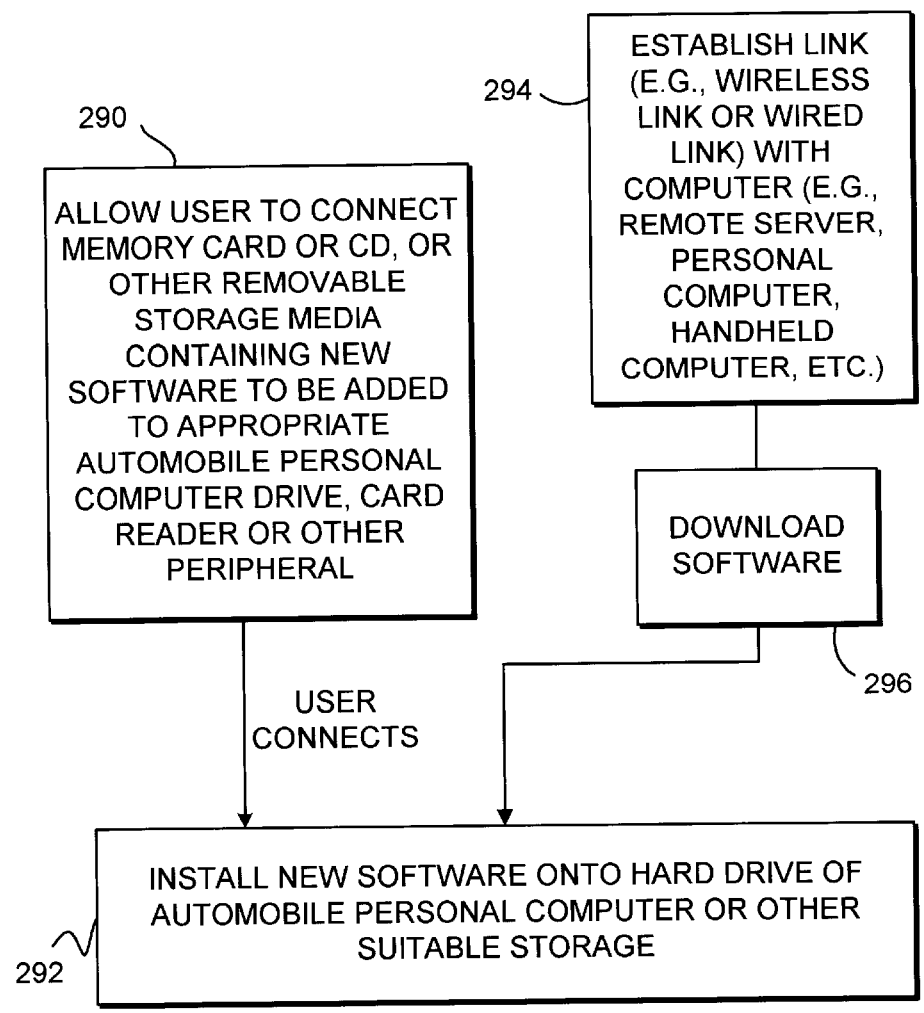
FIG. 12 is a flow chart of illustrative steps that may be used in installing software on the automobile personal computer in accordance with the present invention.

Steps involved in installing software on automobile personal computer 14 after automobile 12 has been provided to the user are shown in FIG. 12. Software may be loaded using a storage media or using a communications path. With the storage media approach, the user may be allowed to connect a memory card to the computer or to install a CD or DVD or other removable storage media that contains the new software in a suitable drive at step 290. At step 292, the user may be provided with an opportunity to install the software. For example, the user may be provided with instructions (e.g., audio instructions or on-screen instructions) that guide the through the installation process. With the communications path approach, a link between the computing equipment that is the source of the software and the automobile personal computer 14 is established at step 294. The link may be a wired link (e.g., using a USB cable or other suitable connector) or may be a wireless link. The wireless link may be optical. For example, the link may involve infrared communications between the source computing device and the automobile personal computer. The wireless link may also use radio-frequency communications. The wireless link may be a local wireless link or remote wireless link. After the link has been established at step 294, the software may be downloaded to the automobile computer at step 296. At step 294, the software installation process may be completed.

Figure 13:
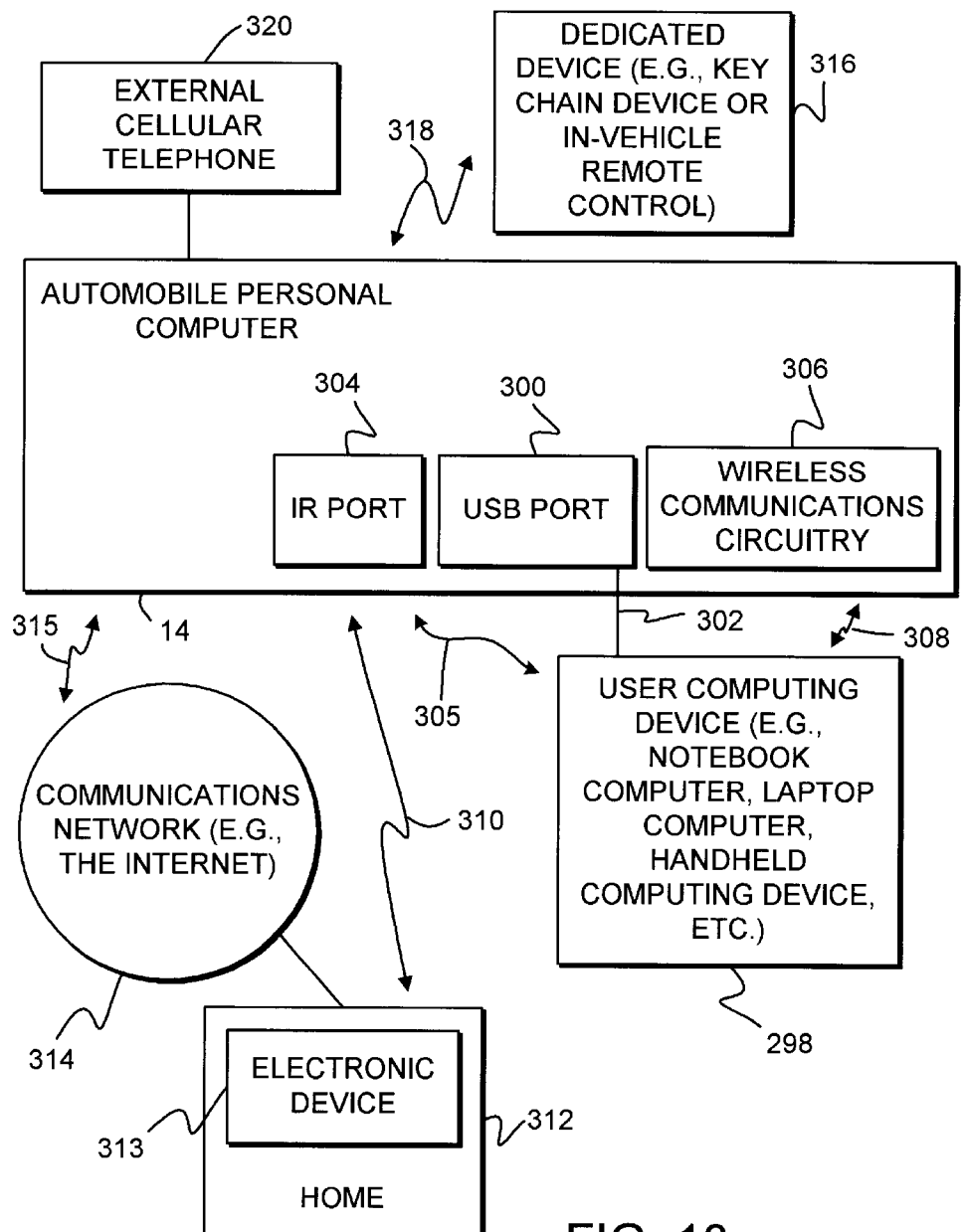
FIG. 13 is a diagram showing an illustrative arrangement in which computers that are separate from the automobile may interact with the automobile personal computer in accordance with the present invention.

Illustrative arrangements in which external devices may be used to communicate with automobile personal computer 14 are shown in FIG. 13. Automobile personal computer 14 may be connected to user computing device 298 using various communications paths. Computing device 298 may be a notebook computer, a laptop computer, or any other suitable portable computer. Computing device 298 may also be a personal digital assistant or any other suitable handheld computing device. Automobile personal computer 14 may have a port such as USB port 300. A USB cable such as cable 302 may be connected between port 300 and a mating port on computing device 298. Automobile personal computer 14 may have an infrared (IR) port 304. If user computing device 298 has infrared communications capabilities, computer 14 and device 298 may communicate over IR link 305. Automobile personal computer 14 may also have wireless communications circuitry 306 that allows automobile personal computer 14 to form a local wireless link 308 (e.g., a direct wireless link over a distance of less than a foot to hundreds of feet) with user computing device 298.

A local wireless link 310 may be formed between automobile personal computer 14 and electronic devices in a home 312 such as device 313. Device 313 may be connected to a communications network 314 such as the Internet. Automobile personal computer 14 may communicate with communications network 314 (and thus electronic device 313) using remote wireless link 315.

Links such as links 302, 305, 308, 310, and 315 may be used to download information to automobile personal computer or to upload information from automobile personal computer. Such links also allow the automobile to be monitored and controlled.

Dedicated devices such as device 316 may communicate with automobile personal computer 14 over local wireless links such as link 318. Such dedicated devices may include key chain wireless devices or infrared remote control devices for use in the interior of the automobile.

Automobile personal computer 14 may include integrated cellular telephone capabilities or may work with an external cellular telephone 320. A satellite telephone may also be used in this way.

The user may interact with automobile personal computer 14 by pressing buttons or using any other suitable physical user input interface and by viewing information displayed on a suitable display. The user may also control the automobile personal computer by giving the automobile personal computer voice commands. The automobile personal computer may respond to physical or verbal inputs using audio in addition to or instead of using visual display techniques.

Verbal instructions for the automobile personal computer may be received using microphone 162 of FIG. 1. Signals from microphone 162 may be digitized and processed using digital signal processor 76 and other suitable processors 72 and support circuitry. Such audio signal processing techniques may be used to recognize anywhere from a few commands to an entire spoken vocabulary. The words that are recognized by the automobile personal computer may be fixed in advance or may be selected by the user. If desired, automobile personal computer 14 may allow the user to train the voice-recognition algorithm to increase the accuracy of the system in recognizing the user's commands. Multiple users may be supported by the system. Each user may train the voice-recognition algorithm separately if desired. If many users are verbally interacting with the computer at the same time, the user-specific voice-recognition capabilities of the computer may be temporarily disabled.

Automobile personal computer 14 may have voice-synthesis capabilities that allow computer 14 to read text out loud to the user. For example, if the user receives an e-mail message, automobile personal computer 14 may use voice-synthesis to play the entire e-mail message through the automobile sound system. This allows the user to handle e-mail messages without a display, so that the user is not distracted while driving. Automobile personal computer 14 may use this technique to handle any text information, whether the information originates from within the automobile or is received from elsewhere.

The user may often desire to adjust various settings for the automobile personal computer system. For example, the user may wish to change the default voice-recognition settings, the settings for the automobile's sound system, settings related to an application running on the automobile personal computer, etc.

The user may change settings by pressing appropriate buttons on the personal computer or by using any other suitable physical user input interface (e.g., a pointing device, touch screen, etc.). The user may also issue voice commands. Feedback from the automobile personal computer may be provided as visual information on displays or may be provided as audio information.

Another approach for adjusting settings involves using. a user computing device such as user computing device 298 or in-home electronic device 313 of FIG. 13. This approach may allow the user to take advantage of the relatively large screen displays of such computing devices relative to the potentially smaller display on an automobile personal computer. This approach may also allow wireless control from a distance, which is not possible if the settings are changed by direct verbal or physical interactions with automobile personal computer 14.

Figure 14:
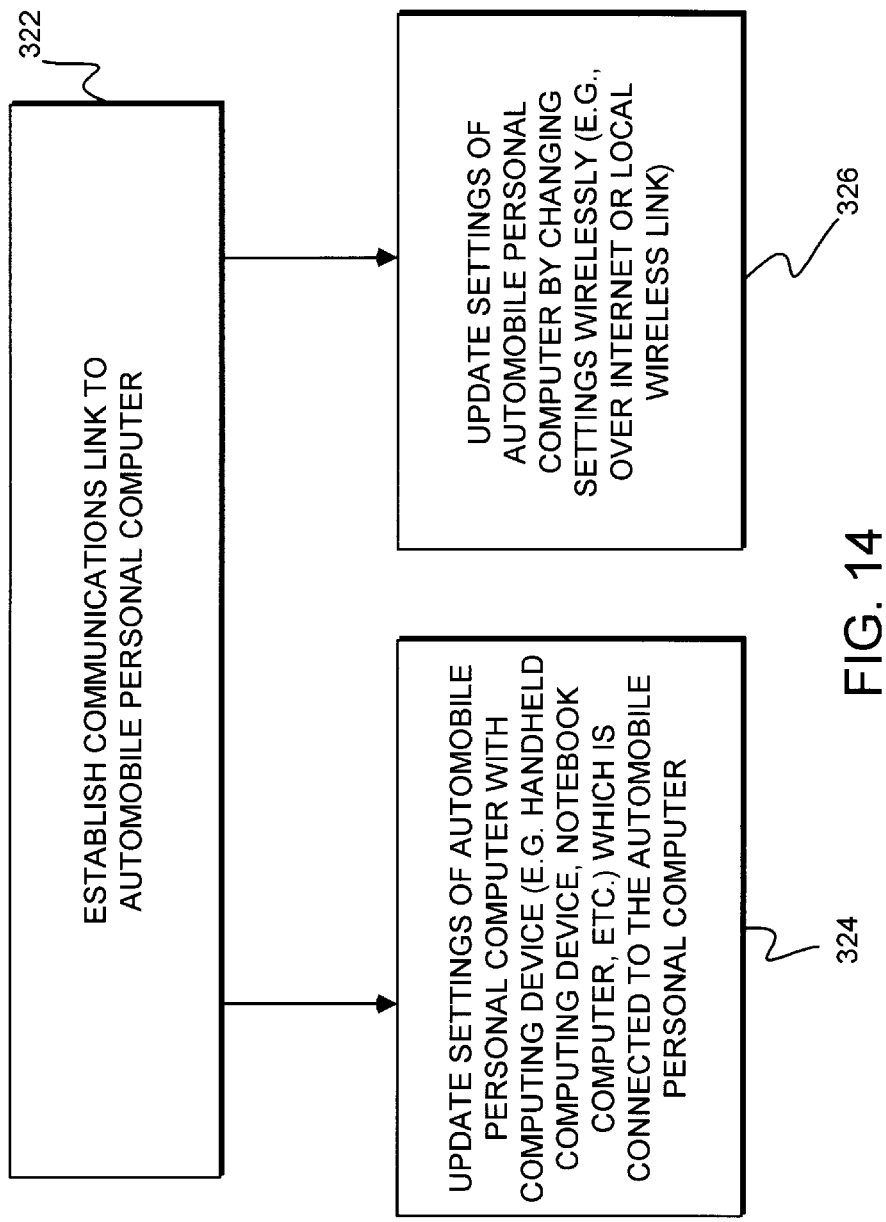
FIG. 14 is a flow chart of illustrative steps involved in updating settings on the automobile personal computer in accordance with the present invention.

Steps involved in adjusting the settings of an automobile personal computer using such computing devices are shown in FIG. 14. At step 322, the user may establish a communications link between the automobile personal computer 14 and the computing device. Settings may be updated over a physical link at step 324 or over a remote or local wireless link at step 326. With either approach, settings may be changed while the user is interacting directly with software running on the automobile personal computer (e.g., to provide information in response to queries or make adjustments to on-screen buttons) or may be changed by downloading a configuration file or the like to the automobile personal computer. A combination of these techniques may be used if desired.

Figure 15:
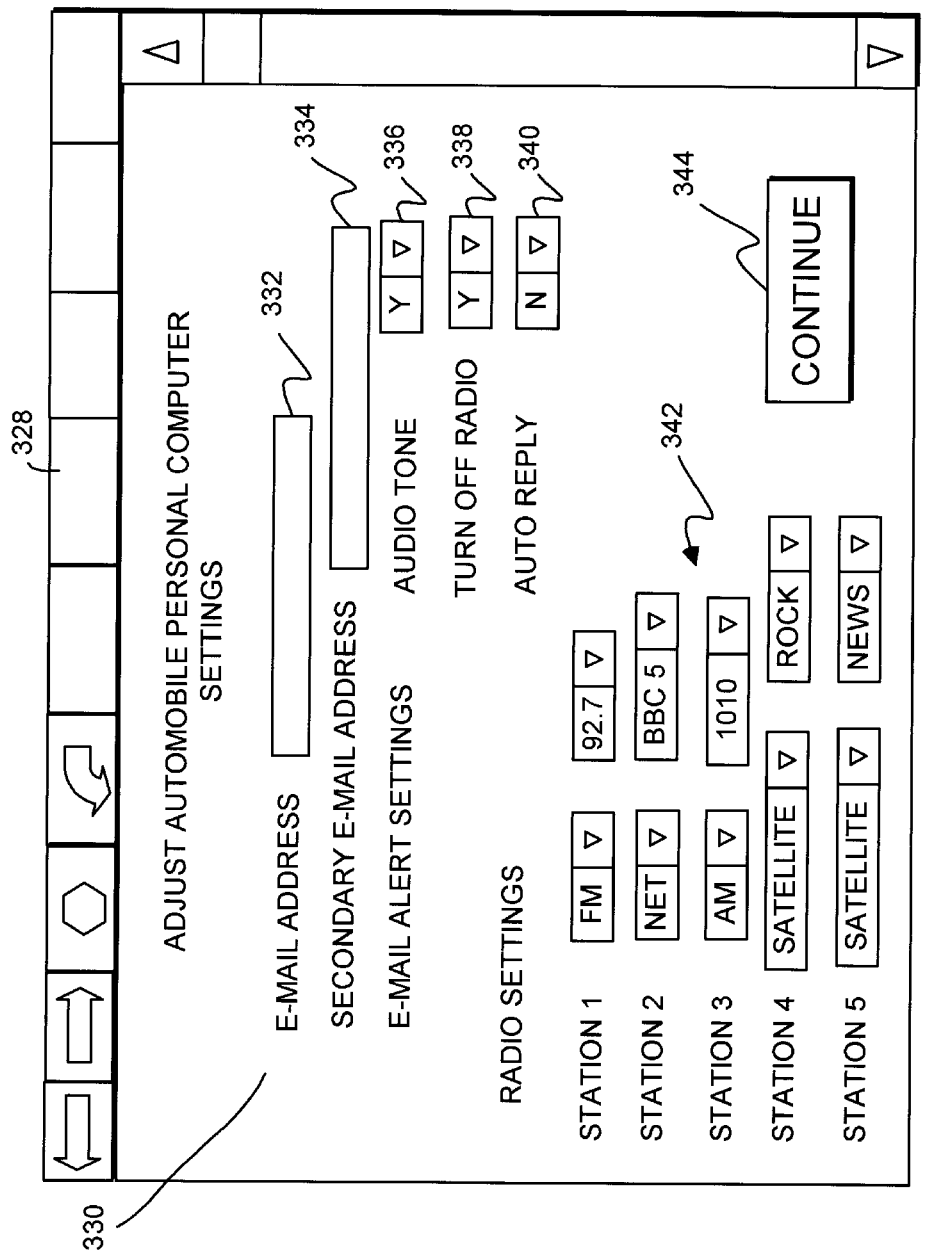
FIG. 15 shows an illustrative web-based user interface that may be used when adjusting settings on the automobile personal computer in accordance with the present invention.

An illustrative web-based interface that may be used to adjust automobile personal computer settings is shown in FIG. 15. A web browser with interactive controls 328 may be used to allow the user to interact with web page 330. If a direct physical communications link such as a cable is used to connect automobile personal computer 14 and the computing device or if a local wireless link is used, web page 330 may be provided directly to the computing device by automobile personal computer 14. If a remote link is used, web page 330 may be provided from computer 14 or may be supplied by a server on the Internet or other such facility that is remote from computer 14.

Settings that require remote updates to be made to communications servers or service provider computers may require that the computing device or automobile personal computer 14 make a connection with such entities after the settings adjustment session is complete. For example, if the user adjusts the e-mail address of the automobile personal computer, it may be necessary to provide this information to an e-mail server, so that e-mail messages for the user are properly routed to the automobile personal computer.

Illustrative web page 330 may contain options that the user may interact with to adjust or supply various settings. For example, option 332 allows the user to supply an e-mail address that the automobile personal computer may use to receive e-mail. Option 334 may be used to supply a secondary e-mail address that the automobile personal computer may use to receive information. The secondary e-mail address may, for example, be the user's usual work e-mail address. By adding the work e-mail address with option 334, the user's work e-mail may be received with the automobile personal computer (e.g., when the user is away from work on a road trip).

Options such as options 336, 338, and 340 may be used to adjust the user's e-mail alert settings. For example, option 336 may be used to turn audio tone alerts on or off. When option 338 is turned on, automobile personal computer 14 will turn the audio volume of the automobile's sound system down when an e-mail is received. This allows the automobile personal computer to use voice synthesis to read the e-mail to the user. Option 340 allows the user to select whether the automobile personal computer is to automatically respond to the user's e-mail. If the auto-respond feature is turned on, the user-may be presented with additional options that the user may select to inform the automobile personal computer of which actions are to be taken in response to the receipt of an e-mail message.

Radio settings may be adjusted using options such as options 342. The user may, for example, be provided with an opportunity to establish button assignments using web page 330. When the user is using automobile personal computer 14 to listen to audio content, the user may press a button on computer 14 that is labeled "1" to direct the automobile personal computer 14 to tune to the station the user has assigned to station 1 using web page 330. If the user has finished entering the desired options on page 330, the user may select continue option 344. When the user has finished adjusting settings for the automobile personal computer, the user may exit. The features of screen 330 are merely illustrative. Any suitable features may be provided if desired.

When adjusting radio settings using options 342, the station that the user wishes to assign to each button may be selected using drop-down menus or other suitable interfaces. Drop-down menus may, for example, allow the user to select radio stations from a list by specifying the band and frequency of each desired station. Band options may include traditional radio formats such as AM and FM. Band options may also include digital terrestrial radio, satellite broadcast radio, Internet radio, and other suitable band options. The drop-down menu for band selection may therefore include entries such as AM, FM, DIGITAL, INTERNET, SATELLITE, etc. Terrestrial digital radio may involve digital audio transmissions from terrestrial antennas. Satellite broadcast radio may involve, e.g., digital music channels that are available by subscription. Internet radio stations may involve the rebroadcast of radio content from a regular broadcast source. Internet radio may be received by automobile personal computer 14 over a satellite or terrestrial wireless Internet link and may be decoded using an application that decodes streaming audio content.

If the user wishes to subscribe to a service to which the user does not presently subscribe (e.g., digital satellite radio service or Internet service or the like), web page 330 or any other suitable web page may be used to provide the user with ordering options. If the web page is being provided by a source other than the content provider of the service to which the user desires to subscribe, information on the user's order may be provided to the appropriate service provider (e.g., one of content providers 30 of FIG. 1) to consummate the transaction.

A web-based interface such as the interface of FIG. 15 may be used in various situations. As just one example, an automobile manufacturer may maintain a web site that the user may access from a personal computer in home 312. When the user logs on to the web site, the user may be provided with an opportunity to subscribe to a digital satellite service that is available from the automobile manufacturer. If the user opts to subscribe, an on-line transaction may be completed that signs the user up for the service. When the sign-up process is complete, configuration data that enables the automobile personal computer to obtain the new satellite service may be downloaded into automobile personal computer 14, the user may be provided with a code to provide to automobile personal computer 14 to activate the service, etc.

The web-type interface of FIG. 15 is particularly appropriate for computing devices that are relatively full-featured, such as personal computers, notebook computers, laptop computer, or the like. A similar arrangement (with a smaller display screen) may be used by handheld devices or the like if desired. Using this interface may be easier for the user than interacting directly with automobile personal computer 14. If desired, however, the user may adjust settings such as those described in connection with the arrangement of FIG. 15 using voice commands or by pressing buttons on computer 14 or otherwise directly interacting with computer 14.

Figure 16:
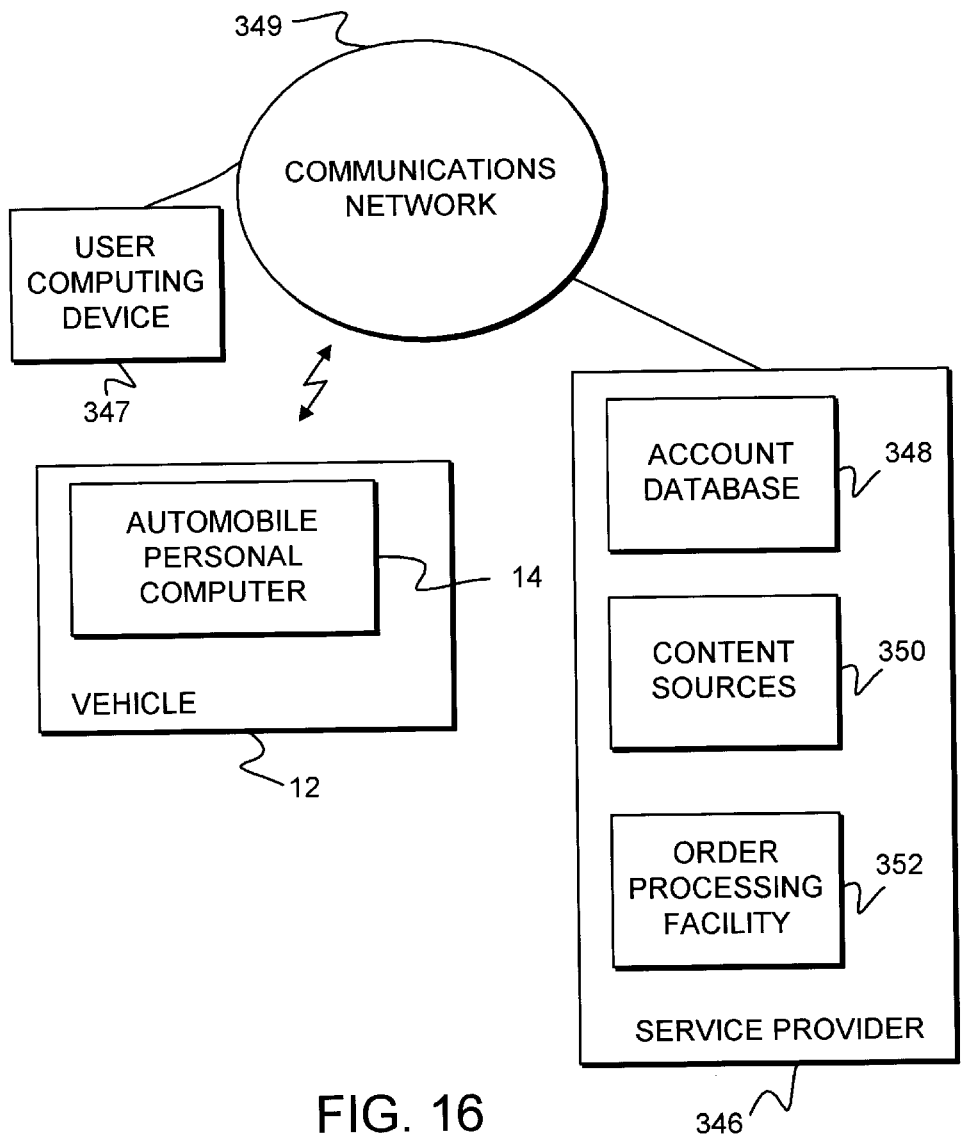
FIG. 16 is a schematic diagram showing how an automobile personal computer may access various services over a communications network from a single service provider in accordance with the present invention.

As shown in FIG. 16, a single service provider 346 (e.g., an automobile manufacturer or associated entity or a content-related company such as a web portal company or the like) may provide a user of automobile personal computer 14 with a number of different services. Automobile personal computer 14 and user computing device 347 (e.g., a personal computer, handheld computing device, etc.) may be linked to service provider 346 over communications network 349 (e.g., the Internet). Service provider 346 may use an account database 348 to store information on the user's account status. This may allow the user to subscribe to services (e.g., music services, news services, communications services, data services, etc.). These services may be provided using content sources 350 that are maintained by the service provider. Content sources may use servers and may provide content continuously (e.g., music, satellite radio, etc.), periodically (e.g., traffic reports), or on-demand (e.g., Internet content). These approaches may be combined. For example, broadcast radio (e.g., satellite radio or terrestrial radio of other radio broadcast signal) may be combined with Internet access to provide interactive audio content. In this example the interactive component of the audio content uses an Internet link, but any other type of interactive link may be used if desired.

When the user desires to subscribe to a service, service provider 346 may debit the user's account using database 348. Because service provider 346 has access to the user's account status, the service provider 346 may allow the user to purchase additional products and services using the account. For example, a compact disc being promoted using interactive audio may be purchased from service provider 346. An order processing facility such as order processing facility 352 may be used to process the orders. When a user of automobile personal computer 14 responds to such interactive audio content, the user's order may be transmitted from automobile personal computer 14 to order processing facility 352 (e.g., over a remote wireless link using network 349 or other suitable communications path).

If desired, the functions of account database 348, content sources 350, and order processing facility 352 may be provided by one or more entities other than the service provider (i.e., entities that are associated with but distinct from the service provider).

As shown in FIG. 13, a dedicated wireless device 316 such as a wireless key chain device or an infrared or wireless in-car remote control may be used to control automobile personal computer 14. If desired, a dedicated wireless device may be used to control both automobile personal computer 14 and other equipment or devices. For example, a wireless key chain device may be used to control automobile personal computer 14 and devices in the home.

Figure 17:
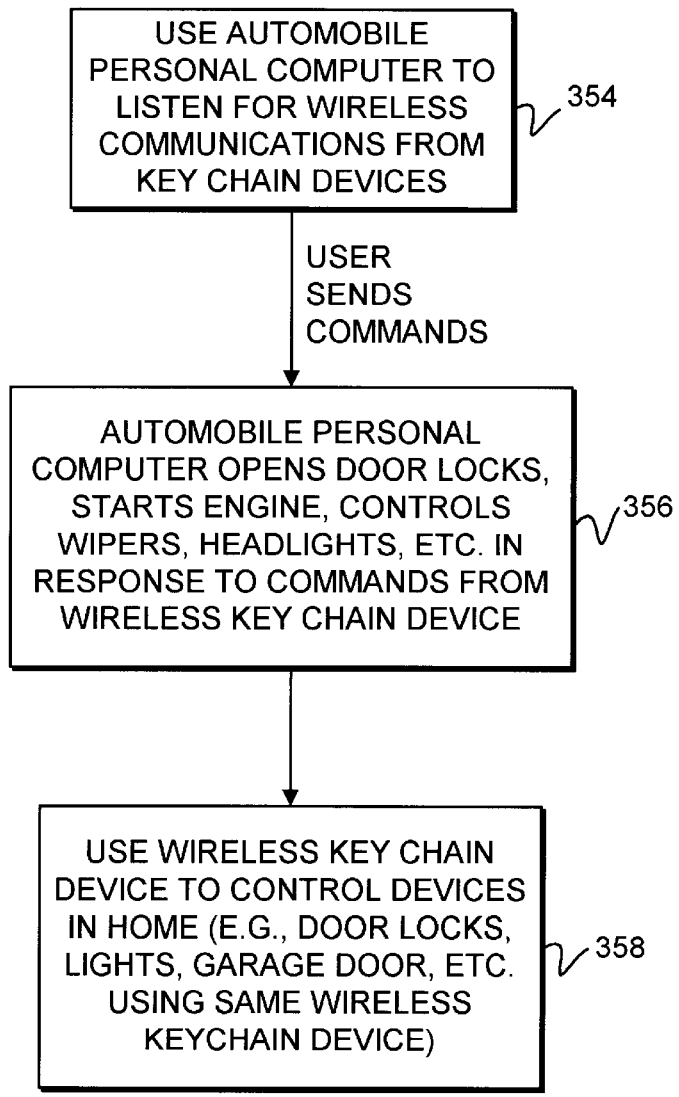
FIG. 17 is a flow chart of illustrative steps involved in using a wireless key chain device to control the automobile personal computer and the home in accordance with the present invention.

Steps involved in using wireless key chain devices with automobile personal computer 14 are shown in FIG. 17. At step 354, the automobile personal computer listens for wireless commands from key chain devices. In response to wireless commands sent from the wireless key chain device to automobile personal computer 14, automobile personal computer 14 may open the door locks on automobile 12, may start the engine of the automobile, may adjust the heat and air conditioning, and may control the wipers, headlights, rear defogger, and any other suitable equipment in the automobile at step 356.

The wireless key chain device may have distinct buttons to perform each of these functions or several of the functions may be grouped together and invoked using a smaller number of buttons (e.g., one or a few buttons). For example, one button may open the door locks and start the engine. The user may use this buttons on days with normal weather. Another button may open the door locks, start the engine, turn up the heat, turn on the rear defogger, turn on the headlights, and turn on the wipers. This button may be used when there is inclement weather. These examples are merely illustrative.

The wireless key chain device may be preprogrammed by the manufacturer. If desired, the device may be reconfigurable by the user (e.g., using a local wireless link from automobile personal computer 14).

The wireless key chain device may use any suitable wireless communications circuitry to communicate with automobile personal computer 14 over a local wireless link. If desired, the wireless key chain device may also be used to activate devices in the home at step 358. Devices that may be controlled include door locks, lights, garage doors, etc. The wireless key chain device that is used to open the garage door (for example) may be the same device that is used to control the automobile.

Figure 18:
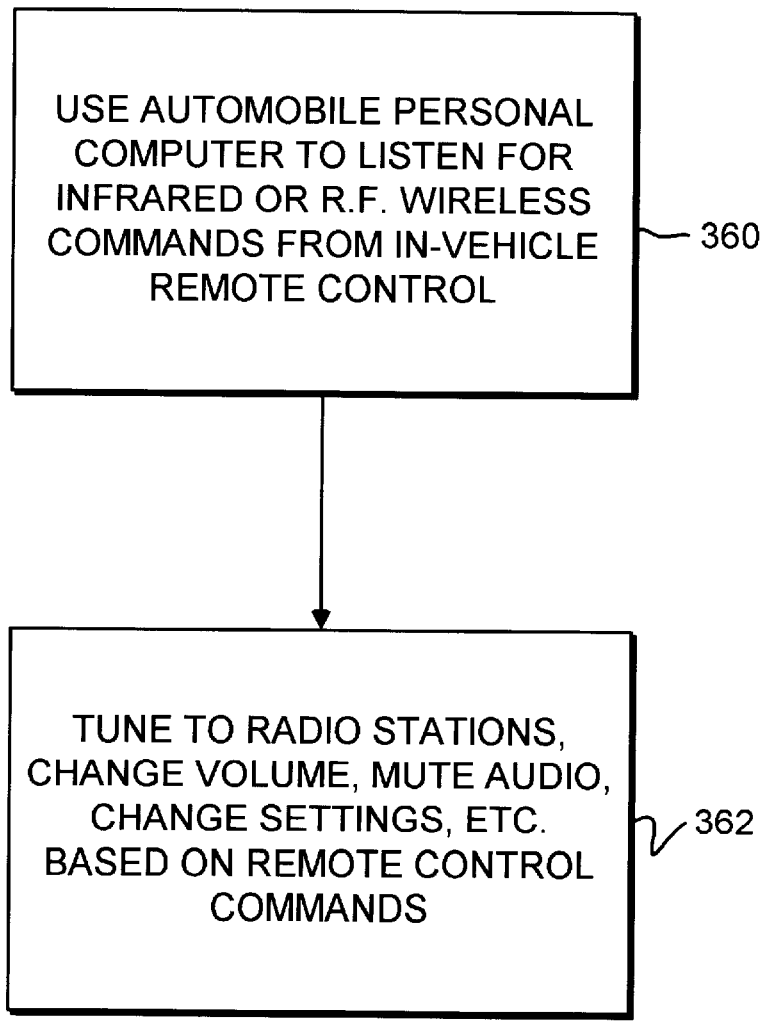
FIG. 18 is a flow chart of illustrative steps involved in using an in-vehicle remote control in accordance with the present invention.

Steps involved in using an infrared or wireless in-car remote control to control automobile personal computer 14 are shown in FIG. 18. At step 360, the automobile personal computer 14 listens for infrared or RF wireless commands from an in-vehicle remote control. In response to receiving such commands, automobile personal computer 14 may tune to a radio station, change the sound system volume, mute the audio, change computer settings, etc. at step 362.

Devices in the home may be used with the automobile personal computer 14. For example, a small dedicated touch screen device in the home may be used to start automobile 12 by interacting with automobile personal computer 14. Personal computers may also be used to interact with automobile personal computer 14. For example, settings may be adjusted or the car remotely controlled from a personal computer over the Internet or other suitable remote link using an interface such as the interface of FIG. 15.

Several approaches may be used when the automobile's engine is to be started remotely. With one approach, such operation may only be permitted when the key is already in the ignition. This avoids the problem of a user starting a car using a short-range wireless link, driving out of range of the link and turning off the automobile and then being unable to drive any further. Another approach is to allow the automobile's engine to be started remotely without a key in the ignition, but to require that the key be used to release the parking brake or to put the automobile into gear. This allows the user to start the automobile remotely (e.g., from inside the user's home) without concern that the automobile might be stolen. Yet another approach is to allow the engine to be started remotely and to allow the parking brake to be released and the automobile put in gear. This approach may allow a user who has lost the keys to the automobile to start the automobile remotely and to drive the automobile once it has been started. These approaches are merely illustrative.

Figure 19:
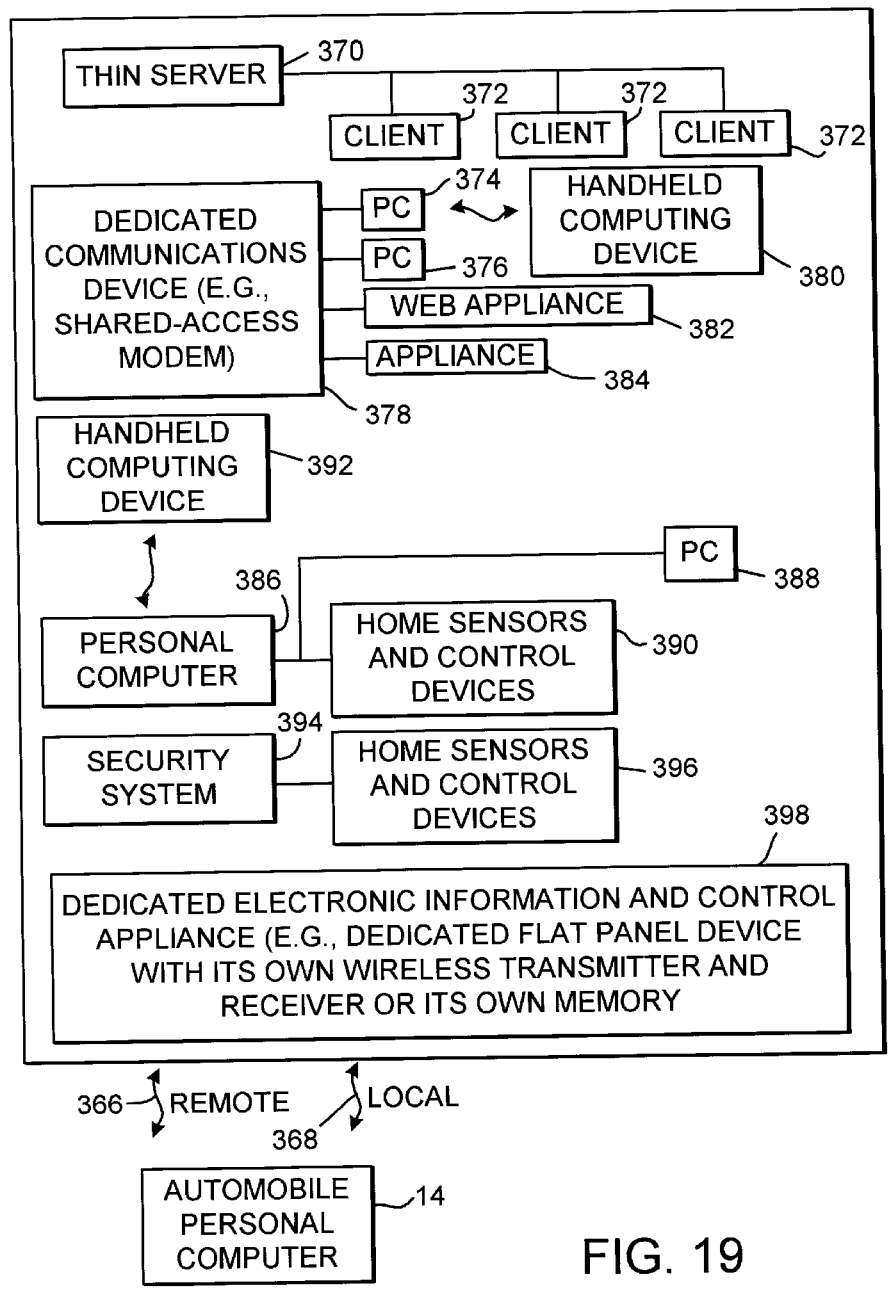
FIG. 19 is a schematic diagram showing how various computers, computing devices, web appliances, and other devices in the home may be used to interact with the automobile personal computer in accordance with the present invention.

A home 364 that contains various illustrative electronic devices is shown in FIG. 19. Although possible, it is not necessary to include all of the devices shown in FIG. 19 in a single home. These devices are depicted in a single drawing for clarity. As shown in FIG. 19, automobile personal computer 14 may communicate with the devices in home 364 using a remote wireless link 366 or a local wireless link 368. A thin server 370 that contains suitable communications circuitry for communicating over a remote wireless link or a local wireless link may be interconnected with a number of client devices 372. The client devices may be small dedicated sensor and control devices, electronic appliances (e.g., web appliances), computing devices (e.g., a personal computer), etc. Thin server 370 may act as a residential gateway to communications networks such as the telephone network and the Internet. Thin server 370 may communicate with automobile personal computer 14 through a remote wireless path that involves such a communications network. Thin server 370 may also have a wireless receiver and transmitter for communicating with automobile personal computer 14 directly over a local wireless link.

Automobile personal computer 14 may also communicate with personal computers such as personal computers 374 and 376 over a remote wireless link that terminates by passing through a dedicated communications device 378 in the home such as a shared-access modem. If desired, communications device 378 may be part of a residential gateway platform. A handheld computing device 380 may communicate with personal computer 374 over a wireless link such as an infrared link or using a cable. This allows user commands from handheld computing device 380 to be passed to automobile personal computer 14 and allows information from automobile personal computer 14 to be passed to handheld computing device 380. Web appliances such as web appliance 382 and other electronic information and control appliances 384 may also be connected to automobile personal computer 14 through dedicated communications device 378. Web appliances may be used to access Internet or intranet web page content and my commitment with dedicated communications device 378 or other suitable equipment using a local wireless link. Dedicated communications device 378 may have wireless transmitter and receiver circuitry that supports communications with automobile personal computer 14 over a local wireless link.

If desired, a personal computer such as personal computer 386 may have communications circuitry for communicating with automobile personal computer 14 over a remote wireless link or a local wireless link. Personal computer 386 may be networked with other personal computers such as personal computer 388. If desired, personal computer 386 may be configured to serve as a residential gateway to the Internet. Various home sensors and control devices 390 may also be connected to personal computer 386. By virtue of their connections with personal computer 386, personal computer 388 and sensors and control devices 390 may communicate with automobile personal computer 14. A handheld computing device 392 that is in wireless communication with personal computer 386 may communicate with automobile personal computer 14 using its own communications circuitry (e.g., communications circuitry for communicating with automobile personal computer 14 over a remote wireless link or a local wireless link) or may communicate with automobile personal computer 14 through personal computer 386.

A security system 394 may have communications circuitry for communicating with automobile personal computer 14 over a remote wireless link or a local wireless link. Security system 394 may be used to control and receive information from home sensors and control devices 396. Sensors and control devices 396 (and sensors and control devices 390) may include door sensors and locks, heating system controls, smoke detectors, temperature sensors (e.g., to detect freezing temperatures or fire), water detectors (e.g., to detect flooding), carbon dioxide detectors, propane detectors, glass integrity and vibration detectors, window sensors and locks, sensors and controls for interior and exterior lights, control for an external siren. These are merely illustrative examples. Any suitable sensors and controls may be provided if desired. Devices 396 may communicate or interact with automobile personal computer 14 through system 394.

System 394 may serve as a residential gateway and may communicate with personnel at a service center or police station if one of the sensors and control devices 396 detects a problem in the home. System 394 may also communicate such alerts to the automobile personal computer. For example, system 394 may notify the user at automobile personal computer that the basement is flooding, that a window alarm has been triggered, that the temperature has dropped below freezing, etc. Such alerts may be provided to the user via e-mail or other messaging technique, or any other suitable communications technique. If desired, information on the status of the user's home may be provided on a web page that the user can access from automobile personal computer 14 using an automobile personal computer web browser. Such a web browser may use an audio interface, so that the user is not distracted while operating the automobile.

A dedicated electronic information and control appliance 398 may also have communications circuitry for communicating with automobile personal computer 14 over a remote wireless link or a local wireless link. Such a dedicated device may be, for example, a touch screen device with a wireless transmitter or wireless transmitter and receiver suitable for short-range RF communications.

The functions of sensors and controls 396 and security system 394 may be provided by other in-home equipment. For example, these functions may be provided by thin server 370 and clients 372. For example, clients 372 may include door sensors, lighting controls, etc. and thin server 370 may handle communications with service providers, the police, automobile personal computer 14, and other entities. Such functions may also be provided using personal computers such as personal computers 374 and 376 and appliances 382 and 384 as sensor and control devices and using dedicated communications device 378 to handle communications with a service provider, the police, automobile personal computer 14, and other entities. Home sensors and control devices 390 and personal computer 388 may be used as sensor and control devices and personal computer 386 may be used to handle communications with a service provider, the police, automobile personal computer 14, and other entities. Dedicated electronic appliance 398 may perform sensor and control functions and may handle communications with a service provider, the police, automobile personal computer 14, and other entities.

The in-home devices of FIG. 19 may be interconnected with each other using a wired or wireless in-home network or other suitable interconnections if desired. Whether or not the in-home devices are networked, the devices may communicate with various entities using either wireless communications or wired connections as appropriate. As an example, a wireless connection may be used to communicate with automobile personal computer 14, whereas a wired connection may be used to contact a service provider, the police, and other entities.

The communications circuitry used by the in-home devices of FIG. 19 to communicate with automobile personal computer 14 over a remote wireless link may include, for example, a modem such as a telephone modem, cable modem, ISDN modem, DSL modem, or any other suitable wired communications circuitry for connecting to the telephone network, or the Internet, or other suitable communications network through a wired path. The automobile personal computer may be connected to the communications network using a wireless terrestrial communications path or a satellite communications path.

The communications circuitry used by the in-home devices of FIG. 19 to communicate with automobile personal computer 14 over a local wireless link may include any suitable RF transmitter circuitry or transmitter and receiver circuitry that is capable of communicating over short distances (e.g., distances comparable to the distance between the interior of the user's home and the user's driveway or garage where the automobile is parked).

If desired, in-home electronic devices such as the devices shown in FIG. 19 may be used in a business or at the user's office or at any other suitable location. For example, a user at work may use a handheld computing device such as handheld computing device 392 or a personal computer such as personal computer 386 or may use computers connected over local area networks, etc. to communicate with the user's automobile personal computer 14 over a remote or local wireless connection. If, for example, automobile personal computer 14 is in an automobile 12 parked in the parking lot at work and if it is snowing outside, the user may start the automobile from inside the office just prior to leaving work. For example, the user may start the engine in automobile 12, turn on the heat, the defroster, and the rear defogger, while leaving the doors locked and the driving functions of the automobile immobilized for security reasons. The user may also forward information to automobile personal computer 14 (e.g., unanswered e-mail messages or other work) from a computer (e.g., a personal computer) or a handheld computing device at work.

As the user arrives home in automobile 12, the user may use the automobile personal computer 14 to forward information to the devices in the home and may use automobile personal computer 14 to control the devices within the home. For example, the user may open the garage door and turn on the exterior home lights using automobile personal computer 14. This may be done automatically when the automobile personal computer 14 detects that the automobile is headed toward the home. The user's location and heading may, for example, be determined using the location and direction capabilities of GPS receiver 112 (FIG. 1).

Later, as the user departs from the home for automobile 12, the user may use the devices in the home to forward information from the devices in the home to the automobile personal computer 14 and may control the automobile personal computer 14 and automobile 12 using the in-home devices. For example, the user may be listening to a particular digital audio recording (e.g., a digital audio recording stored as an MP3 file) on digital home audio equipment (e.g., equipment that is one of clients 372) or a personal computer, etc. If the user does not want to miss the end of the recording, the user may instruct client 372 or any other equipment being used to forward the recording to automobile personal computer 14 over a local or remote wireless link, where the recording may be played back through the sound system of automobile 12. The user may also use an in-home device to instruct the automobile personal computer 14 to turn on the engine of the automobile 12 and open the garage door.

Because the in-home device may be networked within the home, the in-home device may also be used to turn down the heat or air conditioning in the home and to turn off all of the lights. If desired, the user may set up routines that are to be run when the user wants to complete a frequently-performed task. For example, an in-home device may be programmed to perform all "leaving home" functions at the touch of a single button.

Personal computers in the home may need to be booted up before they are used. The boot process may take several minutes. For many uses (e.g., running financial programs, games, desk-top publishing, etc.), this time period is not significant. However, for casual use (e.g., to turn on lights in the home or to check the current weather), such a boot-up process may be burdensome. Users with in-home devices that are less complex than personal computers may therefore be able to perform certain functions more easily than users with personal computers.

An illustrative in-home electronic device or appliance that is optimized for casual use may have some or all of the following characteristics. It may always be on or almost on. For example, the display may always be lit and the device running, the display may be in a temporary screen-saver mode, or the device may be in a temporary sleep mode. The device may use a relatively small and lightweight display. For example, a flat-panel display may be used. Such displays may use liquid crystal display technology. Active-matrix displays may be used. Then in-home device may be battery powered or may be run off of a DC power cord. Battery-powered devices and devices that are powered with DC power cords may be more easily mounted on a wall or kitchen appliance or other such location, or may be positioned on a counter top more easily than devices with integral AC power supplies. If an integral AC power supply is used it may be small in size. A simple user interface may be provided. For example, task buttons may be used to provide shortcuts for popular actions. A touch screen display may be used, so that the user need not use a pointing device or keyboard. If keypads or keyboards are used, they may have keys that are relatively small (e.g., smaller than keys on standard computer keyboards or smaller than cellular telephone keys). The devices may be wall-mounted, mounted on kitchen cabinets, mounted on a refrigerator or stove, provided on counter-tops, integrated into kitchen appliances such as refrigerators or stoves, integrated into audio and video equipment, combined with telephones, answering machines, light switches, etc. A device may be provided with any suitable combination of these attributes.

Although use of such relatively less complex in-home devices may sometimes be more convenient than using a personal computer, the user may only have access to a personal computer or may prefer using a personal computer. The automobile and home monitoring and control features of the invention may be provided using any suitable platform, whether a personal computer or a less complex in-home electronic device or appliance.

Figure 20:
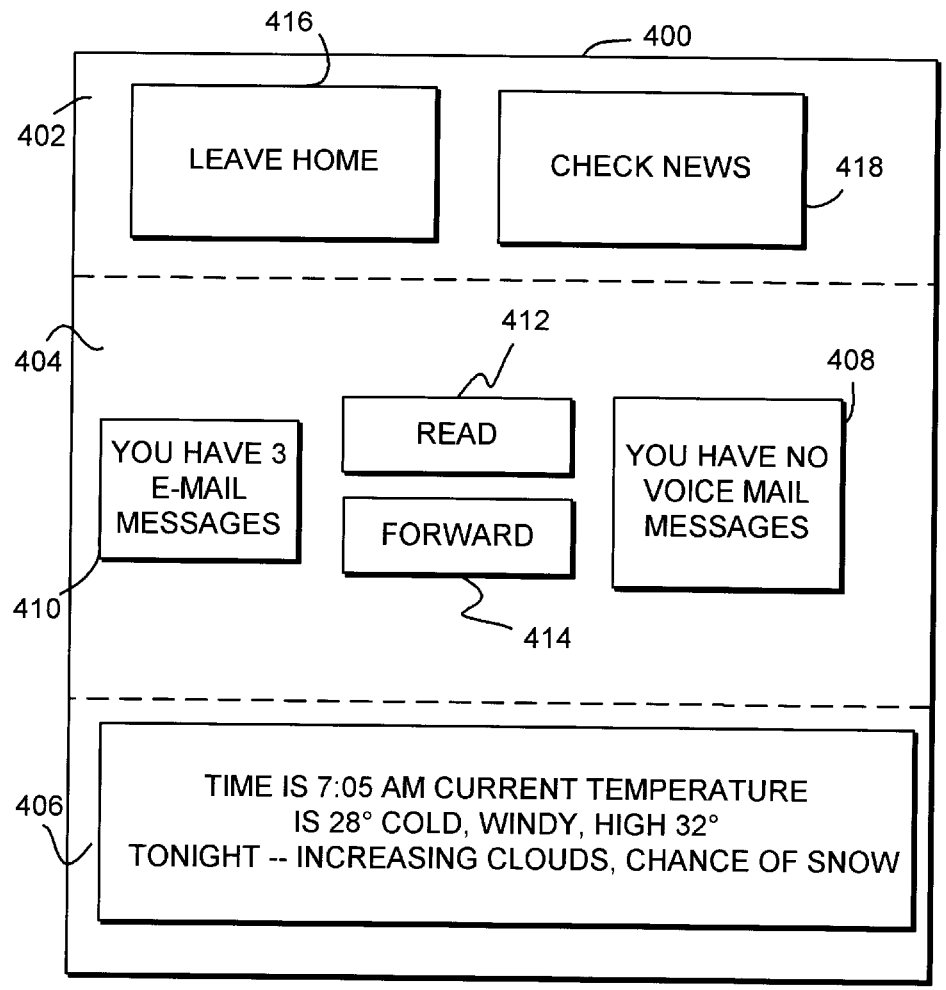
FIG. 20 shows illustrative options that may be displayed on a touch screen device in the home in accordance with the present invention.
Figure 21:
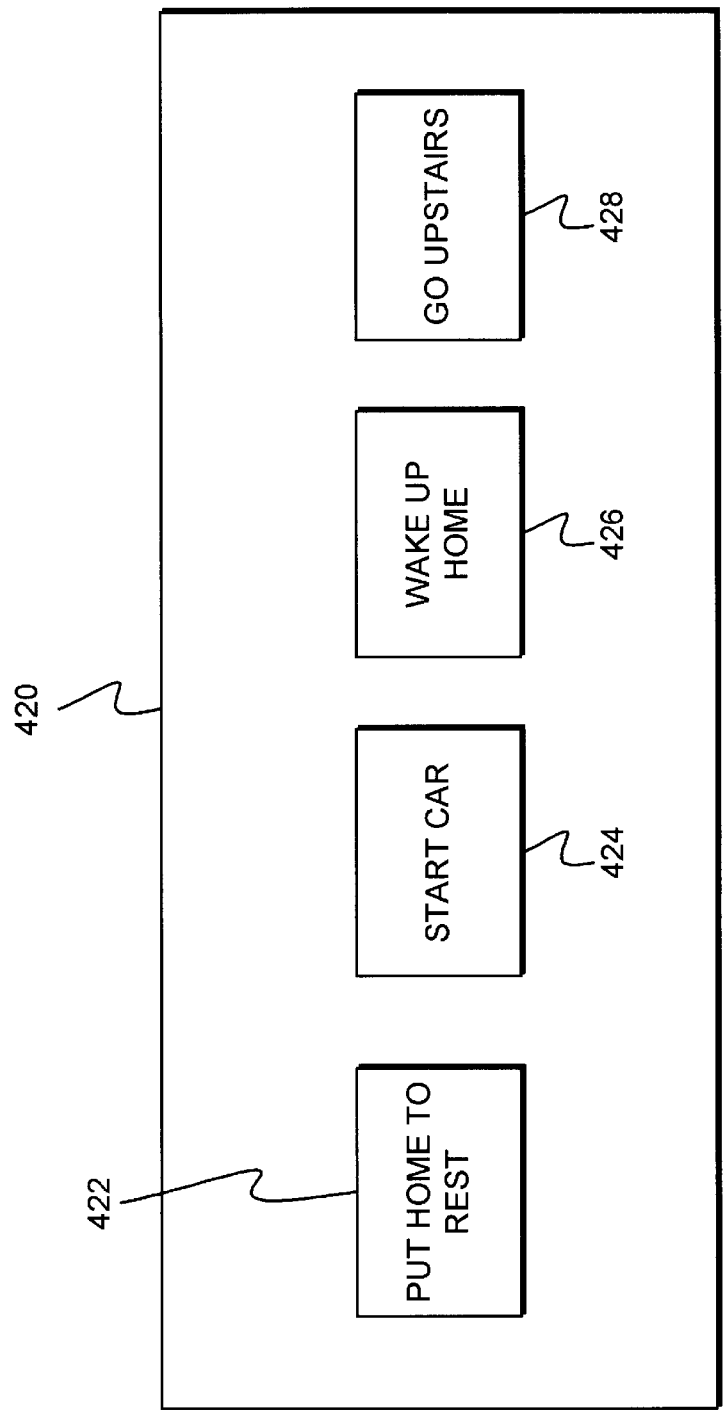
FIG. 21 shows additional illustrative options that may be displayed on a touch screen device in the home in accordance with the present invention.
Figure 22:
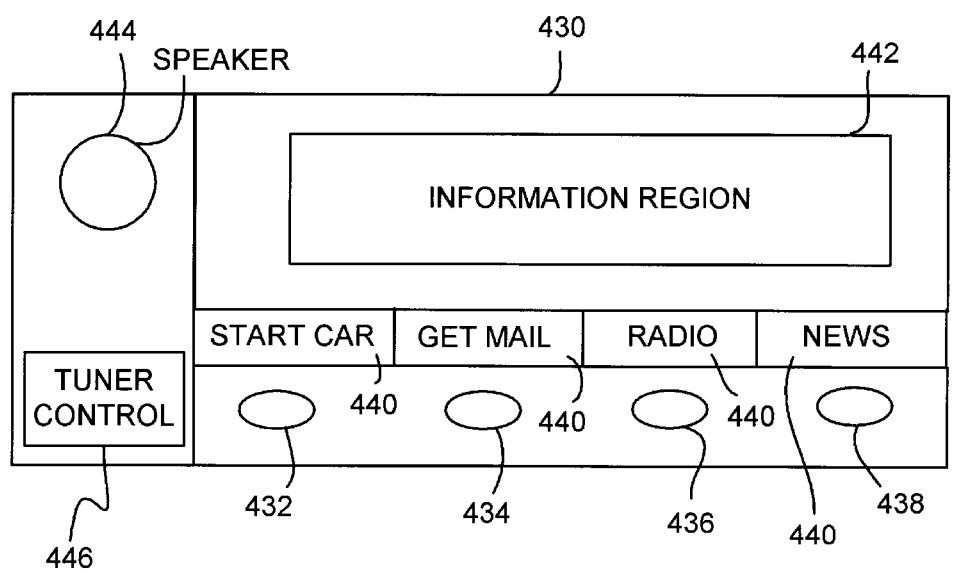
FIG. 22 shows an illustrative in-home device that has a button that may be used with the automobile personal computer to start an automobile in accordance with the present invention.

Illustrative screens that may be provided on the displays of personal computers and other in-home electronic devices and appliances such as the devices of FIG. 19 are shown in FIGS. 20–22.

In the example of FIG. 20, screen 400 contains a number of selectable options in region 402, various notifications and associated options in region 404, and time, date, weather, and other information in region 406.

The information for region 406 may be obtained, for example, from an Internet service or the like. Suitable information for region 406 may include weather, news, stock quotes, or any other suitable information. If desired, the information that is displayed in region 402 may be personalized for the user.

The notifications presented in region 404 may include notifications such as notification 408 that indicate whether the user has any voice mail messages. If desired, the in-home device on which screen 400 is displayed may have telephone capabilities or may be connected to a telephone or the like. Notifications such as notification 410 may be provided that inform the user of whether the user has received any e-mail messages. Associated options 412 and 414 may be displayed adjacent to notification 410. Options such as options 412 and 414 and other on-screen options may be selected by the user by touching a touch screen above the option, by pressing a button adjacent to the option, by clicking on the option (e.g., with an arrow), by highlighting the option, etc. If the user selects option 410, the user's e-mail messages may be displayed on screen 400. If the user selects option 414, the e-mail may be forwarded to automobile personal computer 14 or the user may be presented with on-screen options that allow the user to decide whether to forward the e-mail messages to automobile personal computer 14, to the office, to another recipient, etc.).

Leave home option 416 in region 402 may be used to perform tasks associated with leaving home. For example, when the user selects option 416, lighting control devices in the home may be directed to turn off certain lights. The heat or air conditioning may be turned down. An alarm system may be activated, home appliances such as the stove may be automatically turned off, and windows and doors may be locked. The user may be notified of any open windows and doors. Automobile personal computer 14 may be contacted over a remote or local wireless link. The automobile personal computer 14 may be directed to start the engine of the automobile, turn on the heat or air conditioning to a level that is appropriate based on weather information such as the weather information displayed in region 406, etc. The garage door may be opened (either by the in-home network using a local or remote wireless link or by directing the automobile personal computer to use a wireless link to open the door).

If desired, all of these functions or other such functions may be controlled by the single selection of leave home option 416. These functions may also be controlled using separate options. For example, one option may turn all house lights off, another option may start the automobile, and another option may turn on the alarm system. The advantage of creating options that include many individual functions is that it simplifies the user's task of locating the desired options. However, options that control individual functions or at least smaller groups of functions can provide flexibility. For example, the user may not always desire to activate the security system when the user leaves home, as there may still be another family member present in the home. The user may also desire to start the automobile early without activating the security system, so that the automobile has time to warm up. By using separate options to invoke different functions, the user may pick and choose options as needed. If desired, some options may be provided that control multiple home and automobile functions and some options may be provided that control simpler and more dedicated groups of functions or individual functions.

An illustrative arrangement in which functions related to turning off lights and the like are activated using an on-screen option that is separate from the option used to start the automobile is shown in FIG. 21. On screen 420 of FIG. 21, the user may select option 422 to place the home in a mode that is appropriate for when no one is home. In this mode the heat or air conditioning may be turned down, the lights turned off, the security system activated, etc. A separate option 424 may be used to start automobile 12 over a wireless link. The user may select wake up home option 426 to turn on the lights, turn up the heat, etc. Option 428 may be used to turn off the downstairs lights and heating system zones, turn on the light above the stairs for one minute, turn on the upstairs lights, etc.

FIG. 22 shows an illustrative arrangement in which an in-home electronic device 430 has dedicated buttons 432, 434, 436, and 438. Associated on-screen labels 440 may be displayed adjacent to each dedicated button. The user may select the start car option by pressing button 432. This wirelessly starts automobile 12. If the user presses button 434, the user's e-mail is retrieved and displayed in information region 442. If button 436 is pressed, radio content is played through speaker 444. The user may tune to a desired radio station (e.g., an AM or FM or Internet station using speaker 444). News (e.g., from the Internet) may be displayed in information region 442 when button 438 is pressed.

Figure 23:
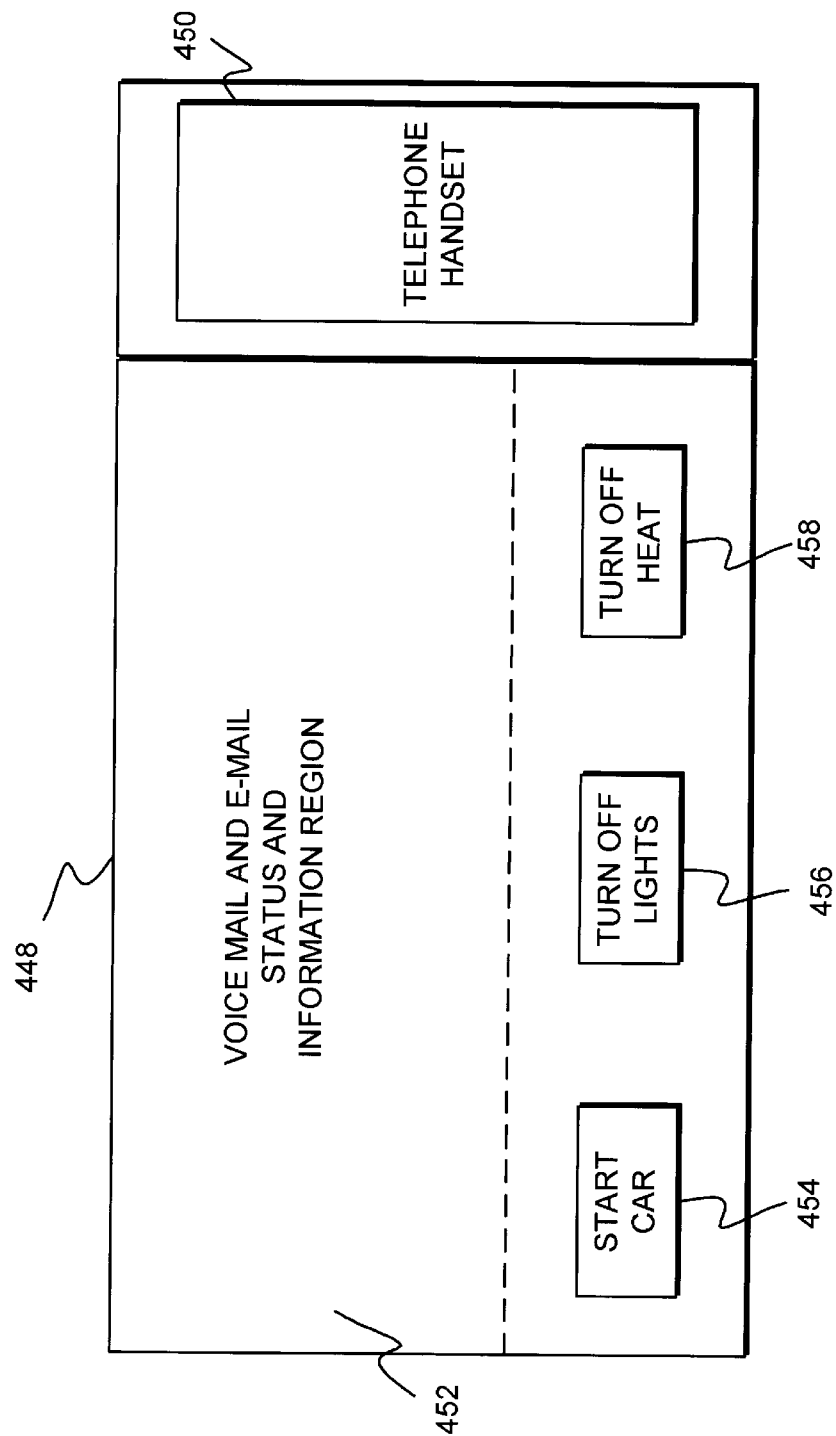
FIG. 23 shows an illustrative in-home device that has an integral telephone handset in accordance with the present invention.

FIG. 23 shows an illustrative in-home electronic device in that has telephone capabilities. Device 448 may have a telephone handset 450 with an integral keypad. Voice mail and e-mail status and information region 452 may be used to display information on voice mail and e-mail messages. For example, the names, telephone numbers, and e-mail addresses of senders and callers may be displayed in region 452. E-mail message titles and content may also be displayed in region 452. If desired, region 452 may be used to display the content of e-mail messages. Selectable options 454, 456, and 458 may be used to perform functions such controlling automobile 12 and home 364.

Figure 24:
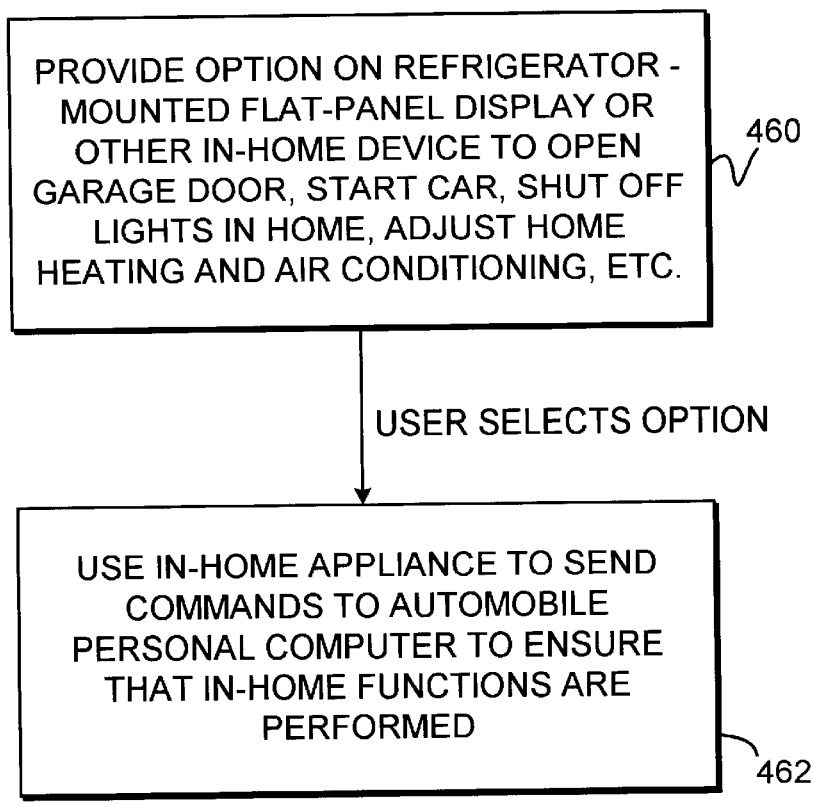
FIG. 24 is a flow chart of illustrative steps involved in using an in-home device to control an automobile with the automobile personal computer in accordance with the present invention.

Illustrative steps involved in using an in-home device as the user leaves home 364 to enter automobile 12 are shown in FIG. 24. At step 460, the in-home device is used to provide the user with selectable options. The options may be displayed on a refrigerator-mounted in-home web appliance or other suitable in-home electronic device. The options may include, for example, one or more options to shut off the lights in the house, to start the engine of automobile 12, etc.

After the user has selected one or more of the options displayed at step 460, the in-home device is used to send commands to automobile personal computer 14 at step 462. Commands from the in-home device may be sent through appropriate in-home equipment of the type shown in FIG. 19 using a remote or local wireless link. At step 462, the in-home electronic device also ensures that any in-home functions that are associated with the selected option or options are performed by the appropriate in-home sensors, controls, and other equipment of the type shown in FIG. 19.

Figure 25:
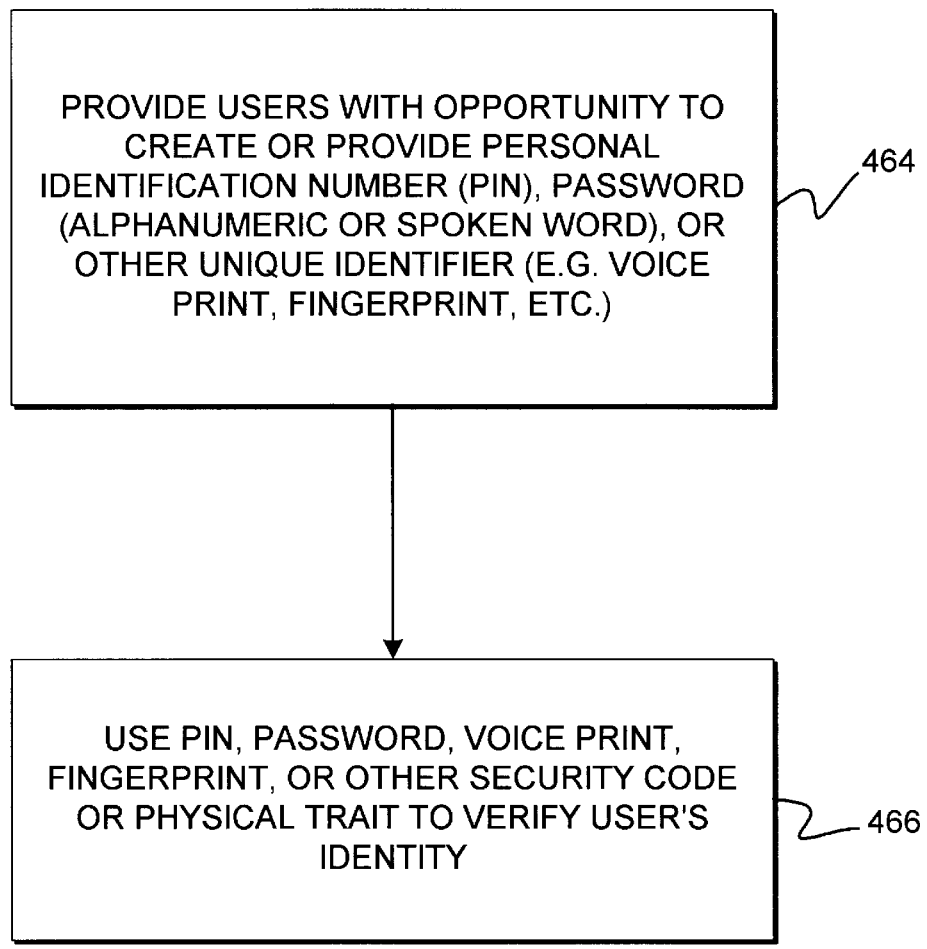
FIG. 25 is a flow chart of illustrative steps involved in allowing a user to create a customized password or the like for the automobile personal computer and using the password to verify the user's identity in accordance with the present invention.

The user may often need to access certain automobile or home features with a password for security purposes. The password may be preselected by a service provider or other entity. If desired, the password may be created by the user, as shown in FIG. 25. At step 464, the user may be provided with an opportunity to create a personal identification number (PIN), password (alphanumeric or verbal), or other user identifier. The user may be provided with the opportunity of step 464 using on-screen options on an automobile-personal computer, on equipment located in the home, or on personal computers, handheld computing devices, or other electronic devices located in the home or office or any other suitable location. The user may also be provided with the opportunity of step 464 by providing the user with audio prompts and processing the user's verbal responses (e.g., using an automobile personal computer or personal computers, handheld computing devices, or other electronic devices or equipment located in the home or office or any other suitable location). If desired, step 464 may be performed using a telephone system that allows the user to press number keys in response to audio prompts. The user may supply a voice sample to be used in a voiceprint security arrangement in which the audio components of the user's voice are analyzed to uniquely identify the user. The user may also supply a fingerprint sample. Voiceprints and fingerprints may be supplied to an automobile personal computer, equipment located in the home, or personal computers, handheld,computing devices, or other electronic devices located in the office or any other suitable location.

At step 466, the PIN, password, voiceprint, fingerprint, or other information used to uniquely identify the user is used to verify the user's identity. The user's identity may be verified, for example, when the user is using the automobile personal computer 14 or when the user is selecting options or modifying settings related to the operation of automobile 12. The user's identify may be verified when the user is using automobile personal computer 14 for a financial transaction. For example, if the user is purchasing a product or service, automobile personal computer 14 may require a password or the like to ensure that the purchase is authorized.

Figure 26:
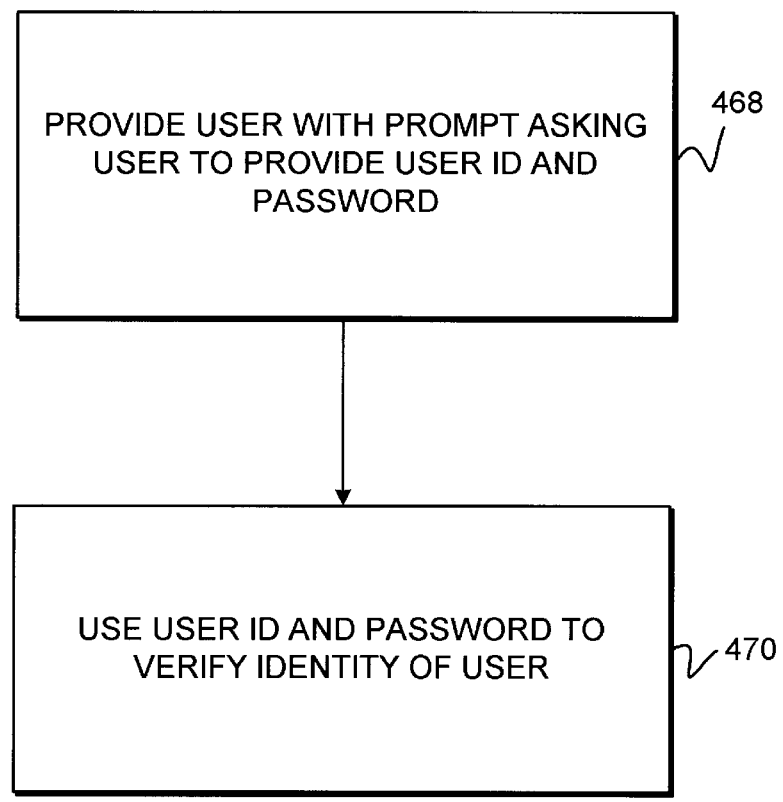
FIG. 26 is a flow chart of illustrative steps involved in verifying the identity of the user with a user identifier and password in accordance with the present invention.

If desired, the user may be required to provide a user identifier (ID) and a password. For example, as shown in FIG. 26, the user may be required to provide a user ID and password at step 468. The user ID and password may be provided as text, as verbal inputs, or as a combination of text and verbal inputs. At step 470, the user ID and password are used to verify the user's identity. Steps 468 and 470 may be performed on the same platform or different platforms and may involve the use of automobile personal computer 14, equipment located in the home, or personal computers, handheld computing devices, or other electronic devices located in the office or any other suitable location. The approaches for verifying the user's identity that are shown in FIGS. 25 and 26 are merely illustrative. Any suitable approach for verifying who the user is or whether the user is authorized to perform a particular action in system 30 may be used if desired.

The location of automobile 12 may be determined using GPS receiver 112 (FIG. 3) or using network-based techniques. Location information may be provided as geographical coordinates or may be converted to a street address (e.g., by performing a look-up operation in a map database on a CD or the like).

Figure 27:
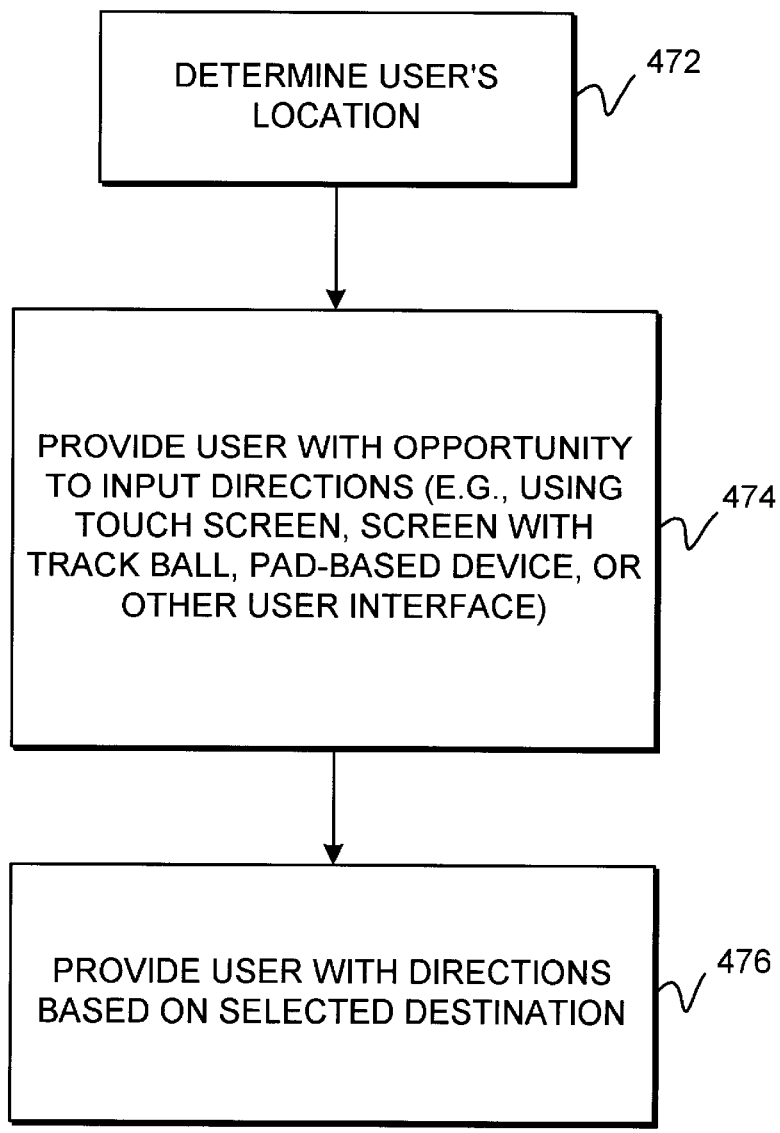
FIG. 27 is a flow chart of illustrative steps involved in providing location-sensitive directions to the user with the automobile personal computer in accordance with the present invention.

Illustrative steps involve in using location information to provide the user with location-sensitive directions are shown in FIG. 27. At step 472, the location of automobile 12 is determined (e.g., by using GPS, DGPS, network-based location schemes, or any other suitable approach). If the location information is provided by a facility that is distant from the automobile personal computer, the location information may be provided to the automobile personal computer over a remote or local wireless link. At step 474, the user may be provided with an opportunity to supply destination information to the automobile personal computer. The destination information may be supplied by pressing buttons on the front panel of the automobile personal computer, by pressing options that are displayed on a touch screen, by interacting with automobile personal computer 14 using voice commands and audio prompts, by using a pointing device such as a trackball or the like to interact with on-screen options, using handwriting recognition, using a pen-based input device, or using any other suitable approach. At step 476, the automobile personal computer may provide the user with directions based on the known current location of the automobile and the destination information supplied by the user. The directions may be provided as audio played through the automobile's sound system. Directions may also be displayed on a suitable display. A graphical interface may be used to indicate the user's current position, the destination, and the preferred route.

Figure 28:
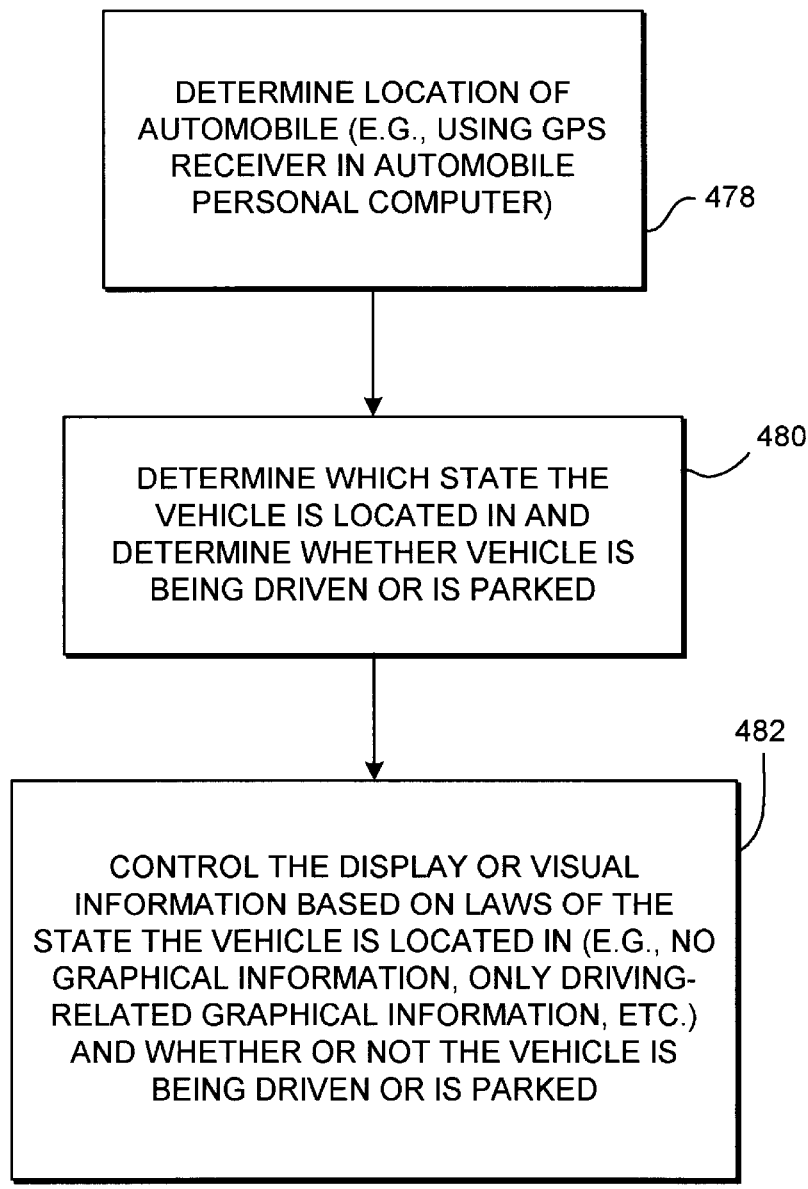
FIG. 28 is a flow chart of illustrative steps involved in controlling the display of visual information in the automobile based on the location of the automobile in accordance with the present invention.

Certain states prohibit the display of information to the driver during operation of the automobile if that information is not, for example, related to driving. However, the laws of each state differ. Steps involved in displaying different types of content to the user depending on the automobile's present location are shown in FIG. 28. At step 478, the geographical location of the automobile is determined. At step 480, the geographical location data from step 478 is processed to determine the state (or other suitable political subdivision) in which the automobile is located. Information on state boundaries and the like may be provided by a local CD or DVD or hard drive database or may be obtained from a server or other computer equipment over a remote wireless link. Steps 478 and 480 may be performed locally using automobile personal computer 14, may be performed at a location distant from automobile personal computer 14, or may be performed at a combination of such locations. At step 482, the automobile personal computer may use the information on which state the automobile is located in to control the types of information that are displayed to the driver on displays 88 (FIG. 1). For example, if the state in which automobile 12 is located permits only driving-related information to be displayed to the driver, then automobile personal computer 14 will not allow non-driving-related information to be displayed when it may be viewed by the driver (e.g., when a display such as display 230 of FIG. 5 is turned toward the driver or when the display in question is permanently located in the driver's field of view). If the state in which automobile 12 is located permits non-driving-related information to be displayed for the user, automobile personal computer 14 may display such information.

Figure 29:
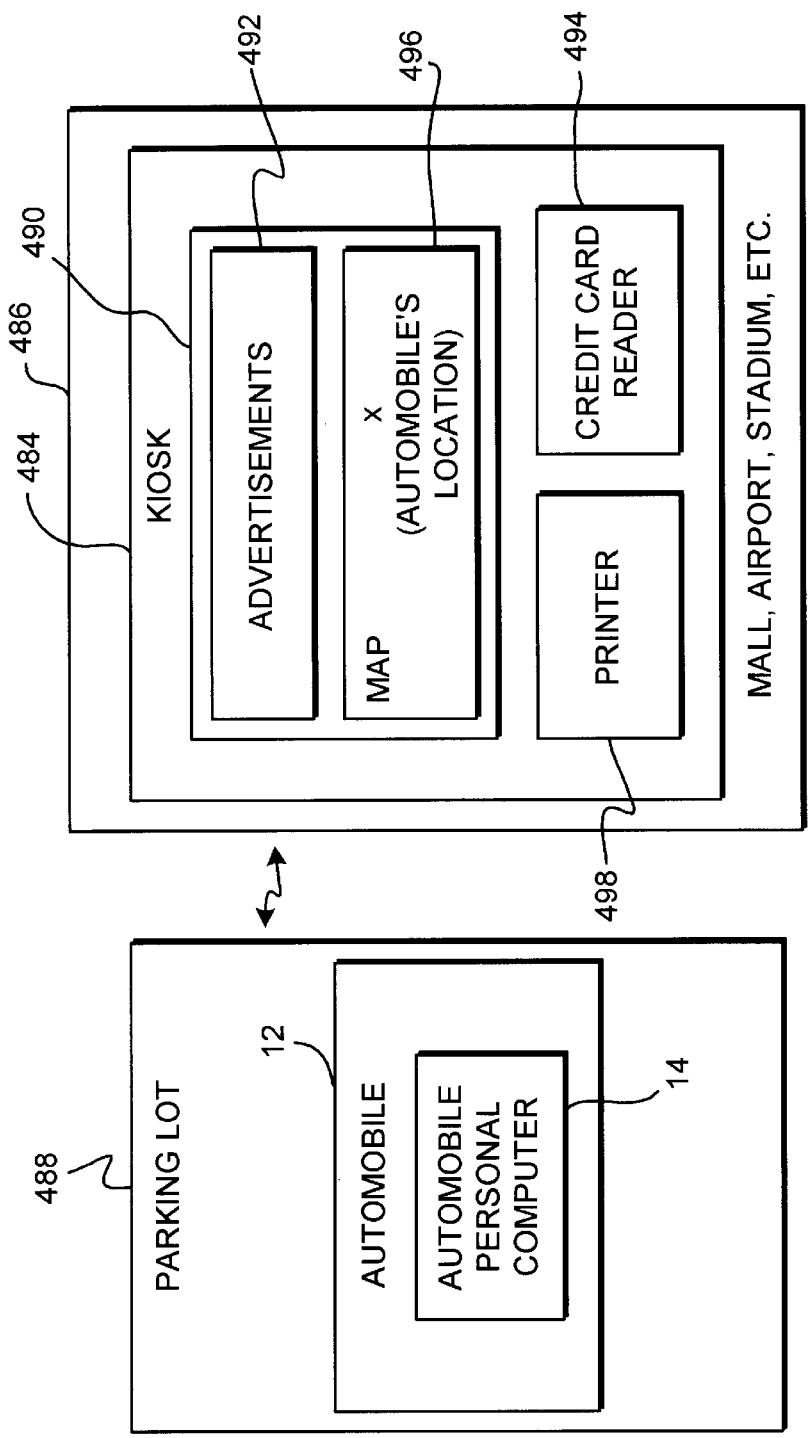
FIG. 29 is a diagram showing how a kiosk may be used to display information on the location of a user's automobile in accordance with the present invention.

Location information may be used to assist the user in locating automobile 12 in a parking lot. It can be difficult to remember where one has parked, particularly if the lot is large, if there is more than one lot, or if a period of time has passed since the user has parked. With the configuration of FIG. 29, a publically-accessible kiosk may be provided at a mall, airport, stadium, or any other suitable facility 486 at which the user may need to retrieve their automobile 12 from a parking lot 488. The kiosk 484 may have a display 490. Interactive advertising and promotions may be provided, as illustrated by interactive advertisement 492. This allows the user to purchase goods and services (e.g., over the Internet or using any other electronic technique). A credit card reader 494 or the-like may be provided so that the user may easily use a credit card to purchase products.

When the user wishes to locate automobile 12, the user may provide information to kiosk 484 that identifies the user's automobile personal computer 14. The user may also supply information that allows kiosk 484 to verify the user's identity and authorization to locate automobile 12. The user's automobile personal computer 14 may be identified using any suitable arrangement. For example, the user's automobile personal computer 14 may be identified by a unique communications address. The communications address may be assigned to automobile personal computer 14 by the manufacturer of automobile 12 if automobile personal computer 14 is delivered as original equipment for automobile 12, or may be assigned by the manufacturer of automobile personal computer 14. To make such information easier to remember, the user may be allowed to change the address. The address may be, for example, an e-mail or general purpose address or identifier that is selected by the user. Other information such as license plate information, the user's name or social security number, telephone number, etc. may also be sufficient to uniquely identify automobile personal computer 14. The manufacturer or a third party may maintain a database that correlates user names (for example) with automobile personal computer communications addresses. The user's user ID or password may also be used to identify automobile personal computer 14 to kiosk 486. Such information may also be used to verify the user's identity.

Once automobile personal computer 14 has been identified and the user's identity verified, the location of automobile personal computer 14 may be determined. The location of automobile personal computer 14 may be determined using any suitable technique. For example, kiosk 486 may establish a local or remote communications link with automobile personal computer 14 and obtain information on the automobile's location from a GPS receiver in the automobile. Wireless network information may also be used to triangulate the position of automobile 12. Regardless of how the user's automobile is located, kiosk 486 preferably provides information on the automobile's location to the user. The location information may be provided in any suitable form. For example, a map 496 may be displayed on screen 490. The map and coupons and other promotional information may be printed using printer 498. Printer 498 may also be used to provide a text description of the location of the user's automobile.

Figure 30:
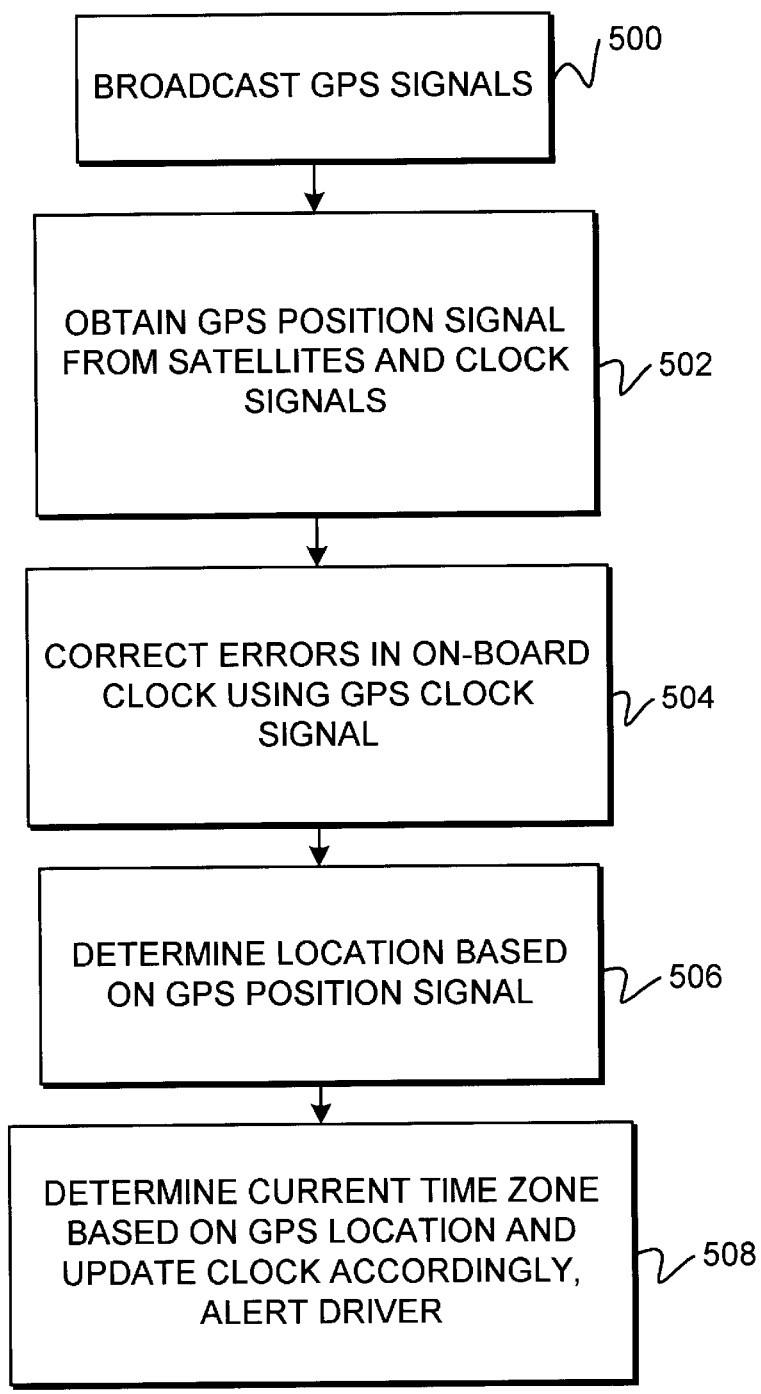
FIG. 30 is a flow chart of illustrative steps involved in automatically adjusting the clock in an automobile based on the location of the automobile in accordance with the present invention.

Automobile personal computer 14 may display clock information (e.g., the current time) to the user on a faceplate display or any other suitable display or may provide this information to the user through the automobile's sound system in response to a command from the user. If desired, location information may be used to automatically change the clock time that is displayed to the user as the user travels from one time zone to the next. Steps involved in providing this feature are shown in FIG. 30. At step 500, a GPS signal is broadcast from satellites in the GPS system. At step 502, the GPS position signals and GPS clock signals may be obtained from the satellites by GPS receiver 112 in automobile personal computer 14. At step 504, any errors in the time of the clock other than time zone errors may be corrected based on the received GPS clock signal. At step 506, the current geographical location of automobile 12 may be determined based on the received GPS position signals. At step 508, the current time zone in which automobile 12 is located may be determined based on the geographical location data. For example, automobile personal computer 14 may consult a local or remote map database to determine the current time zone. If automobile personal computer 14 determines that the user has changed time zones, the on-board clock may be updated accordingly and the user alerted at step 508.

Figure 31:
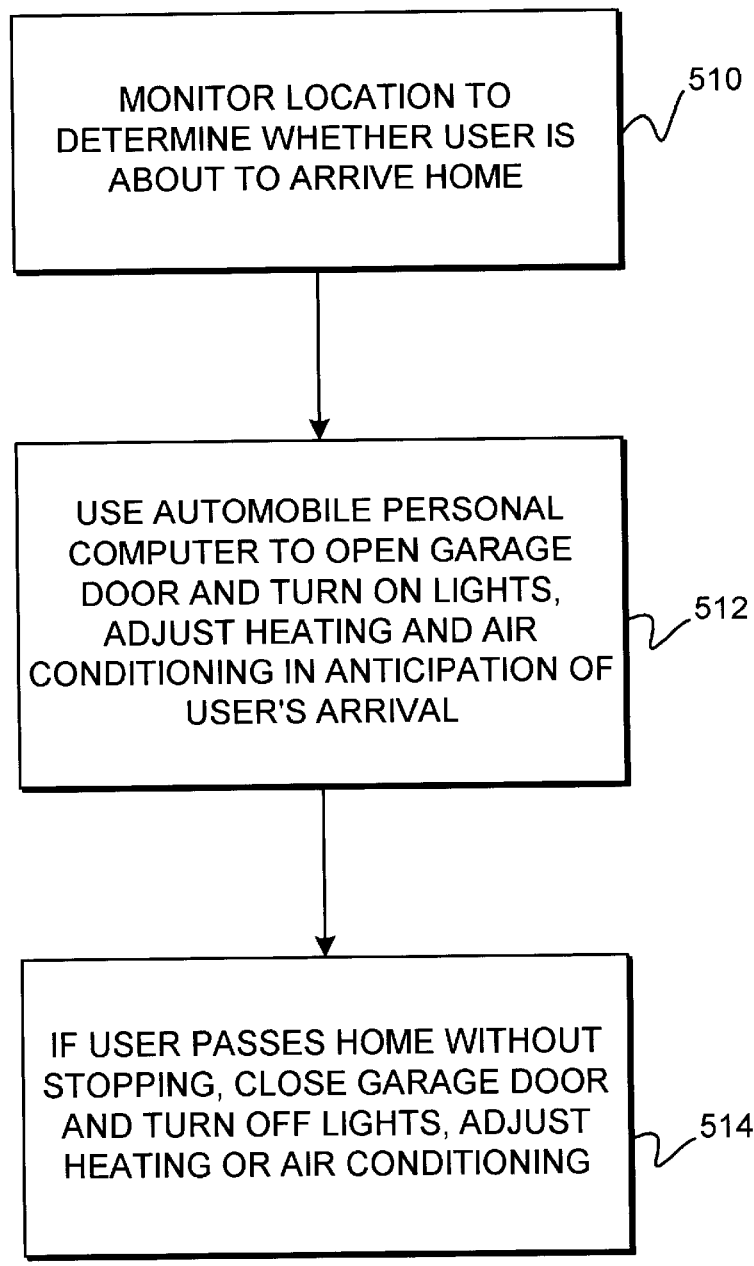
FIG. 31 is a flow chart of illustrative steps involved in using the automobile personal computer to open a garage door in accordance with the present invention.

If desired, automobile personal computer 14 may use location information to determine when the user is headed toward home. This may allow automobile personal computer 14 to prepare the user's home for the user's arrival. Illustrative steps involved in this type of arrangement are shown in FIG. 31. At step 510 the location of automobile 12 is monitored to determine whether the user is headed toward home. For example, information on the user's home address may be stored in a database (e.g., a database maintained by automobile personal computer 14). Automobile personal computer 14 may use a GPS reading to determine the user's location and bearing. The user's location and bearing may be compared to the stored information on the user's home address to determine whether the user is within a certain radius of the home and has a bearing (instantaneous or averaged) that is directed toward the home. If desired, automobile personal computer 14 may just determine whether the automobile is less than a certain predefined distance from the home.

Regardless of the way in which it is determined that the user is near home, at step 512 this information may be used by the automobile personal computer 14 to direct equipment at the home (such as the equipment of FIG. 19) to prepare for the user's arrival. The automobile personal computer 14 may communicate with the equipment at the home using remote or local wireless links. In an illustrative scenario, when it is determined that the user is heading home or near home, the automobile personal computer 14 may direct equipment at the home to open the garage door, to turn on exterior and interior lights, to adjust the heat or air conditioning, to turn of the security system, etc.

The automobile personal computer may send commands to turn on the lights to personal computer 386 or security system 394, etc. over a remote or local wireless link. The lights may be controlled by any suitable in-home device such as the devices of FIG. 19. For example, the lights may be turned on using control devices such as control devices 390 and 396, clients 372, personal computers such as personal computers 374 and 376, appliances 382 and 384, etc. The security system may be turned on by communicating with security system 394 over a remote or local wireless link. The garage door may be activated directly by the automobile personal computer 14 over a local wireless link or a remote wireless link. The garage door opener may be connected to personal computer 386, security system 394, or other equipment in home 364 with wired or wireless connection. Remote wireless commands from automobile personal computer 14 that are directed toward opening the garage door may then be sent to the garage door opener through personal computer 386, security system 394, or other equipment in home 364.

As shown in FIG. 31, if the user passes near the home without stopping, or it can otherwise be determined that the user does not intend to return home, the steps taken to prepare the home for the user's arrival may be terminated at step 514.

When the user leaves the home, automobile personal computer 14 may use local and remote wireless links to automatically turn out the lights in the home, turn back the heat, close the garage door, turn on the security system, etc.

Location-based services may be provided by monitoring the location of automobile 12. The functions of the automobile may also be monitored using vehicle electronics 174 of FIG. 4. For example, airbag deployment sensor 205 and inertial sensors 192 of FIG. 4 may be used to monitor whether or not automobile 12 has been involved in an accident.

Figure 32:
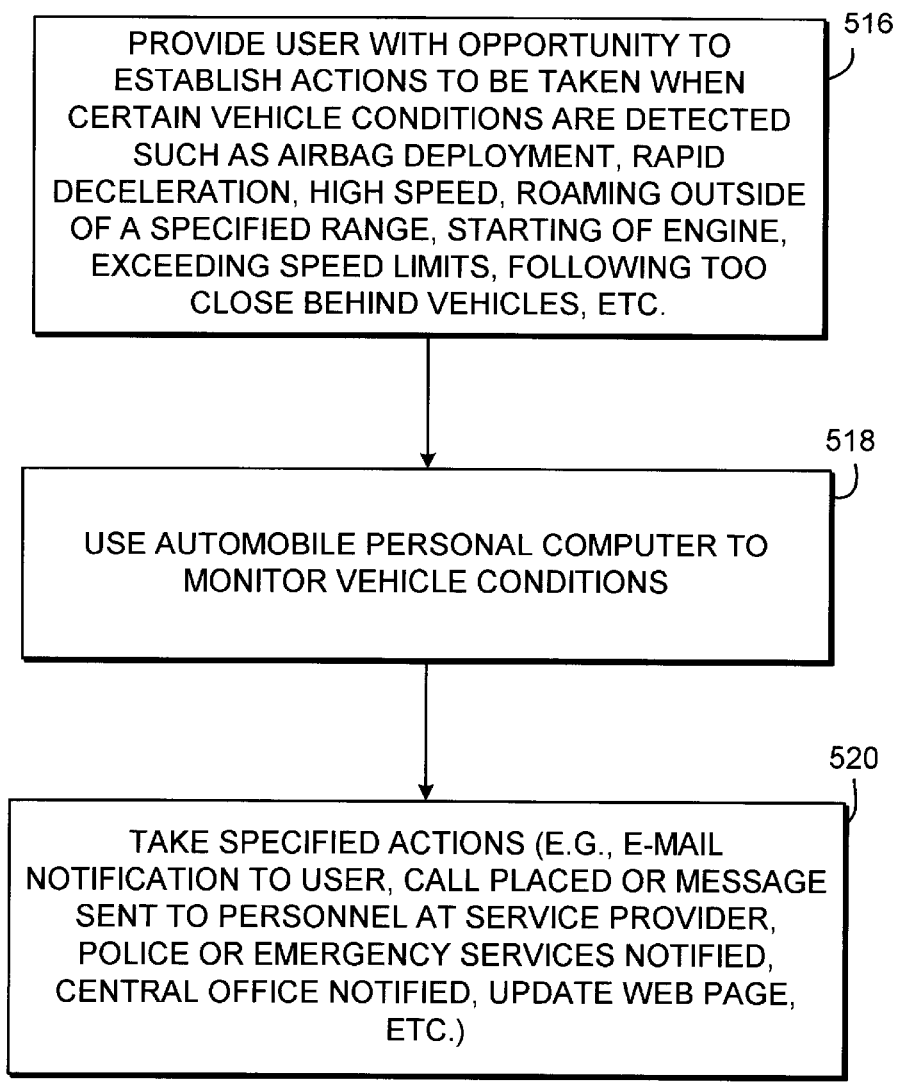
FIG. 32 is a flow chart of illustrative steps involved in monitoring the automobile using various sensors in accordance with the present invention.

Steps involved in monitoring automobile 12 with automobile personal computer 14 are shown in FIG. 32. At step 516, the user may be provided with an opportunity to establish which actions are to be taken when certain vehicle conditions are detected.

At step 518, vehicle conditions may be monitored. Automobile personal computer 14 may use vehicle electronics 174 (FIG. 4) to detect the state of the vehicle. Any suitable vehicle condition may be monitored, such as airbag deployment, rapid deceleration, high speeds, roaming outside of a specified range, unauthorized attempts to operate the vehicle, starting the engine, exceeding speed limits, following too close behind vehicles, having other vehicles follow too close behind, etc. The location of the vehicle and its bearing may be determined using GPS techniques or other location-determination techniques.

At step 520, the actions specified by the user at step 516 may be taken. Suitable actions include sending e-mail notifications to various parties including the police or other providers of emergency services at facilities 34 (FIG. 1), content and service providers at facilities 30 (FIG. 1), other entities 36 (FIG. 1), etc. If the user is not in the automobile, e-mail notifications may be sent to the user's home 38 (FIG. 1), office 40 (FIG. 1), or handheld computing device. Notifications may be sent from one automobile personal computer to another upon detection of the specified conditions.

E-mail is just one example of a suitable format that may be used to send notifications. Any suitable messaging approach may be used, including paging messages, voice mail messages, proprietary messaging formats, e-mail messages with attachments (e.g., text, graphics, video, audio, voice, etc.), or any other messaging technique. If desired, automobile personal computer 14 or other equipment may automatically place a telephone call to the user and play an appropriate audio message as a notification.

A database-backed web page may be automatically updated or otherwise changed in response to the action. The web page may be provided by a server on the Internet or any other suitable arrangement. The web page may be modified by automatically modifying the database when the specified action is taken. This may be accomplished, for example, by having automobile personal computer 14 or other equipment send commands to the database to make the modification. The server may modify the database in response to the commands.

Figure 33:
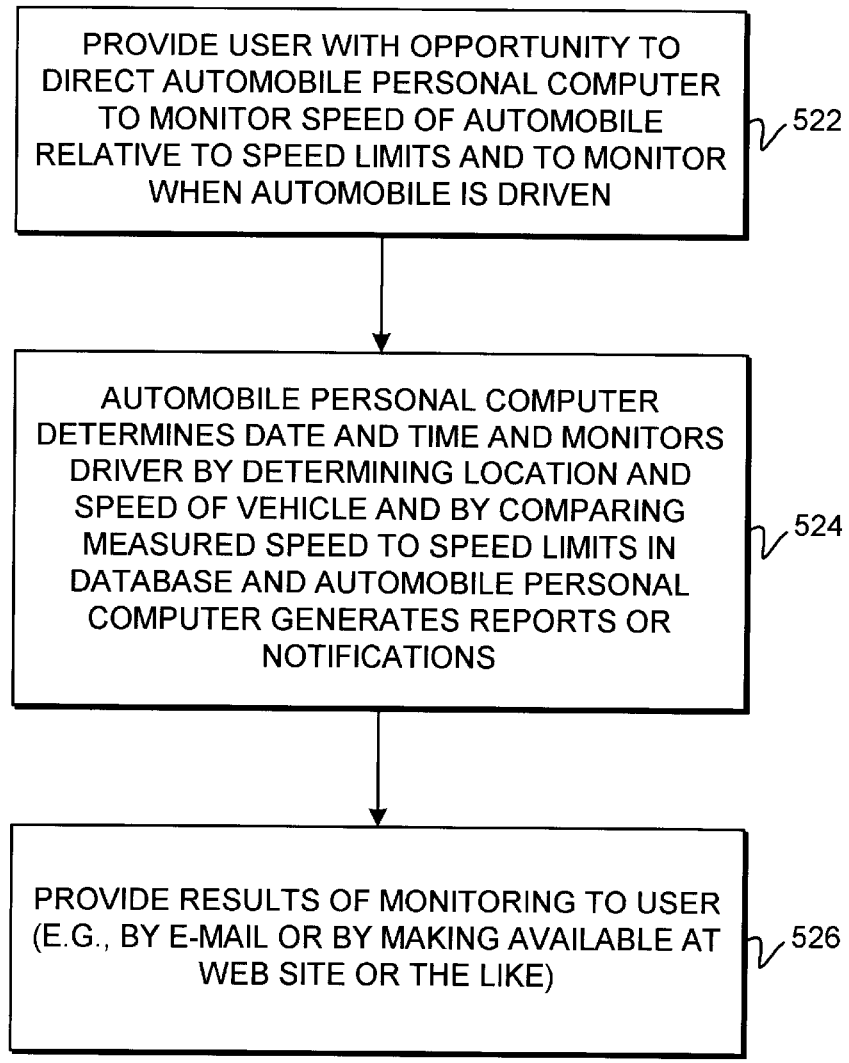
FIG. 33 is a flow chart of illustrative steps involved in sending e-mail reports on a driver's behavior to the user in accordance with the present invention.

E-mail reports on the behavior of a driver of an automobile may be sent to another party. This type of arrangement may be used by a parent to monitor the driving behavior of a child. It may also be used to monitor whether one's automobile has been moved after it has been left with a parking attendant or valet parking. Any suitable information may be included in such reports, such as information on the speed of the automobile, the location of the automobile, where and when the automobile is started and stopped, etc. Steps involved in an illustrative example are shown in FIG. 33. At step 522, the user (e.g., the parent) may be provided with an opportunity to direct the automobile personal computer 14 to monitor the speed of the automobile relative to the speed limit. Speed limit information may be stored in a map database (e.g., a local map database maintained on a CD or DVD or in storage 80 or other suitable storage media by automobile personal computer 14 or a remote database maintained on a server). The speed of the automobile may be monitored using speedometer 190 (FIG. 1) or GPS receiver 112 (FIG. 2), etc.

At step 524, the automobile personal computer 14 may monitor the driver by determining the location of the driver (e.g., the child) and the speed of the vehicle and comparing this information to the database speed limit information. When the measured speed of the automobile at a given location exceeds the posted speed limit that is listed for that location in the database this information may be provided to the user at step 526. The results of the monitoring operation may be provided to the user as an e-mail notification or this information may be made available on a web site. To avoid triggering the transmission of numerous e-mails during a single monitoring session, the user may set up the system to send consolidated reports. For example, the user may direct that a report be sent once each hour, only when the automobile is started or stopped, only if the speed limit is exceeded, only if the automobile is driven beyond a certain distance from the home, etc. E-mail reports may contain information on the time and date and location of each detected event. Graphic images such as maps showing the driving route taken and indicating where events took place may be provided as e-mail attachments. These examples are merely illustrative. Any other suitable driving events may be detected and the monitoring party may be provided with information on the detected events using various arrangements.

The monitoring arrangement of FIG. 33 may be used with any driver and monitoring entity. For example, this approach may be used for fleet managers who wish to monitor the driving behavior of fleet drivers. Moreover, e-mail reports may be sent to any suitable device with an e-mail address, such as personal computers, handheld computing devices, cellular telephones with e-mail capabilities, etc.

Figure 34:
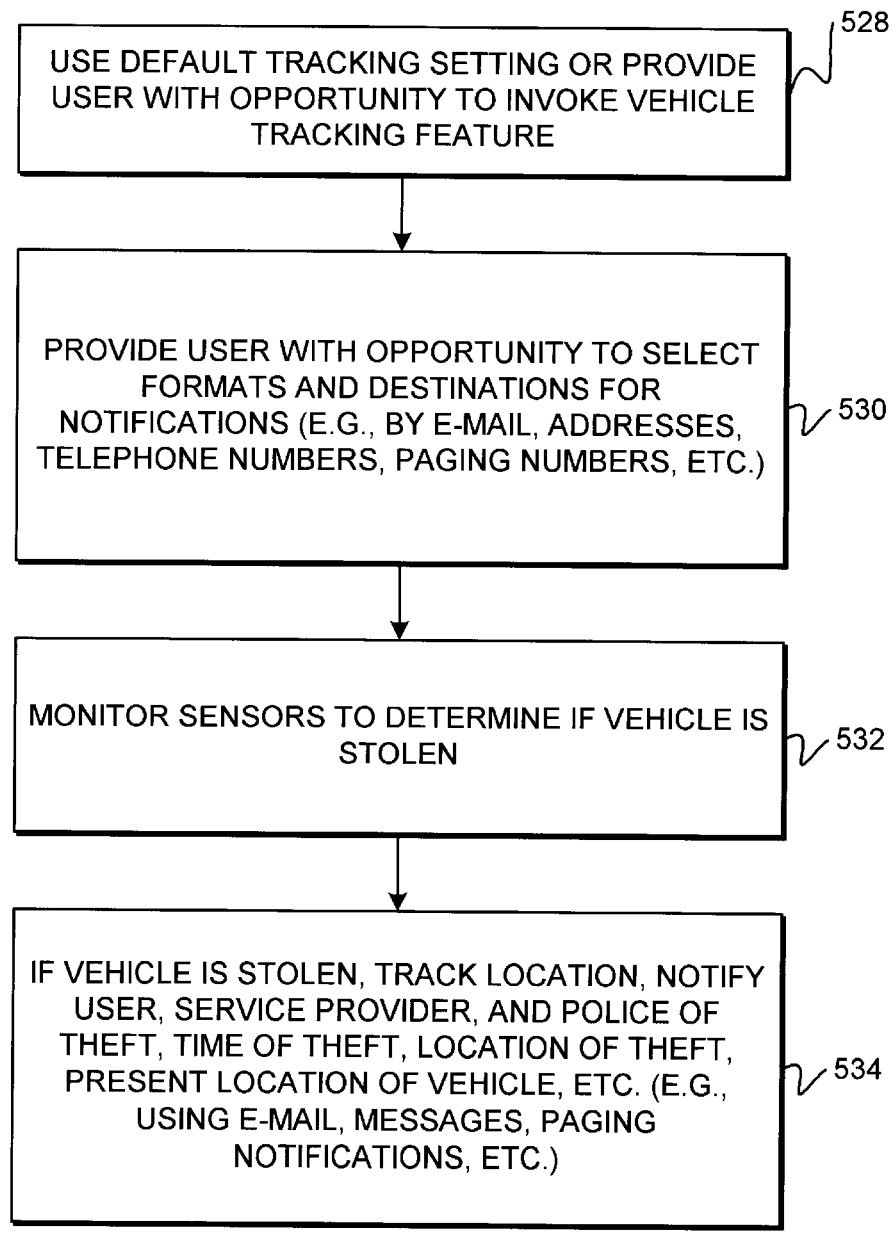
FIG. 34 is a flow chart of illustrative steps involved in tracking stolen automobiles in accordance with the present invention.

If desired, automobile personal computer 14 may be used to track stolen vehicles. Illustrative steps involved in tracking automobile 12 with automobile personal computer 14 are shown in FIG. 34. At step 528, a default tracking setting may be used or the user may be provided with an opportunity to invoke the tracking mode. For example, the user may set an alarm by informing the automobile personal computer that the vehicle is not to be moved. If the user returns to the automobile, the user may release the alarm. If the automobile is jostled (as detected by inertial sensors) or is moved (as detected by inertial sensors or the GPS receiver or the odometer, etc.) before the alarm is released, the automobile personal computer will be able to conclude that the automobile has been stolen or is about to be stolen.

At step 530, the user may be provided with an opportunity to select formats and destinations for notification. Step 530 may involve providing automobile personal computer 14 with e-mail addresses, telephone numbers, paging numbers, etc. At step 532, automobile personal computer 14 may monitor on-board sensors so as to detect when an attempted theft of automobile 14 occurs.

If automobile 12 is stolen, the location of the automobile 12 may be tracked at step 534 using location data (e.g., GPS location data). Various parties may be notified at step 534. For example, the owner of the automobile may be notified. Additional parties that may be notified include a service provider, the police, an insurance company, etc. If desired, automobile personal computer 12 may play a warning message through the automobile's sound system that alerts the occupant of the vehicle that a theft has been detected, that the automobile's location is being monitored and the police have been notified.

Notifications may include information on the present location and heading of the vehicle, the time and date and location of the theft, the state and number of the automobile's license plate, the names and a descriptions of the registered owner and authorized drivers of the vehicle, etc. Notifications may involve e-mail transmissions, paging transmissions, or any other suitable data transmission scheme.

If automobile 12 has a digital camera or video camera, still or moving images may be included in notifications. For example, a camera may be directed towards the driver's seat. With this arrangement, images of the driver may be sent to the owner and the police in real time. Such notifications may be routed to handheld computing devices or automobile personal computers or other suitable equipment in police cruisers in the vicinity of the automobile. Because such notifications may be transmitted in real time, the likelihood that the stolen vehicle will be recovered may be fairly high.

If desired, still or moving images may be taken when automobile 12 is struck by another vehicle in a parking lot (e.g., when the user is not present). Automobile personal computer 14 may use an inertial sensor or the like to detect when automobile 12 is bumped. A digital camera or video camera may then be used to capture images (e.g., of the vehicle and driver that struck automobile 12). A notification (e.g., an e-mail notification) may be sent to the user with the images attached. Other information on the event (e.g., the date, time, location, etc.) may also be included in the notification. If desired, this information may be stored locally in automobile personal computer 14. To ensure that an image of the bumping vehicle is captured, automobile 12 may be provided with multiple outward-facing digital cameras that cover a 360° view.

Figure 35:
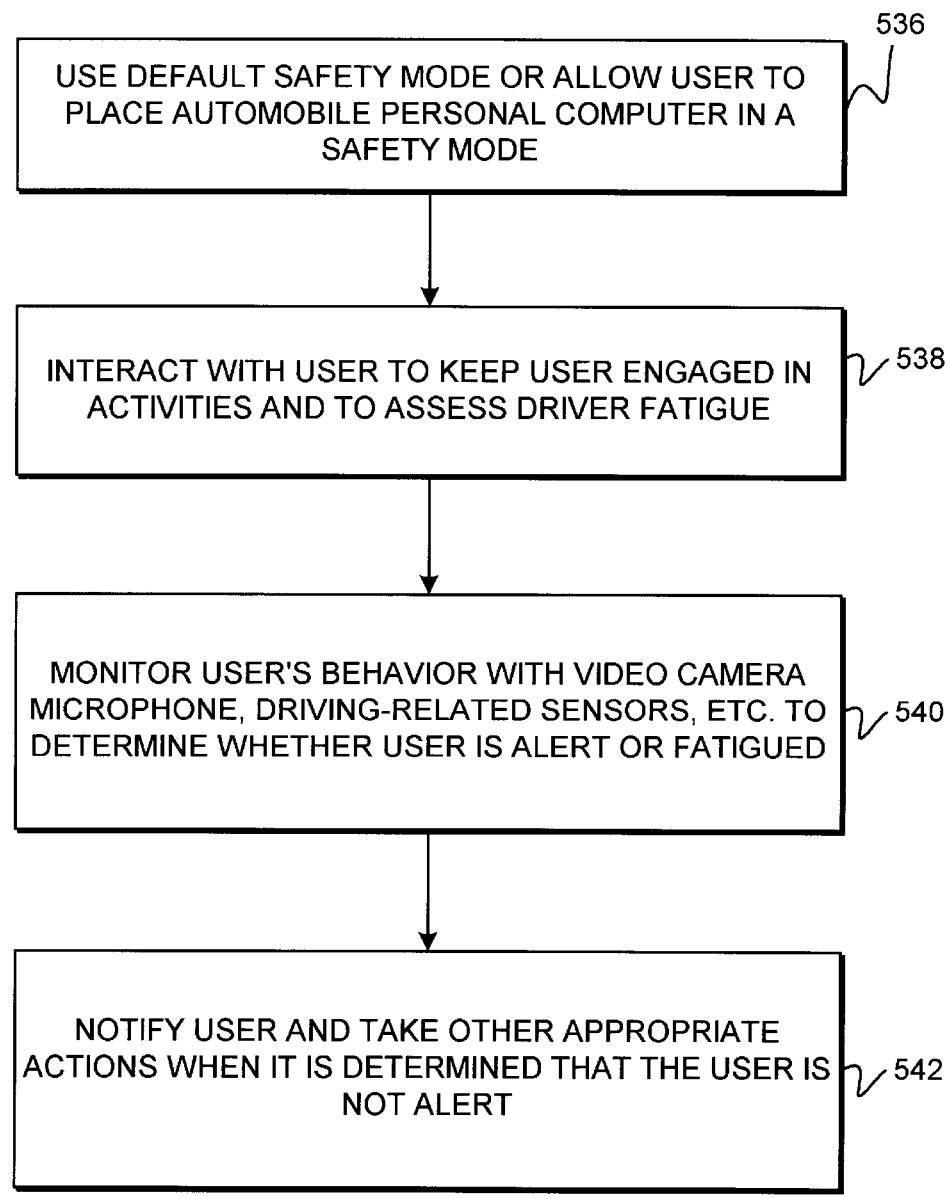
FIG. 35 is a flow chart of illustrative steps involved in monitoring a driver's behavior to assess fatigue in accordance with the present invention.

Another use of a camera (e.g., a video camera or a digital camera that takes still images) is to help monitor driver fatigue. Illustrative steps involved in this process are shown in FIG. 35. At step 536, a default safety monitoring mode may be used or the user may be provided with an opportunity to invoke safety monitoring. At step 538, automobile personal computer 14 may endeavor to interact with the user to help keep the user alert and to determine whether the user is fatigued. An example is a periodic trivia game. Once every few minutes (a parameter that may be user-selectable), the user may be provided with a trivia question through the automobile's sound system. Answering the trivia questions helps keep the user-alert. In addition, automobile personal computer 14 may assess the user's fatigue level by evaluating the user's answers. Frequent incorrect answers may indicate a problem, particularly if the user is not performing as well as the user has historically performed.

At step 540, the automobile personal computer may monitor the user's behavior using a camera directed toward the user. If the user is not moving much or if it can be determined whether the user's eyes are closing (using, e.g., digital image processing techniques), the user may be fatigued. Other tests that may be performed to assess fatigue involve monitoring the user's responsiveness to turns in the road, monitoring whether the user is drifting out of the marked lanes on a road, etc. Wireless beacons along-the road that are in wireless communications with automobile personal computer 14 may be used to help identify the course of the roadway. If desired, GPS techniques or network-based location techniques may be used to track the location of automobile 14 relative to the road.

If it is determined that the user is fatigued, various actions may be taken at step 542. For example, the user may be alerted with a loud alarm noise that is played through the sound system of the automobile. Other parties, such as a service provider or an individual who will place a telephone call to the user may be notified (e.g., by e-mail or by an automatically placed telephone call during which automobile personal computer voice synthesizes an alert message for the recipient, etc.).

Figure 36:
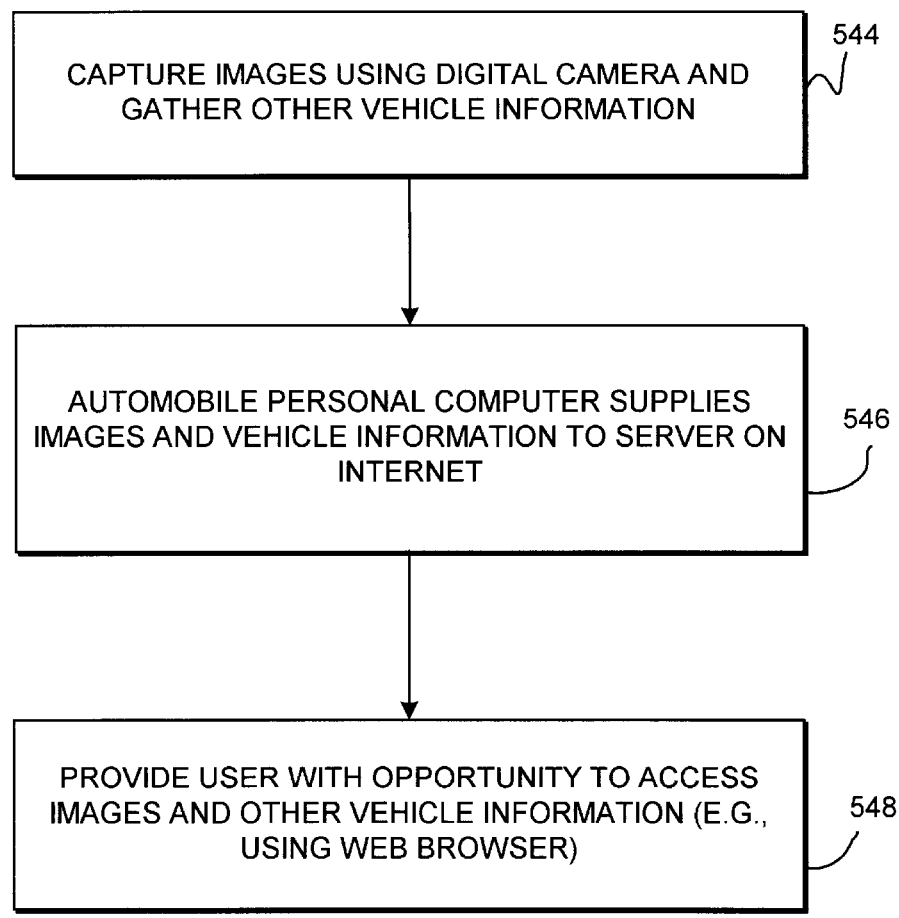
FIG. 36 is a flow chart of illustrative steps involved using a camera to monitor the interior of an automobile in accordance with the present invention.

The results of driver and vehicle monitoring operations may be made available to various parties using a web-based approach. Illustrative steps involved in this type of arrangement are shown in FIG. 36. At step 544, images may be captured (e.g., of the interior of the automobile or of any other suitable subject) and information on the vehicle may be gathered (e.g., using vehicle electronics 174 of FIG. 4). At step 546, the automobile personal computer may supply the images and vehicle information to a server over the Internet. At step 548, the user and other parties may be provided with an opportunity to access the images and other vehicle information. For example, a web browser may be used to access this information. Web pages containing the information may be placed under password control to protect the privacy of the user.

If desired, monitoring approaches such as these may be used with drivers on probation due to previous driving infractions. Truck drivers may benefit by using automobile personal computer 14 to automatically assess driver fatigue. Fleet managers may use the information to evaluate the performance of fleet drivers.

Figure 37:
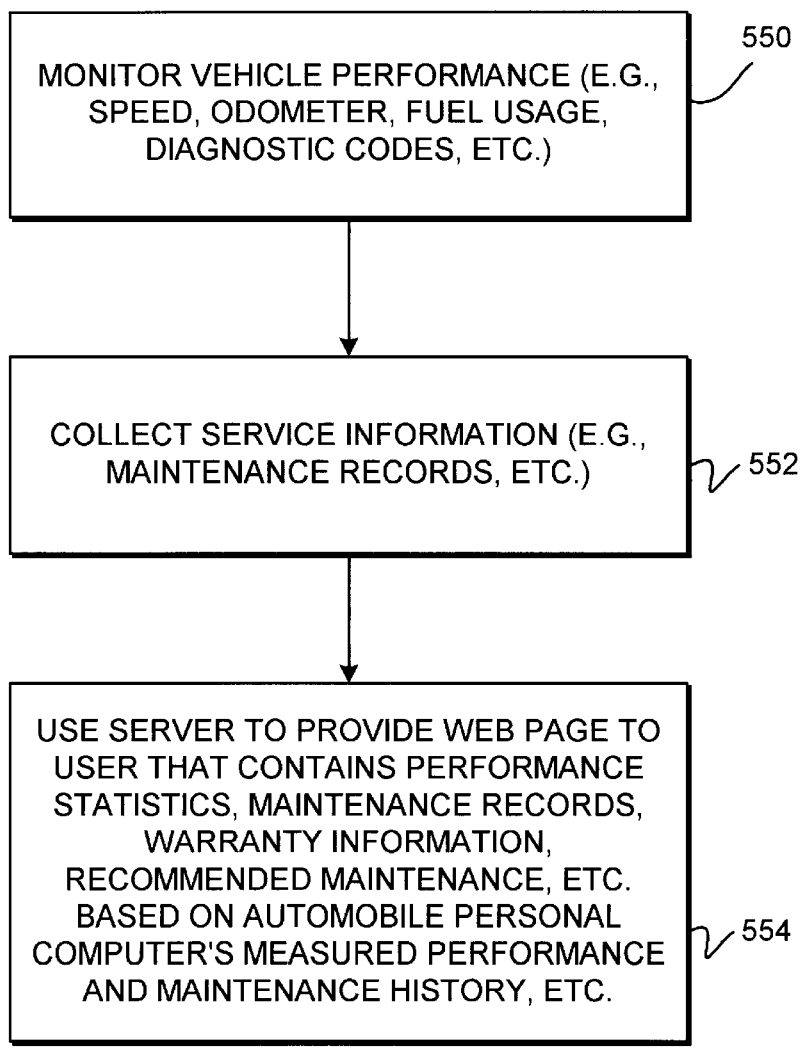
FIG. 37 is a flow chart of illustrative steps involved in monitoring vehicle performance and providing related web pages to the user in accordance with the present invention.

Maintenance and performance information for a vehicle may be gathered and access to this information provided using a web page or other suitable arrangement. Illustrative steps involved in using automobile personal computer 15 to monitor vehicle performance and in gathering maintenance information and providing web access to the performance and maintenance information are shown in FIG. 37. Performance information may be gathered by using automobile personal computer 14 and vehicle electronics 174 of FIG. 4 to monitor the automobile at step 550. Various sensors of the types shown in FIG. 4 may be used to gather vehicle information. Vehicle information that may be gathered includes information on speed, odometer readings, fuel usage, engine performance, diagnostic codes, etc. At step 552, service information such as maintenance records or the like may be collected.

The information that is collected at steps 550 and 552 may be stored locally in automobile personal computer 14 and transferred to a server (e.g., a server on the Internet) at any suitable interval. If desired, the information that is collected at steps 550 and 552 may be transferred to a server (e.g., a server on the Internet) at relatively infrequent intervals such as once per month or more frequently (e.g., once per day, once per hour, etc.) Maintenance information that is generated by service technicians at a service facility may be provided directly to such a server if desired. Performance and maintenance information may be transferred to the server using wired or wireless links. If wireless links are used, a remote link (e.g., a satellite or terrestrial cellular link or the like) or a local link (e.g., a short-range wireless link in the service facility or the like) may be used.

At step 554, the user and other parties may be provided with access to the vehicle performance information and the maintenance information using a web page format or other suitable format. The web page may include a record of the entire maintenance history of the automobile. Diagnostic codes, service technician notes, and user notes may be included. User notes (e.g., audio clips or text) may be added through the web page, may be added by interacting with the service technician during a service visit, or may be supplied through automobile personal computer 14. The web page may also include raw and processed vehicle performance information that was gathered by automobile personal computer 14 and the sensors of vehicle electronics 174 (FIG. 4), vehicle diagnostic system 226, or other suitable automobile components.

The web page may include service reminders, helpful tips (e.g., preventative maintenance tips, etc.) etc. This type of information may be promotional in nature and may be targeted based on the vehicle performance data and maintenance information. For example, if the user has not had an oil change at the recommended interval, a printable coupon or on-line offer may be provided that allows the user to obtain a discount on an oil change at the user's local service facility. An on-line offer may be redeemed in any suitable way. For example, the user may be prompted to sign up for a service visit on-line to obtain the discount being offered.

If data from an inertial sensor indicates that the user has been in an accident, promotional information may be provided that provides the user with an opportunity to view or order information on safety accessories, body repair, driving instruction, larger vehicles offered by the same manufacturer, etc. If fuel tank and odometer measurements indicate that the user is not getting optimal gas mileage from the automobile, tips may be provided on how to increase one's gas mileage.

The web page information that is provided at step 554 may be accessed from any web-enabled device, such as a personal computer or a handheld computing device with web browsing capabilities. The user may also access this information using a web browser running on automobile personal computer 14. The web browser in automobile personal computer 14 may provide text in the web page to the user as audio using voice synthesis. Audio clips may be played directly through the sound system of the automobile. Video and graphics information may be presented on displays.

Figure 38:
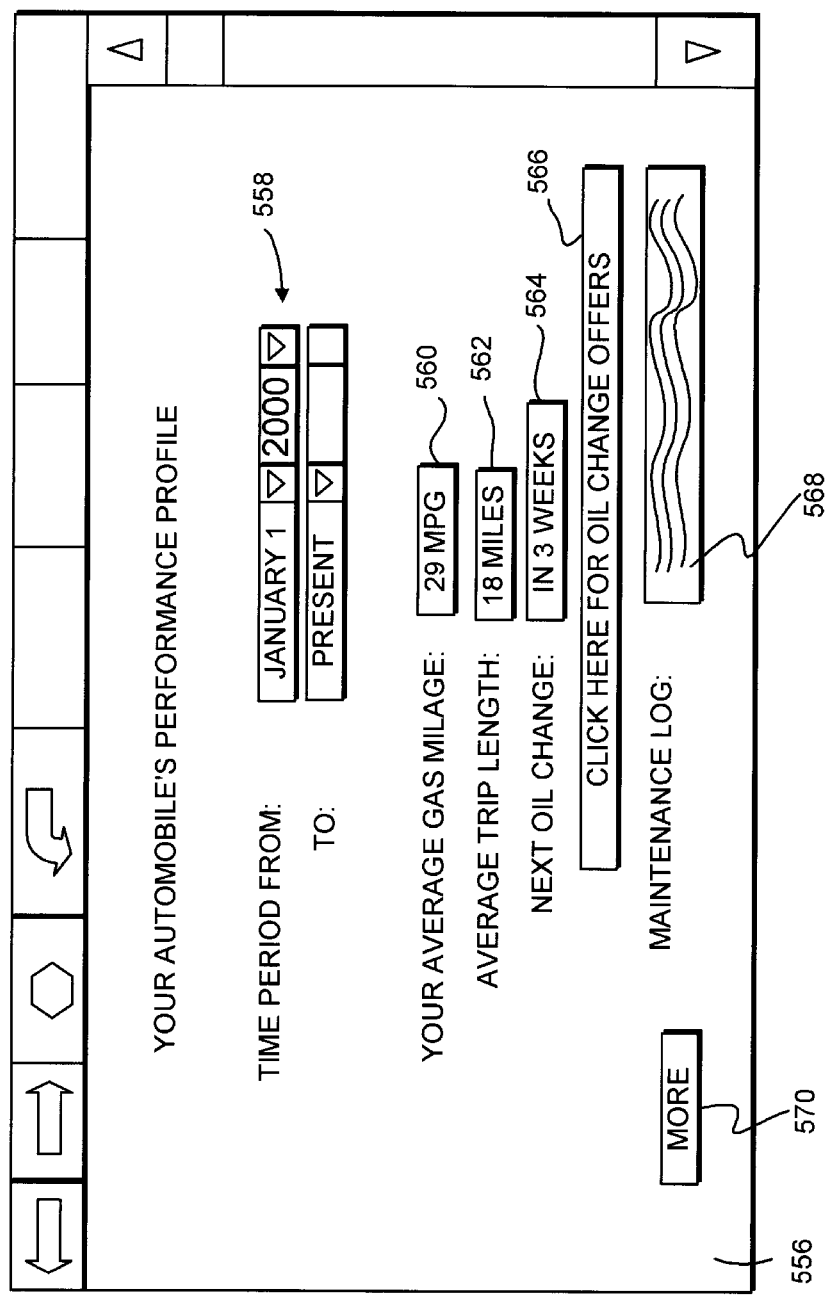
FIG. 38 shows a web-based arrangement that may be used to provide information on the user's automobile performance to the user in accordance with the present invention.

An illustrative web page of the type that may be provided at step 554 is shown in FIG. 38. Web page 556 may have interactive options that allow the user to organize and analyze performance and maintenance data. For example, an option 558 may be provided that allows the user to select the date range for which data on web page 556 is to relate. Web page 556 may contain information 560 on the user's actual gas mileage and information on the user's average trip length. Information 564 may be provided on the recommended date for the user's next oil change. An advertisement 566 may be provided. If desired, advertisement 566 may be related to the user's information. For example, if an oil change is due soon, advertisement 566 may be related to oil changes. Web page 566 may contain a maintenance log 568. Additional information may be accessed by scrolling the page or by clicking on more option 570.

The server used to provide the web page of FIG. 38 or another such server may be used to provide reminders and targeted promotions to the user. For example, information on the user's last oil change may be used to generate a reminder for the user that suggests that it is time to have the oil changed. The reminder may be provided as an audio reminder that is presented to the user by the automobile personal computer through the automobile's sound system.

The reminder may also be provided as an e-mail message. E-mail reminders may be sent to the automobile personal computer 14, a personal computer at the home or office, or other e-mail capable devices at the home or office such as one of the less complex in-home electronics devices of FIG. 19. Such a device may be mounted on the user's refrigerator, so that when it is time for the user to have the oil changed, a reminder may automatically appear in a location that the user may readily view. E-mail reminders for service visits may have embedded links for the user to select to schedule the visit. If desired, the user may select an option that postpones the reminder for a week or other suitable interval. The e-mail message format is merely illustrative. Any suitable communications scheme may be used to communicate reminders to users.

Any of the vehicle performance and maintenance information and user-configurable options that may be provided using the web page arrangement of FIGS. 37 and 38 may be provided using other formats and arrangements. For example, this information may be stored in storage 80 of automobile personal computer 14 and accessed locally. The user may access this information verbally using voice recognition and voice synthesis or may access the information using buttons, on-screen options, etc.

Figure 39:
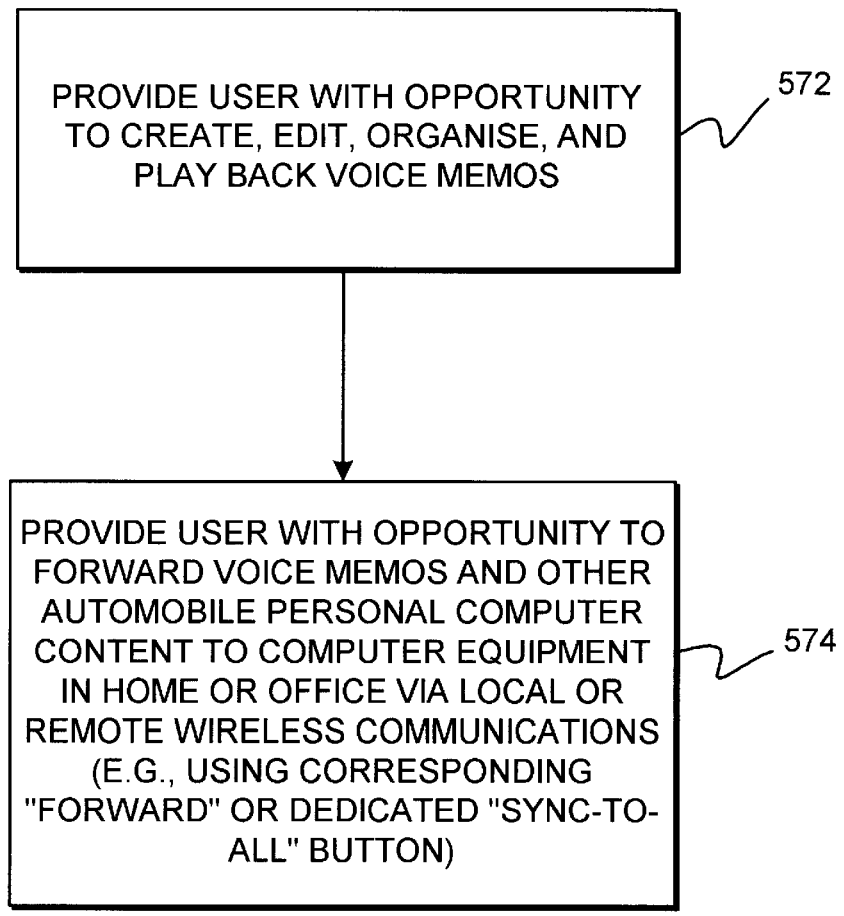
FIG. 39 is a flow chart of illustrative steps that may be used to forward voice messages in accordance with the present invention.

Automobile personal computer 14 may be used to handle various types of content, such as e-mail, voice mail, paging messages, voice memos, audio or video files, images, etc. Illustrative steps involve in using automobile personal computer 14 to handle voice memos and other content are shown in FIG. 39. At step 572, the user may be provided with an opportunity to create, edit, and organize, and play back voice memos. The user may interact with automobile personal computer 14 using buttons or other physical user input devices or may interact verbally. At step 574, the user may be provided with an opportunity to forward voice memos and other automobile personal computer content to equipment (e.g., computer equipment in the home or office or a handheld computing device) using local or remote wireless communications links.

The forwarding feature of step 574 may be invoked, for example, using the verbal command "forward," followed by information identifying the content to be forwarded and the desired destination. If desired, dedicated buttons may be used to forward content to various locations. One button may forward information to the home, one to the office, one to the user's handheld computing device, etc. A single button may be used to send content to multiple locations. A single button or multiple buttons may be used for synchronizing functions. Pressing a "sync" button may direct automobile personal computer 14 to send all newly-changed information to designated destinations. For example, if the user's designated forwarding destination is the home, pressing the sync button directs automobile personal computer 14 to send all new information (e.g., newly-downloaded audio clips, newly-added addresses in the address book, etc.) to a personal computer or other in-home electronic device over a remote or local wireless connection.

A user may use automobile personal computer 14 to. forward e-mail that is received at the automobile personal computer. If desired, e-mail may be forwarded to the user at the automobile personal computer. The automobile personal computer may detect when the user is present in the automobile, so that e-mail may be automatically routed to the automobile personal computer without any input from the user.

Figure 40:
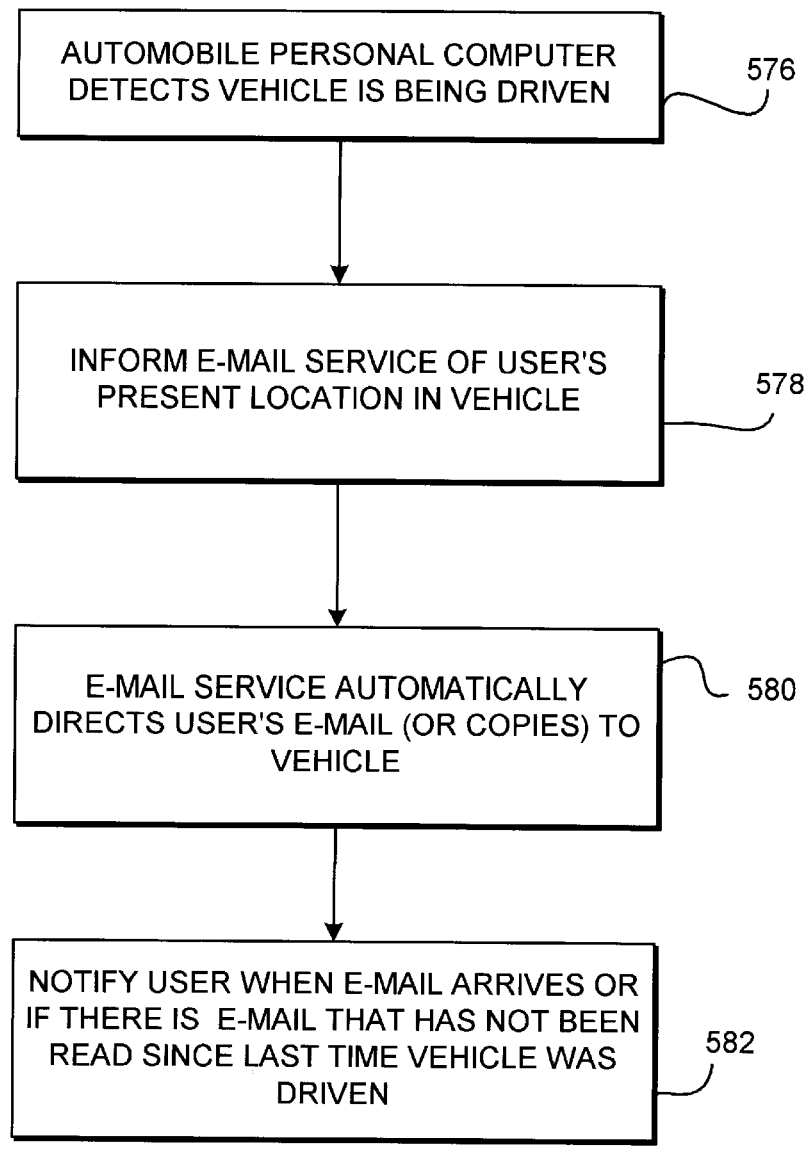
FIG. 40 is a flow chart of illustrative steps involved in forwarding e-mail to a user's automobile personal computer when the user is driving in accordance with the present invention.

Illustrative steps involved in using system 30 to provide this feature are shown in FIG. 40. At step 576, the automobile personal computer detects that the automobile is being driven or that the user is present in the vehicle. Any suitable sensor or arrangement may be used to detect use of the vehicle. For example, an ignition sensor may be used to detect when the automobile engine is running. Any suitable location scheme may such as a GPS arrangement or network-based location determination scheme may be used to determine when the automobile is moving or is away from the home. Automobile motion may also be detected using inertial sensors, a speed sensor, an odometer sensor, etc. Automobile personal computer 14 may also recognize when the user is pressing buttons on computer 14 or is vocally interacting with computer 14, which both indicate that the user is in automobile 12.

Once it has been determined that the user is in automobile 12 or is driving automobile 12, the user's e-mail service may be informed of the user's present location in automobile 12 at step 578. For example, automobile personal computer 14 may send a message or commands to a mail server at the user's e-mail service using a remote wireless link. At step 580, the user e-mail service may automatically direct the user's e-mail or duplicate copies of the user's e-mail to automobile personal computer 14.

At step 582, the user may be notified when an e-mail message arrives at automobile personal computer 14 or when an e-mail is present at automobile personal computer 14 that the user has not read since the last time the automobile was driven. Any suitable technique may be used to notify the user at step 582.

Figure 41:
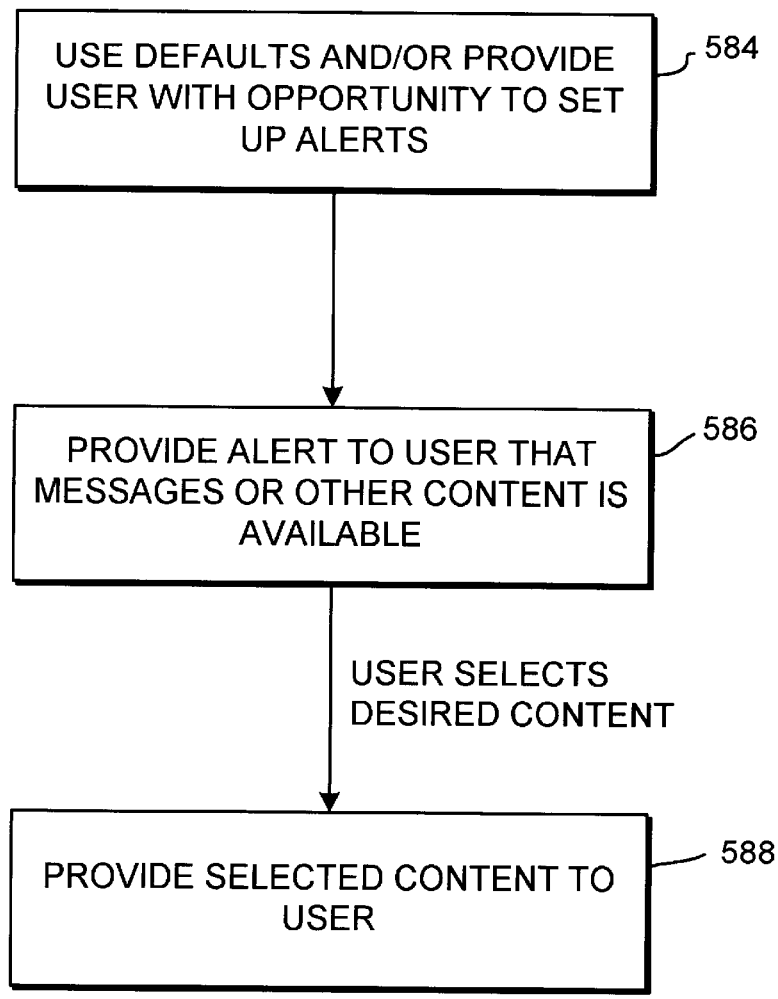
FIG. 41 is a flow chart of illustrative steps involved in providing alerts to the user that notify the user when certain content is available in accordance with the present invention.

Illustrative steps involved in alerting the user (e.g., altering the user when e-mail messages have arrived at automobile personal computer 14, alerting the user when other communications arrive, etc.) are shown in FIG. 41. At step 584, default alert settings may be used or the user may be provided with an opportunity to adjust various alert settings. An alert may be presented visually on an automobile personal computer display, may be presented by playing a tone through the automobile's sound system, or may be presented by playing a voice-synthesized message or audio clip for the user, etc. If desired, the user may, for example, select which audio clip is to be played when there is an incoming message. Alerts may be provided to the user at step 586. After the user informs automobile personal computer 14 of which content the user desires to view or listen to, automobile personal computer 14 may provide the selected content to the user at step 588.

Although primarily described in the context of e-mail messages, the automatic forwarding approach of FIG. 40 and the alert functions of FIG. 41 may be used with e-mail messages, voice mail messages, paging messages, or any other messages.

If desired, the user may set up alerts or default alerts may be used for various detected vehicle conditions. For example, the automobile personal computer 14 may alert the user when the user is low on gas, when the engine is overheated, when the user reaches a certain location, when the headlights should go on or off (e.g., based on a clock reading or light sensor), when the doors are not closed, when the door locks are not closed, etc.

Figure 42:
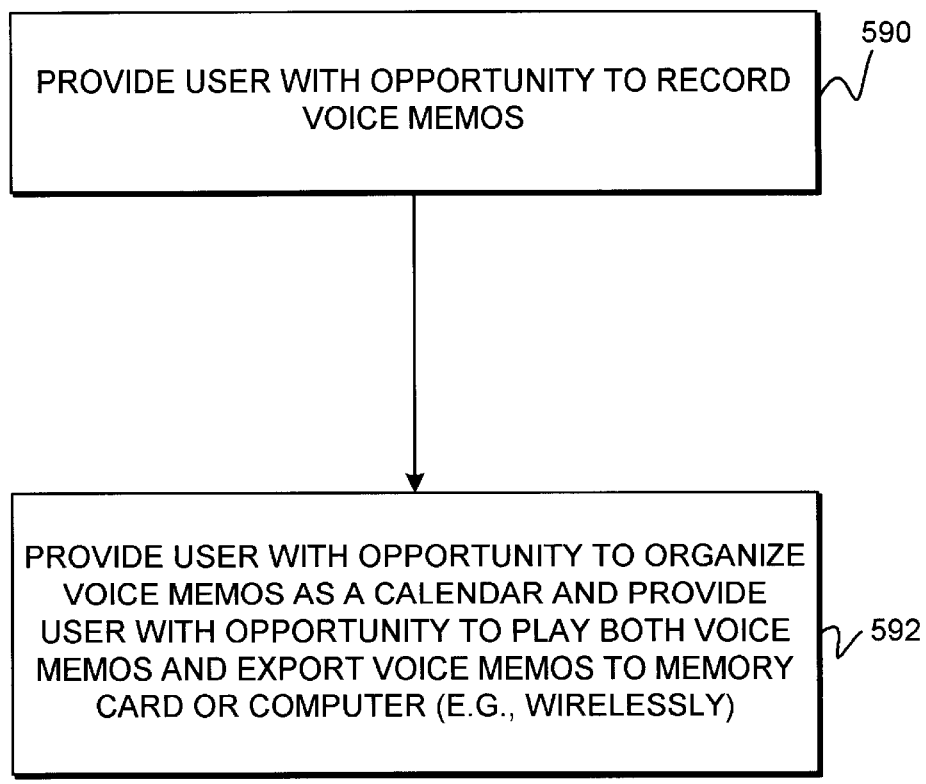
FIG. 42 is a flow chart of illustrative steps involved in providing voice memo features to the user with the automobile personal computer in accordance with the present invention.

Voice memos may be organized using calendar functions. As shown in FIG. 42, at step 590 automobile personal computer 14 may provide the user with an opportunity to record voice memos. For example, a voice memo might be "meet with Smith for lunch." At step 592, automobile personal computer 14 may be used to provide the user with an opportunity to assign memos to certain date and time slots to form a calendar. The automobile personal computer may also be used to provide the user with an opportunity to play back recorded voice memos, to export voice memos to a memory card, to export voice memos wirelessly (e.g., to a handheld computer or other computing device over a wired link, an infrared link, a local wireless link, or a remote wireless link), etc. The calendar or entries for the calendar may be forwarded to computer equipment in the home over a local or remote wireless link. If desired, for example, the calendar or entries for the calendar may be forwarded to a web appliance mounted to the user's refrigerator, a web appliance mounted to a wall in the user's home, a countertop web appliance, etc. E-mail messages and other messages may also be forwarded or sent to the user's refrigerator-mounted web appliance from automobile personal computer 14.

Figure 43:
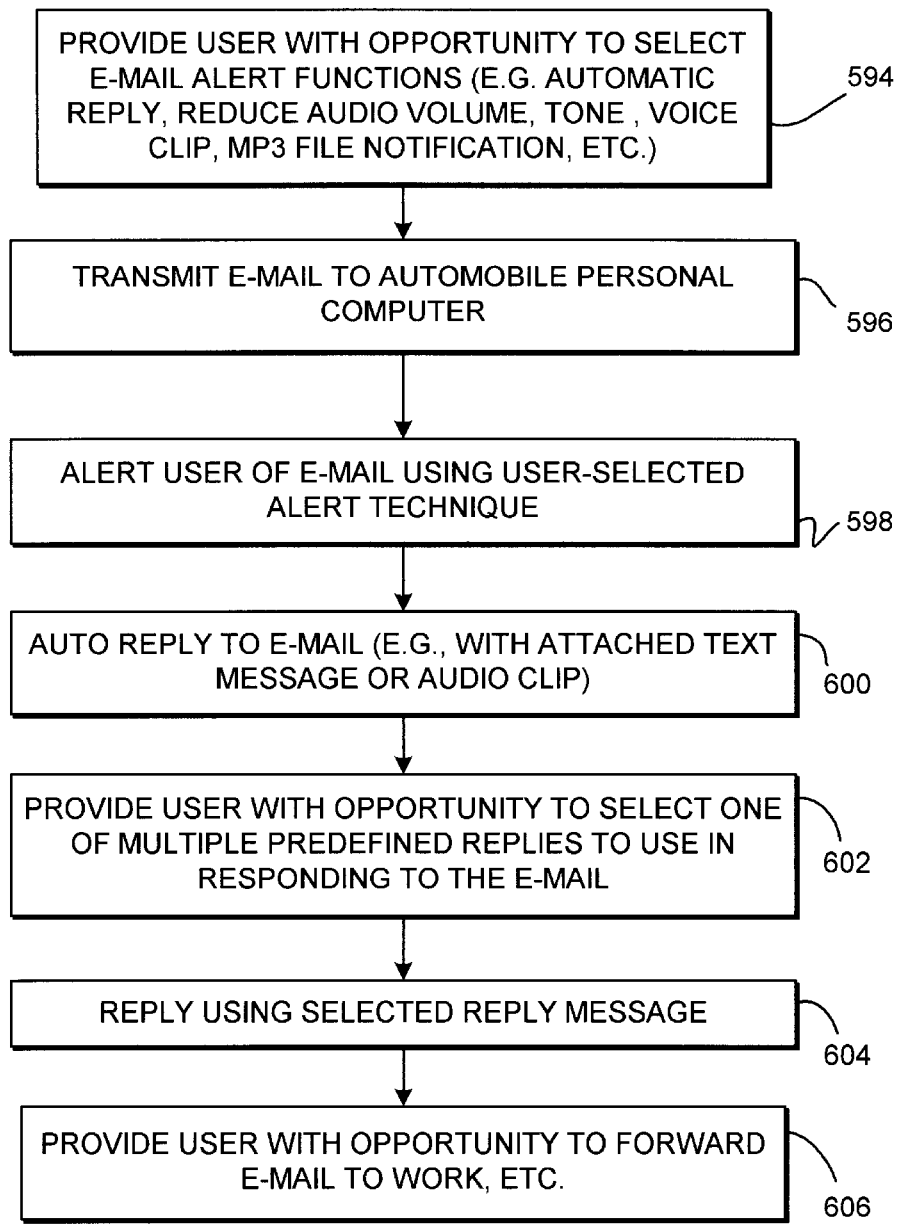
FIG. 43 is a flow chart of illustrative steps involved in providing the user with options related to handling e-mail in accordance-with the present invention.

Automobile personal computer 14 may allow the user to adjust various e-mail settings. Illustrative steps involved using automobile personal computer 14 to handle e-mail settings are shown in FIG. 43. At step 594, computer 14 may be used to provide the user with an opportunity to select e-mail alert functions (e.g., the actions to be taken when alerting a user to the receipt of e-mail messages). Suitable alert options include automatically replying, reducing the volume of any current or competing audio content, using a tone as an alert, using a voice clip as an alert, or using an audio clip (e.g., an MP3 file) as an alert.

At step 596, e-mail messages may be transmitted to automobile personal computer 14. At step 598, automobile personal computer 14 may alert the user to the new e-mail message using the user's selected alert settings.

If the user activated the automatic reply feature at step 594, automobile personal computer 14 may automatically send a reply to the user at step 600. The automatic reply may contain a message or audio clip created by the user. If desired, the automobile personal computer 14 may provide the user with an opportunity to select one of multiple predefined reply messages at step 602. For example, the user may select from messages such as "thanks for the information" or "I'll get back to you shortly," etc. At step 604 automobile personal computer 14 may respond to the e-mail using the selected reply message. At step 606 the user may be provided with an opportunity to forward the original e-mail or the e-mail and reply message to the user's work e-mail address, home e-mail address, or the e-mail address of any suitable device or recipient.

The user may remotely control automobile 12 directly over a wireless link by communicating directly with automobile personal computer 14. The user may also remotely control automobile 12 using an arrangement in which there is an intervening service provider between the user and the automobile.

Figure 44:
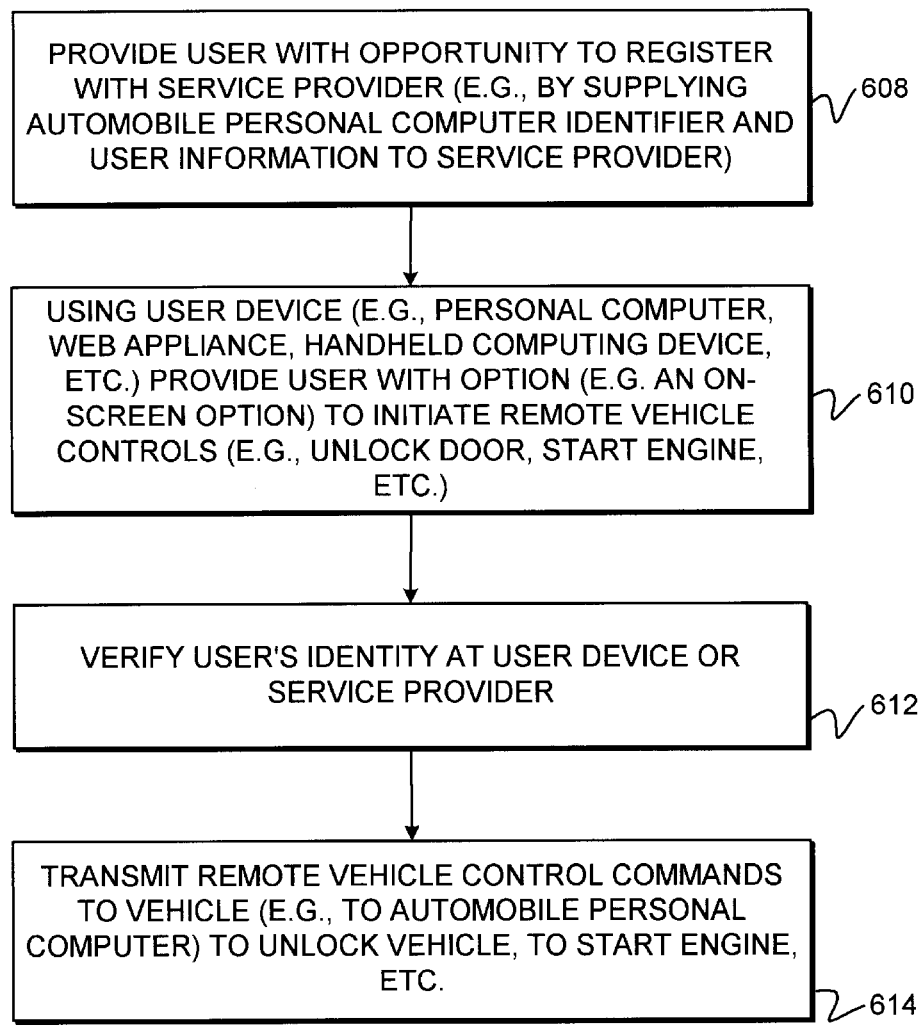
FIG. 44 is a flow chart of illustrative steps involved in wirelessly controlling an automobile using a service provider in accordance with the present invention.

Steps involved in remotely controlling automobile 12 using an intervening service provider arrangement are shown in FIG. 44. At step 608, the user may be provided with an opportunity to register with a service provider. For example, the user may register by supplying the service provider with an identification number that is associated with the automobile personal computer 14 and that uniquely identifies a communications address for automobile personal computer 14. The user may also provide user information such as the user's password or user ID, or other information that may be used to verify the user's identity and authorization to remotely control automobile 12. The user may register using automobile personal computer 14 or other suitable user device such as a personal computer, web appliance, handheld computing device, etc. that communicates with a server at the service provider.

At step 610, a user device (e.g., a personal computer, web appliance, handheld computing device, etc.) may be used to provide the user with on-screen options or voice command options or the like to initiate remote control of automobile 12. For example, the user may select an on-screen option labeled "unlock doors." The user device may be in communication with the server at the service provider or may be running independently when the on-screen option is selected. However, at some point before the server is used to control the automobile, information on which option or options were selected by the user is passed to the server.

At step 612, the user's identity may be verified either at the user device or at the service provider server. To verify the user's identity at the service provider server, the user device may communicate with the server. After the user's identity has been verified, control commands for the selected option are transmitted to automobile personal computer 14 from the server at step 614.

A typical user may only desire to control automobile 14 through a few different user devices. For example, the user may desire to control automobile 12 through a handheld computer, a personal computer at home, and a personal computer at work. Each of these devices may be identified by the user during a registration process. The user may direct the system to only permit remote control of automobile 12 to be performed from one of these devices. This provides an added measure of security, because unauthorized individuals cannot control automobile 12 through other equipment, even if the user's user ID and password have been stolen.

Figure 45:
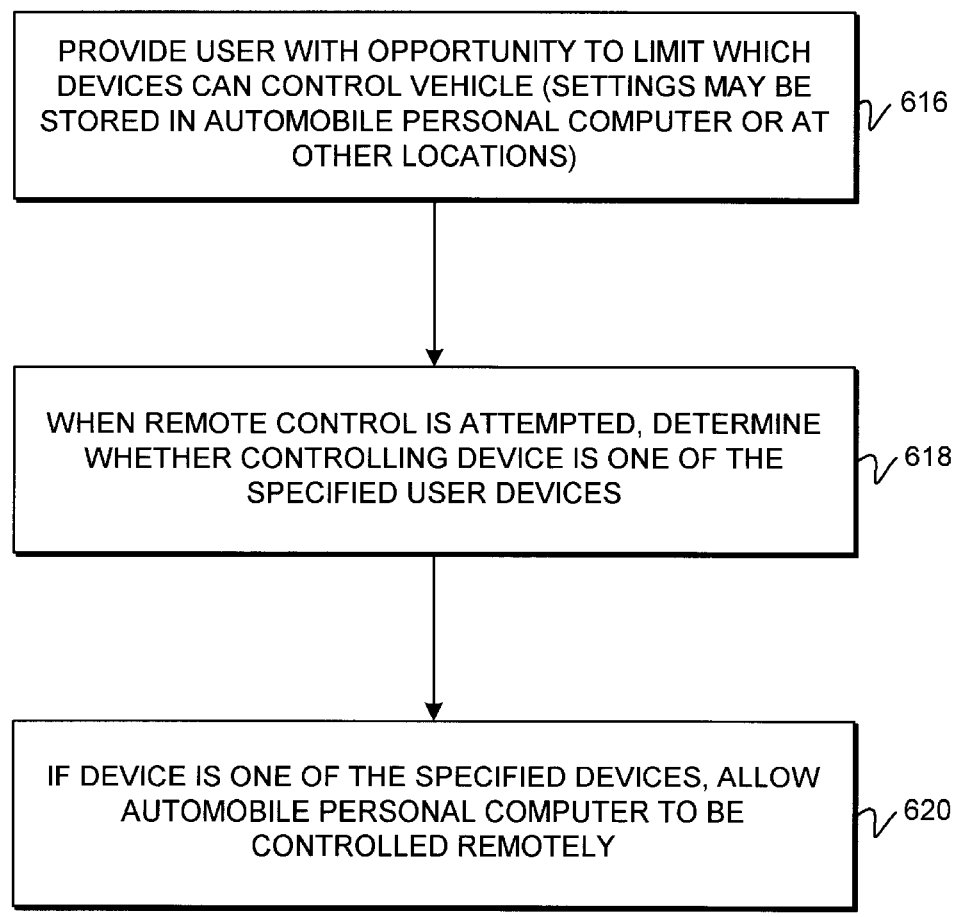
FIG. 45 is a flow chart of illustrative steps involved in ensuring security when controlling an automobile wirelessly in accordance with the present invention.

Steps involved in limiting which devices may be used to remotely control automobile 12 are shown in FIG. 45. At step 616, the user may be provided with an opportunity to limit which devices can control the user's automobile. The settings for this feature may be stored in any suitable location, such as in the automobile personal computer, or on a service provider server, etc. The user-selected settings may be communicated to this storage location from the user's location using any suitable communications path (e.g., over the Internet).

When remote control of automobile 12 is attempted at step 618, the server or automobile personal computer 14 may determine whether the controlling device is one of the devices specified by the user at step 616. The server or automobile personal computer may, for example, send a message to the specified devices asking the user to confirm that remote control is being requested by the user and asking the user to respond.

If the response from the user is received, this confirms that the controlling device is one of the specified devices and the user is allowed to control automobile 12 remotely at step 620.

Figure 46:
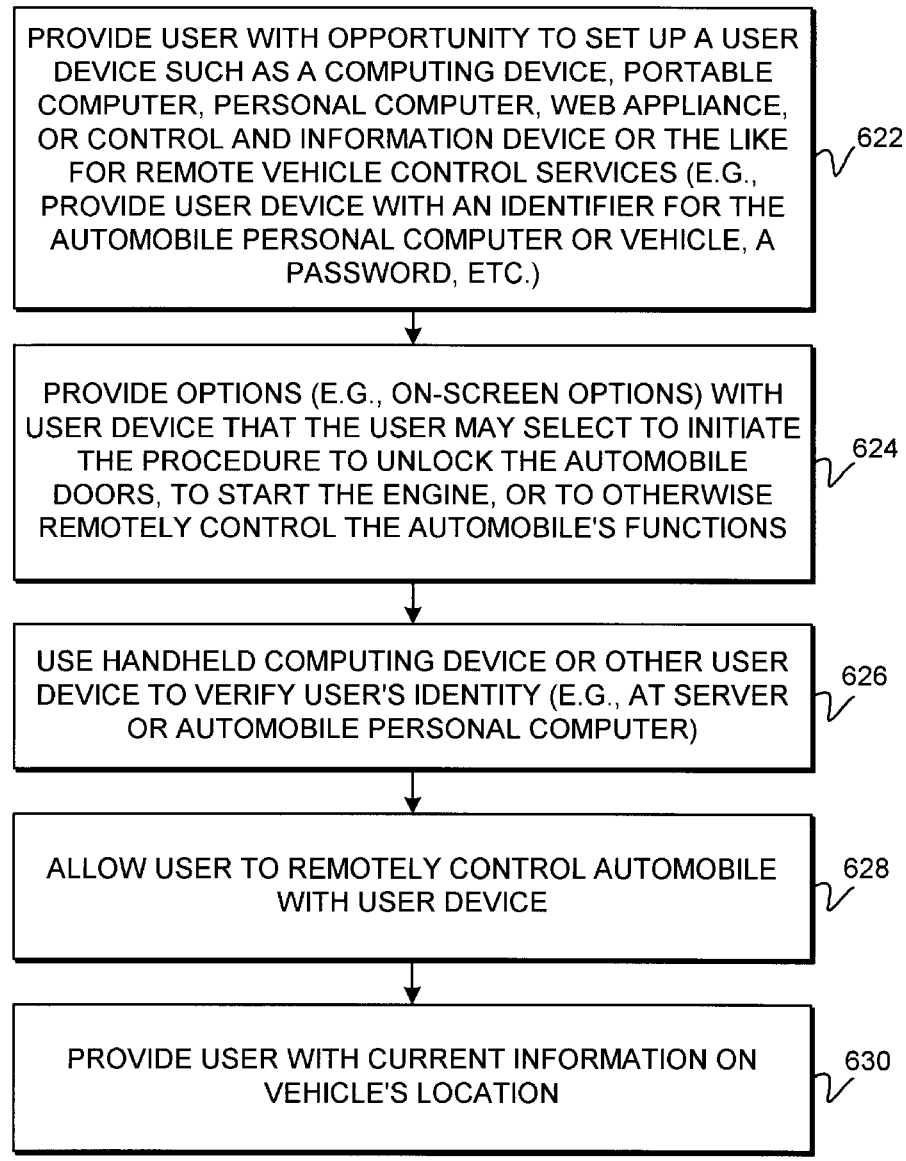
FIG. 46 is a flow chart of illustrative steps involved in providing wireless control of automobile functions in accordance with the present invention.

Illustrative steps involved in remotely controlling automobile 12 are shown in FIG. 46. At step 622, the user may be provided with an opportunity to set up a user device so that it has remote control capabilities. For example, a suitable software application may be downloaded that provides remote control options. The user device may be any suitable device such as a handheld computing device, portable computer, personal computer, web appliance, in-home electronic device, or any other suitable control or information appliance. The user device may communicate with automobile personal computer 14 using local or remote wireless links. A remote wireless link may be formed either directly to automobile personal computer 14 from the user device or may be formed using an intermediate server.

At step 624, the user may be provided with options (e.g., on-screen options) with the user device that the user may select to initiate a procedure to unlock the doors of the user's automobile, to start the engine, or to otherwise remotely control the automobile's functions. The options may be provided using a routine running locally on the user device or using the server.

At step 626, the user's identity may be verified (e.g., at the server or at automobile personal computer 14). At step 628, the user may use the user device to remotely control the automobile over the wireless link. Any vehicle devices that may be controlled using vehicle control devices such as those shown in FIG. 4 or the like may be controlled using the user device. For example, the user may control the trunk, the headlights, the door locks, the windows, the heat and air conditioning, the wipers, the ignitions, the throttle (e.g., by setting a maximum permitted speed), the transmission, the ignition, the cruise control system, the brakes, etc.

At step 630, the user may use the user device to gather location information from the automobile or the communications network.

To ensure security when using the remote control feature, the identity of the individual controlling the automobile may be verified (this may not be necessary when access to the user device is controlled, such as in the home). If desired, the user may not be allowed to use a password more than once.

An arrangement may be used in which a human operator (e.g., personnel at a service provider) may be involved in some or all remote control operations. This may provide a second layer of security because such personnel may be specially trained in how to handle remote control operations. If desired, the specific user devices that are authorized to be used in remote control operations may be limited (e.g., by the user). Multiple passwords and user IDs may be used.

As shown by step 630 of FIG. 46, the user may use a user device such as a handheld computing device, portable computer, personal computer, web appliance, in-home electronic device, or other suitable control or information appliance to obtain information on the location of automobile 12. This may allow the user to locate automobile 12 in a large parking lot or the like or to monitor the location of the automobile 12 when it is being driven by someone else. The location information may be provided as geographical position information (e.g., GPS coordinates) or in a more contextual format. For example, automobile location information may be provided in the form of a street address or a graphic map with an icon or other indicator that indicates the location of the automobile.

Figure 47:
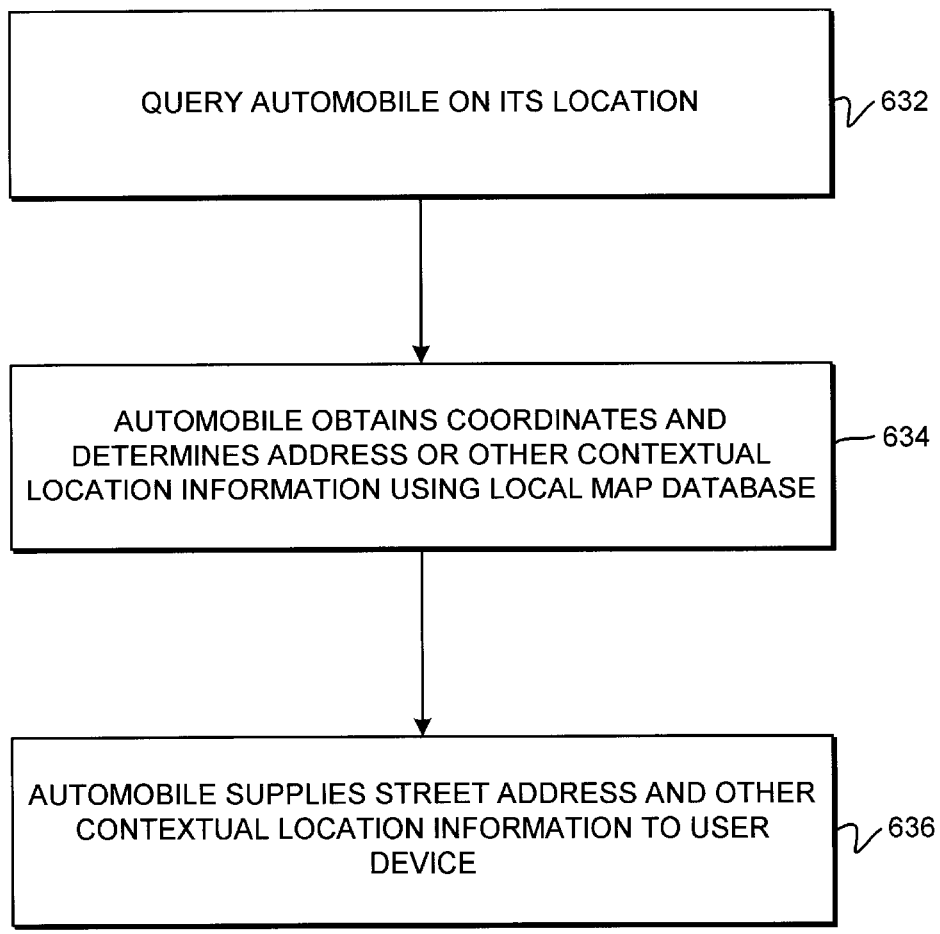
FIG. 47 is a flow chart of illustrative steps involved in obtaining an address or contextual location information from an automobile in accordance with the present invention.

Illustrative steps involved in obtaining contextual location information from a database maintained by automobile 12 are shown in FIG. 47. At step 632, the user uses the user device to query automobile 12 for its location. At step 634, automobile personal computer 12 obtains GPS coordinates from GPS receiver 112 or otherwise determines its geographical position. Automobile personal computer 14 also determines the corresponding street address or other contextual location information corresponding to the geographical position information using a local map database or the like that is stored on a CD or DVD in or on storage 80 or other suitable storage media in automobile 12. At step 636, automobile personal computer 14 supplies the street address or other contextual location information to the user device. The contextual location information may, for example, indicate which airport parking lot automobile 12 is parked in or which section of a stadium parking lot the automobile is parked in, etc. The contextual location information may be provided in any suitable format, including text, graphics, audio, and video.

Figure 48:
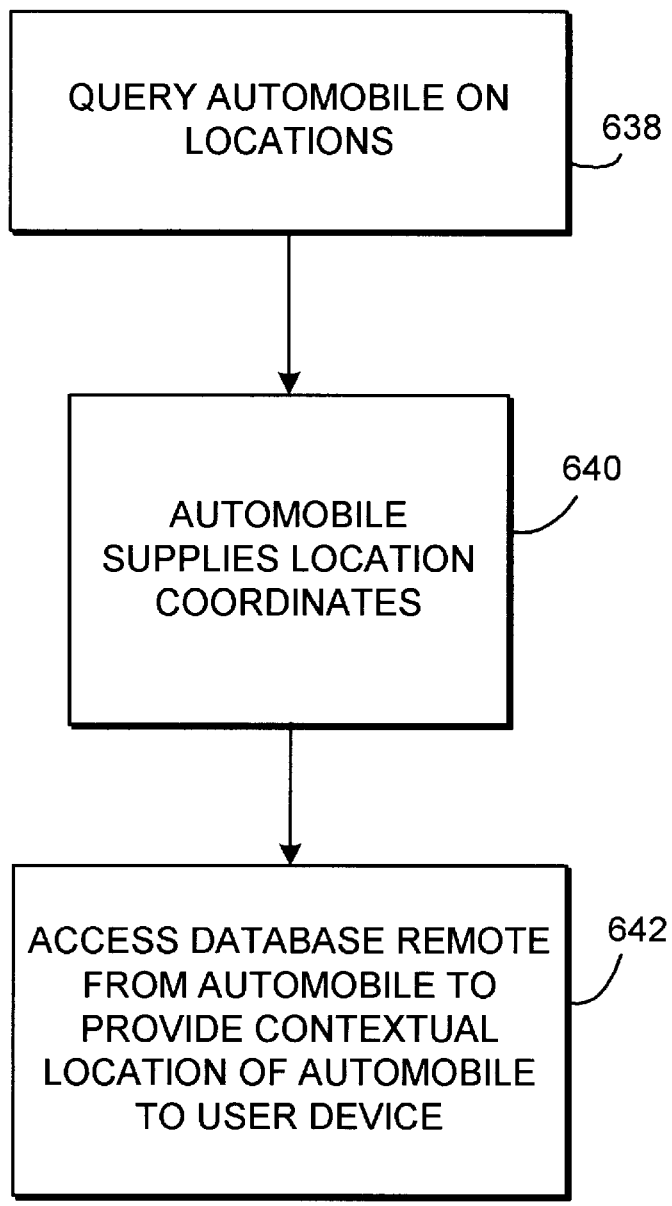
FIG. 48 is a flow chart of illustrative steps involved in obtaining contextual location information from an automobile in accordance with the present invention.

Contextual location information may also be obtained using a database that is remote from automobile 12. Illustrative steps involved in obtaining contextual location information with this type of arrangement are shown in FIG. 48. At step 638, the user device may be used to query automobile personal computer 14 on its location. At step 640, automobile personal computer 14 obtains GPS coordinates from GPS receiver 112 or otherwise determines its geographical position. At step 642, the user device or the automobile personal computer accesses a map or address database that is remote from automobile 12. A database look-up operation may be performed on the remote database at step 642 to determine the contextual location (e.g., the street address, etc.) of automobile 12 based on the coordinates supplied at step 638 and to supply this information to the user device.

The wireless communications capabilities of automobile personal computer 14 may be used to purchase products and services and to provide other benefits for the occupants of automobile 12. Remote communications paths may be based on satellite links and relatively long-range terrestrial links (e.g., terrestrial links formed over distances on the order of fractions of miles and up). Local communications paths may involve short range links formed over distances from less than a foot to hundreds of feet. Because such local communications paths need not pass through the large antennas and base station facilities of cellular networks or the like, users of local wireless links do not need to be charged for network access. In certain transactions, both remote and local wireless links may be used.

Figure 49:
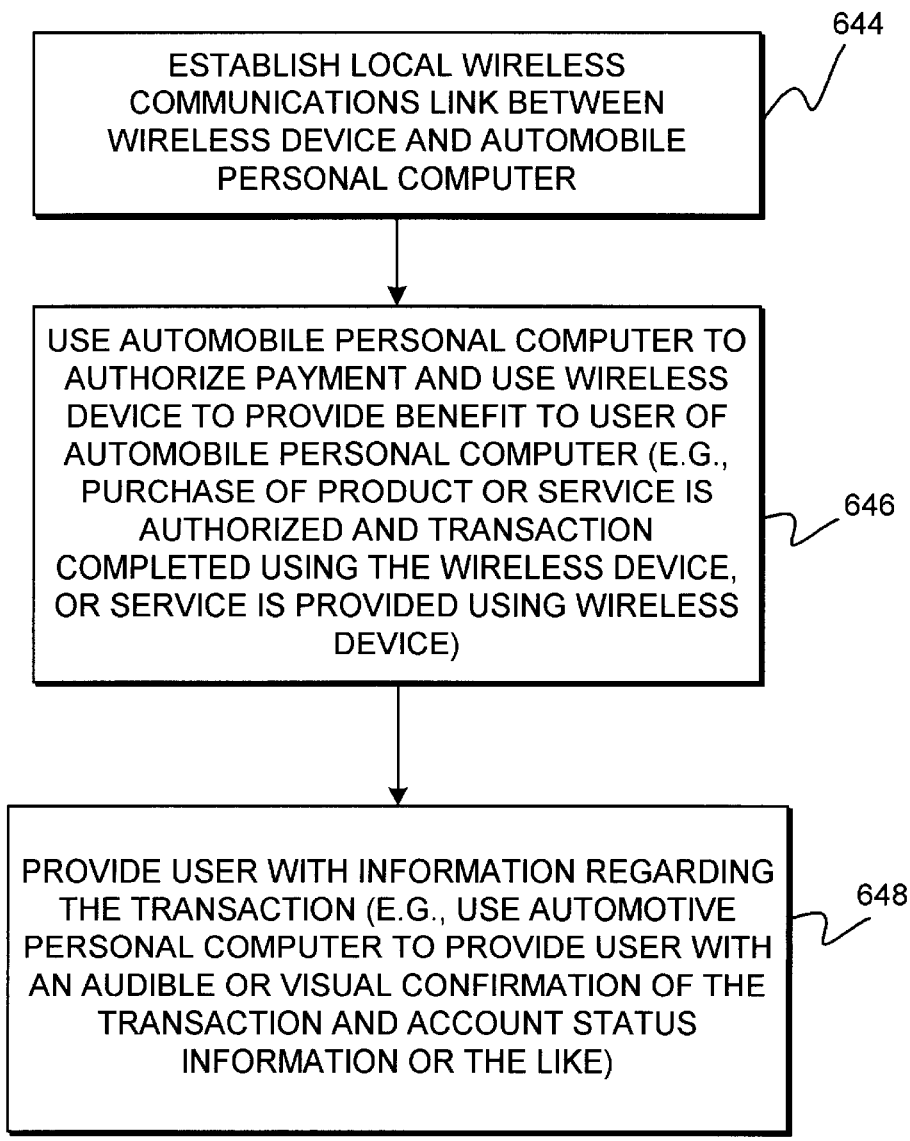
FIG. 49 is a flow chart of illustrative steps involved in using local wireless communications in a purchase transaction in accordance with the present invention.

Illustrative steps involved in using automobile personal computer 14 to interact with various entities over local wireless links are shown in FIG. 49. At step 644, a local wireless communications link may be established between a wireless device and the automobile personal computer. The wireless device may be a portable wireless device such as a handheld computing device, a portable computer, or any other suitable mobile wireless device. The wireless device may also be a fixed wireless device, such as a personal computer, a networked computer, a server, or any other suitable communications and processing equipment. Such fixed wireless devices may be located at dedicated facilities such as toll collection facilities or the like, etc. Wireless devices associated with toll collection facilities, merchants, and other such entities may be external to automobile 12. Wireless devices such as handheld computing devices, portable computers, and other mobile wireless devices may be external to automobile 12 or may be operated in the interior of automobile 12.

At step 646, automobile personal computer 14 may communicate with the wireless device to authorize payment on behalf of the user. The payment may be for any suitable benefit, such as purchasing a product or service such as food or automobile maintenance, paying a toll, paying a parking meter, etc.

At step 648, the user may be provided with information regarding the transaction of step 646. In particular, the user may be provided with information such as the cost or benefit of the transaction, the user's account status, promotional information, etc. Audible and visual techniques may be used to convey this information and to confirm that the transaction took place.

Figure 50:
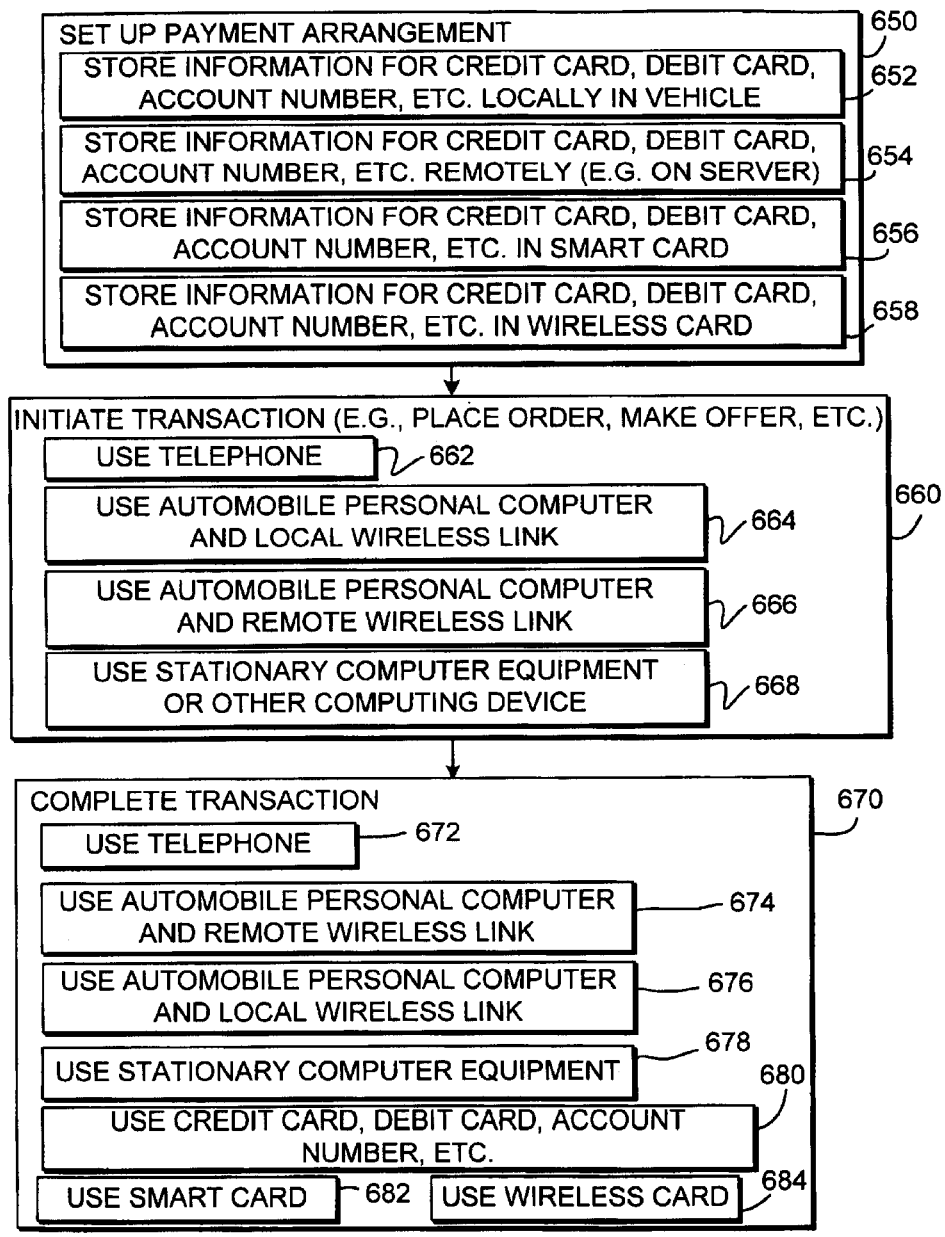
FIG. 50 is a flow chart of illustrative steps involved in setting up payment arrangements and in initiating and completing purchasing transactions in accordance with the present invention.

Financial transactions may be involved in using automobile personal computer 14 to interact with wireless communications devices over remote and local wireless links. Illustrative steps involved in such financial transactions are shown in FIG. 50. At step 650, the user may be provided with options that allow the user to set up a payment arrangement. For example, the user may be provided with an opportunity to store information on the user's credit cards, debit cards, account numbers, etc. at step 652. This information may be stored locally in automobile 12. At step 654, the user may be provided with an opportunity to store information on the user's credit cards, debit cards, account numbers, etc. using a remote server. At step 656, the user may be provided with an opportunity to store such information on a smart card. At step 658, the user may be provided with an opportunity to store such information on a wireless card. The user may use automobile personal computer 14 to store the financial information. If desired, some or all of this information may be stored in advance (e.g., by a service provider who supplies the smart card to the user, etc.). Substeps 652, 654, 656, and 658 are merely illustrative. Moreover, not all of substeps 652, 654, 656, and 658 need to be performed.

At step 660, a purchase transaction or other wireless transaction may be initiated. For example, the user or a merchant may make an offer, the user may place an order, etc. Either local or remote links may be used. At step 662, the user may use a wireless telephone to obtain information. The wireless telephone may be part of automobile personal computer 14 or may be an attachment to automobile personal computer 14. If desired, automobile personal computer 14 may automatically dial a desired telephone number. At step 664, the automobile personal computer 14 may be used to initiate the transaction over a local wireless link. At step 666, the automobile personal computer 14 may be used to initiate the transaction over a remote wireless link. At step 668, stationary computer equipment may be used to initiate the transaction. Substeps 662, 664, 666, and 668 are merely illustrative. Any other suitable techniques for initiating the transaction may be used if desired. Moreover, not all of these substeps need to be performed. In a typical arrangement, one of the substeps is used.

At step 670, the transaction may be completed. In particular, any required payments may be made and the product or service may be delivered. If the physical delivery of a product or service is involved (e.g., gas, food, lodging, etc.), the transaction may be completed at the merchant or other entity. The transaction may also be completed at or in the vicinity of the merchant if the transaction is completed using a local wireless link. An example is payment of a toll over a local wireless link.

At step 672, a telephone (e.g., a wireless telephone) may be used to complete the transaction. At step 674, a remote wireless link (e.g., between the automobile personal computer and the merchant or other entity involved in the transaction) may be used to complete the transaction. At step 676, a local wireless link (e.g., between the automobile personal computer and the merchant or other entity involved in the transaction) may be used to complete the transaction. At step 678, stationary computer equipment may be used to complete the transaction. For example, the user may enter a purchase code into a kiosk or other stationary computing device to complete a transaction that was initiated using a remote wireless link. At step 680, a credit card, debit card, or account number may be provided to complete the transaction. The user or the merchant may use a credit card reader to handle credit cards, debit cards, and other financial or loyalty cards at step 680. For example, a user purchasing gasoline may insert a credit card into the credit card reader. At step 682, a smart card may be used to complete the transaction. At step 684, a wireless card may be used to complete the transaction. Substeps 672, 674, 676, 678, 680, 682, and 684 are merely illustrative. Any suitable technique may be used to complete the transaction.

Either the same type of approach that is used to initiate the transaction at step 660 may be used to complete the transaction at step 670 or different approaches may be used. If desired, the transaction may be initiated and completed at the same time. For example, wireless toll payment may involve what is essentially a single local wireless transaction when the automobile passes through a wireless toll collection facility. With other arrangements, the transaction may be initiated well before the transaction is completed. For example, a user may use automobile personal computer 14 to make a hotel reservation over a remote wireless link. The transaction may be completed when the user registers at the hotel in person and provides a credit card to the hotel that is read by a credit card reader.

In some scenarios, automobile personal computer 14 may be used in financial transactions that involve more steps or different steps than the steps shown in FIG. 50. Nevertheless, the illustrative steps of FIG. 50 show a general approach that is suitable for a number of different transactions.

Figure 51:
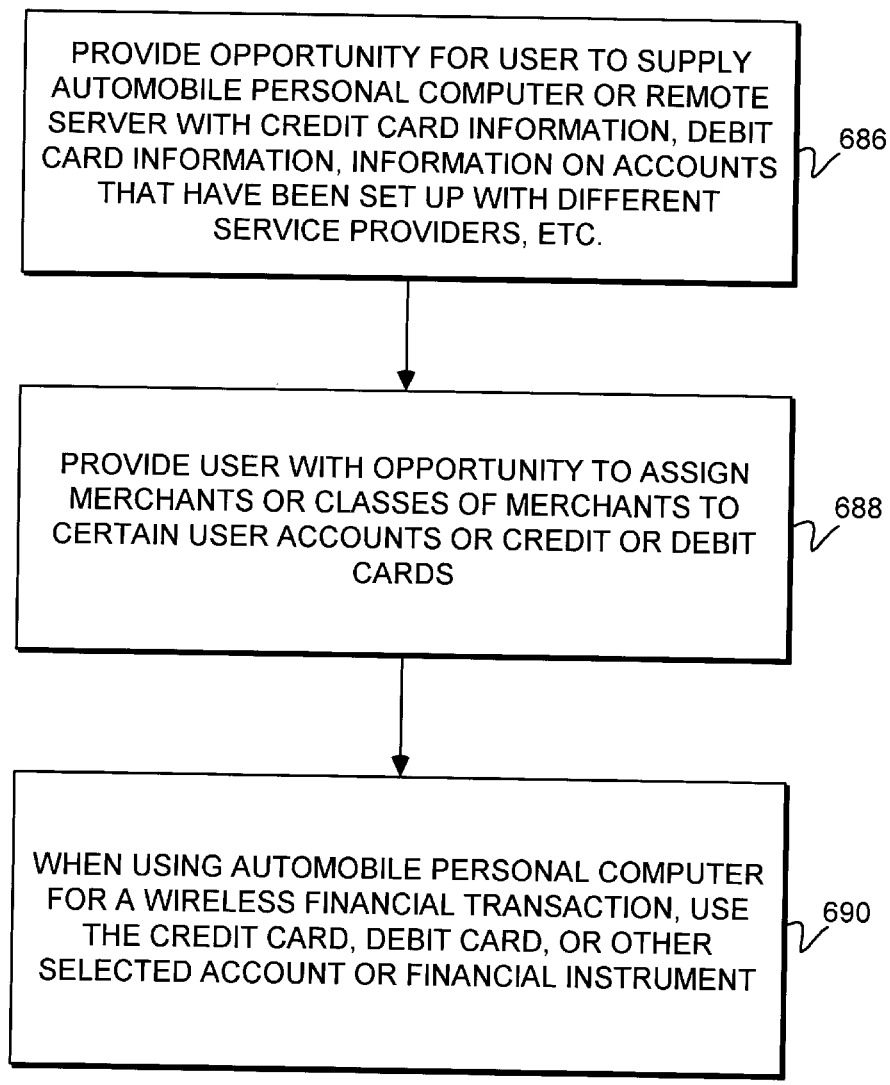
FIG. 51 is a flow chart of illustrative steps involved in various payment methods in accordance with the present invention.

The user may adjust certain settings in automobile personal computer to facilitate payment during financial transactions. Illustrative steps involved in setting up payment arrangements with automobile personal computer 14 are shown in FIG. 51. At step 686, the user may be provided with an opportunity to supply automobile personal computer 14 or a remote server with credit card information, debit card information, information on accounts that have been set up with service providers or other entities, etc. For example, the user may be provided with an opportunity to supply the information directly to automobile personal computer 14 or using a local or remote wireless link. The user may be provided with an opportunity to supply the information to the remote server over the Internet, through a customer service representative, or using any other suitable approach. At step 688, the user may be provided with an opportunity to assign certain merchants or classes of merchants to certain user accounts or credit or debit cards. The user may accomplish this by interacting with automobile personal computer 14 or the remote server. As an example, the user may adjust settings so that all purchases at a particular gas station use that gas station's credit card. All transactions involving fast food restaurants may use another credit card and all transactions involving lodging may use yet another credit card. All automatic teller machine (ATM) transactions may use a debit card. All highway toll payments may use a toll payment account. These are merely illustrative examples.

At step 690, the information on the appropriate credit card, debit card, or account or other financial instrument may be used when using automobile personal computer 14 for a financial transaction. The information that is used may be obtained from storage in automobile personal computer 14 (if stored locally) or may be retrieved from the remote server (if stored remotely).

Figure 52:
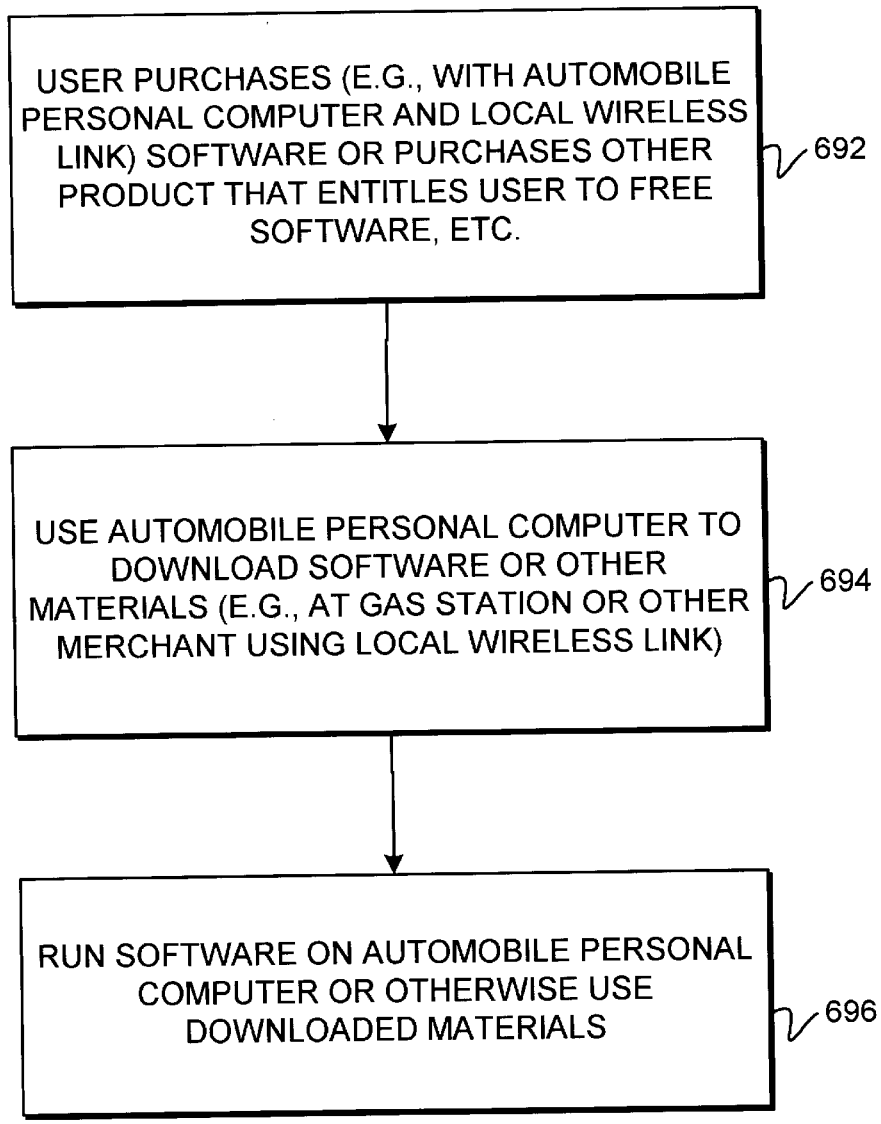
FIG. 52 is a flow chart of illustrative steps involved in providing a promotional software download over a local wireless link in accordance with the present invention.

If desired, a local wireless link may be used to download software or audio content from a merchant. For example, a drive-through fast food restaurant or a gasoline station may allow the user to download MP3 files to automobile personal computer 14 over a local wireless link. Video, graphics, and text files may also be downloaded in this way. This may be done as an enticement for the user to visit the merchant, as part of a promotion involving the purchase of a product or service (e.g., gas, food, etc.), or may be a regular service of the merchant for which the user pays a fee. Illustrative steps involved in using a local wireless link to deliver software and other materials to the user are shown in FIG. 52. At step 692, the user may purchase software or other electronic materials or may purchase a product or service that entitles the user to free software other electronic materials. The automobile personal computer may be used to make the purchase over a local wireless link or any other purchase technique may be used. At step 694, the automobile personal computer 14 may be used to download the software or other materials (e.g., at a gas station or other merchant over a local wireless link). At step 696, automobile personal computer 14 may be used to run the downloaded software, to play downloaded audio or video files, or to otherwise use the downloaded materials.

If desired, the software or other materials that are download in the arrangement of FIG. 52 may be downloaded using a physical cable or from a memory card or other storage medium or may be downloaded over a remote wireless link.

The materials may be part of a collection. For example, the materials may be individual MP3 audio tracks that make up an album or the chapters in an audio book. Software installments may provide different levels for a video game. The merchant may offer a different component of the collection each month. Because the user may want to collect all or many of the components of the collection, this approach may encourage the user to visit the merchant more often. If desired, different components of the collection may be collected at different participating merchants. As an illustrative example, the user may download or otherwise be provided with an MP3 file for the first part of a story at one merchant, but may need to download or otherwise be provided with an MP3 file for the second part of the story at another merchant.

The wireless device from which the user may download the software and other materials from the merchant may be located in any suitable location, such as inside or near a gas pump, in the drive-through path used by a drive-through restaurant, or in more central locations in a parking lot or interior of the merchant's facilities.

Figure 53:
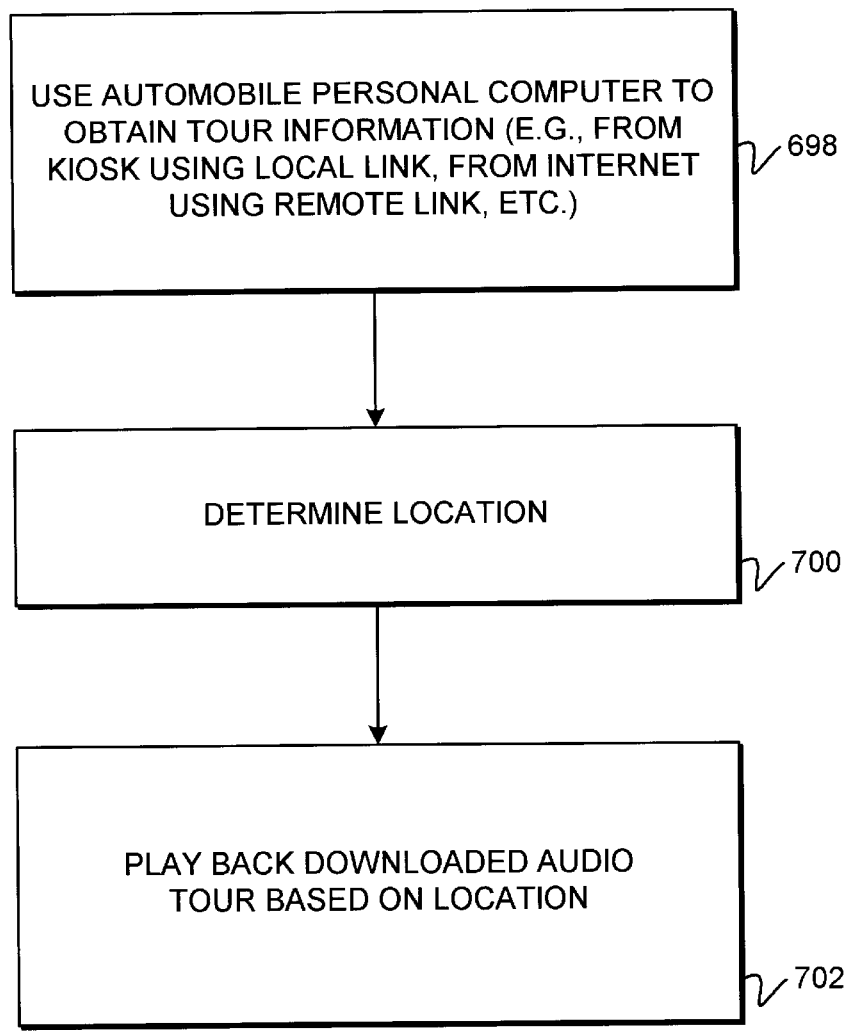
FIG. 53 is a flow chart of illustrative steps involved in obtaining a downloaded tour in accordance with the present invention.

Electronic materials such as software, text, audio, and video content may be downloaded from kiosks or remotely using remote wireless links. One suitable approach involves downloading an audio tour from a kiosk over a local wireless link or from a remote server over a remote wireless link. Illustrative steps involved in wirelessly downloading and using a tour are shown in FIG. 53. At step 698, the user may use the automobile personal computer to download tour information (e.g., form a kiosk over a local wireless link or from a remote server using a remote wireless link). At step 700, while the user is driving around the region covered by the tour, the location of automobile 12 may be determined (e.g., using GPS techniques or other techniques). Automobile personal computer 14 may use the location information to synchronize the playback of the audio tour with the user's present location at step 702. If desired, audio tours can be used without tying the playback of the audio to the automobile's location.

If desired, the information for the tour may be provided to automobile personal computer 14 in real time (e.g., using a remote wireless Internet link). The tour information that is provided may be specific to the user's present location or may be more general information that the automobile personal computer filters based on the location. The user may specify the desired location (e.g., using voice commands, etc.). Because a large amount of tour information may be stored on remote servers, arrangements in which tour information is stored remotely and obtained by the automobile personal computer 14 when needed allow users who travel to have access to a large repository of possible tours from which to choose. The user may access the Internet using automobile personal computer 14 and may select desired tours using a web browser. If the automobile's location is determined (e.g., by GPS), such location information may be used to synchronize the delivery of the tour to the user. The tour's content may be synchronized at the remote server or at the automobile personal computer 14.

Wireless links, and particularly local wireless links, may be used to interact with facilities such as parking garages, entrance gates (e.g., at military bases, government facilities, corporate facilities, etc.), parking meters, gas stations, toll collection facilities, and merchants.

Figure 54:
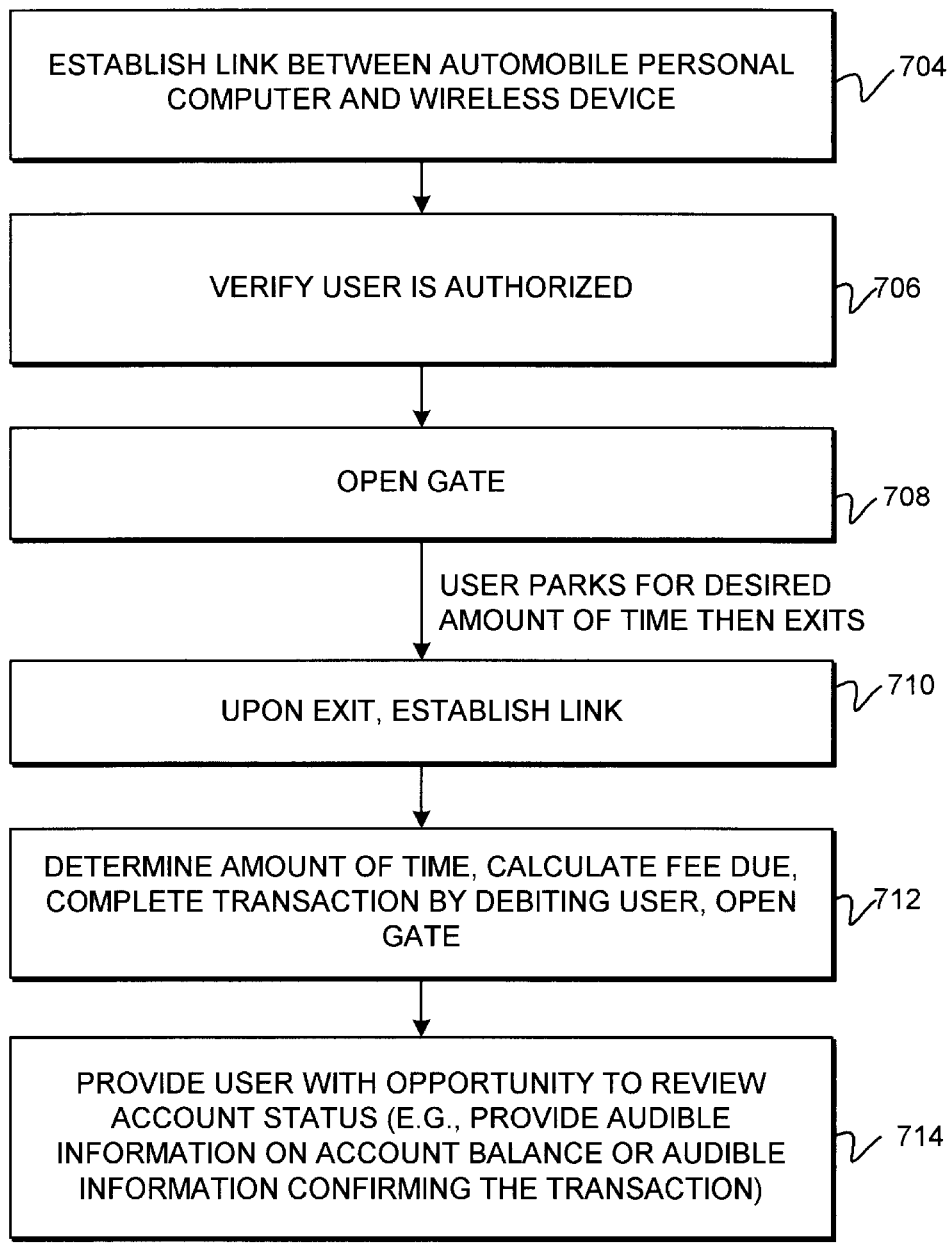
FIG. 54 is a flow chart of illustrative steps involved in using the automobile personal computer in a parking garage in accordance with the present invention.

Illustrative steps involved in using a wireless link to interact with a parking facility are shown in FIG. 54. At step 704, a wireless link may be established between automobile personal computer 14 and the parking facility. For example, a local wireless link may be established with a wireless device at the parking facility such as a short-range transmitter-receiver that is located in a structure near the entrance gate to the garage or elsewhere in the vicinity of the garage. At step 706, the garage (e.g., computing equipment associated with the garage and in communication with automobile personal computer 14) may determine whether the user is authorized. Information on the user's identity or account or the like may be provided to the garage over the wireless link. All users may be authorized, only monthly parkers, etc. If a wireless link cannot be established or the user is not authorized, the user may be provided with a printed parking ticket.

If the user is authorized, the entrance gate is opened at step 708. After the user has finished parking in the parking facility, the user proceeds to the exit of the parking facility, where another wireless link may be established with the garage. For example, a local wireless link may be established with a wireless device near the exit gate of the parking facility). The parking garage determines the amount of time that the user has parked at the parking facility, and calculates the fee owed by the user. The payment transaction may be completed wirelessly and automatically and the exit gate opened. If desired, the user may be provided with an opportunity to review the status of the user's account, etc. For example, the automobile personal computer 14 may be allow the user to make parking facility account balance inquiries using verbal commands or commands provided through other user interfaces. Account balance information may also be provided automatically. Automobile personal computer 14 may play a short confirmation tone or message automatically upon exit. For example, as the gate is lifted, the automobile personal computer may play the message "five dollars has deducted from your account—thank you for your visit" through the sound system of automobile 12. A tone or an audio clip or other audible signals may also be presented upon exiting.

If desired, other entrance and exit control arrangements may be used. For example, entrance and exit sensors and video or still image monitoring techniques may be used instead of physical control gates.

Figure 55:
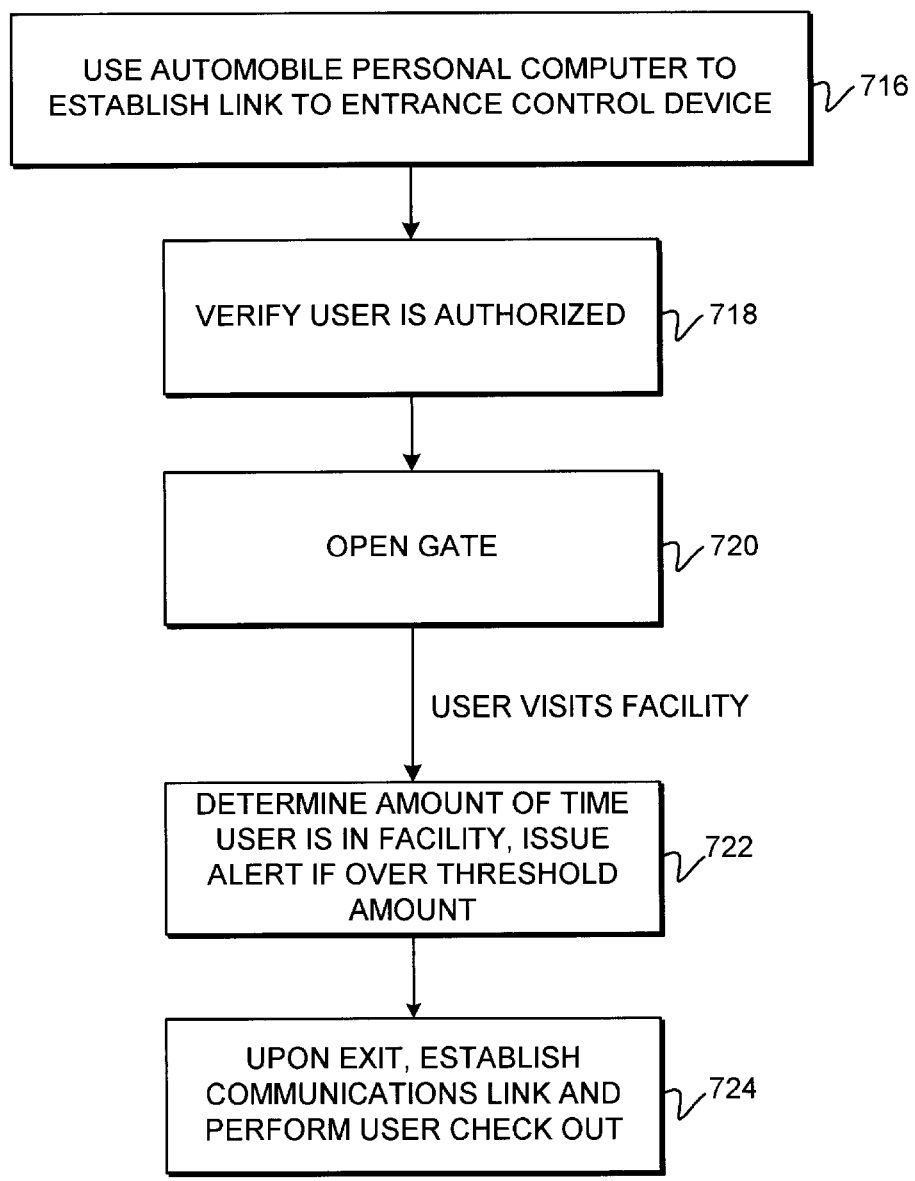
FIG. 55 is a flow chart of illustrative steps involved in using the automobile personal computer in visiting a facility with controlled access in accordance with the present invention.

Illustrative steps involved in using automobile personal computer 14 when visiting facilities with controlled access are shown in FIG. 55. At step 716, a wireless link may be established. For example, a local wireless link may be established between automobile personal computer 14 and a wireless device such as a wireless device connected to or associated with an entrance control device such as a gate. At step 718, the entrance control device or other computer at the facility may be used to determine whether the user is authorized to enter the facility. The user's identity may be provided to the entrance control device over the local wireless link.

If the user is authorized, the entrance gate may be opened at step 720. At step 722, the facility may periodically determine the amount of time that various visitors have been present at the facility. If the length of a visitor's stay raises any suspicions, an alert may be issued to security personnel at the facility at step 722.

After the user has finished visiting the facility and is preparing to leave, a wireless link may be established between automobile personal computer 14 and the facility at step 724. For example, a local wireless link may be established. In addition, the user's authorization to leave is confirmed. If the user is authorized, the exit gate may be opened.

If desired, other entrance and exit control arrangements may be used for facilities with controlled access. For example, entrance and exit sensors and video or still image monitoring techniques may be used instead of physical control gates.

Figure 56:
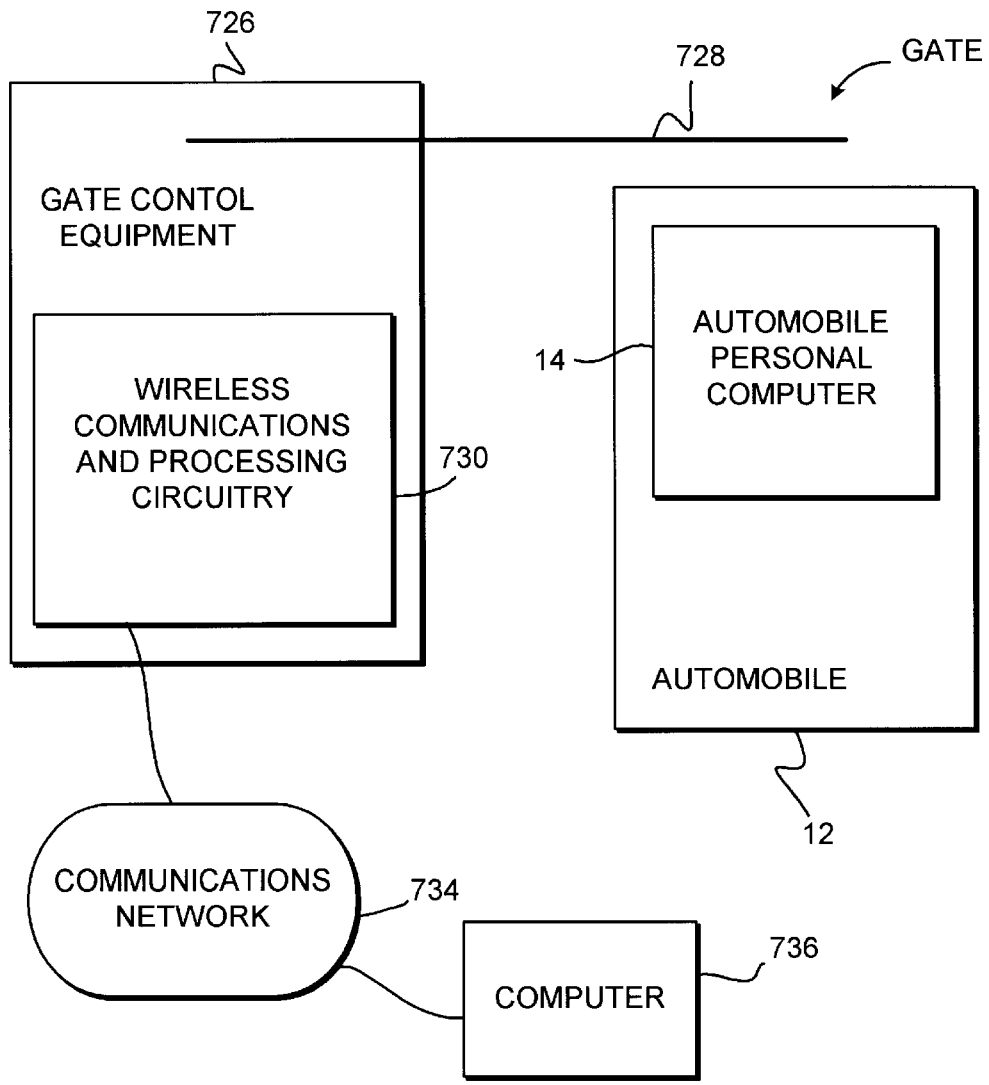
FIG. 56 is a diagram of illustrative equipment that may be involved in performing the steps of FIGS. 54 and 55 in accordance with the present invention.

A schematic diagram of illustrative equipment involved in handling wireless entrance and exit transactions of the types described in connection with FIGS. 54 and 55 is shown in FIG. 56. Gate control equipment 726 may be used to operate an access control gate 728. Wireless communications and processing circuitry 730 may be used to communicate with automobile personal computer 14 in automobile 12. If desired, a wireless communications link (e.g., a local wireless communications link) may be established between wireless communications and processing circuitry 730 and an automobile personal computer 14 whenever the automobile personal computer 14 comes within range of wireless communications and processing circuitry 730.

If desired, the processing components of wireless communications and processing circuitry 730 may be housed at a location other than gate control equipment 726. In addition, data from wireless communications and processing circuitry 730 may be stored on a computer 736 that is connected to wireless communications and processing circuitry 730 through a communications network. This arrangement allows computer 736 to maintain records and accounts, send statements to users through the mail, etc. If desired, computer 736 may store statistics and account information and the like that may be accessed by the user (e.g., using a web browser or the like).

Figure 57:
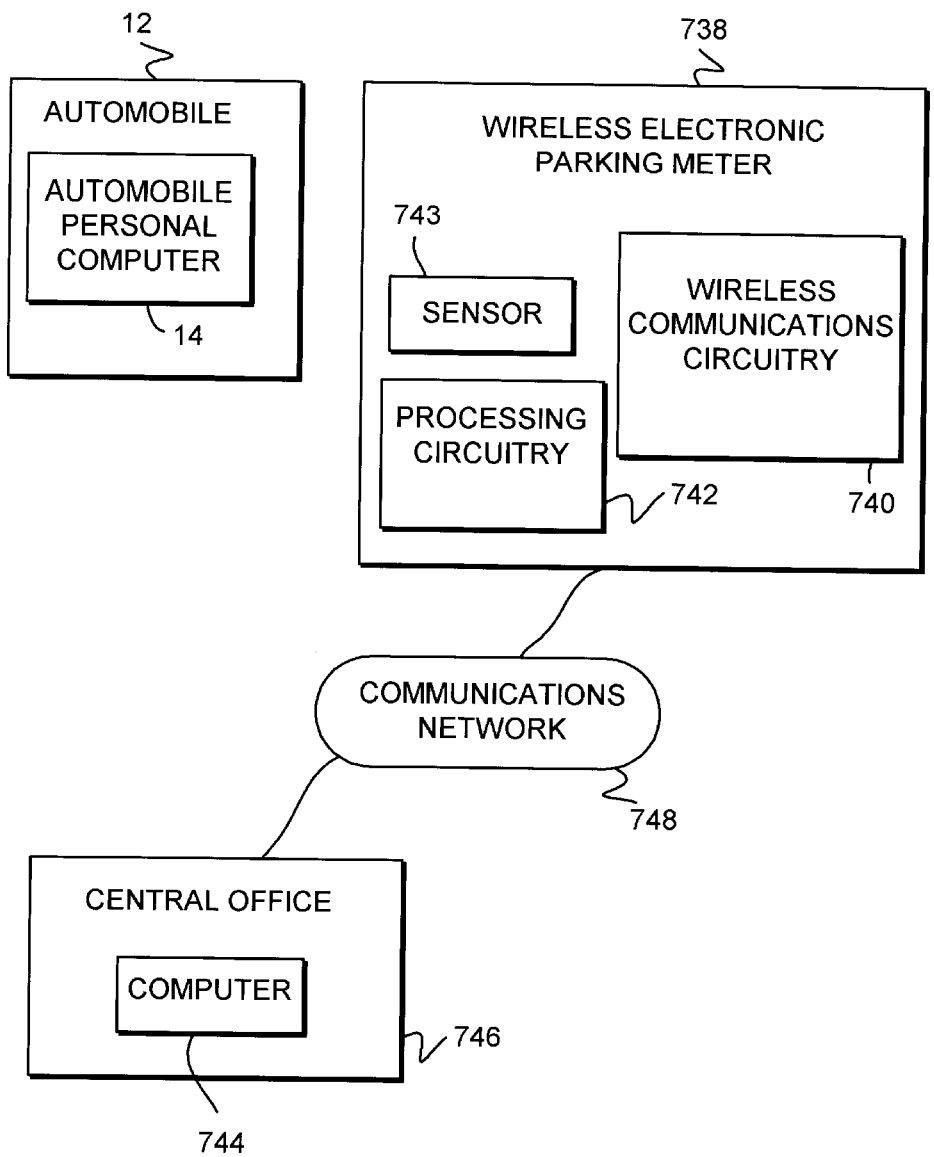
FIG. 57 is a diagram of an illustrative wireless parking meter system in accordance with the present invention.

An electronic parking meter arrangement may be used with the automobile personal computer 14, as shown in FIG. 57. Electronic parking meter 738 may have wireless communications circuitry 740 and processing circuitry 742 for communicating with automobile personal computer 14 of automobile 12 and for handling parking transactions. Sensor 743 may be used to detect the presence of vehicles.

Electronic parking meter 738 may be connected to a computer 744 at a central office 746 over a communications network (e.g., the Internet, or the telephone network, or any other suitable communications paths). The central office 746 can handle customer service issues, can maintain accounts for users, may send status reports or bills or tickets or the like to users through the mail, by e-mail, etc.

Figure 58:
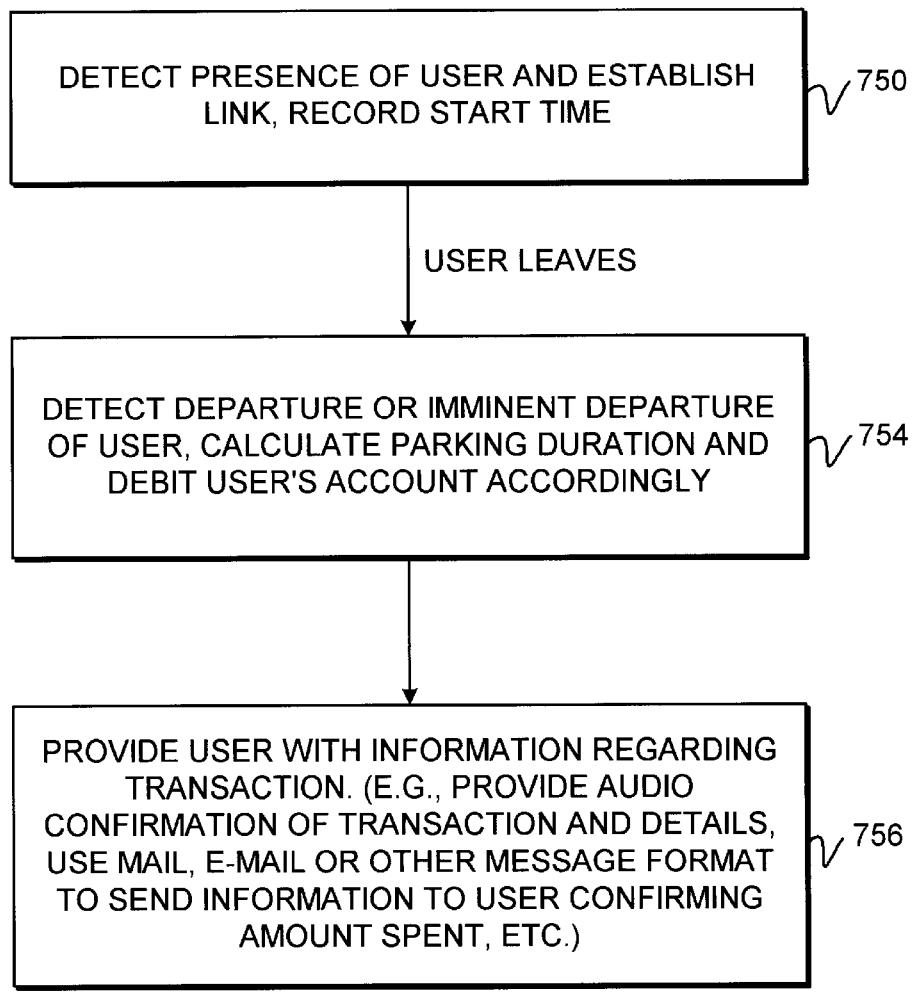
FIG. 58 is a flow chart of illustrative steps involved in using the automobile personal computer to pay a parking meter in accordance with the present invention.

Illustrative steps involved in using an electronic parking meter system such as the system of FIG. 57 are shown in FIG. 58. At step 750, the system detects the presence of the user and records the date and time at which the user has started parking. The user's presence may be detected using any suitable technique. For example, the user's presence may be detected by sensor 743. Sensor 743 may be a magnetic sensor (e.g., buried beneath the parking space) or may be an optical sensor. The user's presence may also be detected using wireless communications circuitry 740. A wireless link (e.g., a local wireless link) may be established between electronic parking meter 738 (FIG. 57) and automobile personal computer 14 at step 750. Such a link may be used, for example, to determine whether the user is authorized to use the electronic parking meter and whether the user has sufficient funds available to pay for parking.

When the user leaves the parking space, the system may detect the user's departure at step 754. The system determines how long the user parked and calculates the parking fee that is due. The user may then be debited by the appropriate amount. The user may pay for the parking transaction using credit card information or other financial transaction information stored locally in automobile 12 or may use an account or other financial arrangement that is maintained on a server or the like that is external to automobile 12. For example, the user's account may be maintained at computer 744 of FIG. 57. If desired, the user may follow instructions that direct the user to wirelessly pay the parking fee before departing the parking space. With this approach, the system can use sensor 743 to ensure that the user does not leave without paying.

Regardless of the particular technique used to debit the user for the use of the parking garage, the user may be provided with a confirmation of the transaction and other parking meter information at step 756. In particular, the user may be provided with information regarding the transaction such as the total amount due or debited, the duration of the user's stay, the status of the user's account, etc. This information may be provided to automobile personal computer 14 (e.g., over a local wireless link). In addition, a message such an audio message thanking the user may be provided to automobile personal computer. The information regarding the transaction may be played manually or automatically by the automobile personal computer through the sound system of automobile 12. The message thanking the user may also be played manually or automatically by the automobile personal computer 14 through the automobile sound system. If desired, advertisements may be included with these messages.

Figure 59:
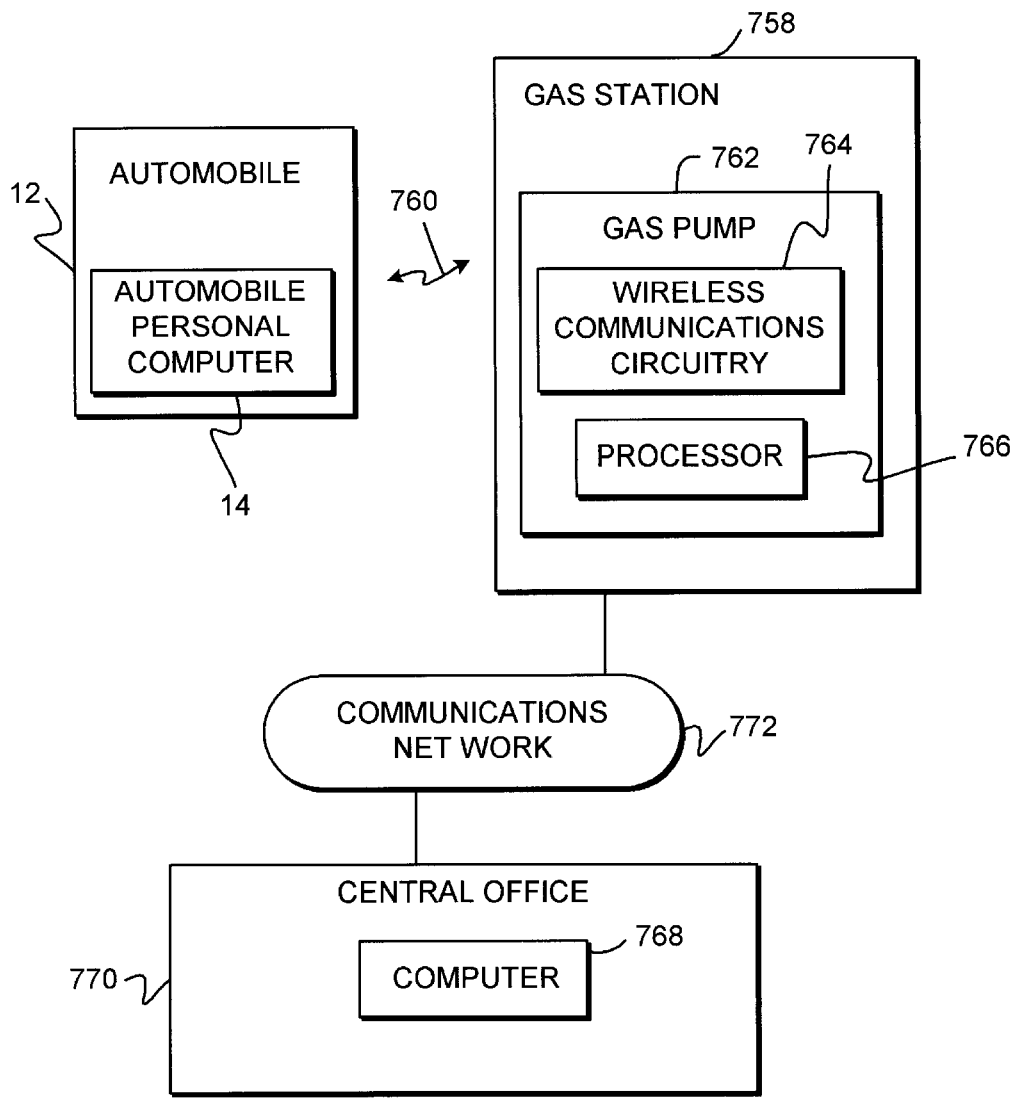
FIG. 59 is a diagram of an illustrative wireless gas pump arrangement in accordance with the present invention.

As shown in FIG. 59, a user at automobile 12 may use automobile personal computer 14 to purchase gasoline from a gas station 758 over a wireless link (e.g., a local wireless link). Gas pumps at the station such as gas pump 762 may have wireless communications circuitry 764 and processing circuitry 766 for handling wireless transactions. Gas pump 762 may be connected to a computer 768 at a central office 770 over a communications network 772 (e.g., the Internet). This allows personnel at the central office to monitor transactions from numerous gas stations. User information such as account information may be stored at processor 766, computer 768, or other locations if desired.

Figure 60:
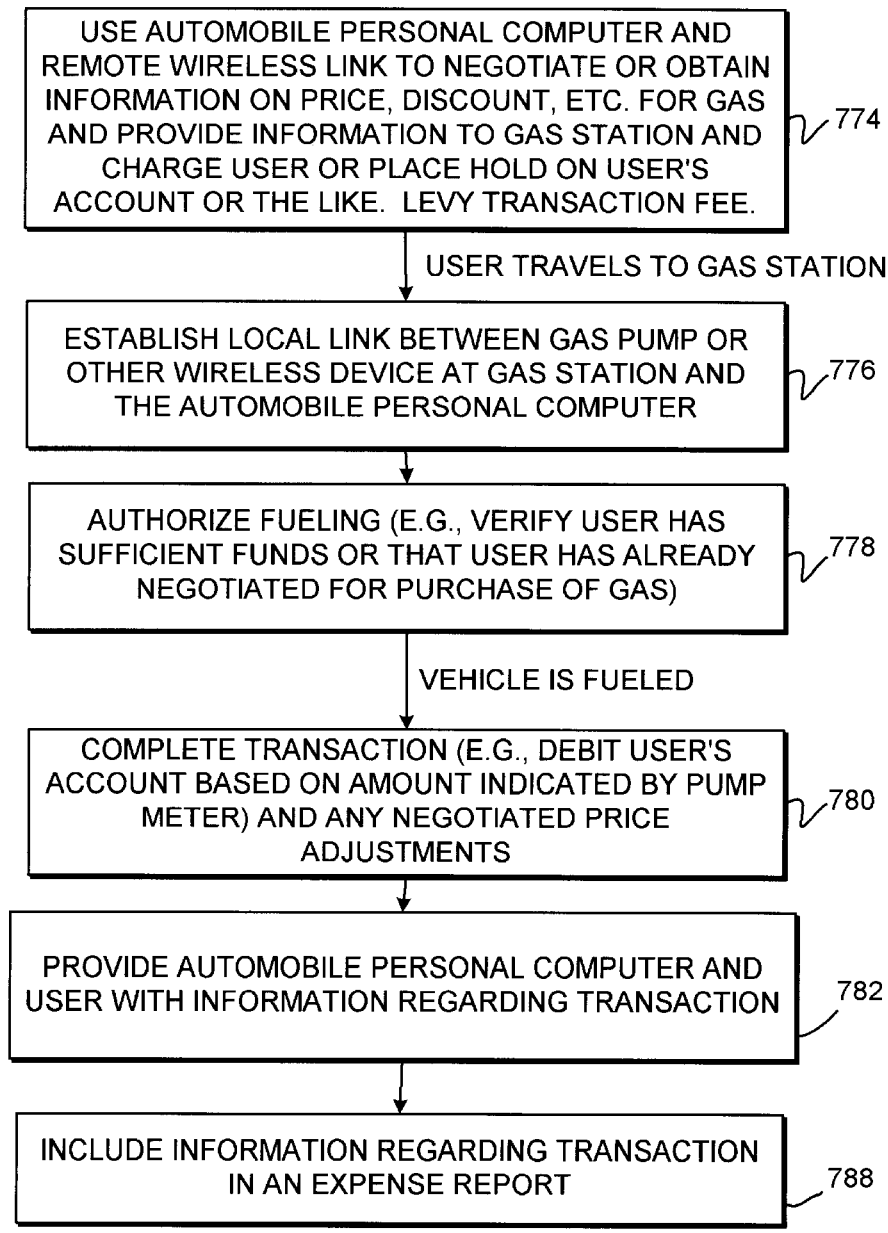
FIG. 60 is a flow chart of illustrative steps involved in allowing a user to wirelessly purchase gasoline in accordance with the present invention.

Illustrative steps involved in using automobile personal computer 14 to purchase gasoline from a gas station such as gas station 758 are shown in FIG. 60. At step 774, the user may, if desired, use automobile personal computer 14 to obtain information on the price of gasoline at gas station 758 over a remote wireless link. The user may also negotiate a price or discount on the gas.

One illustrative way in which the user may be provided with an opportunity to negotiate for the price of the gas or a discount for the gas involves using a server (e.g., a server on the Internet that the user accesses over a remote wireless Internet link using a web browser running on automobile personal computer 14 such as an audio-enabled web browser) to provide the user with information on several gas stations of interest in a particular area. The user may make a financial commitment (e.g., with a credit card) indicating a willingness to purchase a certain amount of gas at a certain price (e.g., 10 gallons at $1.00 per gallon). A server may then run a process that allows various gas stations or gas companies to bid for the user's business. If a seller accepts the user's offer, the user's credit card or account is charged or a hold is put on the credit card or account to cover the purchase amount. A transaction fee may be levied by the service provider that runs the server).

This is, however, just one illustrative example. Any suitable techniques may be used to allow the user at automobile personal computer 14 to negotiate a price or discount or otherwise initiate a financial transaction with gas station 758.

After the user travels to the gas station (e.g., the gas station that offered the best price, discount, or accepted the user's offer, etc.), a local wireless link may be established between automobile personal computer 14 and the gas station at step 776.

When using local wireless links in environments in which there are many potential parties involved (e.g., other automobile personal computers) it may be desirable to use directional local wireless signals. This allows individual automobiles 12 to be communicated with separately, without interference. If desired, for example, such directional wireless signals may be used to send out separate groups of trigger pulses in the vicinity of each pump. If an automobile pulls up next to a particular pump, the automobile personal computer 14 in that car will receive only the trigger signals associated with that pump. The trigger signals may include a pump number. The automobile personal computer 14 may use the pump number in communications with the gas station to ensure that the user is associated with the proper pump and pays only for the gas the user receives. This approach is merely illustrative. Any suitable technique may be used to ensure that transactions between multiple automobile personal computers and gas station 378 are handled properly. Similar techniques may be used in local wireless transactions with any facilities, including parking facilities, parking meters, other merchants, toll collection facilities, etc.

At step 778, the system may determine whether the user is authorized to begin fueling. If the user is paying by credit card, for example, the system may determine whether there are sufficient funds in the user's credit card account to cover the transaction. If the user is consummating an order that is based on a negotiated price or special discount or the like and the user has already made a financial commitment (e.g., by credit card) at step 774, then the gas station will authorize the user. If the user is authorized, the pump may be released (if it was locked) and the user may fuel automobile 12. Information for the transaction (e.g., which credit card is to be used, etc.) may be provided to the gas station by automobile personal computer 14 over local wireless link 760.

At step 780, after fueling is complete, the transaction may be completed. For example, the user's credit card or other account may be debited by the amount indicated by the pump in light of any price adjustments due to prior negotiations at step 774.

Information on the transaction may be provided to automobile personal computer 14 by gas station 758 over local wireless link 760. The information may include advertisements, discounts, offers, etc. If desired, the information may also be provided to the user by e-mail or any other suitable technique using a remote wireless link. Such e-mail confirmation messages may be sent to automobile personal computer 14 and any other recipients designated by the user. For example, the user may, when setting up an account with the gas station or a service provider, indicate that such e-mails are to be sent both to automobile personal computer 14 and to the user's work e-mail address. A web site may be provided by the gas station or other entity that maintains statistics on the user's gas purchases, account status, reward point levels, etc.

The user may be provided with information regarding the transaction using any suitable technique. For example, automobile personal computer 14 may read an e-mail report or other message using voice synthesis. A tone or an audio message may be automatically played through the sound system of automobile 12. For example, a message may be played that thanks the user for the transaction and confirms the cost of the transaction. Any promotional material associated with the message may also be played. At step 788, information regarding the transaction may be provided to an expense report tool or may otherwise be included in an expense report or the like.

Figure 61:
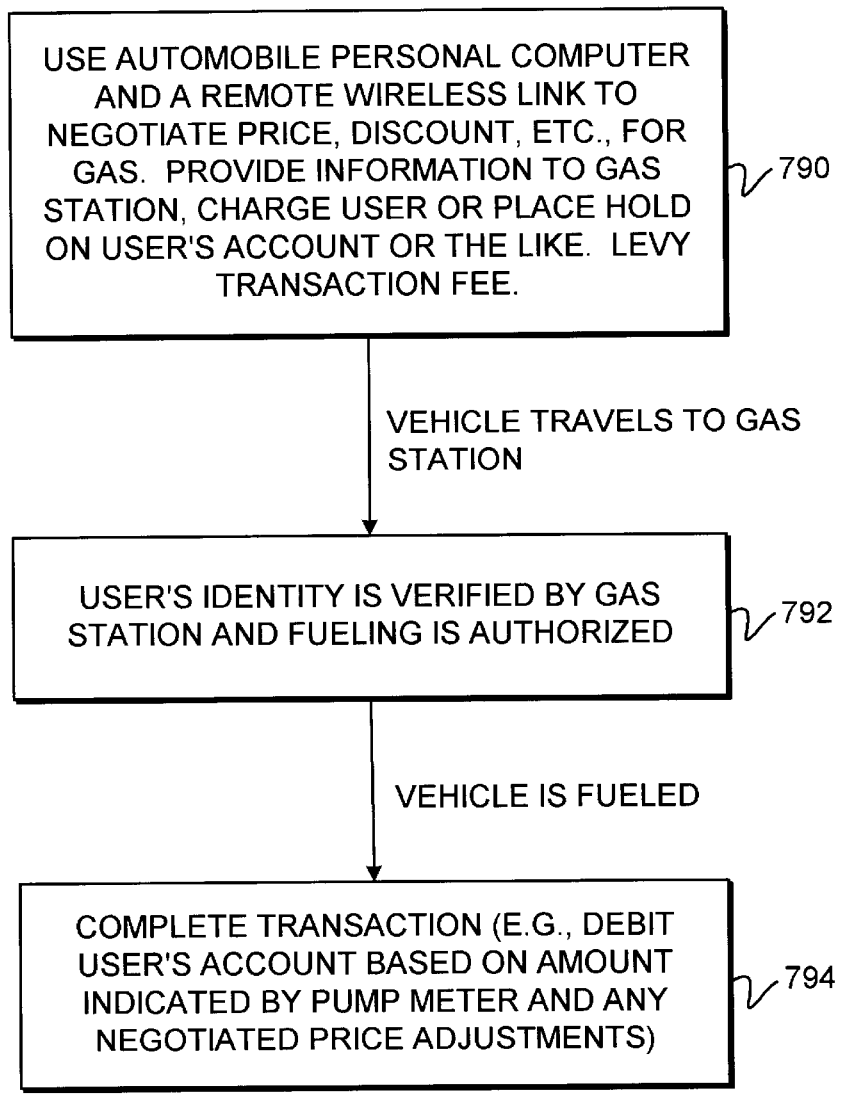
FIG. 61 is a flow chart of illustrative steps involved in using the automobile personal computer when obtaining gasoline in accordance with the present invention.

If desired, gas may be purchased without using a local wireless link. Illustrative steps involved in this approach are shown in FIG. 61. At step 790, the user may, if desired, use automobile personal computer 14 to contact a server (e.g., a server on the Internet) that allows the user to negotiate a price for gasoline, obtain information on gasoline prices, receive promotional offers and discounts, etc. As with step 774 of FIG. 60, the user may be asked to make a financial commitment in order to receive a better price.

At step 792, after the user has traveled to the gas station, the user's identity may be verified and fueling may be authorized. The user's identity may be verified by using a card reader at the gas pump to read the user's credit card.

This may be matched with the user's credit card information that was provided when the user made the financial commitment to purchase the gas at step 790. The matching process may take place using computer equipment at any suitable locations or locations, including computing equipment at the gas station, computer 768 of FIG. 59, the server that facilitated the placing of the initial order, or a combination of such computers or any other suitable computer equipment. The user's identity may also be verified based on the user's use of a debit card, personal identification number, smart card, wireless card, etc.

At step 794, after the automobile has been fueled, the financial transaction may be completed based on the negotiated price or discount, etc. that was provided at step 790.

Figure 62:
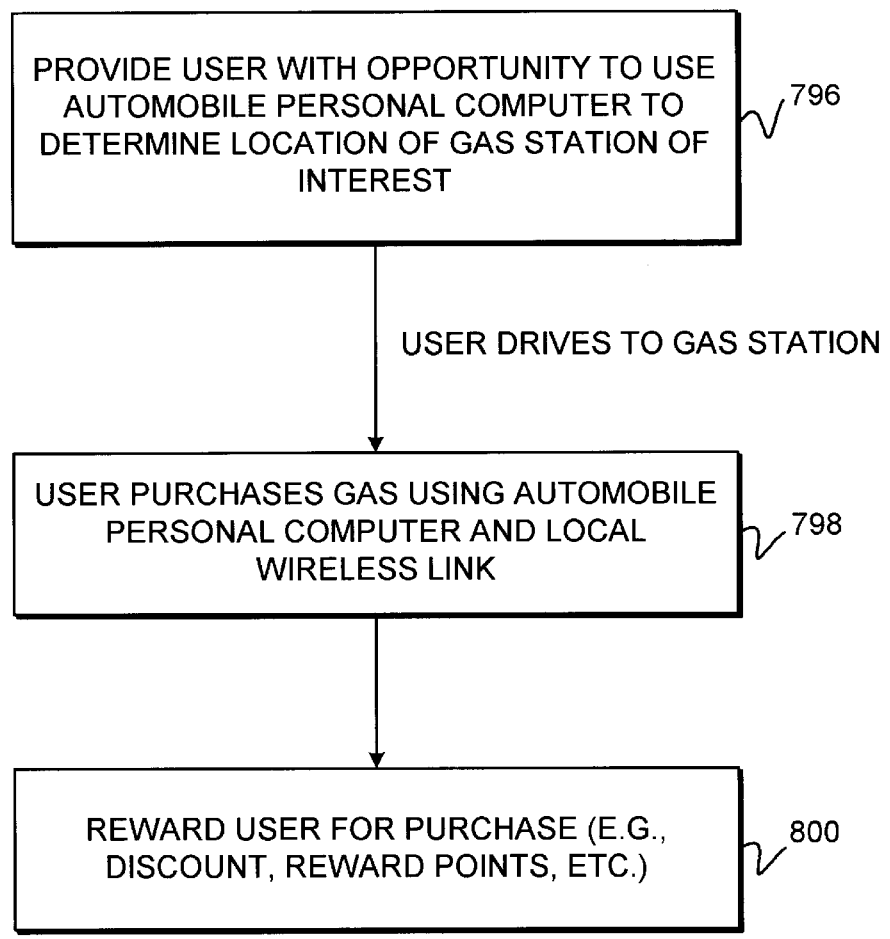
FIG. 62 is a flow chart of illustrative steps involved in purchasing gasoline with the automobile personal computer using a local wireless link in accordance with the present invention.

A gas station may reward an automobile personal computer user for gasoline purchases. Illustrative steps involved in rewarding a user are shown in FIG. 62. At step 796, automobile personal computer 14 may be used to provide the user with an opportunity to determine the location of a gas station of interest. Any suitable technique may be used to provide the user with information on the gas station. For example, the current location of automobile 12 may be determined using GPS or any other suitable location technique. A database containing information on points-of-interest may be searched to locate points of interest (including gas stations) that are nearby, based on the user's present location and heading. Such a database may also be searched manually. Such a database may be maintained locally on automobile personal computer 14 (e.g., on a CD, DVD, hard drive, or other storage medium) or may be maintained remotely (e.g., on a server). When potential gas stations are located, this information may be presented or displayed to the user using audio or visual techniques. For manual searching (i.e., searching based on user inputs rather than GPS location data), the database may be organized by city, by county, by state, by neighborhood, by highway exits, etc. If desired, the user may enter verbal commands to obtain the desired information from the database. For example, the user might instruct the automobile personal computer to locate matches to the query "gas station and exit 25 of I-95" or the like.

After the user locates a gas station of interest and travels to that gas station, the user may purchase gasoline at step 798 using the automobile personal computer 14 and a local wireless link. At step 800, the user may be rewarded for the purchase. For example, the gas company may maintain an account for the user on a computer such as computer 768 (FIG. 59). Whenever the user makes a purchase using automobile personal computer 14 and a local wireless link, the user's account is credited with reward points or the like at step 800. The user may also be rewarded at the time of purchase by an automatic discount that is provided to all users who use automobile personal computers and local wireless links to perform transactions. Another suitable reward scheme involves providing free or discounted software or other materials. Such materials may be downloaded over the local wireless link at time of purchase or may be provided over a remote wireless link or using a removable storage media.

When the automobile personal computer 14 is used in financial transaction (e.g., electronic purchase transactions for goods and services), automobile personal computer 14 may collect information for expense reports. For example, a user may travel extensively on business, purchasing gas, food, and lodging, and paying for tolls and parking using automobile personal computer 14. Automobile personal computer 14 may automatically retain data on the transactions for incorporation into an expense report. Information on transactions that were not handled by the automobile personal computer may be entered into the automobile personal computer by the user (e.g., by voice, by manual input, or by downloading a handheld or portable computing device). Automobile personal computer 14 may prepare an expense report based on these transactions or may provide the data to the user or another application for expense report preparation.

An illustrative expense report that may be provided based on information collected by automobile personal computer 14 when automobile personal computer 14 was used to handle wireless financial transactions is shown in FIG. 63.

Figure 64:
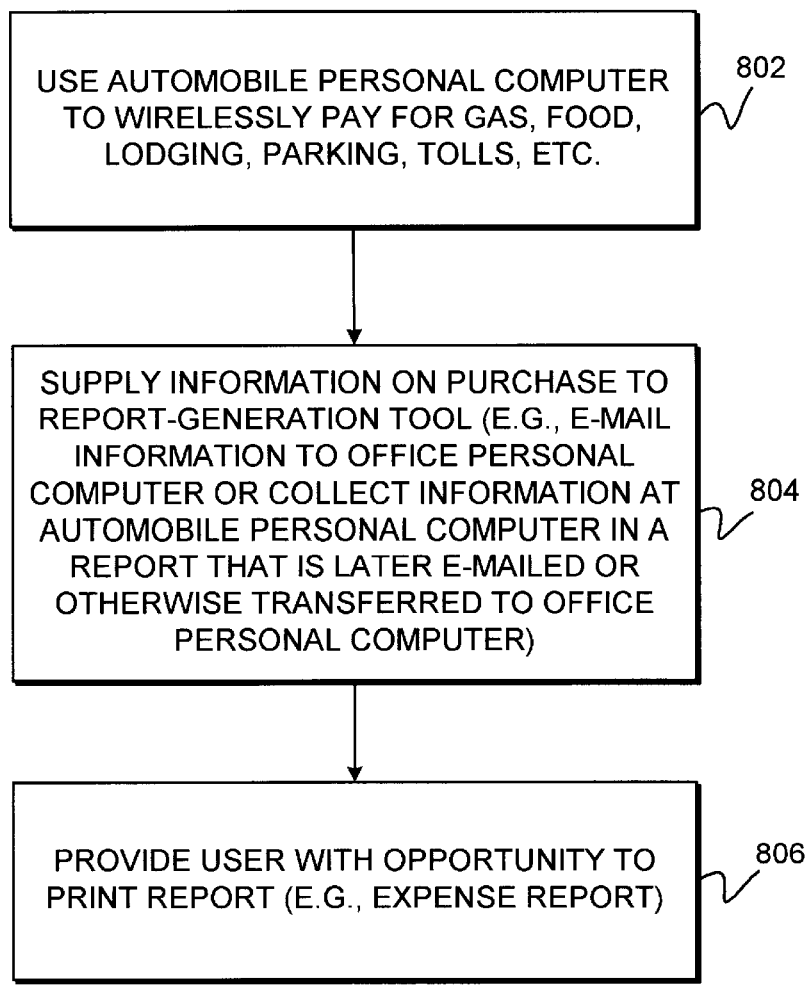
FIG. 64 is a flow chart of illustrative steps involved in using the automobile personal computer to generate expense reports in accordance with the present invention.

Illustrative steps involved in expense report preparation are shown in FIG. 64. At step 802, automobile personal computer 14 is used to wirelessly handle financial transactions related to purchasing products and services such as gas, food, lodging, parking, and tolls. At step 804, as items are paid for, information on the financial details relating to each item's purchase may be supplied to a report-generation tool (e.g., by e-mailing the information to an office personal computer after each purchase or group of purchases) or may be collected at automobile personal computer 14. Information that is collected at automobile personal computer 14 may be forwarded to any suitable destination by the user or may be placed on a removable storage media. The collected information may also be printed out by the user in the form of an expense report or list using printer 116 of FIG. 3 (step 806).

Figure 65:
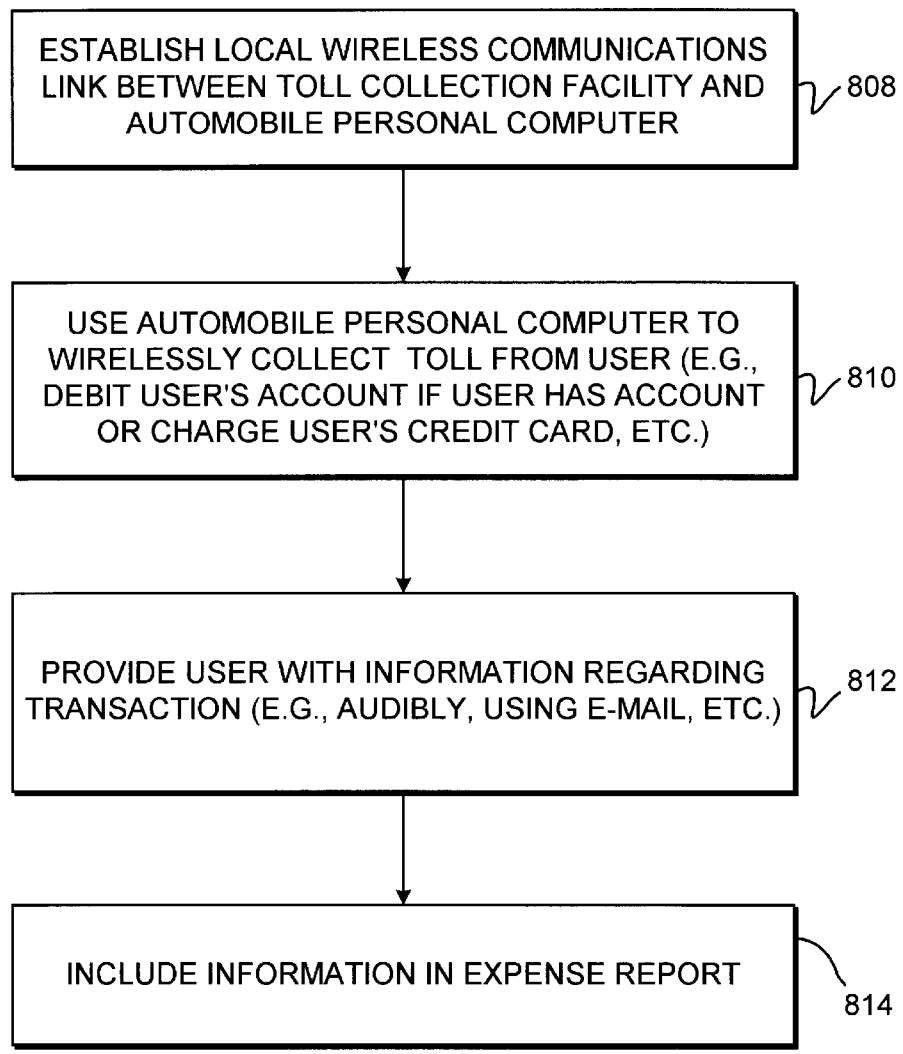
FIG. 65 is a flow chart of illustrative steps involved in using the automobile personal computer for toll collection accordance with the present invention.

Tolls may be collected using automobile personal computer 14. Illustrative steps involved in using automobile personal computer 14 for toll collection are shown in FIG. 65. At step 808, automobile personal computer 14 may be used to establish a local wireless communications link with a toll collection facility. Step 808 may be performed, for example, as automobile 12 passes through a toll booth in the toll collection facility. Each lane in the toll collection facility may use a different wireless transmitter. The wireless transmitters may be configured so that they emit signals that do not overlap from lane to lane.

At step 810, the automobile personal computer 14 may be used in the wireless collection of a toll from the user. For example, the user's account may be debited, the user's credit card may be debited, etc. Various accounts may be used for toll collection. For example, the user may set up an account with the toll collection authority. This type of account may be used solely or primarily for paying tolls. At step 810, automobile personal computer 14 may provide information identifying the user to the toll collection facility. The toll collection facility may use this information to check on the user's account status and to debit the user's account.

Another type of account is a general financial transaction account. This type of account may be sponsored by an entity other than the toll collection authority. Nevertheless, if the toll collection authority recognizes this type of account, the user may use it in paying tolls. Such general accounts may also be used in paying for gas, food, etc. (e.g., over local wireless links).

Credit card and debit cards may also be used to pay tolls. During toll collection the user's credit card or debit card information may be passed to the toll collection facility over the local wireless link. This information may then be used to debit the user for the toll.

If desired, automobile personal computer 14 may use remote communications links or combinations of local and remote communications links during toll collection.

Toll collection facilities that are located in different states or regions may use different communications techniques. For example, each toll collection facility may use a different frequency and different communications protocol for its local wireless link. Information on each region's requirements may be stored (e.g., locally in storage 80 or other suitable storage media or remotely) for access by automobile personal computer 14. This information may be used by the automobile personal computer 14 when paying tolls. For example, the automobile personal computer may identify which type of protocol is being used based on the transmission frequency being used, the type of trigger signal being used, the transmission rate, etc.

Automobile personal computer 14 may also identify which protocol to use based on location information. In particular, automobile personal computer 14 may be used to gather location information as the user is driving (e.g., using GPS techniques or any other suitable techniques). The location information may be used to determine the current region in which the automobile is located. By identifying the current region in which automobile 12 is located, automobile personal computer 12 may determine which communications protocol is in use at nearby toll collection facilities. This protocol may then be used during toll collection.

After the toll has been collected at step 810, automobile personal computer 14 may provide the user with information on the transaction at step 812. For example, automobile personal computer 14 may play a tone or confirmation message through the sound system of automobile 12. Automobile personal computer 14 may also provide information on the amount of the toll and the user's current account balance. If desired, the information that is provided may include promotional messages such as advertisements and the like that were supplied to automobile personal computer by the toll collection facility during toll payment. The information may be stored and played back on demand or may be provided to the user automatically. The information may be provided as audio (e.g., an audio clip or voice-synthesized message) or as text, graphics, or video. E-mail messages on account status and toll amounts and the like may be sent to user-designated addresses.

Figure 66:
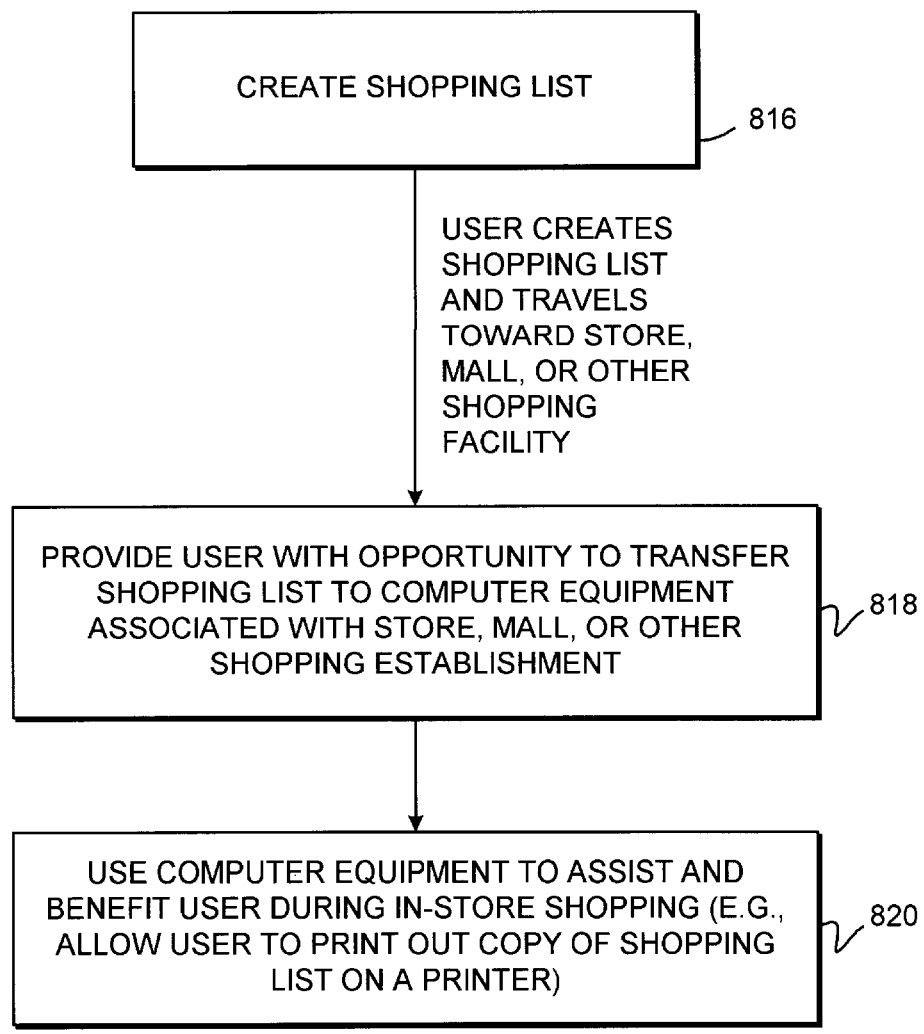
FIG. 66 is a flow chart of illustrative steps involved in using the automobile personal computer to handle shopping lists in accordance with the present invention.

Automobile personal computer 14 may be used to assist the user in shopping in a store. For example, the user may use the automobile personal computer to create a shopping list that may be used in shopping at the store. The store may be, for example, a grocery store. Illustrative steps involved in using automobile personal computer 14 for this type of activity are shown in FIG. 66. At step 816, automobile personal computer 14 may be used to provide the user with an opportunity to create a shopping list. For example, the user may use a verbal command such as "create shopping list" to direct automobile personal computer 14 to invoke a shopping list application. Suitable options that the shopping list application may provide include options to list the current items, add an item, delete an item, read the previous item, read the next item, etc. The user may interact with shopping list creation options such as these using voice commands or by physically interacting with a user interface such as buttons or keys, a touch screen, a pointing device, etc.

If desired, the user may create a shopping list using a recipe application. The recipe application may contain various recipe ideas. When the user locates a recipe of interest, the user may command automobile personal computer 14 to add the recipe's food items to the shopping list.

The shopping list may be created at home and forwarded to automobile personal computer 14 via e-mail or the like. The user may create the shopping list on a web appliance or other in-home electronic device (e.g., a personal computer). For example, the user may add items to the list during the week using a refrigerator-mounted web appliance. This list may be forwarded to automobile personal computer 12 from the web appliance over a local or remote wireless link. If desired, the user may also access such in-home lists from automobile personal computer 14 over a local or remote wireless link.

The shopping list may be created using a remote server. The automobile personal computer may access the server over a remote wireless link. The user may supply a password or user ID to the server to retrieve a previously created shopping list.

A shopping service implemented on a remote server may provide the user with an opportunity to negotiate for the price of various items or to obtain discounts or the like. The user may access the server from any suitable computing device over a communications network such as the Internet. The server may be accessed by the user using the automobile personal computer (e.g., over a remote wireless Internet link using a web browser running on automobile personal computer 14 such as an audio-enabled web browser). The server may provide the user with information on different shopping items of interest at a particular store or stores in the user's area. The user may make a financial commitment (e.g., with a credit card) indicating a willingness to purchase a certain items at certain prices. The remote server may then run a process that allows various stores or manufacturers to bid on the user's offers. If the user's offer is accepted, the user's credit card or account is charged or a hold is put on the credit card or account to cover the purchase amount. A transaction fee may be levied by the service provider that runs the server. The items for which the user's bids were accepted may be added to the shopping list or may form their own shopping list. This shopping list may be stored on automobile personal computer 14 or the remote server, which may be accessed by automobile personal computer 14.

Regardless of where or how the shopping list was created at step 816, after the user has created the list the user may travel to the store to shop. At step 818, automobile personal computer 14 may provide the user with an opportunity to transfer the shopping list to computer equipment associated with the store, mall, or other suitable shopping establishment over a local or remote wireless link. The user may also print out the list in automobile 12 with printer 116 or transfer the list to a handheld computing device.

After the user has forwarded the list to computing equipment at the store, the user may print the list from a kiosk that is in communication with or that contains the computing equipment or may receive any other suitable promotion or benefit at step 820. To access the list for printing, the user may enter a password or pass a loyalty card or other suitable identifying card or a bar-coded card or bar-coded key chain attachment through a suitable reading device. Coupons may be printed on the rear side of the printed list by the kiosk. The list may be forwarded to a shopping cart having a display, so that the user may be provided with the shopping list during shopping. If the user received reduced prices by using the shopping service implemented on the remote server, the list that is printed from the kiosk may be used to assist the user in locating the desired items. The list may also contain price information from the shopping service that the user may use to verify the prices or discounts that were agreed to by the service and for which the user has made a financial commitment.

Figure 67:
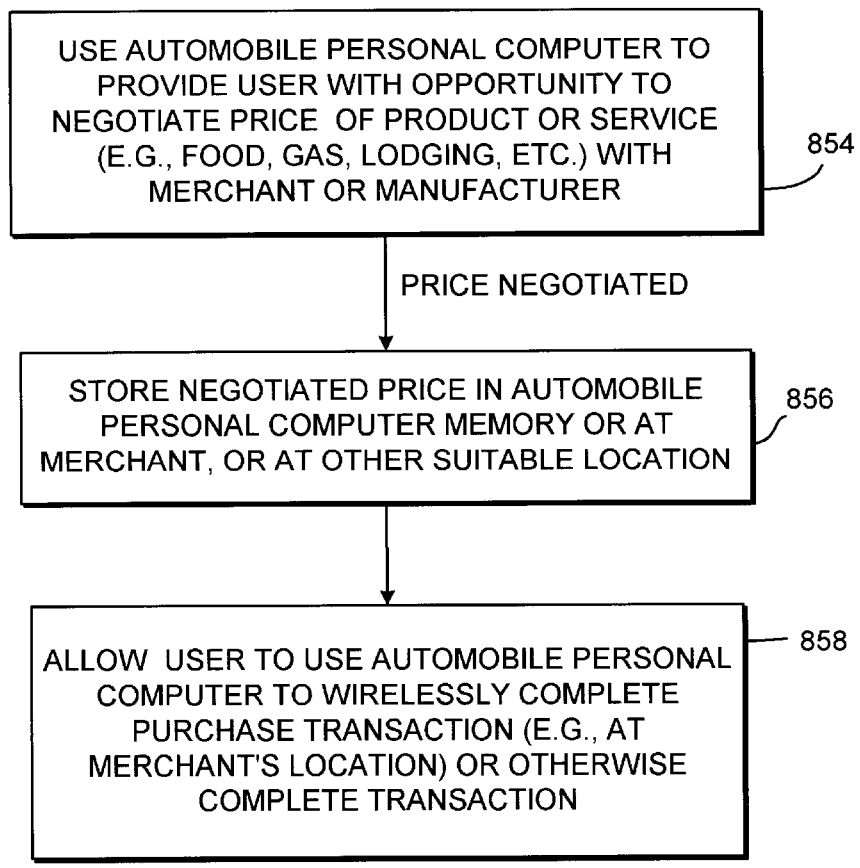
FIG. 67 is a flow chart of steps involved in using the automobile personal computer to assist the user in negotiating prices and wirelessly purchasing products and services in accordance with the present invention.

Illustrative steps involved in using automobile personal computer 14 to facilitate purchase transactions in which there is negotiation of prices prior to the purchase are shown in FIG. 67. At step 854, automobile personal computer 14 may be used to provide the user with an opportunity to negotiate the price of a product or service (e.g., food, gas, lodging, etc.) with a merchant or other entity. For example, the user may be provided with an opportunity to submit a bid for an item that the user desires to purchase. A service implemented on a remote server may provide the user with suggested prices or retail prices for the various products or services. The service may levy a transaction fee. The user may access the server using the automobile personal computer (e.g., over a remote wireless Internet link using a browser application running on automobile personal computer 14 such as an audio-enabled web browser). The user may make a financial commitment (e.g., with a credit card) indicating a willingness to purchase certain products and services at certain prices. The remote server may then run a process that allows various merchants or manufacturers to bid on the user's offers. If an offer of the user's is accepted, the user's credit card or account may be charged or a hold may be placed on the credit card or account to cover the purchase amount.

At step 856, the negotiated price may be stored in memory in automobile personal computer 14, on the remote server, or on any other suitable equipment. At step 858, the user may use the automobile personal computer 14 to wirelessly complete the purchase transaction or the purchase transaction may be completed in person or may be completed electronically using other suitable computing equipment (e.g., a personal computer, handheld computing device, portable computer, or in-home electronic device).

Figure 68:
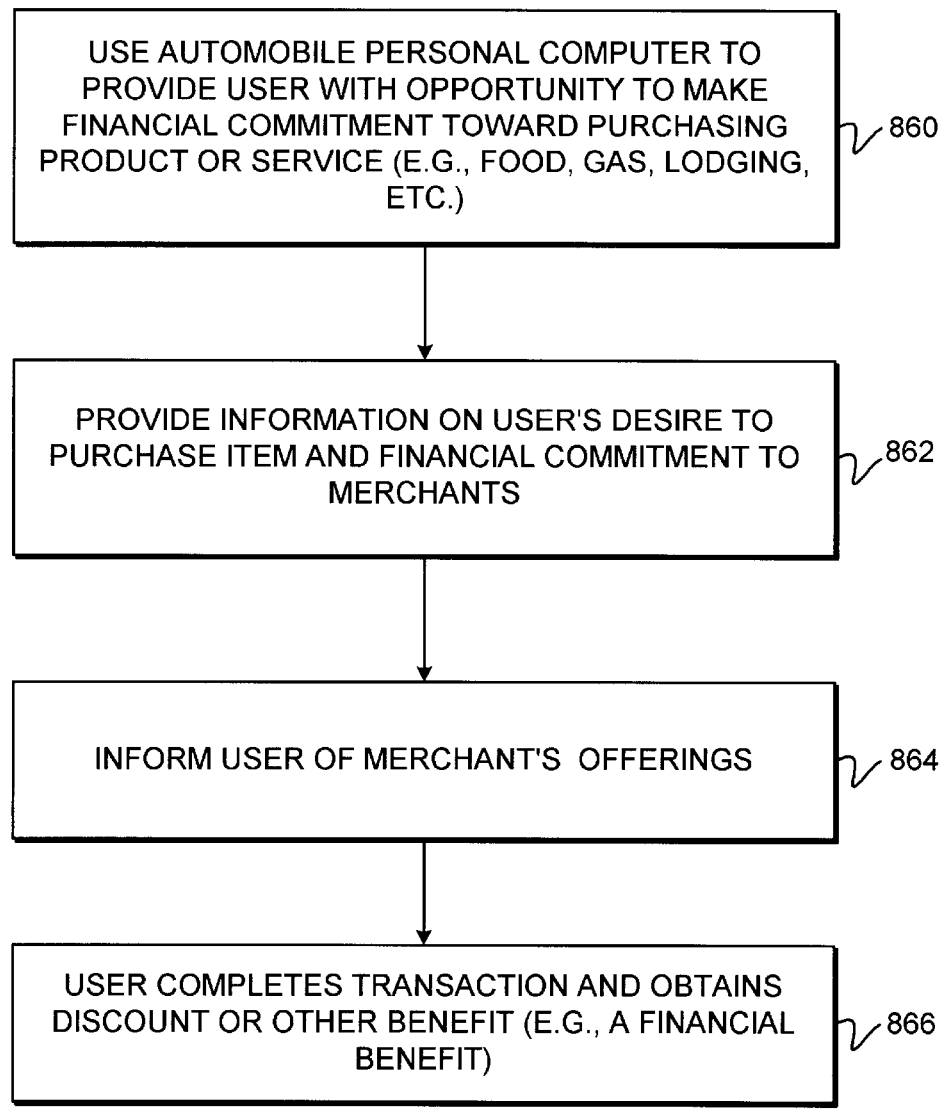
FIG. 68 is a flow chart of steps involved in using the automobile personal computer to make a financial commitment lo toward purchasing an item as part of a purchasing transaction in accordance with the present invention.

Automobile personal computer 14 may also be used to facilitate other types of purchase transactions. Illustrative steps involved in one such type of purchase transaction are shown in FIG. 68. At step 860, automobile personal computer 14 may be used to provide the user with an opportunity to make a financial commitment toward purchasing a product or service (e.g., food, gas, lodging, etc.). The user need not make a particular bid. For example, the user may be approaching a city in which the user is planning to seek lodging. The user may commit 25 dollars toward the evening's lodging bill (minus a transaction fee if desired). The commitment may be backed, for example, by a credit card. The user may agree to forfeit the that amount the user has committed (i.e., $25) if the user declines to stay in any of the hotels that are offered.

A server (e.g., a remote server accessed by automobile personal computer 14 over a remote wireless link) may be used to make the user's desire to purchase a product or service (e.g., the lodging) known to merchants at step 862. This serves to match users who have made financial commitments with, for example, hotels and motels in the user's selected city who are willing to offer lodging. Hotels and motels (and other merchants) may be willing to offer discounts because they are assured that if the user does not select their services, the user is very likely to select the services of a competitor (as evidenced by the $25 commitment made by the user). The $25 commitment made by the user may be applied toward the user's purchase.

At step 864, automobile personal computer 14 may be used to present information to the user on certain merchants who have expressed a willingness to offer lodging (or any other product or service). For example, the user may be presented with a list of various hotels and their prices. The list may be presented visually, using voice synthesis, using audio clips, or using any other suitable format. Audio information may be provided by the service provider at the server or may be provided by the merchants. The audio information and other information may include promotional information such as advertisements.

At step 866, the automobile personal computer may be used to present the user with an opportunity to accept one of the offerings. If the user accepts an offering, the purchase transaction may be completed (e.g., with the merchant or the service provider) using a remote wireless link. The user may also complete the transaction in person or electronically using any suitable computing equipment.

The user may use automobile personal computer 14 to access Internet content and other information over remote wireless links. For example, Internet content may be obtained using satellite links or wireless RF terrestrial links (e.g., cellular links). Internet content such as web pages may be displayed without significant modification using large flat-panel displays. The driver may view Internet content on such displays when the automobile is not being driven. Passengers may view such Internet content more freely. Nevertheless, the driver may sometimes be the only occupant of the automobile. Moreover, the automobile may only have small displays such as a front-panel display on an in-dash personal computer unit.

Figure 69:
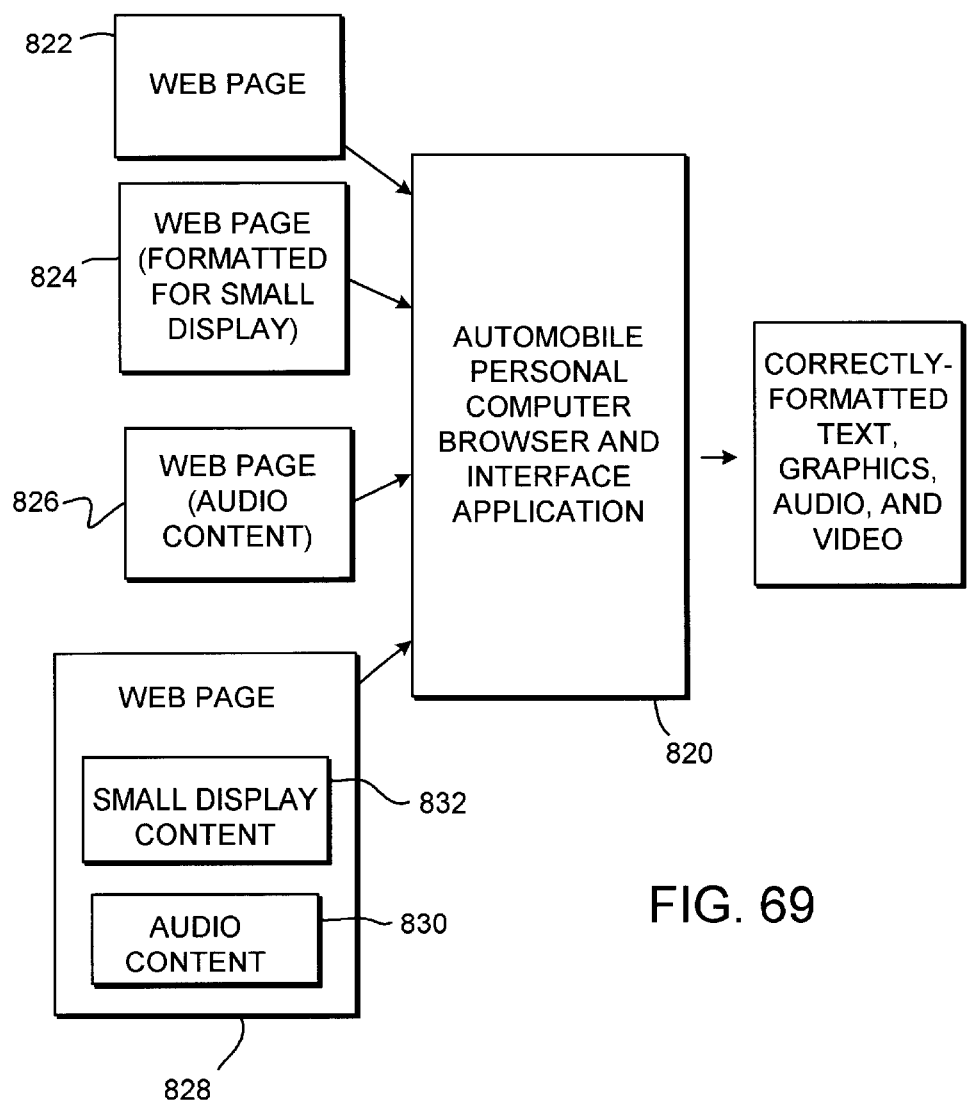
FIG. 69 is a flow chart of illustrative steps involved in extracting content for the automobile personal computer from the Internet in accordance with the present invention.

It is therefore desirable to provide users with access to Internet content that is adapted for small displays and audio presentation techniques such as voice synthesis. One approach that may be used is shown in FIG. 69. Automobile personal computer 14 may run a web browser, or other interface application 820 that accepts content in various formats and presents it to the user. The content from standard web pages such as web page 822 may be translated into a format that is compatible with the automobile personal computer's presentation capabilities. The content of web pages that are particularly formatted for small displays such as web page 824 does not need to be substantially modified before it is presented to the user by web browser 820. Similarly, audio content on web pages such as web page 826 may be presented to the user (e.g., through the automobile's sound system) without modification. Some web pages such as web page 828 may be designed to contain only or mostly audio content 830 and content 832 that is suitable for display on small displays. Browser and interface application 820 may handle content with any suitable formats or protocols such as hypertext markup language (HTML), extensible markup language (XML), voice extensible markup language (VXTML), wireless access protocol (WAP), etc.

Figure 70:
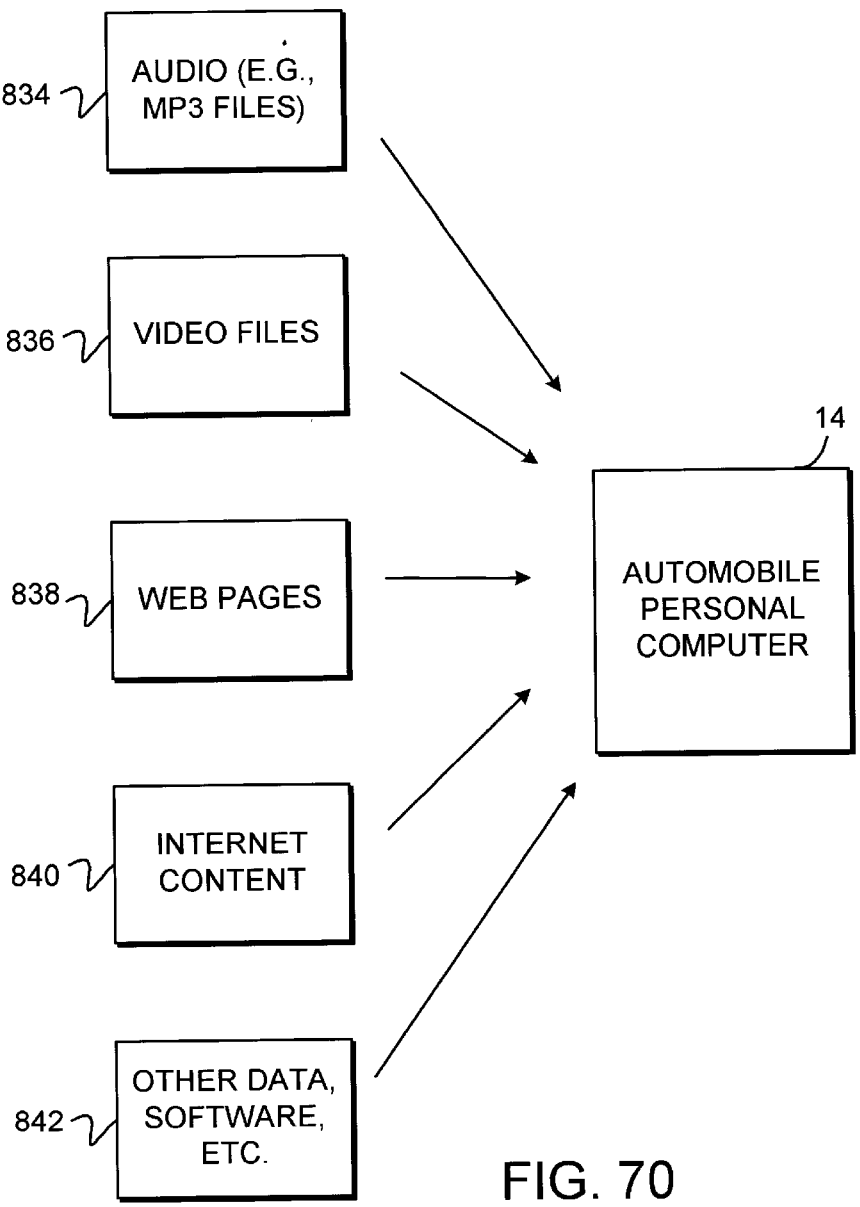
FIG. 70 is a flow chart of illustrative steps involved in distributing data to the automobile personal computer in accordance with the present invention.

As shown in FIG. 70, automobile personal computer 14 may receive wireless content such as audio files 834, video files 836, web pages 838, Internet content 840, and other data, software, etc. 842. Content may be received on request, periodically, or as a continuous stream. Content that may be received on request may include, for example, Internet content that is delivered to the user from a remote server. In this situation, automobile personal computer 14 is acting as a client processor. Content that may be received periodically includes e-mail messages, periodic news reports, paging messages, updates to databases, etc. Content that may be received continuously includes broadcast information such as radio and continuous data broadcasts. Such broadcasts may be provided over Internet links or may be provided in parallel with Internet links. As an example, radio broadcasts may be provided to automobile personal computer 14 at the same time as an Internet connection is made available using a different communications path. The user may listen to the audio content that is being provided on the radio broadcast, while interacting with the audio content in real time using the Internet link. These are just a few illustrative examples.

Moreover, content may be received using combinations of these techniques or any other suitable technique if desired.

Figure 71:
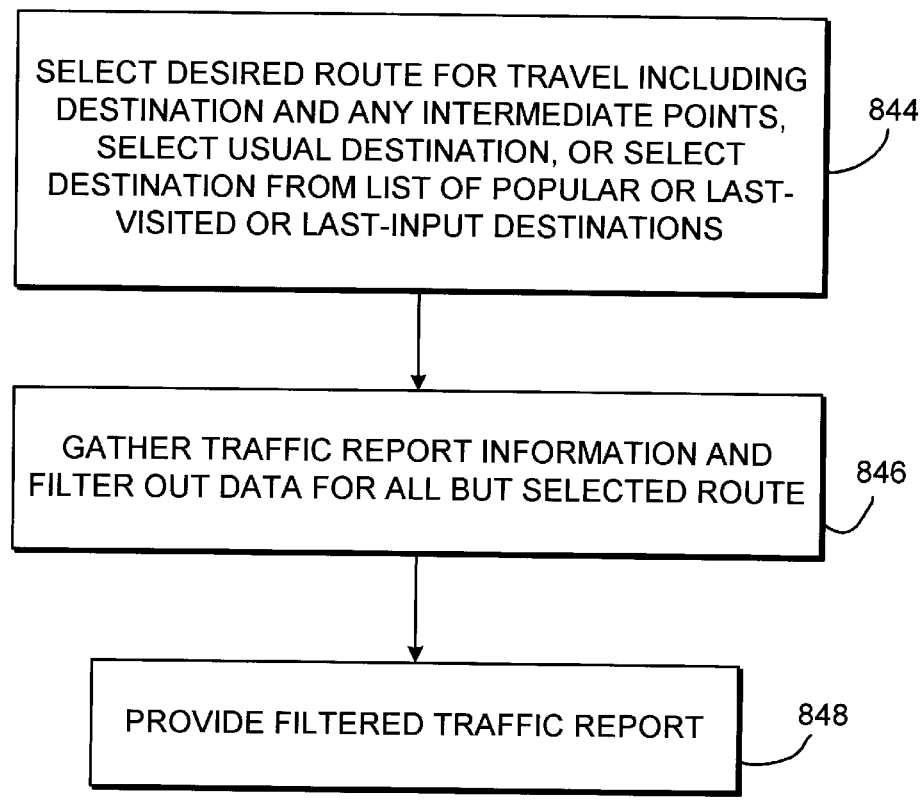
FIG. 71 is a flow chart of illustrative steps involved in providing a filtered traffic report in accordance with the present invention.

Automobile personal computer 14 may receive traffic reports that are filtered based on the user's location or intended route for travel. Illustrative steps involved in using, automobile personal computer 14 to receive traffic reports are shown in FIG. 71. At step 844, the user may select a desired route for travel. Automobile personal computer 14 may provide the user with an opportunity to press buttons or speak or otherwise indicate the desired starting point and destination of travel. If desired, location data from GPS receiver 112 or other location technique may be used to provide the starting point data. If the user drives the same route often (e.g., as for a commute), this information may be stored. The user may be provided with an opportunity to select a trip itinerary or a destination from a list of popular, last-visited (as determined by tracking the automobile's location), or last-entered, or default itineraries or destinations.

At step 846, automobile personal computer 14 may gather traffic report information and filter out data for all but the user's selected route. The traffic report information may be provided as an FM data feed, a satellite data feed, an e-mail report or other message, as data requested from the Internet or the like, or in any other suitable format. At step 848, the filtered traffic report may be presented to the user. For example, text, graphics, and video information may be displayed for the user and audio information played for the user through the sound system. Text may also be presented to the user in audio form using voice-synthesis techniques.

Figure 72:
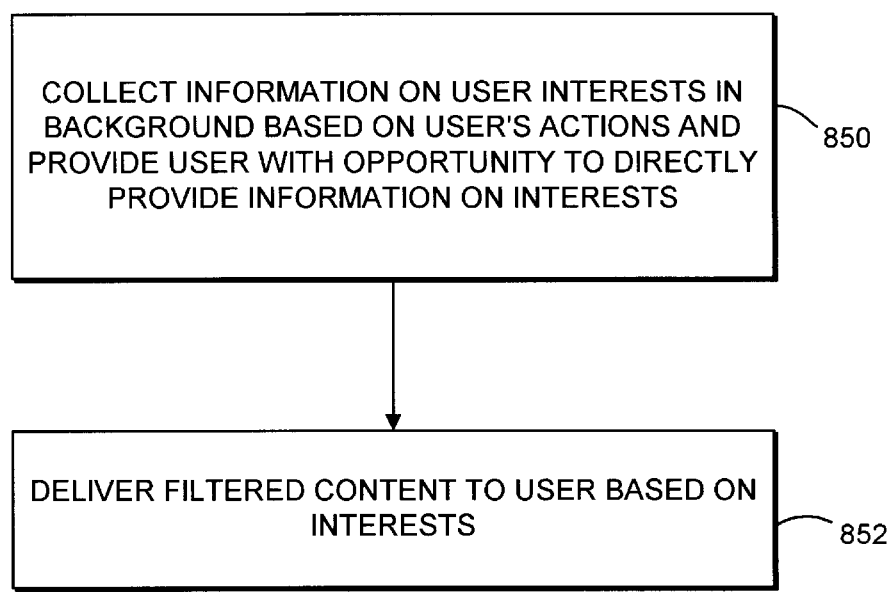
FIG. 72 is a flow chart of illustrative steps involved in providing filtered and targeted content to the user in accordance with the present invention.

Automobile personal computer 14 may collect information on the user's interests and the user may supply information to automobile personal computer 14 on the user's interests. This information on the user's interests may then be used to deliver filtered or targeted content to the user. Illustrative steps involved in using automobile to present content to the user based on the user's interests are shown in FIG. 72. At step 850, the automobile personal computer 14 may collect information on the user's activities. The information that is collected may be stored locally in the automobile personal computer or may be stored on a remote server. A combination of these techniques may be used. For example, information may be collected locally and distributed periodically to the remote server.

During step 850, automobile personal computer 14 may monitor which radio stations the user tunes to. Automobile personal computer 14 may also monitor what type of Internet content the user searches for and retrieves. Information may be collected on which audio files the user downloads and which applications the user runs. The automobile personal computer may also monitor how many e-mail messages the user sends and receives and the recipients and senders of such messages.

Driving-related information may be monitored using vehicle electronics 174 and GPS receiver 112. For example, automobile personal computer 14 may monitor how frequently the user drives and how fast the user drives. The locations the user visits in automobile 12 may also be monitored. Service-related information such as the odometer reading and diagnostic codes of the automobile may be monitored. These are merely illustrative examples. Automobile personal computer 14 may monitor and gather information on any suitable user activity involving the automobile personal computer if desired.

Purchasing information may be monitored by automobile personal computer 14. For example, computer 14 may monitor how often the user shops. Computer 14 may use location data to determine the stores at which the user shops. On-line purchasing transactions over local and remote wireless links may be monitored to determine how much the user is spending and what products and services are being purchased.

Moreover, the user may be provided with opportunities to enter preference information. For example, the user may enter information on the user's most frequent driving routes, so as to be able to receive targeted traffic reports. This is merely an example. The user may supply information on any of the user's preferences if desired. If the user does not want to divulge the information that automobile personal computer collects, the user may fully or partially disable the monitoring functions. For example, the user may turn off location-based tracking.

At step 852, the automobile personal computer 14 may deliver content to the user based on the user's interests as determined at step 850. The content that is presented at step 852 may be filtered from broadcast content, may be locally-generated content, may be provided from a remote server (e.g., on request from the automobile personal computer), may be provided from a message or other targeted content that is distributed from the remote server to the user based on information on the user's interests that was previously forwarded to the remote server, etc.

As an example, traffic reports may be presented to the user based on the travel routes in which the user is interested. Stock price reports may be delivered based on which stocks the user has explicitly selected or based on which stocks the user has purchased on-line using automobile personal computer 14. News may be provided based on the user's most frequented geographic locations. If the user drives extended distances, advertisements may be provided to the user for new tires or maintenance plans or roadside assistance services. If location data indicates that the user is often in the parking lot of an airport, the user may be presented with promotions for airline tickets. If the user is frequently located in the parking lot of a certain store, that store or type of store may be promoted to the user (e.g., an e-mail may be sent to the user when the store is having a sale, etc.) The user may also be presented with custom radio stations based on the user's preferred genres of radio content. These are just a few illustrative examples. Any suitable type of informational or promotional content may be presented to the user using filtering and targeting based on the interests of the user.

Figure 73:
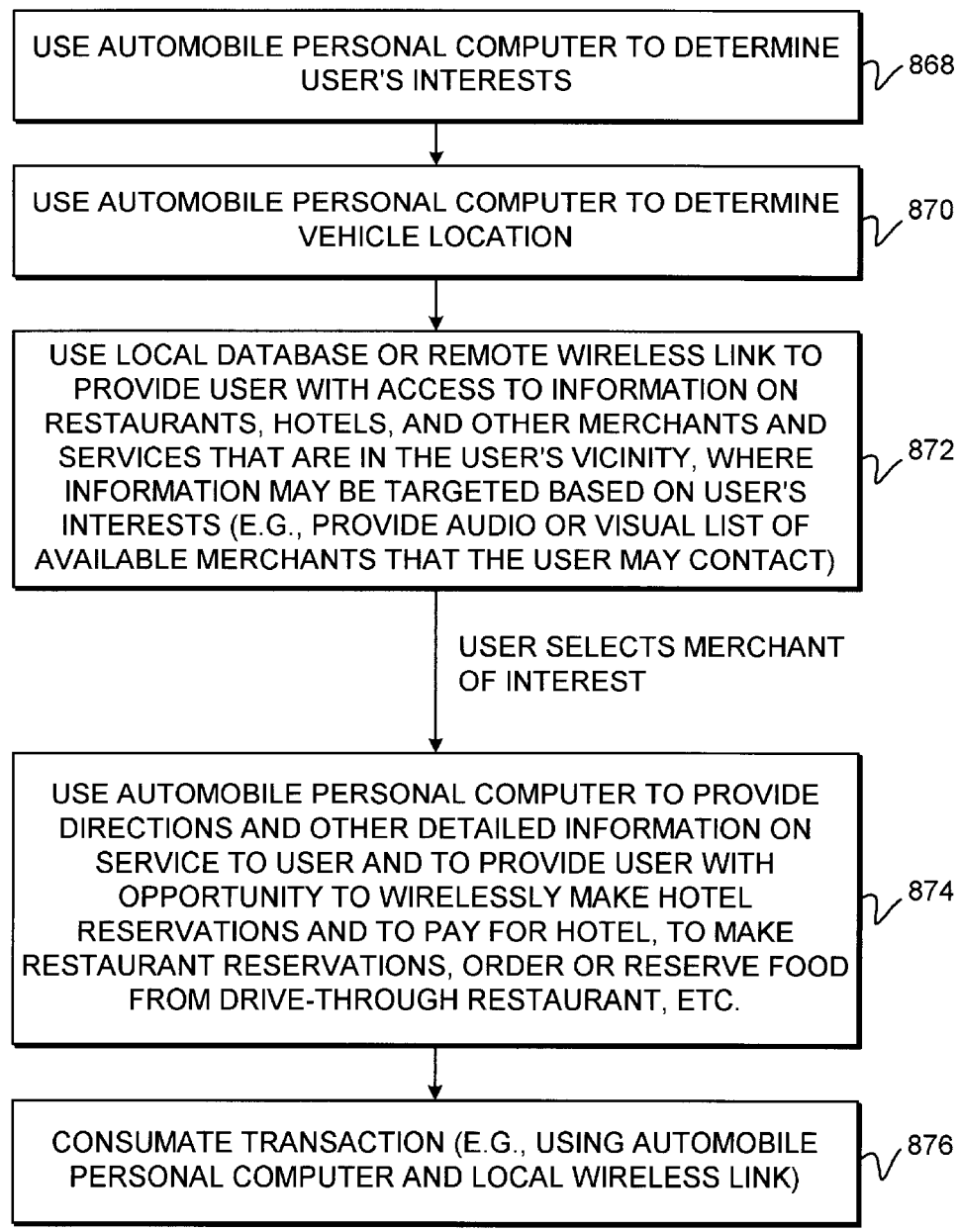
FIG. 73 is a flow chart of illustrative steps involved in using the automobile personal computer to assist in purchase transactions with merchants in accordance with the present invention.

Targeted information may be presented to the user based on the automobile's location. Illustrative steps involved in presenting information to the user based on location information are shown in FIG. 73. At step 868, automobile personal computer 14 may be used to determine the user's interests (as at step 850 of FIG. 72). At step 870, the location of automobile 12 may be determined (e.g., automobile personal computer 14 may be used to determine the location of automobile 12). The location of automobile 12 may be determined using GPS receiver 112 or any other suitable location-determining arrangement. The projected location of automobile 12 may be determined from GPS heading data or from destination information provided by the user or using any other suitable approach. At step 872, a local database at automobile 12 or a remote wireless link to a remote database may be used to provide the user with access to information on restaurants, hotels, and other merchants and services that are in the vicinity of the present or projected location of automobile 12. For example, automobile personal computer 14 may provide the user with an audio or visual list of matching merchants and may provide the user with an opportunity to contact these merchants.

With one suitable approach, a user searching for lodging may direct automobile personal computer to present a list of lodging options. Automobile personal computer 14 may determine which lodgings are in the proper geographic region based on the user's present or projected location. Automobile personal computer 14 may use information on the user's interests to organize how the list is presented to the user. For example, the automobile personal computer may have information indicating that the user prefers certain hotel chains or types of lodging. The user may, for example, prefer hotels over motels, prefer hotels with suites over hotels without suites, prefer hotels with pools, prefer hotels that are close to a highway exit, etc. Hotels that rate high with respect to the user's interests may be presented first or may be otherwise highlighted. Hotels that rate poorly with respect to the user's interests may be eliminated from the list or presented last.

If the user's interests have not been determined from monitoring the user's prior actions or if the user's interests are not sufficient to narrow the list to a reasonable number of matches, the user may be provided with audio or visual prompts asking the user to supply additional criteria to narrow the search for merchants of interest.

If the information being presented to the user is derived from a relatively non-commercial database, information that is comparable in terms of how well it matches the user's interests may be organized by location (e.g., closest first), by price range (e.g., least expensive first), by category (e.g., hotels then motels, then inns, then bed and breakfasts, etc.), alphabetically, etc. More commercially-oriented databases may wish to organize the information being presented to the user so that merchants who have paid for higher levels of service may have their listings presented first. For example, those hotel operators who have paid to highlight their hotels may ensure that information on their hotels is presented to the user before information on competing hotels is presented. Merchants may pay a premium to have advertisements (e.g., in the form of music or audio clips or the like) presented to the user with the listings. If the database is hosted on a remote server run by a service provider, the merchants may pay the service provider for these services. If the database is provided on a CD or DVD or other local media, the publisher of the CD, DVD, or other local media may be paid for these types of services. These are illustrative entities. Other entities may be involved if desired.

After the user selects a merchant of interest, the user may be provided with driving directions and an opportunity to make hotel reservations, pay for a hotel, make restaurant reservations, order or reserve food from a drive-through restaurant, etc. The user may be allowed to contact a merchant using any suitable technique. For example, the user may be provided with an opportunity to have automobile personal computer automatically establish a cellular or satellite telephone link to a merchant of interest (e.g., a particular hotel). The user may also contact the merchant by e-mail or other messaging technique. Listings may be presented to the user in the form of interactive audio and visual advertisements, so that when the user responds a reservation is automatically made (based on financial and personal information on the user that is maintained by automobile personal computer 14). For example, the user may respond to the presentation of an audio advertisement for a nearby hotel by speaking the command "make reservation now" or by interacting with a visual interface (e.g., an on-screen option, a front-panel "select" button, a dedicated purchase button, etc.). The automobile personal computer may then automatically make the reservation by contacting a remote server at the hotel or a reservations services provider and by providing the user's financial and personal information.

More detailed information (e.g., how many nights the user desires to stay, how many beds are required, etc.) may be handled by the automobile personal computer using interactive audio prompts and voice commands or using a visual interface at step 874. If the transaction is completed, automobile personal computer 14 may provide the user with driving directions to the merchant. Information for the driving directions may be obtained from a local database or a remote database.

If the user does not complete the financial transaction with the desired merchant at step 874, the transaction may be completed at step 876. For example, once the user arrives at the merchant, the transaction may be completed using a local or remote wireless link or in person with a credit card, etc.

Figure 74:
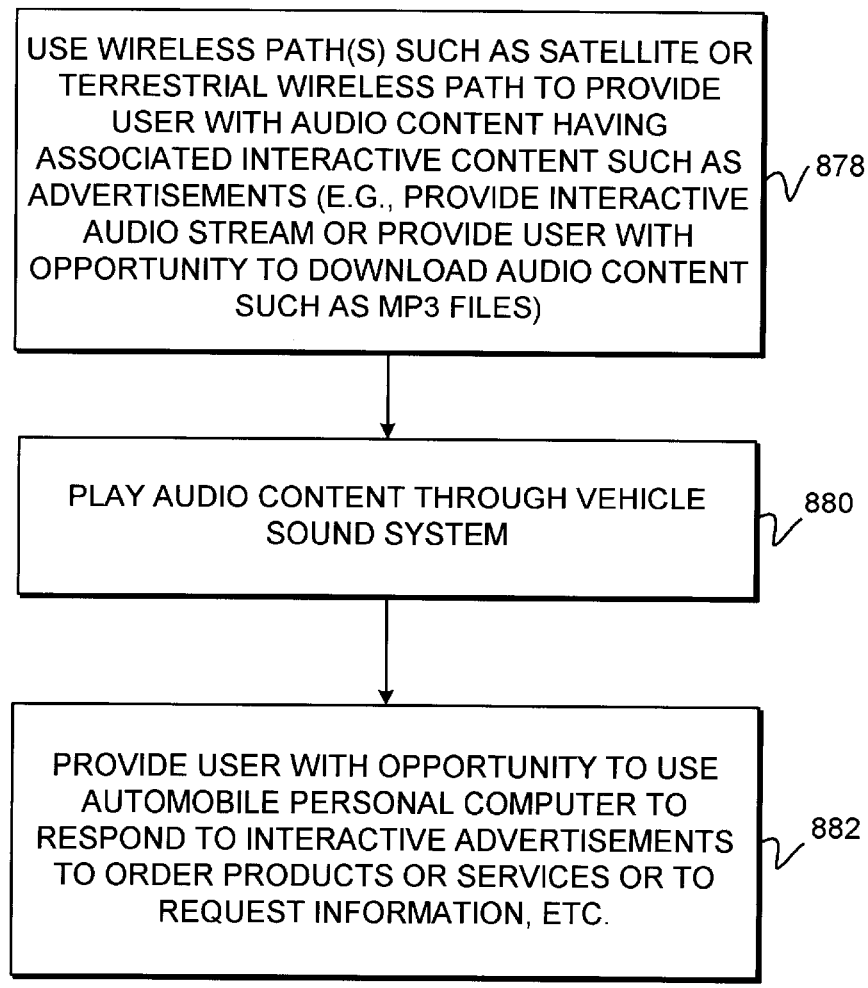
FIG. 74 is a flow chart of illustrative steps involved in providing interactive audio to the user with the automobile personal computer in accordance with the present invention.

Automobile personal computer 14 may be used to allow the user to interact with radio and other audio content. As one example, the user may be provided with a broadcast audio signal and simultaneous Internet access. Interactivity may be provided by using the Internet link to interact with a remote server (e.g., a remote server at a merchant). Illustrative steps involved in using various interactive audio arrangements are shown in FIG. 74. At step 878, the user may be provided with access to audio having an interactive content component. A user may, for example, be provided with audio content from a terrestrial or satellite broadcast source. Audio content may also be provided in the form of downloaded audio files (e.g., MP3 files) or streaming Intranet audio. At step 880, the audio content may be played through the automobile's sound system. If there are any accompanying components of the content that may be displayed visually, automobile personal computer 14 may display these components on a suitable display at step 880. At step 882, automobile personal computer 14 may be used to provide the user with an opportunity to respond to interactive advertisements or other interactive content to order or purchase products or services or to request information, etc.

As an example, the user may download and play an MP3 file for a daily financial report. At the end of the financial report, an audio message may be provided to the user asking the user whether the user would like to place any electronic stock trades or whether the user would like to sign up for an automobile electronic stock trading service. If the user responds affirmatively, the associated functions may be automatically performed using automobile personal computer. For example, an audio browser may be launched and directed to a web site for the advertised service or the user may be otherwise connected with the advertised service. If certain stocks were discussed in the report, information identifying these stocks may be passed to the electronic trading service so that the service may be ready to assist the user in trading these stocks. This is merely illustrative. Audio content and associated interactive components may be provided using any suitable technique and the user may be allowed to communicate with the provider of an advertised service or product using any suitable communications arrangement over a remote wireless link.

Interactive advertisements and the like may be associated with terrestrial or satellite radio broadcasts. If desired, the interactive content component of such broadcasts may only be presented to users who can respond to the interactive content. This may be accomplished using any suitable approach. For example, advertisements that accompany broadcast audio content may be provided as digital audio streams or digital audio clips that are only accessible by automobile personal computers configured to receive such digital streams or digital clips. Digital audio content may be provided in packets with associated packet identifiers or other identifying information. Different types of digital audio content may be identified by analyzing the packet identifiers (e.g., by consulting a table or other data structure in which each packet identifier is associated with a particular type of digital audio content). If desired, interactive audio streams may be provided by streaming Internet audio over an Internet link.

Visual information may be received and displayed in conjunction with the presentation of audio materials. If desired, the interactive audio components that are associated with noninteractive audio content received by automobile personal computer 14 may be provided as text that may be read to the user using the automobile's voice-synthesis capabilities.

Any suitable interactive content may be provided. For example, audio may be provided that relates to sports. Interactive advertisements that accompany this audio may allow the user to purchase sports tickets, sports equipment, sports memorabilia, etc. The interactive advertisements that accompany this audio may allow the user to purchase a subscription to a sports-related digital radio channel or a subscription to a service that provides periodic audio file downloads related to sports.

Similar interactive audio techniques may be used to promote news-related products and services, financial services, shopping services (e.g., related to cloths, books, or gifts), music-related products or services, banking-related, weather-related, automobile-related, or business-related products or services, etc.

Figure 75:
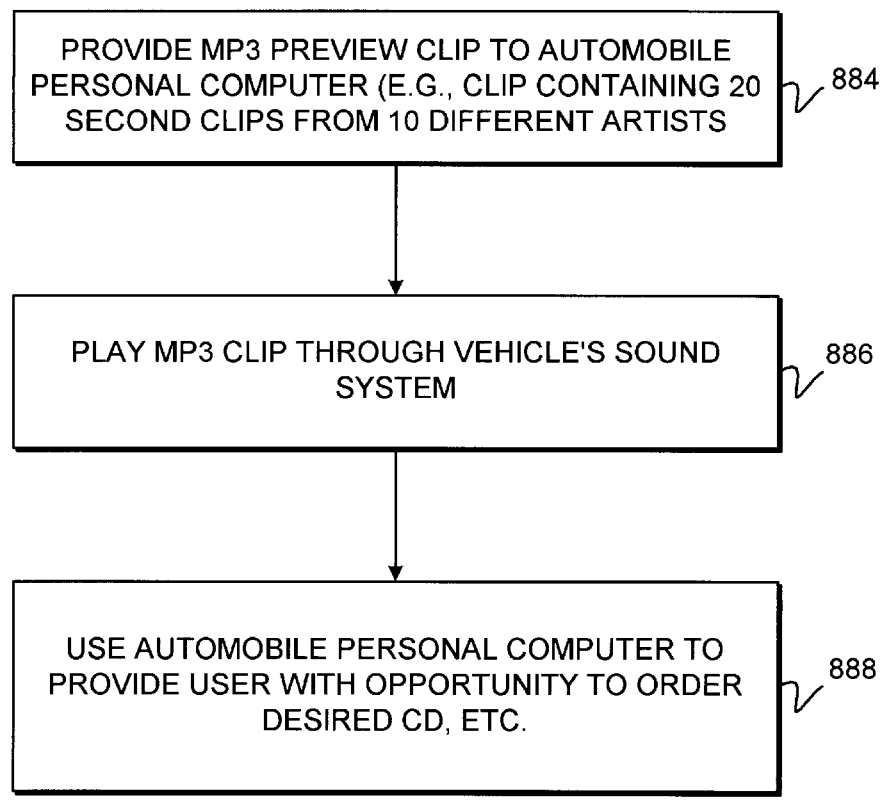
FIG. 75 is a flow chart of illustrative steps involved in providing audio preview clips to the user with the automobile personal computer in accordance with the present invention.

If desired, the user may be provided with audio preview clips (e.g., as MP3 files). Illustrative steps involved in using automobile personal computer 14 to provide this type of service to the user are shown in FIG. 75. At step 884, automobile personal computer 14 may obtain an audio preview clip. The user may select and download the clip using an audio web browser, automobile personal computer 14 may be provided with the clip as a message, the preview clip may be provided to automobile personal computer 14 on a removable media, etc.

At step 886, the user may play the preview clip through the sound system of the automobile. For example, the user may instruct automobile personal computer 14 to play the clip by issuing a voice command such as "play previews" or by pressing buttons on the computer or otherwise interacting with the computer. The audio clip may, for example, contain samples of songs from various artists and associated commentary.

At step 888, automobile personal computer 14 may provide the user with an opportunity to order products and services associated with the preview clip. For example, automobile personal computer 14 may allow the user to order CDs or subscribe to digital radio channels related to the clips by interacting with automobile personal computer 14 using voice commands or other suitable user inputs. Orders may be processed by using automobile personal computer 14 to automatically or manually supply the user's financial information to a remote server over a remote wireless link. The server may be maintained, for example, by an order processing facility that may arrange for the compact discs and other products and services ordered by the user to be delivered. If desired, the user may purchase albums in the form of digital downloads (e.g., as MP3 files) after hearing an associated preview clip. Such albums may be delivered to automobile personal computer 14 over a remote wireless link after the user has completed the necessary financial transactions to purchase the album.

Figure 76:
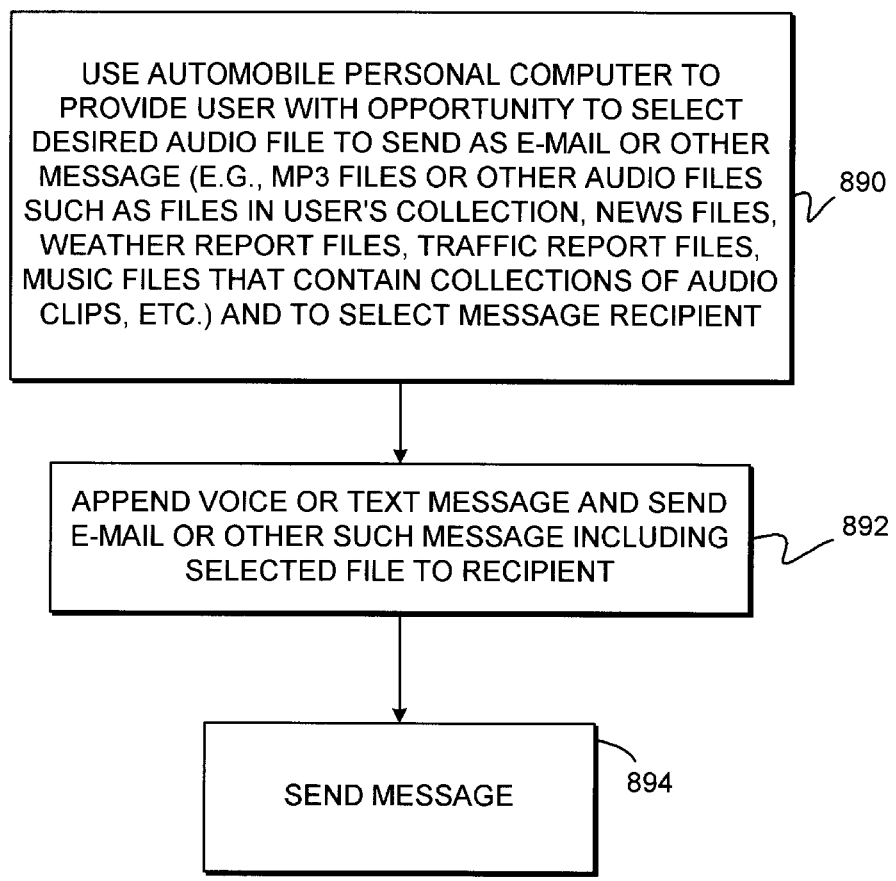
FIG. 76 is a flow chart of illustrative steps involved in allowing the user to e-mail audio files with the automobile personal computer in accordance with the present invention.

The user may develop a collection of digital audio files (e.g., MP3 files) on automobile personal computer 14. The files may be music files, news reports, weather reports, stock reports, digital books, audio clips purchased as souvenirs while the user is traveling, etc. Illustrative steps involved sending messages that include such MP3 files are shown in FIG. 76. At step 890, automobile personal computer 14 may be used to provide the user with an opportunity to select desired audio files to send with an e-mail message or other message. The user may also select a desired recipient for the message. The recipient may be selected by supplying the recipient's address or by selecting the recipient from an address book maintained by automobile personal computer 14. At step 892, content such as voice messages, text messages, and the like may be added to the message. At step 894, the message, including the selected MP3 file and any added message content may be sent to the selected recipient by automobile personal computer 14.

Figure 77:
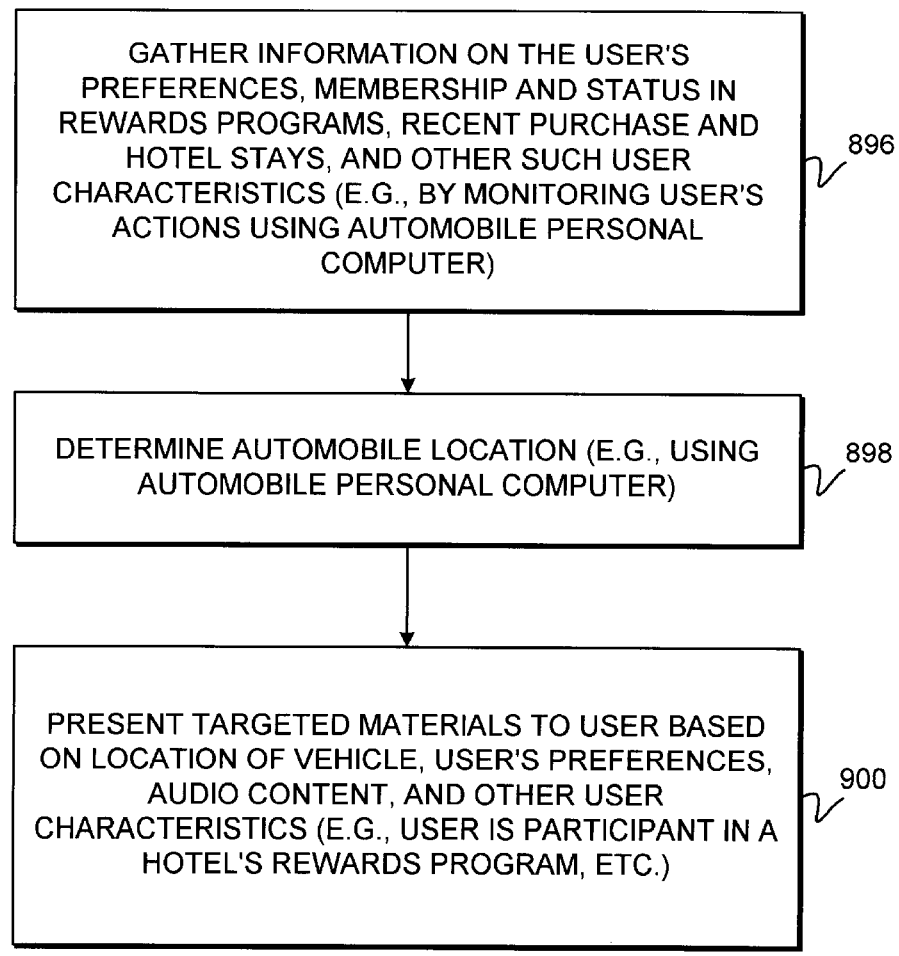
FIG. 77 is a flow chart of illustrative steps involved in providing targeted advertisements to the user with the automobile personal computer in accordance with the present invention.

If desired, highly targeted audio material may be presented to the user based on the location of automobile 12, the user's interests 14, and the audio content being delivered (e.g., the audio content currently being broadcast or streamed to the user or downloaded audio content that the user is currently playing through the automobile's sound system. Illustrative steps in providing such targeted materials to the user are shown in FIG. 77. At step 896, the user's interests may be determined by monitoring the user's preferences, membership and status in rewards programs, recent purchases and hotel stays, and other such user characteristics (as at step 850 of FIG. 72). At step 898, the location of automobile 12 may be determined (e.g., by GPS or other techniques using automobile personal computer 14). At step 900, automobile personal computer 14 may present targeted materials to the user based on the current or projected location of automobile 12, the user's interests, and the nature of the current audio content being presented to the user.

Location information may be used to present advertisements to the user that are for merchants or services that are in the vicinity of the current or projected position of the automobile. Material may be targeted using any suitable geographic scope. For example, material may be targeted based on which state the user is currently located in or may be targeted based on which exit of the highway the user is near, etc.

The user's interests and preferences may be used in determining which material to present to the user. For example, if the user is a member of a loyalty or rewards program with a particular hotel chain, the user may be presented with advertisements for hotels in that chain. A competitor may also desire to present advertisements to such users.

The materials that are presented may be audio or visual. Audio information may be played through the sound system of the automobile. Visual information may be provided, for example, on a faceplate display or supplemental display. Visual information that is displayed may be promotional material such as advertisements. For example, graphic advertisements may be provided for nearby hotels. If such graphic advertisements might be distracting to the driver, they may be displayed for the passengers of automobile 14. Promotional material such as advertisements may also be provided as audio.

The advertisements or other material that is provided may be targeted based on the audio content that is currently being provided to the user. For example, if the user is tuned to a sports-related audio program, an advertisement for a restaurant with a sports theme may be provided. If the user has just downloaded or played or is about to play an audio clip file related to entertainment news, advertisements may be provided to the user that promote a restaurant with an entertainment theme. These examples are merely illustrative. If the user is listening to business-related audio content, the user may be provided with advertisements that promote a nearby hotel with in-room computer and fax capabilities, etc.

The advertisements and other promotional material that is presented may be interactive. The user may respond to an interactive advertisement to order a product or service or to request information on a product or service. Information on a product or service may be delivered to automobile personal computer 14 by e-mail or any other type of message, may be mailed to the user's home, etc. Products and services may be purchased using any suitable techniques.

Interactive visual advertisements may be displayed as selectable graphic options on one of the displays. If the display is a touch screen display, an occupant of the automobile may respond to the advertisement by touching the region of the screen that contains the advertisement. If the display has buttons associated with certain regions on the display, the user may press an appropriate button. A general-purpose order button or response button may also be used. An advertisement on a display may also be selected by clicking on it with an arrow or highlighting it with an on-screen highlight region.

If desired, advertising information and other promotional information may be provided to the user that is not targeted or that is targeted using only a subset of criteria available for targeting.

Automobile personal computer 14 may allow users to order menu items for restaurants. In one illustrative scenario, an automobile may be approaching a certain exit on a highway. Automobile personal computer 14 may present an interactive targeted advertisement for the restaurant to the user based on the location of the automobile. When the user responds to the advertisement, the user may be provided with an opportunity to place an order over a remote wireless link. The user may place an order by, for example, using a web browser on the automobile personal computer to connect to an on-line ordering service for the restaurant over a remote wireless link.

Figure 78:
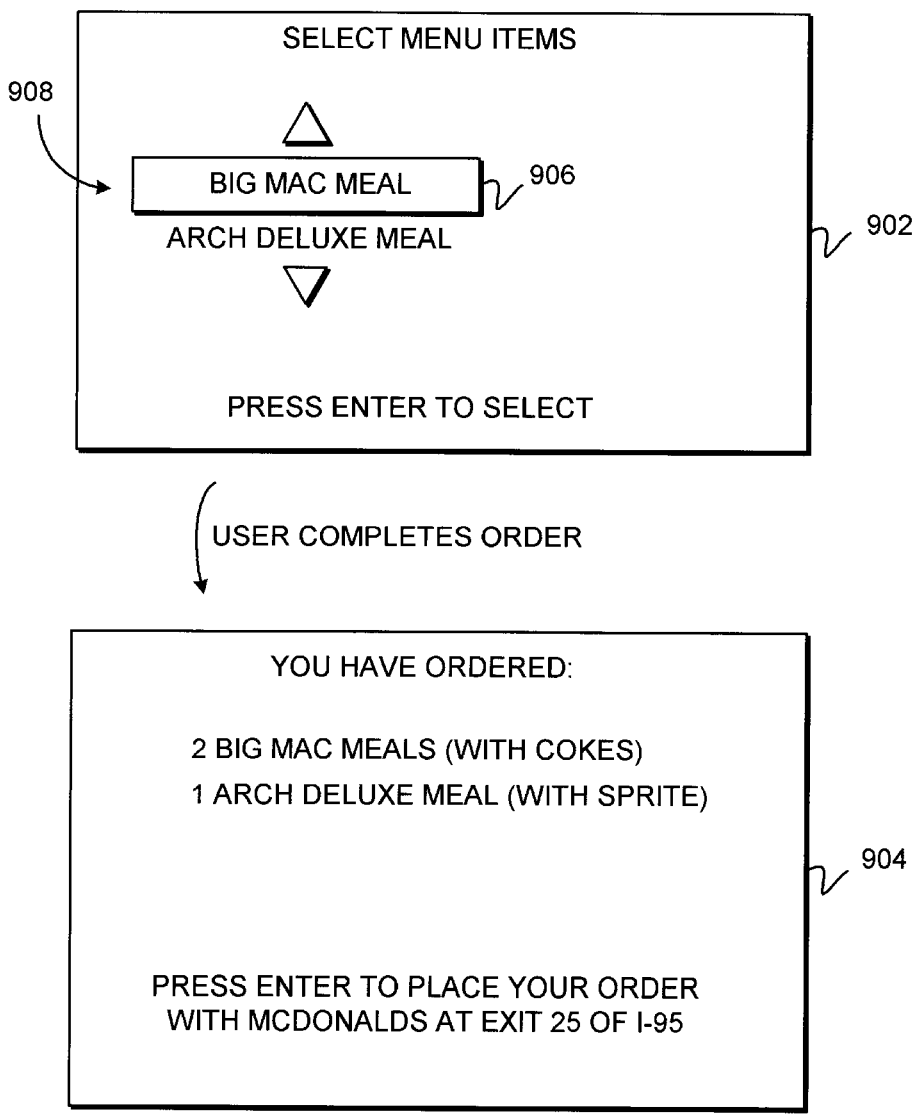
FIG. 78 shows illustrative screens that automobile occupants may use to construct an order for fast food in accordance with the present invention.

Illustrative restaurant ordering screens 902 and 904 that may be displayed to occupants of automobile 12 (e.g., occupants other than the driver) are shown in FIG. 78. Occupants of automobile 12 (e.g., rear-seat or front-seat passengers) may use highlight region 906 to select desired menu items from list 908. The order may be placed with the restaurant over a remote wireless link. When the occupants have placed the order, a confirmation message such as shown in screen 904 may be displayed. An audio confirmation may also be displayed. The menu items that were ordered may be paid for in person, may be paid for over the remote wireless link during the ordering process or may be paid for using a local wireless link (e.g., as the user drives through a drive-through lane at the restaurant).

Figure 79:
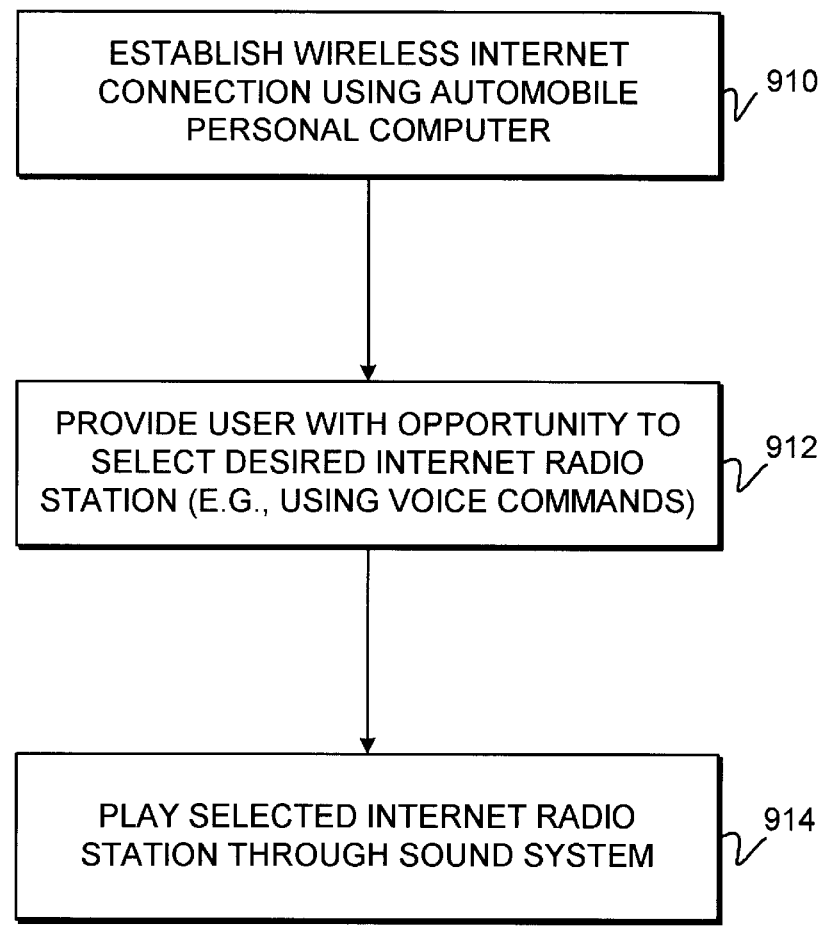
FIG. 79 is a flow chart of illustrative steps involved in providing a user with Internet radio stations in accordance with the present invention.

Automobile personal computer 14 may allow the user to play Internet radio stations through the sound system of automobile 12. Illustrative steps involved in providing the user with Internet radio content are shown in FIG. 79. At step 910, automobile personal computer 14 may be used to establish a wireless Internet connection with a suitable service provider over a remote wireless link.

At step 912, the user may be provided with an opportunity to select a desired Internet radio station. For example, the user may be provided with an opportunity to issue voice commands to automobile personal computer 14 or to make selections using buttons or other suitable user input interfaces. The Internet radio station may be selected using a previously defined list of favorite stations (e.g., stations that have been assigned to certain dedicated station buttons or voice commands such as "station 1," "station 2," etc.).

At step 914, automobile personal computer 14 may run appropriate decoding software to decode streaming Internet content for the selected Internet radio station while that content is being provided to automobile personal computer 14 over the remote wireless Internet link. The decoded content may be played through the sound system of automobile 12 in real time.

Figure 80:
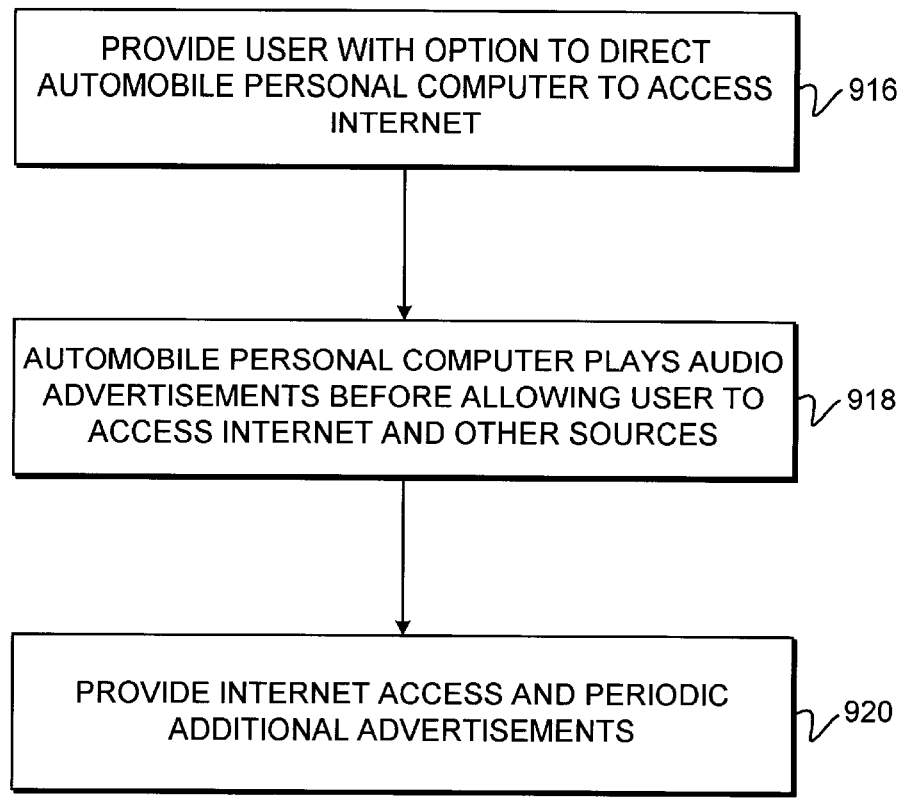
FIG. 80 is a flow chart of illustrative steps involved in providing audio advertisements to the user with the automobile personal computer to provide the user with subsidized Internet access in accordance with the present invention.

Wireless automobile Internet access may be subsidized if the user is provided with advertisements or other promotions, because the revenues that an Internet service provider may obtain from selling such advertisements or promotions to merchants may offset any loss in revenues from subscribers. Illustrative steps involved in using automobile personal computer 14 to provide users with subsidized Internet access are shown in FIG. 80. At step 916, automobile personal computer 14 may be used to provide the user with an opportunity to direct automobile personal computer to establish an Internet connection with an Internet service provider that offers subsidized service. At step 918, automobile personal computer 14 presents the advertisements used by the service provider to offset the costs of the subscription fee losses before Internet access is permitted. The advertisements may be audio advertisements and may have visual content if desired. At 920, the user is provided with wireless Internet access. Additional advertisements may be periodically presented to the user. For example, every 10 minutes an audio advertisement may be played that temporarily interrupts the user's ability to use the service under voice command. If desired, the user may be permitted to access the Internet using audio commands and prompts, while visual advertisements are displayed. Similarly, audio advertisements may be presented without disrupting the user, provided that the user only uses buttons or on-screen interfaces to interact with automobile personal computer 12.

Figure 81:
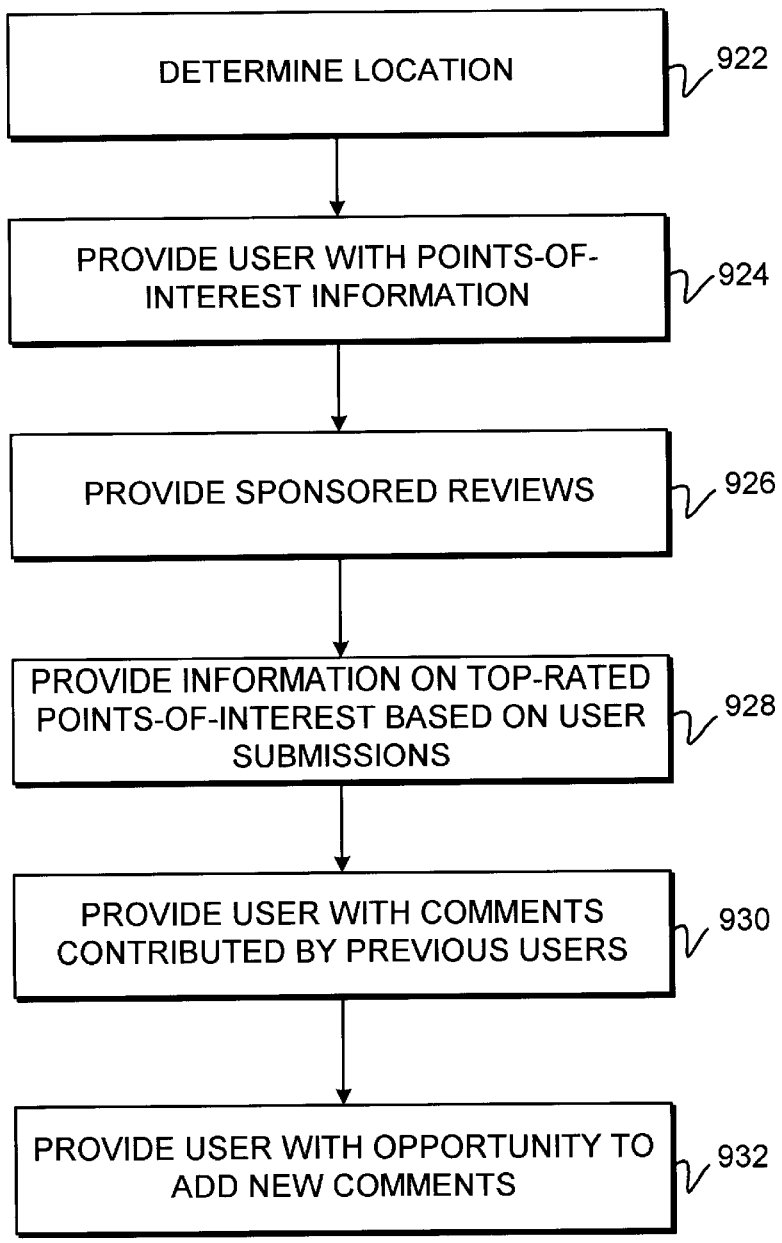
FIG. 81 is a flow chart of illustrative steps involved in allowing users to associate comments with the content of a points-of-interest service in accordance with the present invention.

Points-of-interest information may be provided with automobile personal computer 14 (e.g., by accessing a local database on a CD or DVD or by accessing a remote database over a remote wireless connection). If desired, users may annotate such information. Illustrative steps involved in providing points-of-interest information that users may annotate are shown in FIG. 81. At step 922, the location of automobile 12 may be determined. At step 924, automobile personal computer 14 may provide the user with points-of-interest information. The points-of-interest information that is provided may be based on the location of automobile 12 and user selections. Illustrative information that may be provided includes information on nearby food, lodging, and tourist sites.

At step 926, sponsored reviews may be provided. Reviews may be sponsored by, for example, a well-known guide book company or restaurant critic. Sponsored review information may be appended to the end of a list of various points-of-interest in a particular category (e.g., hotels) or may be interspersed with the points-of-interest information.

The points-of-interest service may also be provided largely or entirely by a well-known guide book company or a restaurant critic or the like.

At step 928, the user may be provided with information on which points-of-interest have been rated most favorably by other users. Information on the ratings of other users may be stored, for example, on a remote database that is accessed over a remote wireless link. This feature allows the user to determine, for example, the most popular nearby restaurant, the most popular hotel, or highly-rated tourist sites. If the user tends to agree with the ratings of the other users, this feature may complement the static content provided by the points-of-interest database. The remote server may be used to maintain the entire points-of-interest database including user annotations or may be used to store only user annotations.

At step 930, the user may be provided with actual comments on the points-of-interest that have been provided by other users. For example, the user may direct automobile personal computer 14 to play back audio clip and voice-synthesized text comments that other users have submitted related to the quality of restaurants, hotels, and tourist sites. User comments may be stored at a remote server such as a remote server run by the owner of the points-of-interest database. If the points-of-interest service is based on a remote database that is being accessed by the user over a remote wireless link, such comments may be incorporated into the remote database. If the points-of-interest service is being provided by a local database on a CD or DVD, automobile personal computer 12 may access the remote database to obtain the comments when needed.

At step 932, automobile personal computer 14 may provide the user with an opportunity to provide comments for inclusion in the points-of-interest service. The user's comments may be stored as part of a remote database for the entire service or may be stored on a remote server for access by other users as a supplement to a local CD or DVD database. Comments may include text, graphics, audio, and video. Comments may also include votes (e.g., for favorites restaurants). Comments may be submitted as e-mail, e-mail with audio attachments, voice-mail, or any other suitable message. Comments may be submitted by responding to queries provided by the points-of-interest service that are provided to the user by automobile personal computer 14 (e.g., using a web browser or the like). User feedback may also be accepted from other users using mail, telephone, e-mail from personal computers, etc. The comments may be edited or may be incorporated automatically by software running at a remote points-of-interest server.

Figure 82:
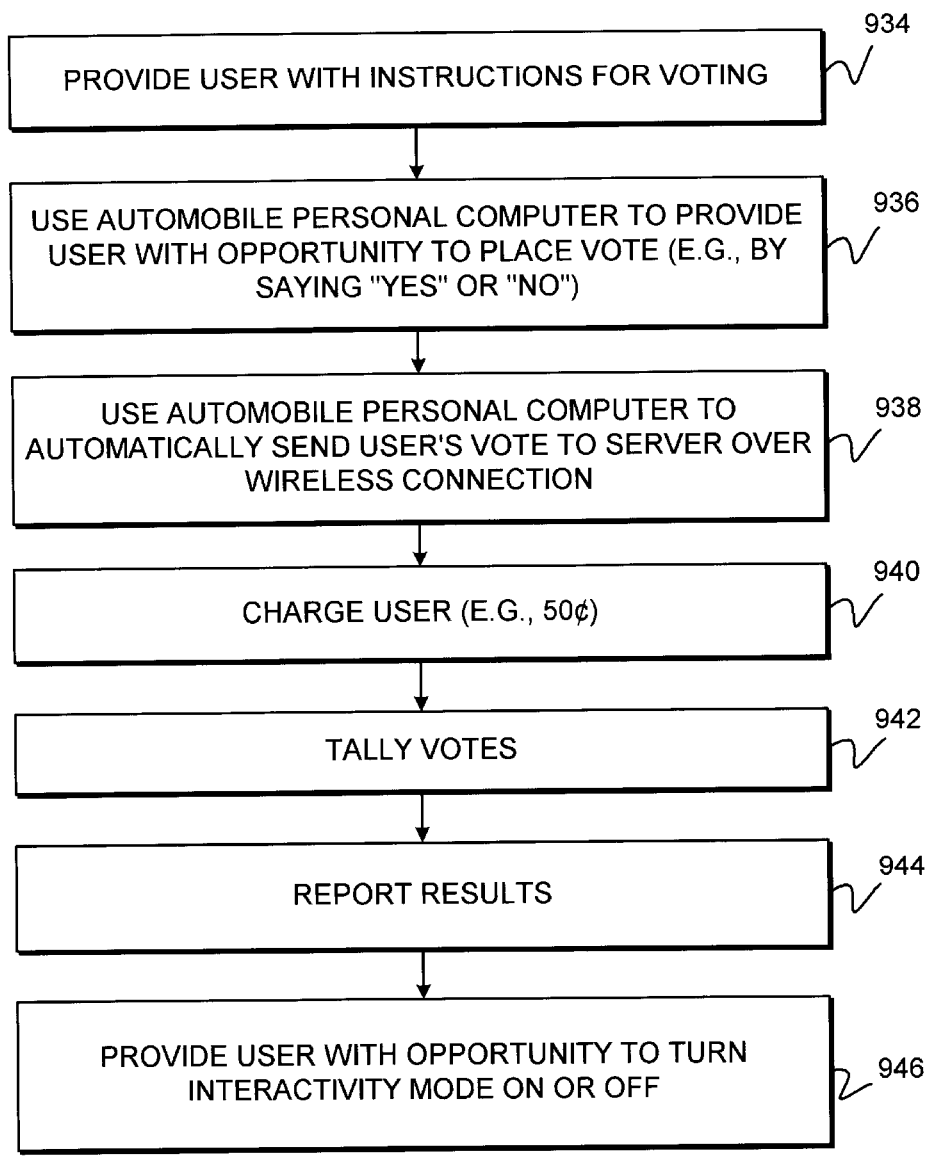
FIG. 82 is a flow chart of illustrative steps involved in allowing users to respond to polls using the automobile personal computer in accordance with the present invention.

Automobile personal computer 14 may be used to allow users to vote on various issues. Illustrative steps involved in allowing users to vote are shown in FIG. 82. At step 934, automobile personal computer 14 may be used to provide the user with instructions on how to vote in a given poll. For example, audio information may be wirelessly delivered to the user on a particular subject and the user prompted to vote. The instructions may be provided to the user at any suitable time, such as after an audio program or during a particular portion of an interactive application running on automobile personal computer 14.

At step 936, automobile personal computer 14 may be used to provide the user with an opportunity to place a vote. For example, automobile personal computer may await user voice responses such as "yes" or "no." At step 938, the user's vote may be sent to a remote server over a remote wireless connection. If desired, the user may be charged for the vote at step 940. At step 942, the votes from various users are tallied. (e.g., at the remote server). At step 944, the results of the vote may be reported. For example, the results may be provided on a web page that the user and others may access using a web browser, etc.

At step 946, the user may be provided with an opportunity to turn the interactive feature of automobile personal computer on or off. For example, if the user does not wish to receive information on additional voting opportunities, the user may direct automobile personal computer 14 not to play any further voting instructions by turning this interactive feature off.

Figure 83:
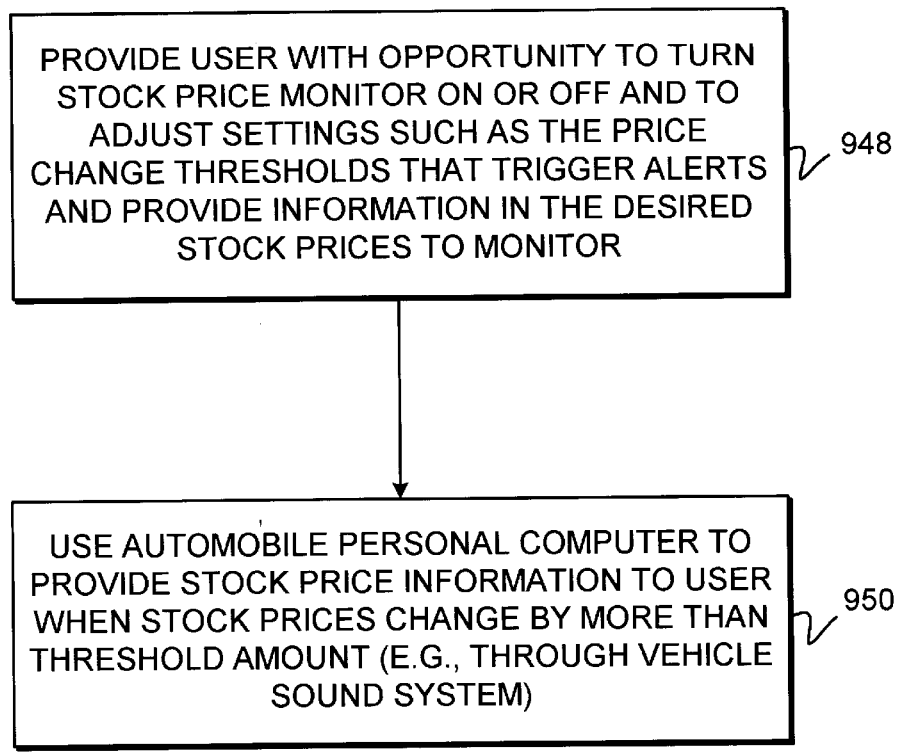
FIG. 83 is a flow chart of illustrative steps involved in providing stock prices to the user with the automobile personal computer in accordance with the present invention.

Automobile personal computer 14 may be used to monitor the prices of certain user-selected stocks. Illustrative steps involved in providing stock quotes to the user with automobile personal computer 14 are shown in FIG. 83. At step 948, automobile personal computer 14 may be used to provide the user with an opportunity to turn the stock price monitor feature on or off and to adjust settings such as the price change thresholds that trigger alerts. The user may also be allowed to select which stock prices are to be monitored.

At step 950, automobile personal computer 14 may be used to provide stock price information to the user whenever stock prices change by more than the selected threshold amount or by more than a default amount. This information may be provided in any suitable way. For example, an e-mail message may be sent to the user. The e-mail message may have an audio clip attachment or may be an audio message that contains the stock quote information. The e-mail message may also be in a text format. Such text messages may be read for the user automatically using the voice-synthesis capabilities of automobile personal computer 14. The stock quote information may be provided to the user through the automobile's sound system.

Figure 84:
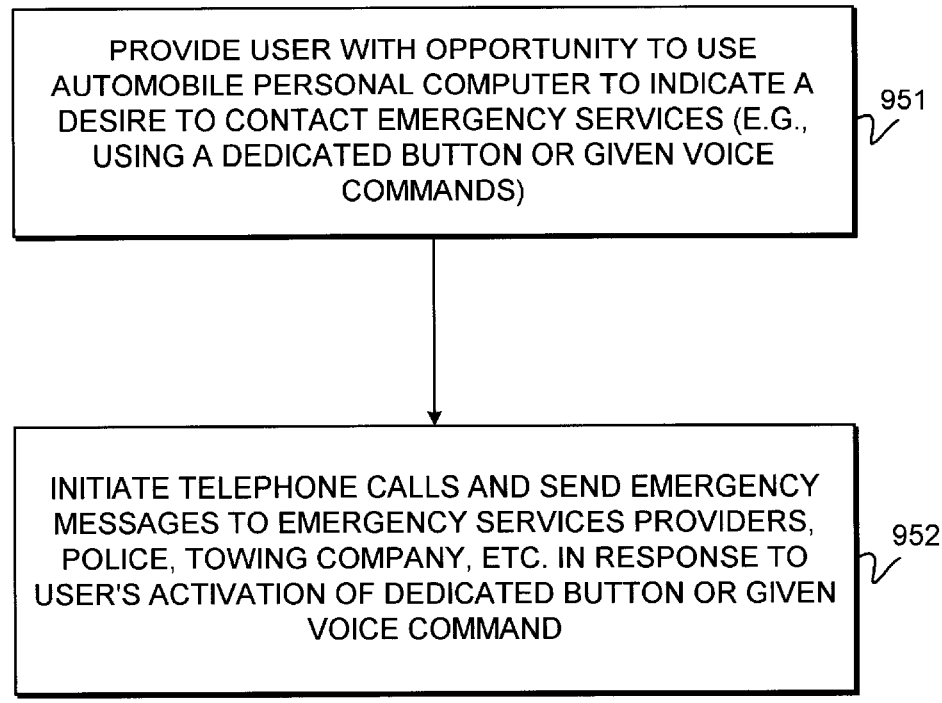
FIG. 84 is a flow chart of illustrative steps involved in providing roadside assistance features to the user with the automobile personal computer in accordance with the present invention.

Automobile personal computer 14 may be used to provide roadside assistance. Illustrative steps involved in using automobile personal computer 14 to provide roadside assistance to the user are shown in FIG. 84. At step 951, the user may be provided with an opportunity to indicate a desire to contact emergency services. For example, automobile personal computer 14 may wait for the user to issue a voice command such as "emergency services" or may wait for the user to depress an emergency button on the faceplate of automobile personal computer 14. The automobile personal computer 14 may also await the selection of an on-screen option that directs the computer 14 to contact an emergency services provider.

At step 952, automobile personal computer 14 may initiate telephone calls and send emergency messages to the emergency services provider in response to the user's command. The emergency services provider may be the police, an emergency operator, a towing company, or a third-party emergency services provider. If desired, dedicated buttons and voice commands may be provided for each different type of emergency service. For example, one voice command or dedicated button may be assigned to towing and another voice command or dedicated button may be assigned to police. If desired, the user may contact emergency services through automobile personal computer 14 using other suitable options or commands.

Figure 85:
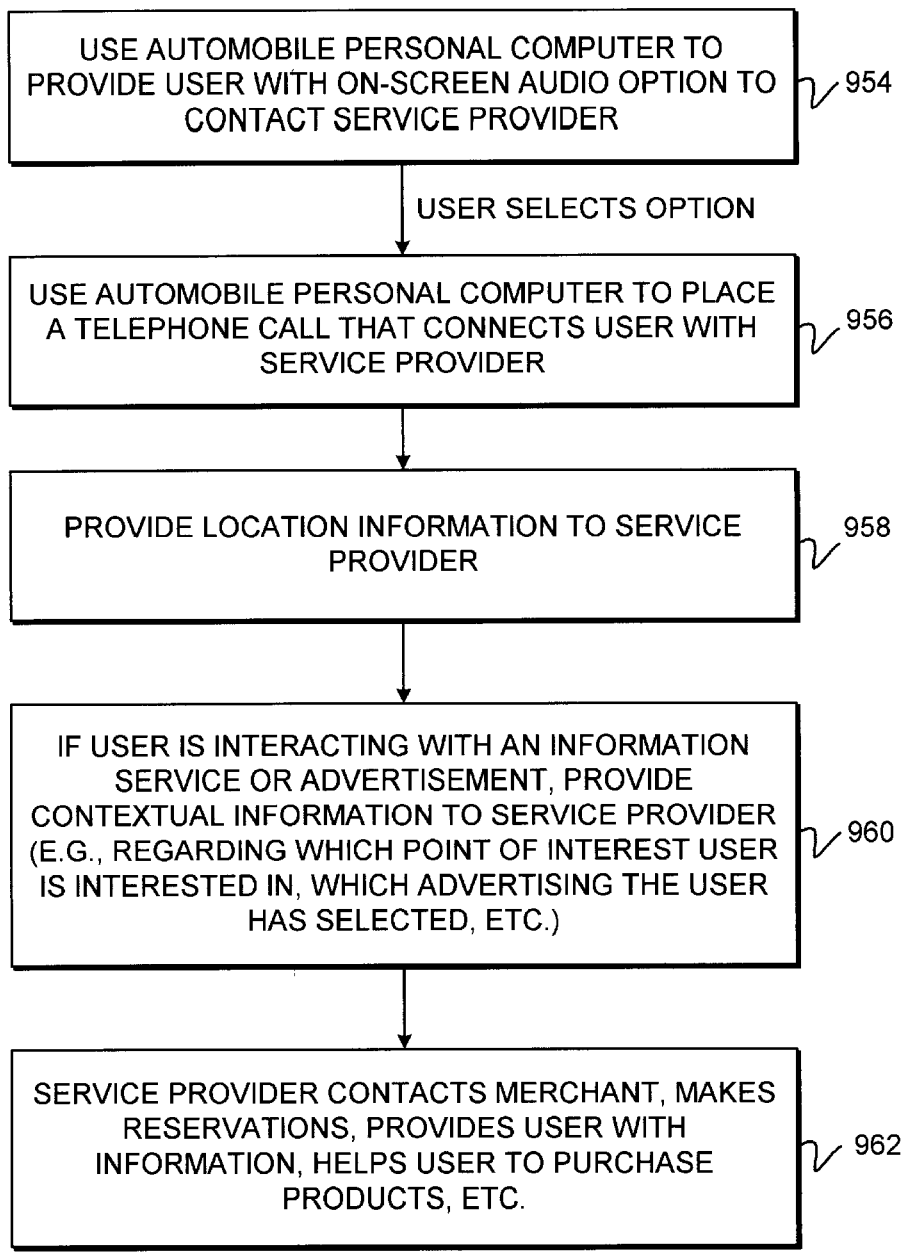
FIG. 85 is a flow chart of illustrative steps involved in using the automobile personal computer to provide operator-assisted features in accordance with the present invention.

Automobile personal computer 14 may be used to provide operator-assisted services. Illustrative steps involved in providing operator-assisted services to the user are shown in FIG. 85. At step 954, automobile personal computer 14 may be used to provide the user with an on-screen option, audio option, or button-actuated option that allows the user to contact the service provider (e.g., for directions or points-of-interest information, etc.). After the user selects a desired option, automobile personal computer 14 may be used to place a telephone call (e.g., a cellular or satellite telephone call) that connects the user with the service provider at step 956. At step 958, the current location of automobile 12 may be determined (e.g., automobile personal computer 12 may use GPS techniques to determine the location or other suitable location techniques may be used). At step 960, if the user is interacting with an information service or an advertisement, contextual information may be provided to the service provider, such as information regarding which point-of-interest the user is interested in, which advertising the user has selected, etc. This allows the service provider to assist the user by contacting the appropriate merchant at step 962. The service provider may make reservations, provide the user with information that helps the user to purchase products or services, etc.

Figure 86:
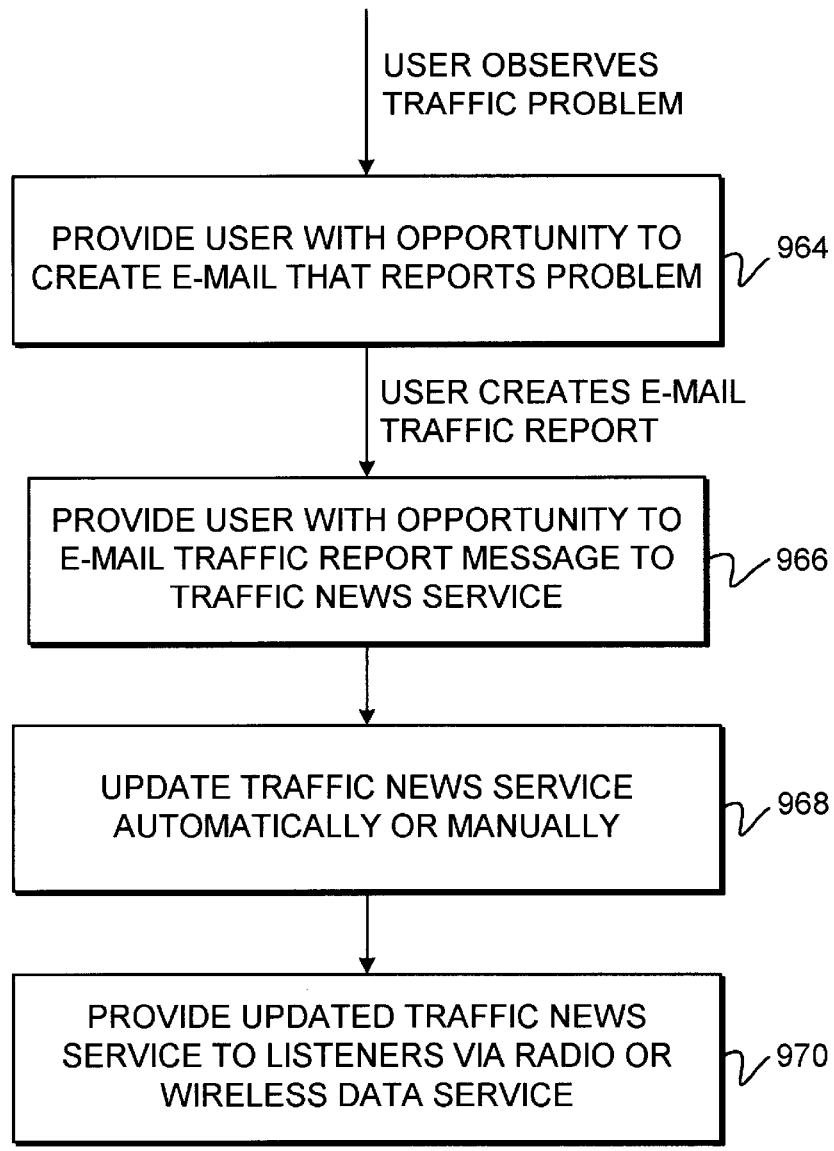
FIG. 86 is a flow chart of illustrative steps involved in using the automobile personal computer to send a traffic report to a service in accordance with the present invention.

Automobile personal computer 14 may be used to provide traffic reports. Illustrative steps involved in providing traffic reports are shown in FIG. 86. At step 964, after the user has taken note of the current traffic situation, automobile personal computer 14 may be used to provide the user with an opportunity to create an e-mail traffic report. For example, the user may be provided with an opportunity to speak the voice command "create traffic report" or to select a button or on-screen option. The user may then be prompted to record an audio clip report or to dictate a text e-mail using the automobile personal computer's voice-recognition capabilities.

At step 966, automobile personal computer 14 may be used to provide the user with an opportunity to e-mail the traffic report message to a traffic news service over a remote wireless link.

The traffic news service may have, for example, a remote server that automatically processes incoming e-mail messages or that is operated by personnel who manually assist in the processing of incoming e-mail messages at step 968.

At step 970, the traffic news service may provide updated traffic information to users that reflects the information from the e-mail report (as text or streaming audio or in any other suitable format). The traffic information may be provided over the Internet, may be provided as a data service using satellite or terrestrial wireless distribution techniques, may be provided as part of a radio broadcast, or may be provided using any other suitable technique. The traffic information may be provided as text, graphics, audio, or video. If, for example, the user appends a digital still image to the e-mail, such an image may be provided to users as part of the service. The recipients of the traffic service may be located in other automobiles or may be located at any other suitable location (e.g., the home or office, etc.).

Figure 87:
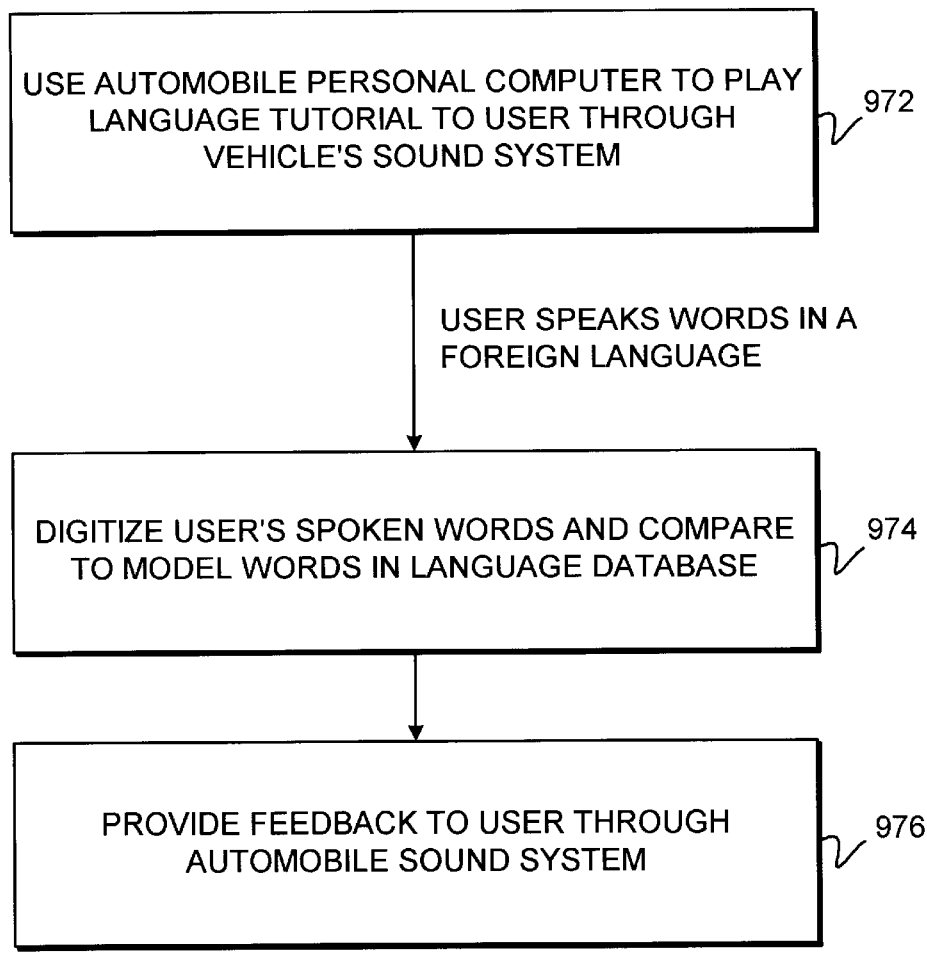
FIG. 87 is a flow chart of illustrative steps involved in using the automobile personal computer to provide interactive language instruction in accordance with the present invention.

Automobile personal computer 14 may be used to provide the user with interactive foreign language instruction, music instruction, or other types of instruction. Illustrative steps involved in using automobile personal computer to provide interactive language instruction are shown in FIG. 87. At step 972, automobile personal computer 14 may be used to play a language tutorial through the automobile's sound system. The tutorial may request that the user repeat certain words or phrases. At step 974, the user's spoken words are digitized and compared to model words in a language database. The language database may be maintained, for example, on a CD or DVD or other suitable storage medium at automobile personal computer 14. At step 976, the language application may provide the user with feedback (e.g., information on how well the user is pronouncing the foreign language, etc.).

If desired, a music application may be provided that allows the user's singing to be analyzed. The user's singing may be analyzed for proper pitch, timing, etc. The application may be used to teach the user songs.

Applications running on automobile personal computer 14 may access the Internet or other suitable communications network over a remote wireless link. This may allow the applications to access additional information or more current information than might otherwise be possible. If desired, such Internet connections may allow multiple users in different automobiles and stationary locations to interact. For example, multiplayer games may be provided. In an instructional environment (e.g., with foreign language instruction or the like), students in multiple automobiles may use automobile personal computers 14 to interact with a common instructor. Students may, for example, use automobile personal computer 14 to interact with an instructor and other students using e-mail, real-time messaging, text or audio chat functions, real-time voice links (over the Internet or using telephone-type links), etc. These multiperson communications features may be used for any suitable purpose. For example, a real-time chat group may be used to discuss traffic, politics, movies, books, current events, etc. The chat server that supports the chat function may limit participation to those participants who are communicating from an automobile personal computer 14 or may include any participant with access to a computer.

Figure 88:
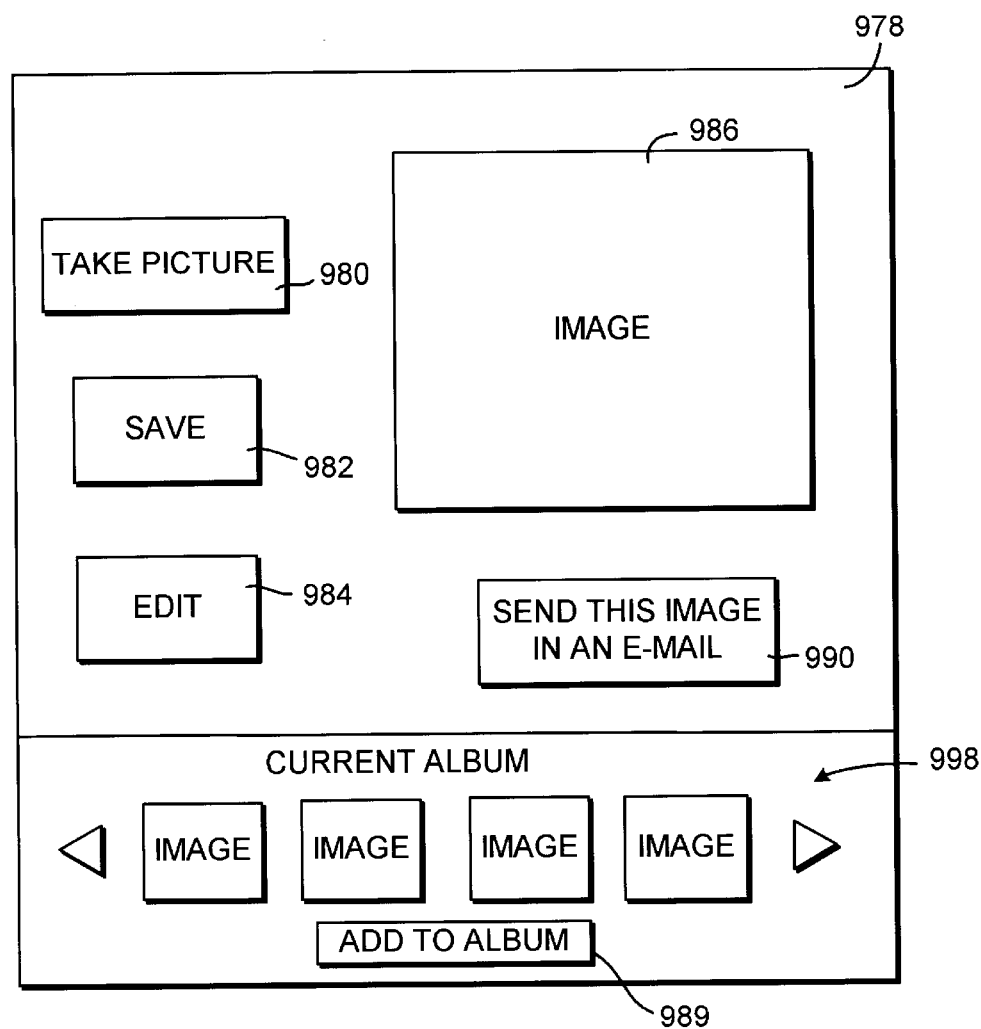
FIG. 88 is an illustrative screen for a digital photography application that the automobile personal computer may display for a passenger in the automobile in accordance with the present invention.

Automobile personal computer 14 may be used to support digital imaging applications. An illustrative screen 978 that may be provided by a camera game is shown in FIG. 88. Screen 978 may be displayed in a location where it may be viewed by passengers of automobile 12 (e.g., on a rear-seat display screen). Option 980 may be selected when a user desires to take an image. Images may be acquired using a digital camera such as digital camera 170. Digital camera 170 may be attached to automobile personal computer 14 using ports such as ports 125 or 252 or any other suitable arrangement.

Images that have been acquired may be saved by selecting option 982. Images may be edited using option 984. Region 986 may be used to display images. An album of images may be displayed in region 988. Additional images may be placed in the album by selecting option 989. Automobile personal computer 14 may provide options such as option 990 that allow the user to e-mail images to any suitable e-mail address over a remote wireless link. The example of FIG. 88 is merely illustrative. Any suitable imaging application may be supported by automobile personal computer 14 if desired.

Figure 89:
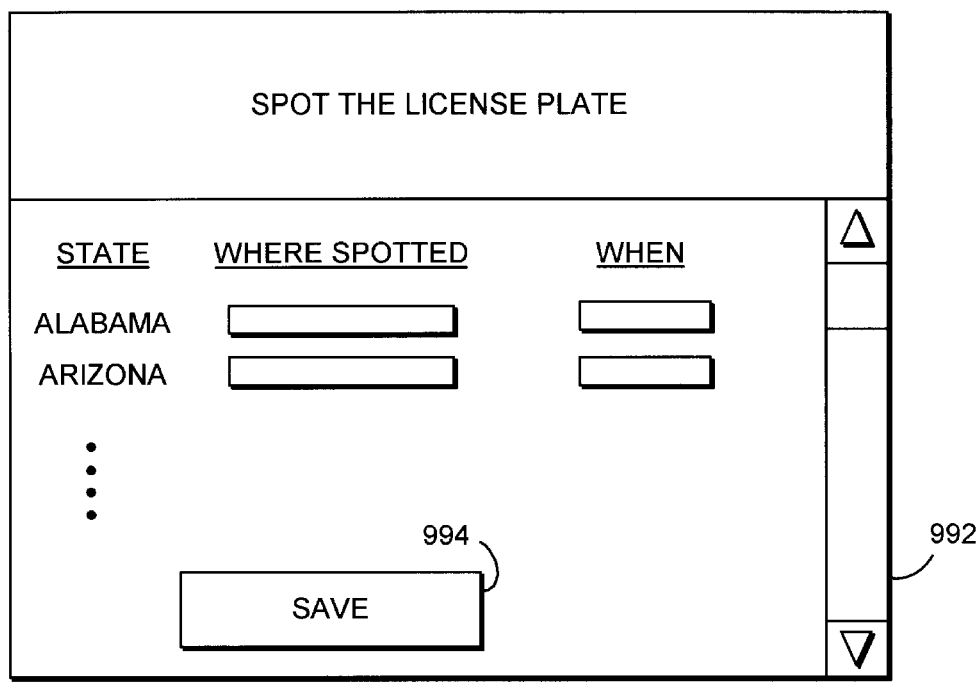
FIG. 89 is an illustrative screen for a license plate game that the automobile personal computer may display for a passenger in the automobile in accordance with the present invention.

Automobile personal computer 14 may allow the occupants of automobile 12 (e.g., children in the rear seat) to play games (e.g., video games, etc.) An illustrative screen 992 lo that may be provided by a license plate spotting game is shown in FIG. 89. Whenever a participant in the game spots a license plate another automobile or truck, information on where and when the plate was spotted and information on which state the license plate was from may be entered into appropriate regions of screen 992. Save option 994 may be provided so that the game may be saved.

Other games that may be provided by automobile personal computer 14 may rely on the fact that the front-seat passengers may-not observe what is displayed on the display screens in the rear-seat area. Accordingly, guessing-type games may be provided.

Figure 90:
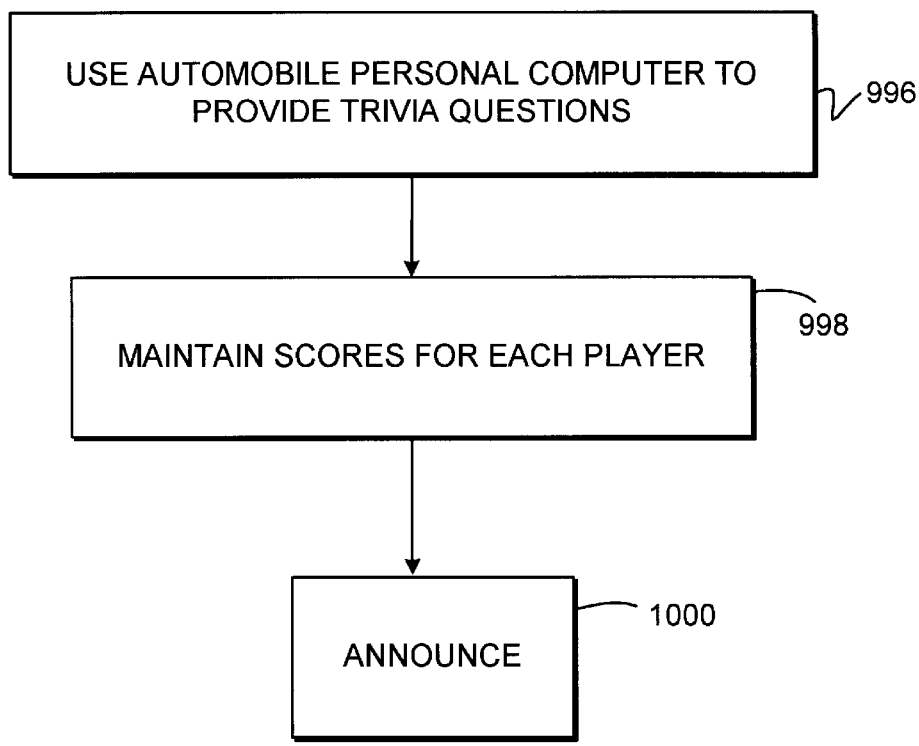
FIG. 90 is a flow chart of illustrative steps involved in using the automobile personal computer to provide a trivia game for the occupants of the automobile in accordance with the present invention.

Illustrative steps involved in using automobile personal computer 14 to provide a trivia game are shown in FIG. 90.

Such a game may be operated in a single-player or a multiplayer format. At step 996, automobile personal computer 14 may provide the game participants with trivia questions. Players may answer verbally, if desired. For example, if the questions are provided as multiple choice questions, automobile personal computer 14 may use voice recognition to determine whether the user is responding with an answer of "a," "b," or "c." Full spoken answers may also be handled using voice recognition. If desired, answers may be supplied using buttons or on-screen options. At step 998, scores may be maintained for each player. After a certain point level is reached by one of the players, a winner may be announced through the sound system of automobile 12 at step 1000.

Figure 91:
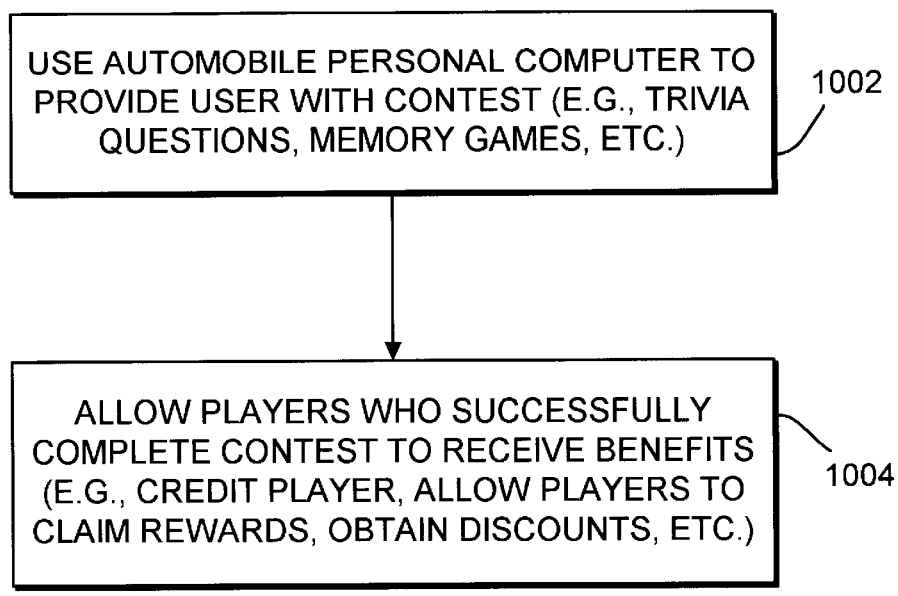
FIG. 91 is a flow chart of illustrative steps involved in using the automobile personal computer to provide a contest to the user in accordance with the present invention.

Automobile personal computer 14 may be used for contests. Illustrative steps involved in using automobile personal computer 14 to support a contest are shown in FIG. 91. At step 1002, automobile personal computer 14 may be used to provide the user with a contest. For example, the contest may be based on a trivia game, a memory game, or any other suitable type of contest. At step 1004, automobile personal computer 14 may allow players who have successfully completed the contest to receive benefits. For example, the player may receive a financial credit or other benefit from the sponsor of the contest. Automobile personal computer 14 may be used to allow players to claim rewards, obtain discounts, or obtain any other suitable benefits based on winning or entering the contest.

Steps 1002 and 1004 may be implemented locally on automobile personal computer 14, may be implemented remotely (e.g., on a remote server that is in communication with automobile personal computer 14 over a remote wireless link such as a remote wireless Internet link or the like), or may be implemented using a combination of local and remote techniques. The benefits and rewards that are provided may be provided as financial credits, discounts, products or services, etc. The benefits and rewards may be provided at any suitable location. For example, a benefit may be provided locally by providing a free download of a game or audio clip over a local or remote wireless link. A benefit may be provided remotely by crediting the user's bank account.

A reward may require that a player travel to a store to redeem the reward. For example, a trivia game may be provided by automobile personal computer 14. When the player successfully completes the trivia game, the user is provided with a discount on an oil change. To receive the benefit, the user travels to the service station to have the oil in automobile 12 changed. The user's successful completion of the contest may be proven by printing a winning ticket with printer 116 or by automatically transmitting a confirming message from automobile personal computer 14 to the contest sponsor or other entity. A confirming messages of this type may be sent by e-mail. If desired, any other suitable technique may be used to communicate information about the user's successful completion of the contest to the contest sponsor or other suitable entity over a remote or local wireless communications path.

Figure 92:
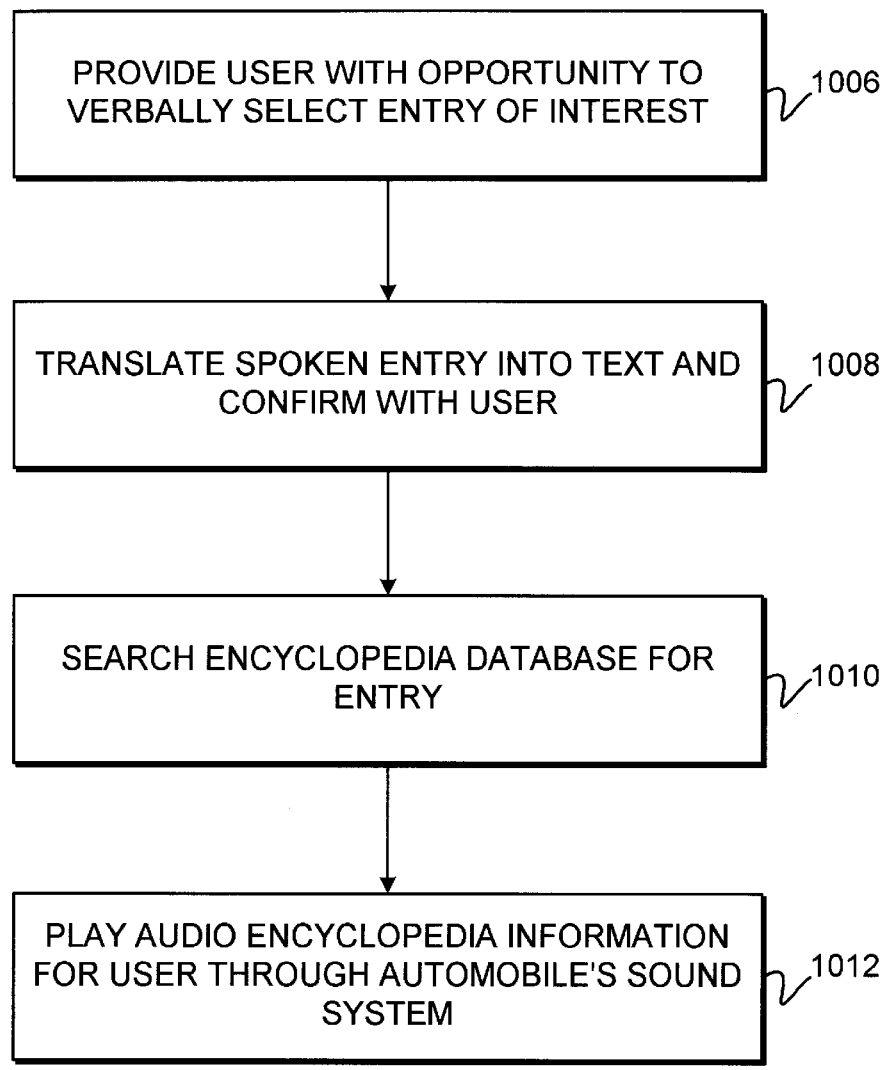
FIG. 92 is a flow chart of illustrative steps involved in using the automobile personal computer to provide an audio encyclopedia to the user in accordance with the present invention.

Automobile personal computer 14 may be used to provide an encyclopedia to the user. Illustrative steps involved in providing encyclopedia functions to the user are shown in FIG. 92. At step 1006, an encyclopedia application implemented on automobile personal computer 14 may be used to provide the user with an opportunity to verbally select an encyclopedia entry of interest. At step 1008, the encyclopedia application may translate the spoken entry into text and may confirm the translation by playing the text back to the user using voice synthesis. At step 1010, the encyclopedia application may search an encyclopedia database to locate information on the selected entry. The database may be implemented locally (e.g., using a CD or DVD or the like) or may be implemented remotely and accessed over a remote communications link. At step 1012, the encyclopedia application may play the encyclopedia content that corresponds to the user's selected entry through the sound system of automobile 12.

Figure 93:
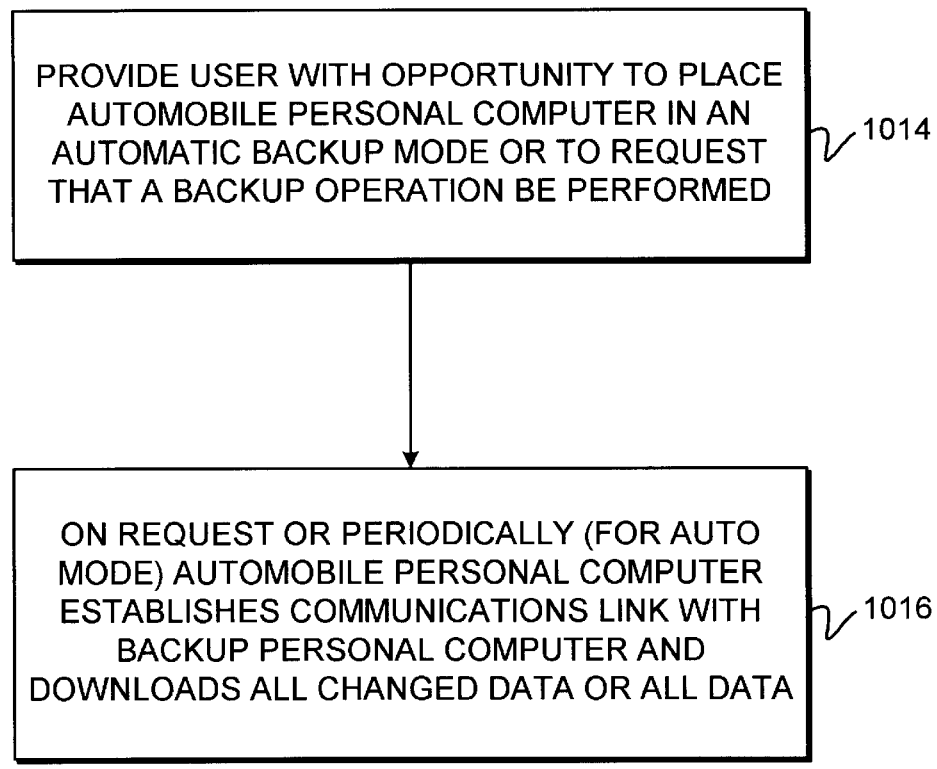
FIG. 93 is a flow chart of illustrative steps involved in backing up data from the automobile personal computer in accordance with the present invention.

Automobile personal computer 14 may be used to automatically back up the user's valuable data. Illustrative steps involved in backing up data are shown in FIG. 93. At step 1014, the user may be provided with an opportunity to place automobile personal computer 14 in an automatic backup mode or to request that a backup operation be performed. With the automatic mode, a backup operation may be automatically performed at certain intervals (e.g., once per day during the night). With manual mode, the user requests backup operations. At step 1016, when it is time for a backup operation, automobile personal computer 14 may establish a link with a backup computer. Backup operations may involve saving information from, for example, a hard drive onto an optical storage media (e.g., a writeable compact disc or digital video disk). Such operations may be performed locally, at automobile personal computer 14. Backup operations may also involved saving information from automobile personal computer 14 to a hard drive or the like in the home. Such operations may be performed using a local or remote wireless link. If desired, the data in automobile personal computer 14 may be backed up on a remote server. Data may be supplied to the remote server over a remote wireless link.

Figure 94:
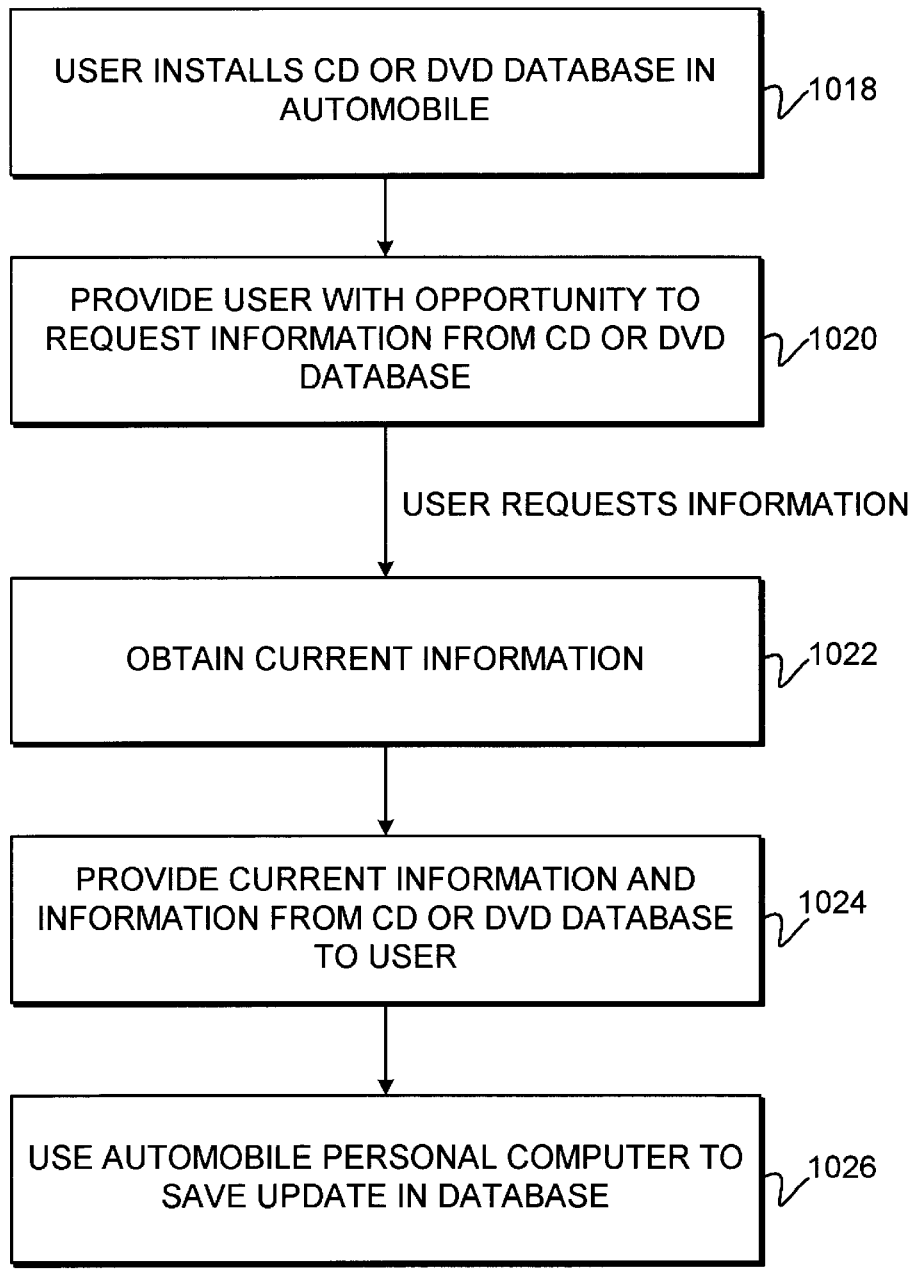
FIG. 94 is a flow chart of illustrative steps involved in wirelessly updating automobile personal computer databases in accordance with the present invention.

Local databases such as map databases and databases for points of interest and the like may be updated using automobile personal computer 14. Illustrative steps involved in wirelessly updating these local databases are shown in FIG. 94. At step 1018, the user may install a CD or DVD database in automobile 12. The database may be a map database, a points-of-interest database, etc. At step 1020, the user may be provided with an opportunity to request information from the database. At step 1022, current information for the database may be obtained over a remote wireless connection. For example, current information may be obtained from a remote server using a wireless Internet connection. At step 1024, the current information and the information from the CD or DVD database may be provided to the user.

If desired, each time current information is obtained to update the database, the current information may be stored locally (e.g., in hard disk drive 82) at step 1026. This may shorten the latency time for subsequent retrievals, because it may not be necessary to retrieve subsequent update information from the remote server). Updates may be performed periodically (e.g., once per day or once per month, etc.) or may be performed when users request information.

Figure 95:
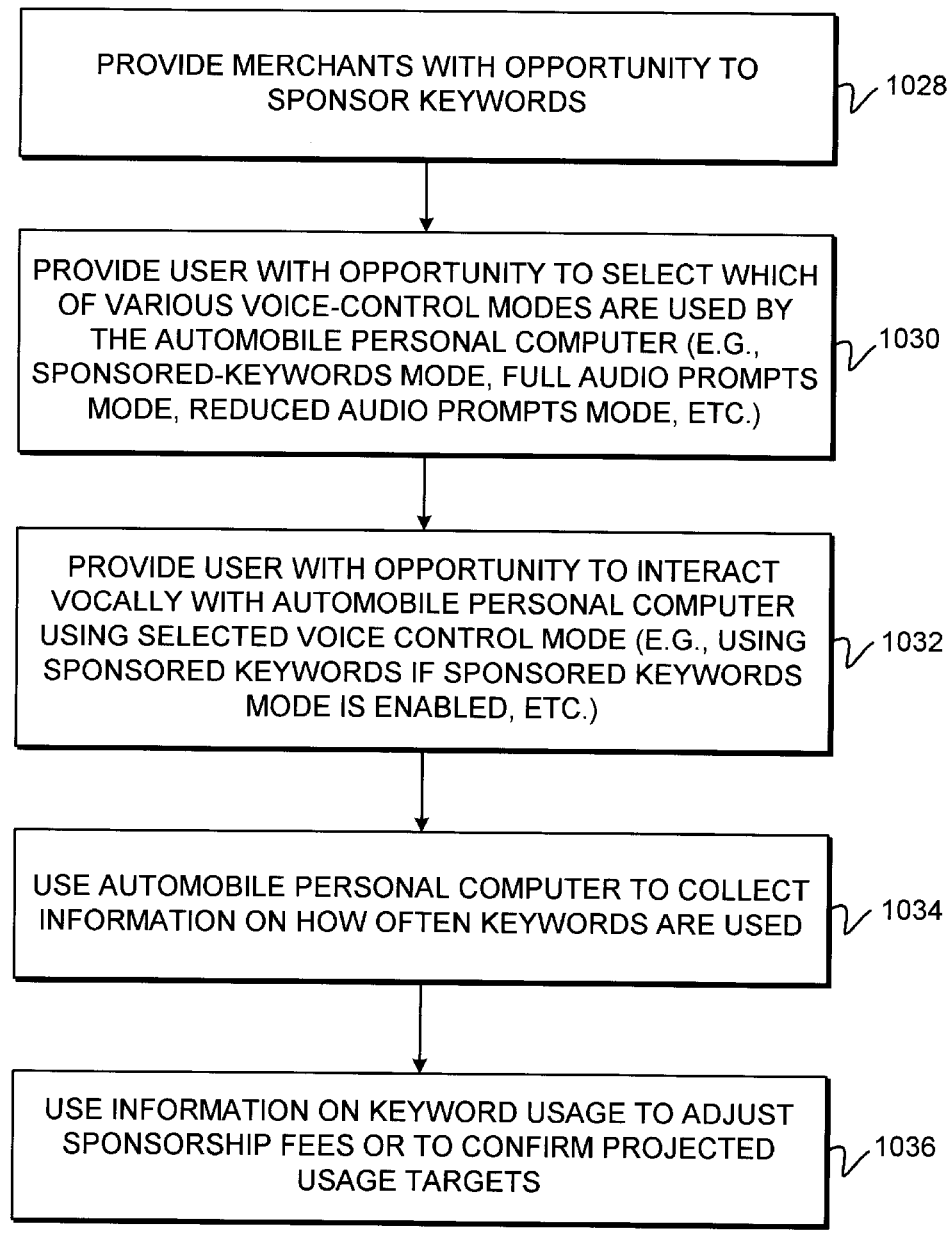
FIG. 95 is a flow chart of illustrative steps involved in allowing the user to use multiple voice-control modes and sponsored keywords in accordance with the present invention.

Automobile personal computer 14 may support different voice-control modes and sponsored keywords. Illustrative steps involved in using automobile personal computer 14 to provide different voice-control modes and sponsored keywords are shown in FIG. 95. At step 1028, merchants may be provided with an opportunity to sponsor keywords. For example, a service provider may use a server to gather keyword information and to charge sponsors. Examples of sponsored keywords are the names of hotel chains, motel chains, restaurant chains, famous hotels and restaurants, other-merchants (e.g., merchants that allow customers to purchase products on-line, etc.), or any other suitable providers of products or services. The keywords are typically proper names or trade-marks, rather than descriptive words of the type otherwise used to control automobile personal computer 14.

The keywords may be programmed into automobile personal computer 14 at the time of manufacturing, may be installed by a dealer or other service technician or by the user, may be downloaded over a local or remote wireless communications link during use of automobile personal computer 14, may be provided to automobile personal computer 14 as an update, etc.

During use of automobile personal computer 14, the user may be provided with an opportunity to select which of various voice-control modes the user desires to use (step 1030). For example, the user may direct automobile personal computer 14 to use a full audio prompt mode in which detailed audio prompts are provided for each possible option. Another option is for automobile personal computer 14 to use a reduced audio prompt mode, in which relatively shorter and less complex audio prompts are provided. If desired, the user may direct that automobile personal computer 14 recognize sponsored keywords.

At step 1032, the user may be provided with an opportunity to interact vocally with automobile personal computer 14, using the selected voice-control mode. In the keyword mode, whenever the user speaks a keyword, automobile personal computer 14 takes an appropriate action that the sponsor has assigned to the keyword. For example, a hotel's name may be used as at keyword. Whenever the user states the name of the hotel to automobile personal computer 14, automobile personal computer 14 may, for example, connect the user with a reservations service for the hotel. The user may be connected to the reservations service by, for example, placing a telephone call to the service or by launching a web browser and automatically directing the browser to the web site for the hotel's reservation service.

At step 1034, automobile personal computer 14 may be used to collect information on how often certain keywords are used. At step 1036, this information, which may be passed to the service provider's server on a periodic basis over a remote wireless link, may be used by the service provider to assess how much to charge for particular keywords and to adjust sponsorship fees accordingly. This information may also be used to confirm to sponsors the usefulness-of the sponsored keyword in attracting interest to the sponsor's product or service.

Figure 96:
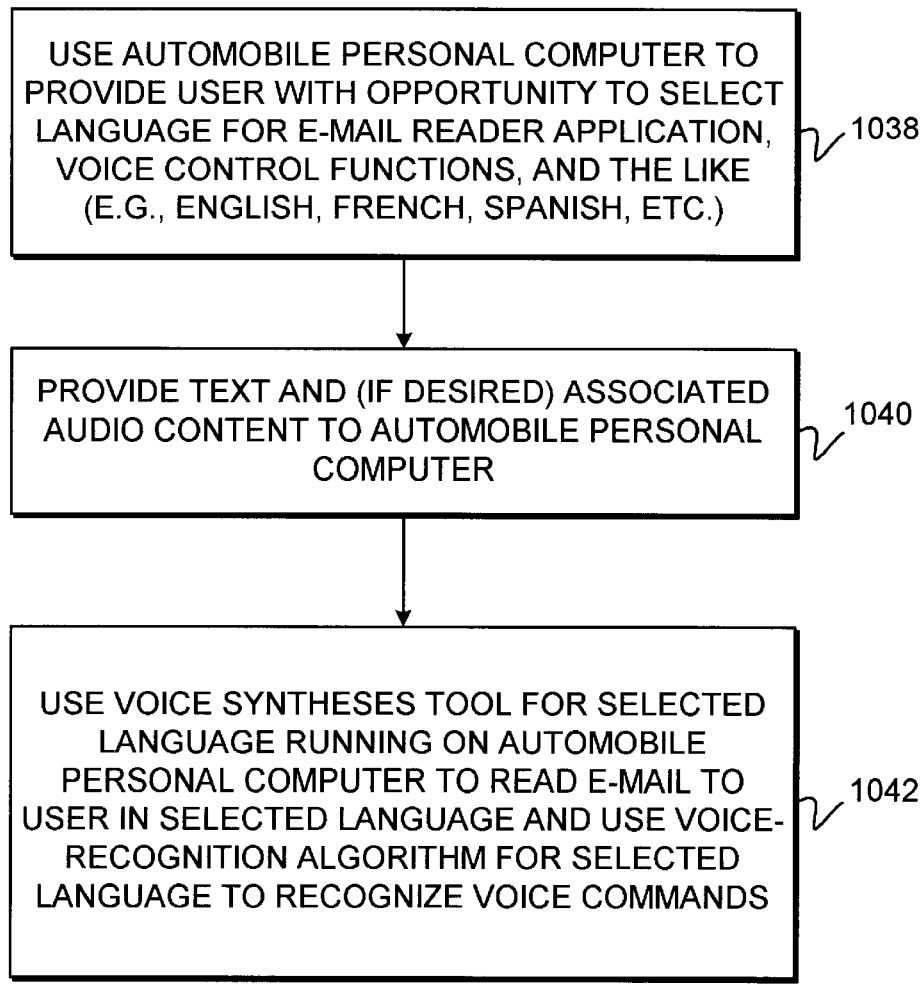
FIG. 96 is a flow chart of illustrative steps involved in using the automobile personal computer to provide the user with the ability to select between various different languages when receiving text messages and the like in accordance with the present invention.

The user may direct automobile personal computer 14 to use different languages when using its voice-recognition and voice-synthesis capabilities. Illustrative steps involved in using automobile personal computer 14 to operate with different languages are shown in FIG. 96. At step 1038, the user may be provided with an opportunity to select a language to use for voice-synthesis operations (e.g., when reading text e-mail and the like) and to select a language to be used during voice control.

At step 1040, automobile personal computer 14 may be provided with text (e.g., in the form of e-mail, books, written memos and other documents, reports, etc.) At step 1042, automobile personal computer 14 may use the selected language when performing voice-synthesis operations on text being read to the user and when recognizing spoken voice commands from the user. For example, if the selected language is French, automobile personal computer will read all e-mail messages as if they were written in French by using a French language voice-synthesis tool. A French language voice-recognition algorithm may be used, so that the user may issue voice commands in French. Selecting the proper language to use during voice synthesis and voice recognition prevents automobile personal computer 14 from mispronouncing foreign text and allows the user to speak in their native language. If desired, a language translation program may be used to translate materials in one language into another.

Figure 97:
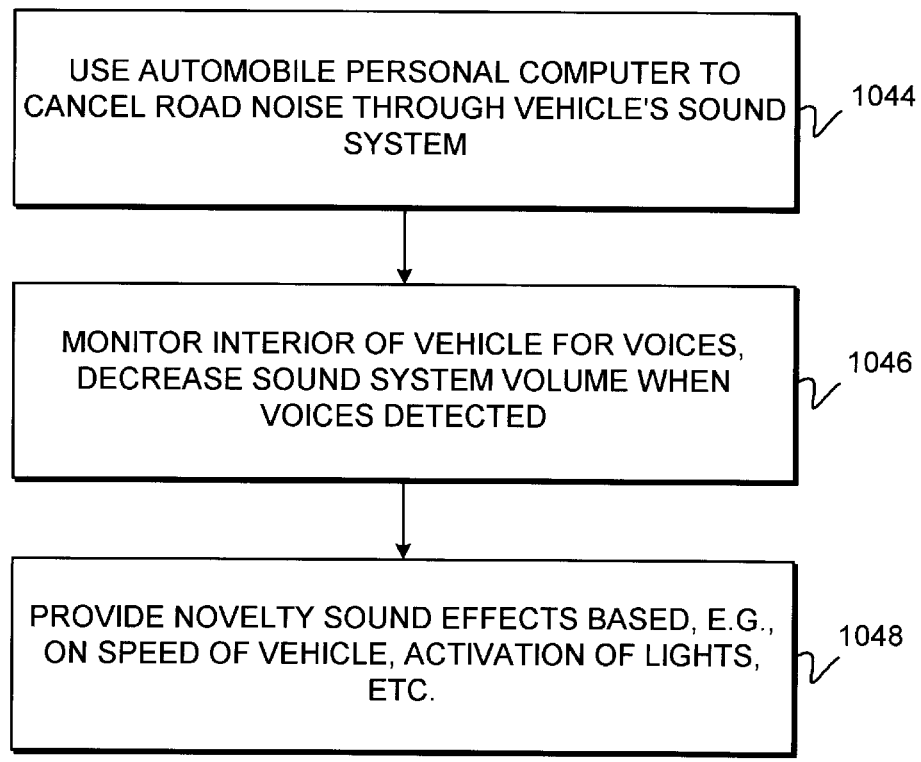
FIG. 97 is a flow chart of illustrative steps involved in processing sound with the automobile personal computer in accordance with the present invention.

Automobile personal computer 14 may process sound using microphones such as microphones 162 and 248 and speakers such as speakers 160 and 246. Illustrative steps involved in using automobile personal computer 14 to process sound are shown in FIG. 97. At step 1044, automobile personal computer 14 may be used to cancel road noise and other ambient noise using active noise suppression techniques. With these techniques, noise is sampled through microphones 162 and 248 and a phase-correlated canceling signal is applied through speakers 160 and 246 in real time.

At step 1046, the interior or automobile 12 is monitored for voices. If an occupant of the vehicle speaks, the volume of any music or other content being played through the automobile's sound system may be reduced. If a period of time passes with no observed speech, the sound system volume may be turned up. If desired, the ambient noise level of automobile 12 may be taken into account (e.g., the noise due to road noise, wind noise, equipment being operated inside the vehicle, etc.)

At step 1048, novelty sound effects may be played through the automobile's sound system. Mock engine noises, brake noises, and tire squeals and the like may be provided. The quality and intensity of such sound effects may be related to monitored vehicle characteristics. Vehicle characteristics may be monitored using vehicle electronics 174. As an example, a mock engine noise may be provided that increases in intensity as the speed of the automobile increase, screeching brake sounds may be provided when the user depresses the brake pedal, and tire squeals may be provided when GPS signals or inertial sensors or compass sensors or the like detect that the automobile is making a turn. For realistic effects, automobile personal computer 14 may generate sound effects that are based on combinations of several such measured parameters. Engine sounds may be provided that replicate the engine sounds of famous automobiles.

Sound effects may also be assigned to functions such as turning on the headlights, using the wipers, opening the door locks or trunk, starting the engine, sounding the horn, etc. If desired, microphone 162 may be used to record a sound sample that is then assigned to a particular function in automobile 12. MP3 files may also be assigned to certain automobile functions. For example, a particular song or other audio clip may be played each time the ignition is started. Automobile personal computer 14 may also use sounds effects such as these to alert the user when e-mail messages are received.

Figure 98:
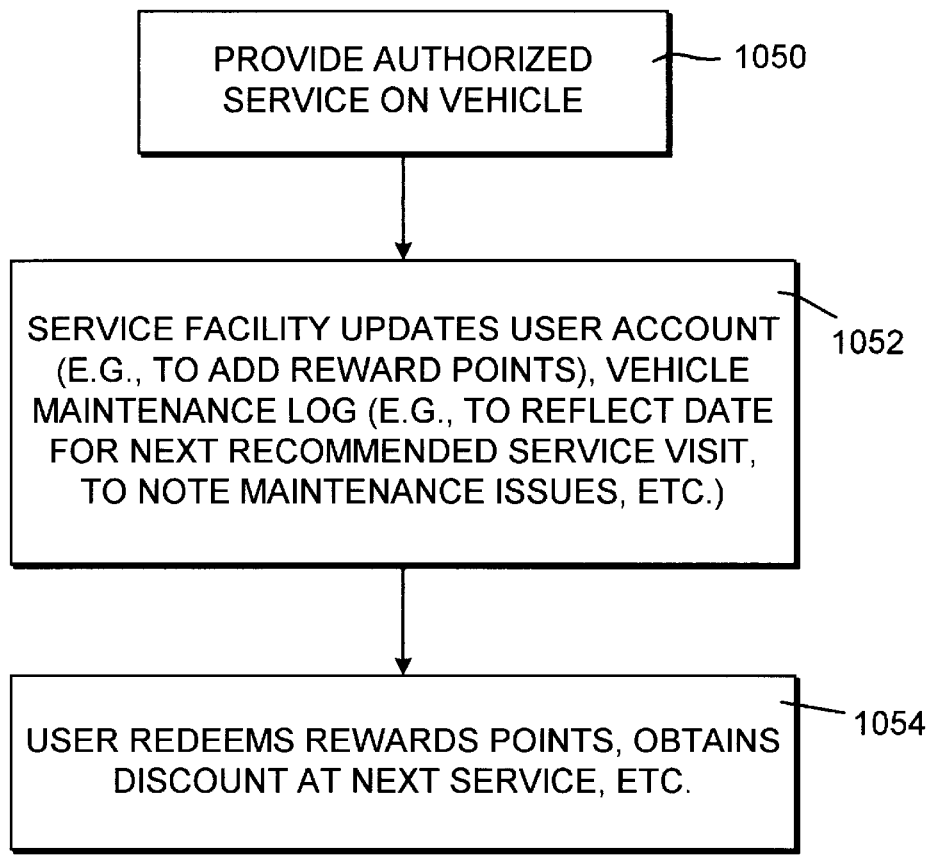
FIG. 98 is a flow chart of illustrative steps involved in using the automobile personal computer to handle maintenance records in accordance with the present invention.

Automobile personal computer 14 may be used to store a maintenance log and information on reward points or the like. Illustrative steps involved in using automobile personal computer 14 to perform these functions are shown in FIG. 98. At step 1050, the user may obtain authorized service for automobile 12. For example, the user may have automobile 12 serviced by the dealer or other authorized service facility. During servicing, service technicians may make notes about particular problems that they observe or any repairs or modifications that are made to automobile 12 (e.g., "idle speed adjusted lower on Oct. 20, 1999," etc.). Some of this information may be gathered using diagnostic computers connected to the vehicle diagnostic system.

At step 1052, this information may be stored in automobile 12 (e.g., in storage 80 or other suitable storage). The service facility may store information in automobile 12 using any suitable technique, such as by using a local wireless link, a remote wireless link, or a physical connection to automobile personal computer 14 or other suitable vehicle electronics. The user may also be given credit in the form of reward points, discounts, and other benefits for using the service facility. Information on these benefits may also be stored in automobile 12 at step 1052. In order to remind the user of the next scheduled service visit, the service facility may store information in automobile 12 on the date of the next recommended service visit, etc.

The information stored in automobile 12 by the service facility may be used in any suitable way. For example, the information may be used to generate electronic reminders (e.g., as e-mail, or automatically played audio messages, or the like). Automobile personal computer 14 may provide the reminders to the user just before service is required. Automobile personal computer 14 may analyze the maintenance log and generate its own reminders. The user may review the contents of the maintenance log (e.g., by using voice synthesis to play the log through the automobile's sound system), by reading it on a display, or by e-mailing the log to the user's home computer or other in-home electronic device, where it may be reviewed at the user's convenience or used to generate an in-home reminder.

At step 1054, the user may redeem the rewards, discounts, or other benefits that were provided at step 1052. As an example, the user may be provided with a free oil change after the service facility determines from the information stored in automobile 12 that the user has had 10 regular service visits.

Figure 99:
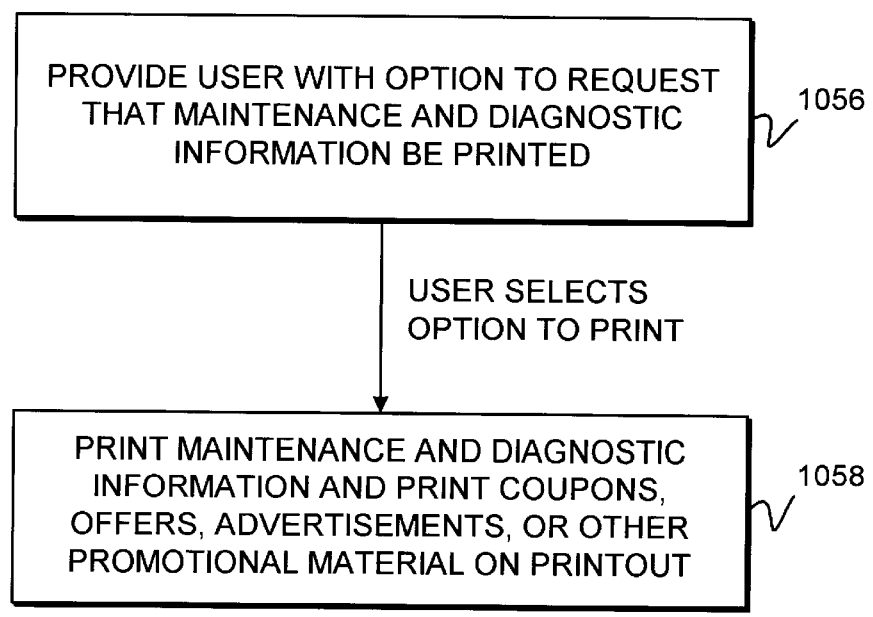
FIG. 99 is a flow chart of illustrative steps involved in printing out maintenance and diagnostic information in accordance with the present invention.

Automobile personal computer 14 may be used to print maintenance and diagnostic reports. Illustrative steps involved in printing such information are shown in FIG. 99. At step 1056, automobile personal computer 14 may be used to provide the user with an option to request that maintenance and diagnostic information be printed. If the user selects this option, automobile personal computer 14 may print maintenance and diagnostic reports at step 1058. The reports may be based, for example, on the maintenance log information that was stored at step 1052 (FIG. 98) or may be based on information from the automobile's diagnostic system. The reports may contain summaries of recommended actions for the user (e.g., rotate tires in September, change oil at 23,000 miles, etc.) If desired, the report may include coupons, offers, advertisements and other promotions (e.g., present this coupon for 10% off your next oil change). Automobile personal computer 14 may limit the number of coupons that are printed if desired.

Figure 100:
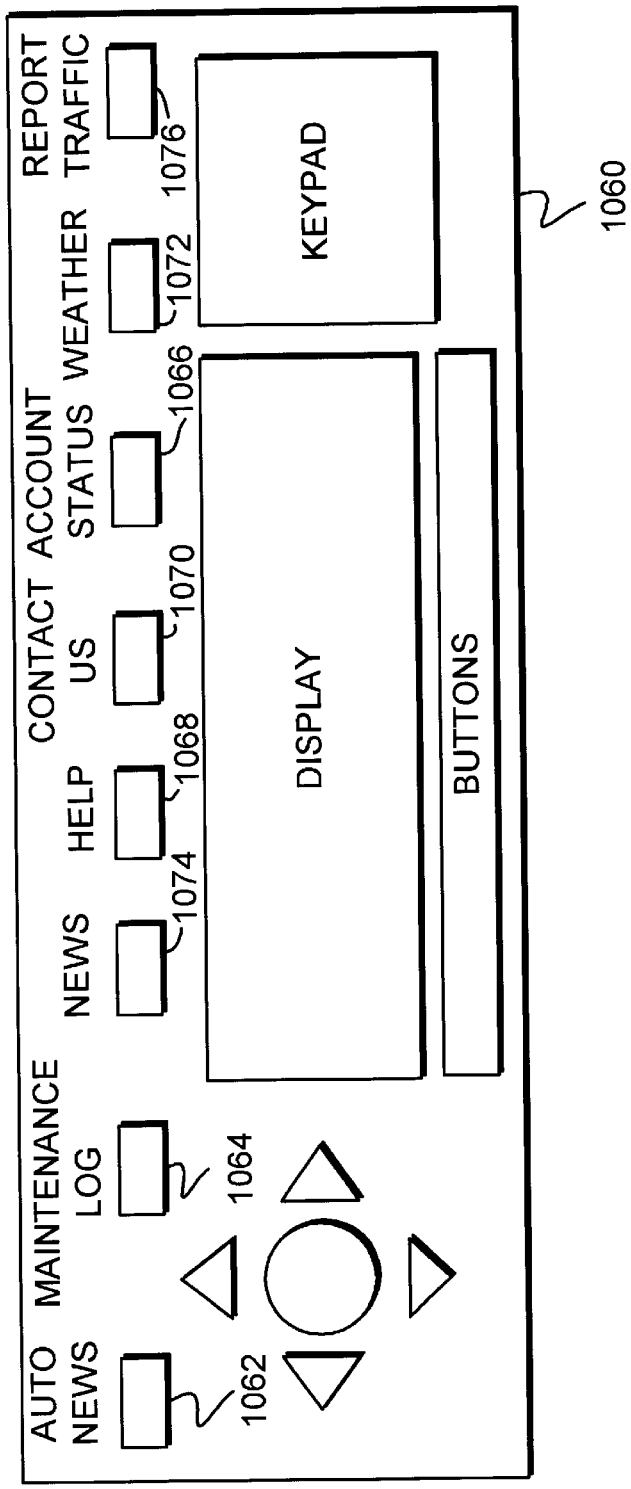
FIG. 100 is an illustrative front view of an automobile personal computer showing how dedicated buttons may be provided that link the user with various services including the services of the automobile manufacturer in accordance with the present invention.

Automobile personal computer 14 may provide features that help the manufacturer and dealer stay in touch with the user after the automobile has been sold. If desired, access to some of these features may be provided using front-panel buttons, as shown in FIG. 100. For example, front panel 1060 of automobile personal computer 14 may have a dedicated button 1062 labeled "auto news." When pressed, this button may direct automobile personal computer 14 to play a promotional audio segment that contains recent news from the manufacturer, such as auto show news, new models, promotional offers for the new model year, trade-in specials, etc. News on recalls may also be provided. The audio segment may be stored locally (e.g., on storage 80 or other suitable storage) or may be obtained using a remote wireless link. If the audio segment is stored locally, it may be updated over a remote wireless link. If desired, the dealer may provide the audio segment (e.g., when automobile 12 is sold to the user, during maintenance visits, etc.) The dealer may provide automobile personal computer 14 with the audio segment using a removable storage media or by downloading the segment over a physical link or a local or remote wireless link. If desired, the audio segment may be-provided in a continuous loop over a radio channel (e.g., a terrestrial or satellite radio channel or data stream). The audio segment may be provided as a download or as streaming audio or as a wireless Internet link. A combination of these approaches or other suitable approaches may also be used.

The audio segment may have associated interactive content. For example, the segment may ask the user to press a button or otherwise respond if the user would like to receive a product brochure in the mail. Products and services may also be ordered. Products and services may be ordered and requests for information may be made using a remote wireless link with the manufacturer or dealer or other suitable entity. Such entities may have, for example, order processing servers for automatically electronically processing user requests from automobile personal computers and the like.

Another button that may be provided is maintenance log button 1064. Pressing this button may direct automobile personal computer 14 to provide the user with options to print maintenance and diagnostic reports, to review maintenance and diagnostic information for automobile 12 (e.g., using voice synthesis), to listen to audio clips on maintenance tips and the like.

Account status button 1066 may be used to retrieve account status information (e.g., the number of reward points or discounts or other benefits that the user has earned).

Help button 1068 may allow the user to listen to information on frequently asked questions. Help button 1068 may also allow the user to access an on-line manual.

Contact us button 1070 may be used to provide the user with an opportunity to send an e-mail message to a customer service representative at the manufacturer, to place a telephone call to a customer service representative, etc.

Dedicated manufacturer or dealer buttons such as buttons 1062, 1064, 1066, 1068, and 1070 may be used to provide information and services for the user and may be used by the manufacturer or dealer as a way to advertise and promote new products, maintain customer loyalty, present advertisements to the user, etc.

The options provided by buttons 1062, 1064, 1066, 1068, and 1070 are merely illustrative. Any suitable options for promoting the interests of the dealer and manufacturer while providing services to the user may be provided if desired.

Moreover, options such as the options of buttons 1062, 1064, 1066, 1068, and 1070 may be provided using different combinations of buttons, using audio options, or on-screen options, or combinations of such arrangements. The content associated with these options may include, text, graphics, audio, and video, may be informative or promotional, and may be interactive or passive.

Additional dedicated buttons may be provided. As an illustrative example, a button such as weather button 1072 may be pressed to receive weather information. The information may be provided over a terrestrial or satellite broadcast link, a remote wireless link (e.g., a remote wireless Internet link), as part of a terrestrial data broadcast, or using any other suitable technique. News information may be received similarly, by pressing button 1074. If the user presses report traffic button 1076, the user may be provided with an opportunity to submit a traffic report. If desired, users may assign different tasks to different buttons, thereby customizing the buttons. Moreover, any of the options or functions provided by automobile personal computer 14 may be assigned to a dedicated or nearly-dedicated button by the manufacturer, the user, or any other suitable entity if desired.

Figure 101:
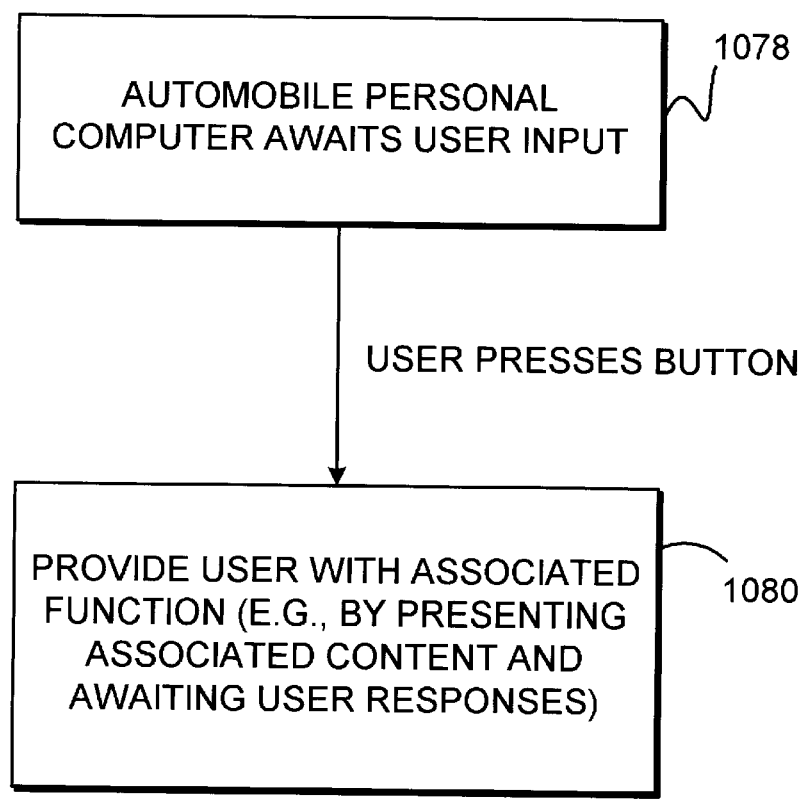
FIG. 101 is a flow chart of illustrative steps involved in allowing a user to use automobile personal computer buttons such as those shown in FIG. 100 in accordance with the present invention.

Illustrative steps involved in providing options such as the options provided by buttons 1062, 1064, 1066, 1068, 1070, 1072, and 1074 are shown in FIG. 101. At step 1078, automobile personal computer 14 awaits user input. After a user presses a button, automobile personal computer 14 provides the use with the function associated with the button at step 1080. This involves presenting appropriate content associated with the button and awaiting user responses to any interactive content.

Figure 102:
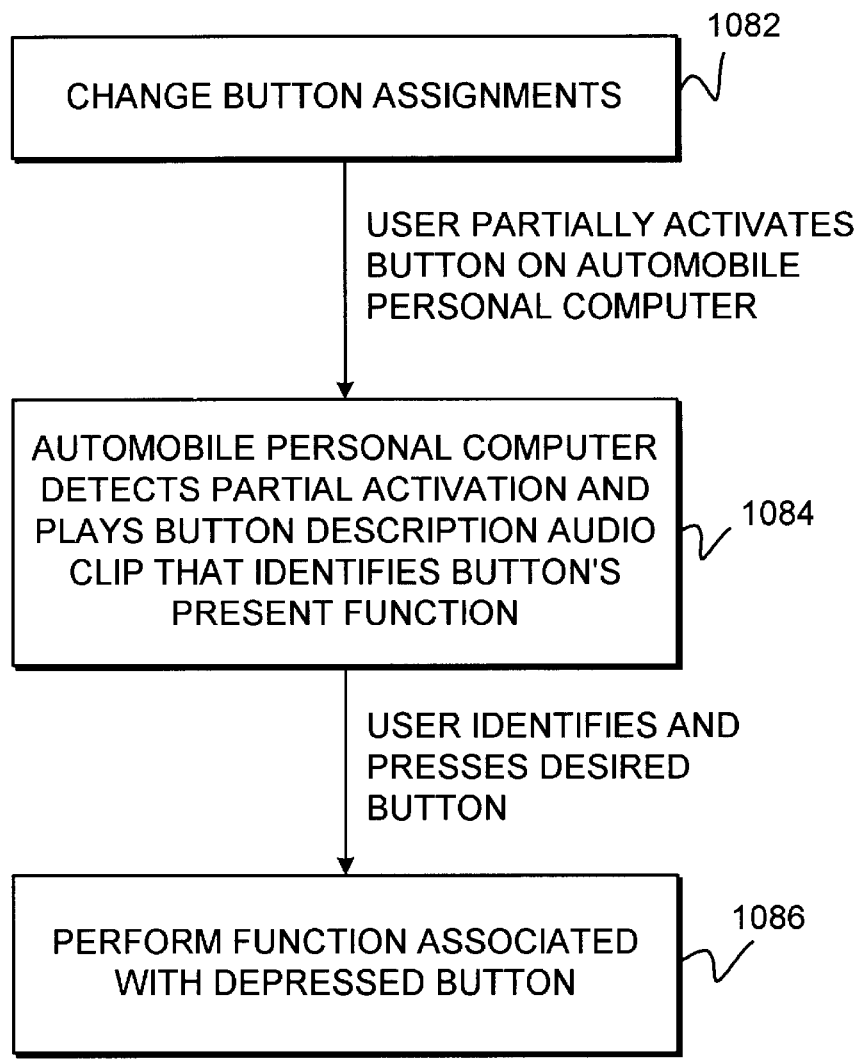
FIG. 102 is a flow chart of illustrative steps involved in providing audio descriptions of button functions in accordance with the present invention.

Automobile personal computer 12 may assist the user in locating buttons of interest by presenting an audio description of each button when it is partially depressed or otherwise partially selected. Illustrative steps involved in providing audio labels for buttons are shown in FIG. 102. At step 1082, automobile personal computer 14 may be used to change button assignments. Buttons assignments may be changed by voice command, physical input, on-screen options, remote control, downloading software (e.g., by the user, dealer, manufacturer, or other entity), etc. During button customization, audio clip descriptions may be provided for each button. Automobile personal computer 14 may allow the user to record a button description using microphone 162. Regardless of the origin of button description audio clips, at step 1084, after a user partially activates a button (e.g., by partially depressing or touching the button, etc.), automobile personal computer 14 may detect the partial activation or partial selection of the button at step 1084. Audio personal computer may play the button description audio clip that is associated with the partially activated button through the automobile's sound system. The button description audio clip describes the current function assigned to the button. After the user has identified a desired button and pressed that button, automobile personal computer 14 may perform the function associated with the button at step 1086. This approach may also be used even if the button functions are not customizable.

Figure 103:
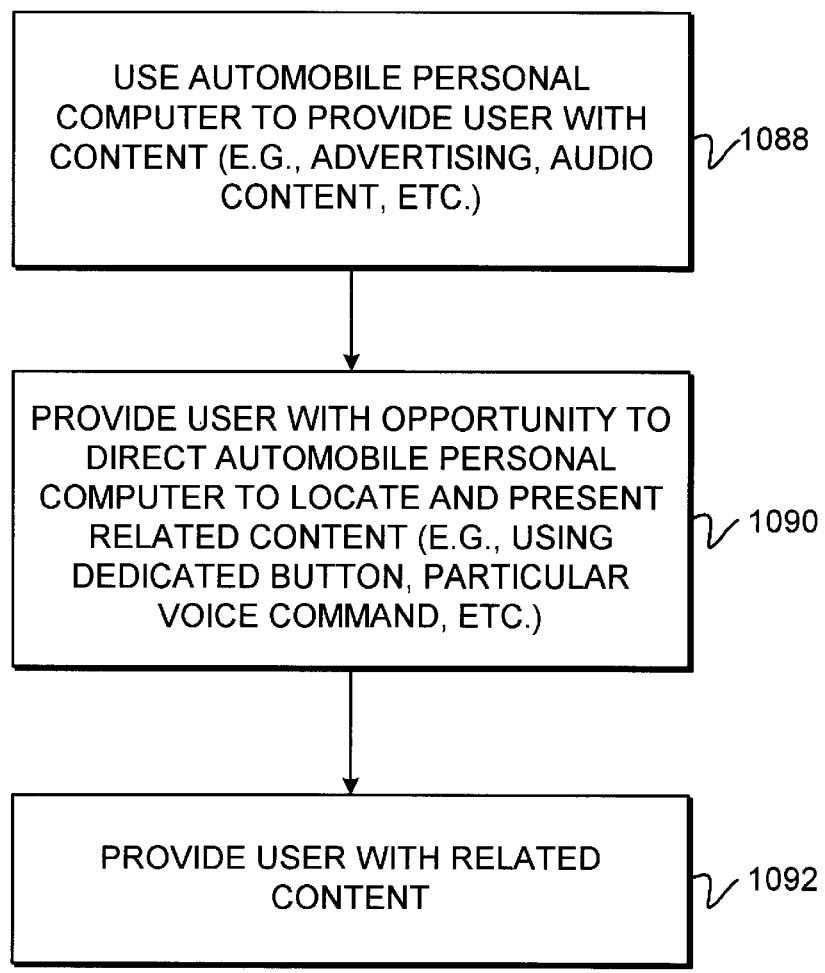
FIG. 103 is a flow chart of illustrative steps involved in using the automobile personal computer to assist the user in locating related content in accordance with the present invention.

Automobile personal computer 14 may be used to assist the user in locating content that is related in some way to content that the user likes. Illustrative steps involved in using automobile personal computer 14 to locate related content are shown in FIG. 103. At step 1088, automobile personal computer 14 may be used to provide the user with content. The content may be promotional or informational in nature. It may be an advertisement. It may be an electronic book or a music clip. The content may be related to music or news. The content may be passive or may have an interactive component. The content may contain text, graphics, audio, or video. Video content may or may not have an accompanying audio track.

At step 1090, automobile personal computer 14 may provide the user with an opportunity to direct automobile personal computer 14 to locate and present related content. For example, this opportunity may be presented to the user using a dedicated button or buttons, using an on-screen option, using a voice-command interface, using a remote-control arrangement, or using any other suitable technique.

At step 1092, automobile personal computer 14 may present the user with related content. For example, if the original content was related to skiing, selecting the related-content option may cause automobile personal computer 14 to locate and present additional content related to skiing or winter sports. If the original content was a stock market report, selecting the related-content option may cause automobile personal computer 14 to locate and present content related to financial news. If sufficient related content is located, the user may be provided with an option to select which related content the user wishes to be presented with from a list (e.g., an audio list).

Figure 104:
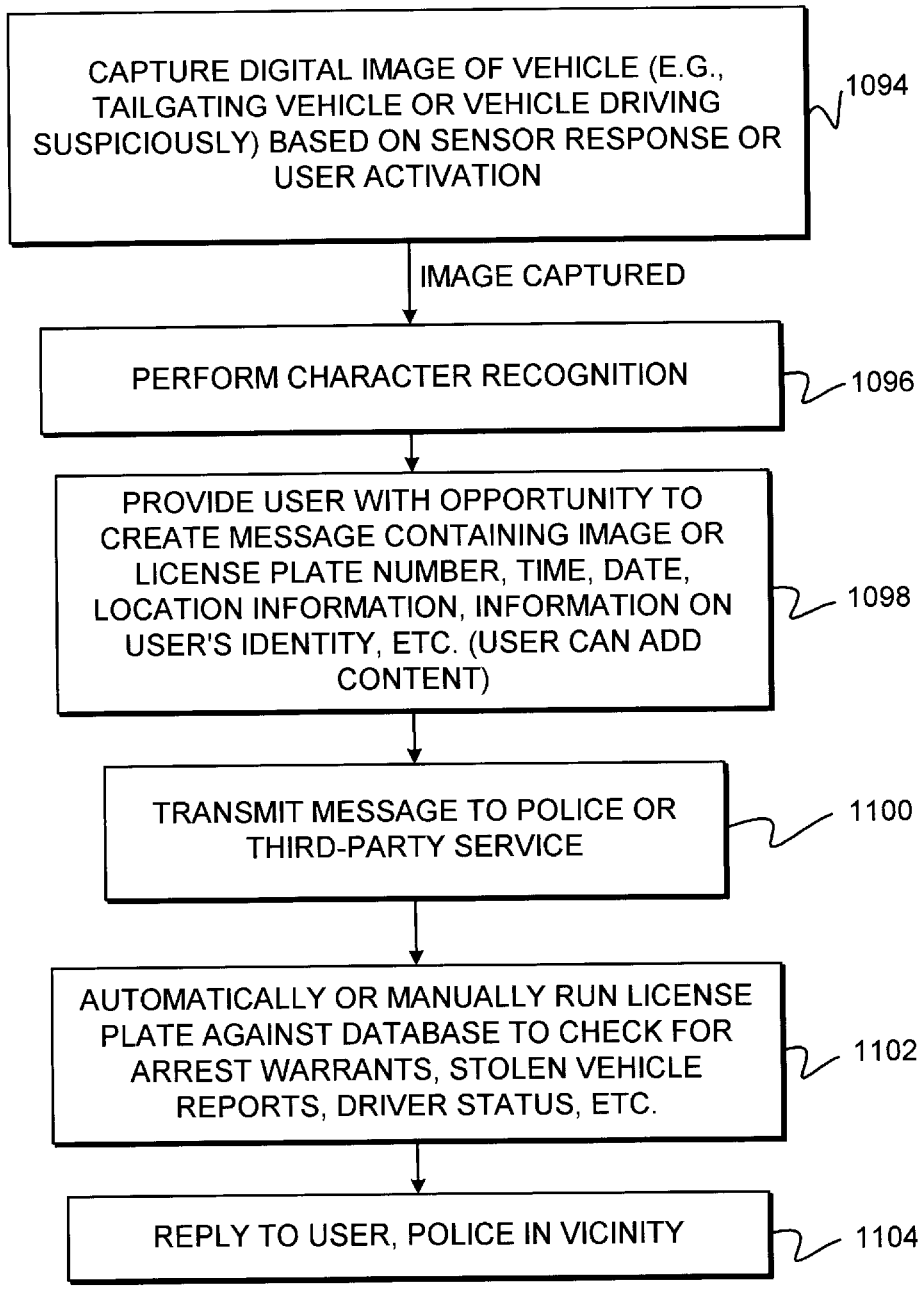
FIG. 104 is a flow chart of illustrative steps involved in using the automobile personal computer to capture images with information on license plates or the like in accordance with the present invention.

Automobile personal computer 14 may use a digital camera such as digital camera 170 to capture images of license plates. Illustrative steps involved in using automobile personal computer 12 to capture images of license plates are shown in FIG. 104. At step 1094, digital camera 170 may be used to capture a digital image of a license plate. The image may include the license plate and an image of the driver of the tailgating vehicle if desired. Digital camera 170 may be mounted in a rear window and face the automobile that is following behind automobile 12, or may be mounted in any other suitable location. Digital camera 170 may be activated automatically (e.g., when automobile personal computer 14 detects that the automobile behind automobile 14 is tailgating based on a reading from proximity sensor 180). Digital camera 170 may also be manually activated. For example, the user may issue a vocal command such as "capture image" to automobile personal computer 14 that directs automobile personal computer 14 to direct digital camera 170 to capture an image. If desired, a video camera may be used. Digital images may be captured from the video camera by automobile personal computer 14 (e.g., digital images may be captured in memory in automobile personal computer 14). Another approach is for digital camera 170 to initiate image capture and to pass the captured image to automobile personal computer.

If desired, automobile personal computer 14 may perform a character recognition process at step 1096 to extract the license plate number form the image.

At step 1098, automobile personal computer 14 may be used to automatically create a message containing the captured image, the license plate number (if extracted), information on the time and date at which the image was captured, information on the location of the image capture (e.g., determined by GPS or other suitable techniques), the name and the address and telephone number (e.g., the automobile's cellular telephone number) and e-mail address (e.g., the automobile's e-mail address), and any other such information. The user may modify the message before it is sent or it may be automatically sent.

The message may be sent to the police or any other suitable entities (e.g., insurance companies) at step 1100. At step 1102, the license plate number may be compared against a database to see if there is an outstanding arrest warrant, or stolen vehicle report, or other such information associated with the vehicle. The comparison step of 1102 may be performed by the police or other such entity or may be performed by automobile personal computer 14 by accessing a suitable database using a remote wireless link. At step 1104, the results of the license plate investigation of step 1102 may be provided to the user at automobile personal computer 14 and may be provided to police in the vicinity. The results may be provided to the user by e-mail. The results may be provided to the police by a dispatcher or by using e-mail or other suitable messaging technique.

Figure 105:
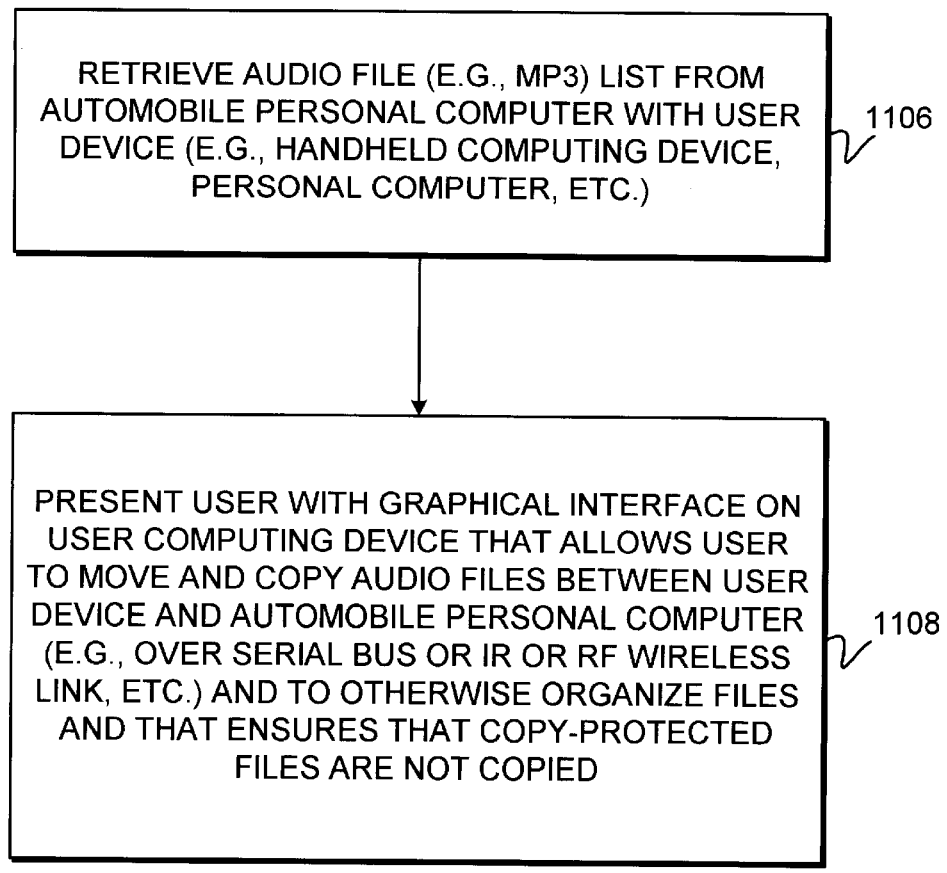
FIG. 105 is a flow chart of illustrative steps involved in allowing a user to use a user computing device such as personal computer or handheld computing device to move copies of audio files such as MP3 files between the automobile personal computer and the user computing device in accordance with the present invention.

Audio files such as MP3 files may be copied and moved between automobile personal computer 14 and user devices such as personal computers, portable computers, handheld computing devices, in-home electronic devices, etc. Such files may be copy-protected. Illustrative steps involved in using automobile personal computer 14 to handle digital audio files and other such files are shown in FIG. 105. At step 1106, an audio file list may be retrieved from the automobile personal computer 14 by the user device. The user device and the automobile personal computer 14 may be in communication over a physical link, a local RF wireless link, an IR link, or a remote wireless link. At step 1108, the user device may be used to present the user with a graphical interface that allows the user to move and copy audio files between the user device and the automobile personal computer and to otherwise organize these files. The graphical interface does not allow copy-protected files to be copied.

Figure 106:
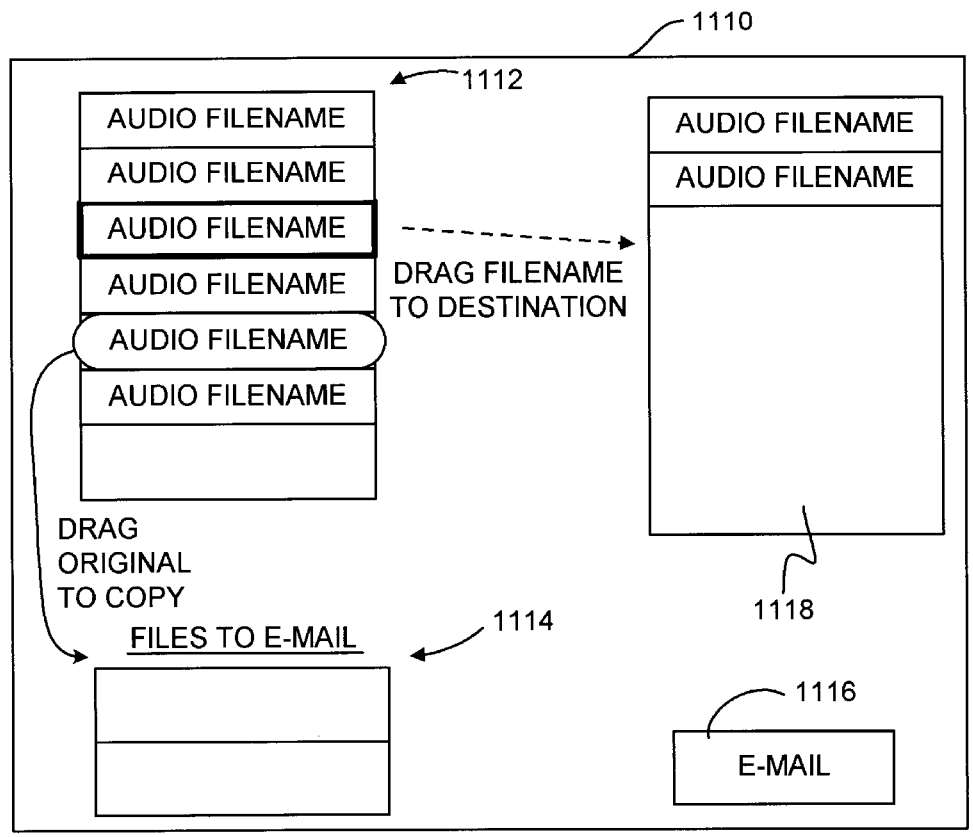
FIG. 106 is an illustrative screen that may be provided to allow the user to move copies of audio files such as MP3 files between the automobile personal computer and the user computing device in accordance with the present invention.

An illustrative graphical interface 1110 that the user device may present is shown in FIG. 106. A list 1112 may be presented that includes information on various audio files that are stored on automobile personal computer 14. The user may drag files (e.g., using a pointing device) to region 1114. Files dragged to region 1114 may be sent by e-mail by selecting e-mail option 1116. Files may be dragged to target region 1118 to move them to the user device.

Figures 107A, 107B:
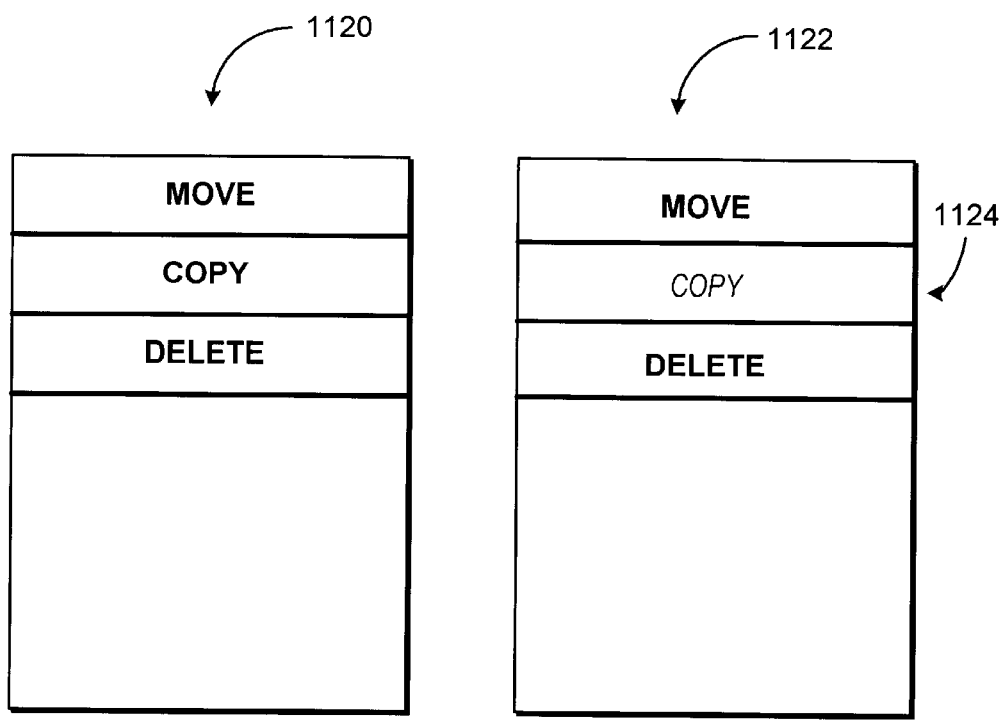
FIGS. 107a and 107b are illustrative drop down menus that may be provided when there is or is not copy protection in place when copying files in accordance with the present invention.

Copy functions may be accessed using a drop down menu. An illustrative drop down menu 1120 is shown in FIG. 107*a*. Menu 1120 may be accessed, for example, by pressing an appropriate button while highlighting one of the filenames in list 1112. If a selected file is copy protected, a menu such as menu 1122 of FIG. 107*b* may be presented. In menu 1122, copy option 1124 is reduced in intensity to indicate that this function is not available for the selected file (e.g., because a serial copy management scheme or other copy protection scheme is being used).

Figure 108:
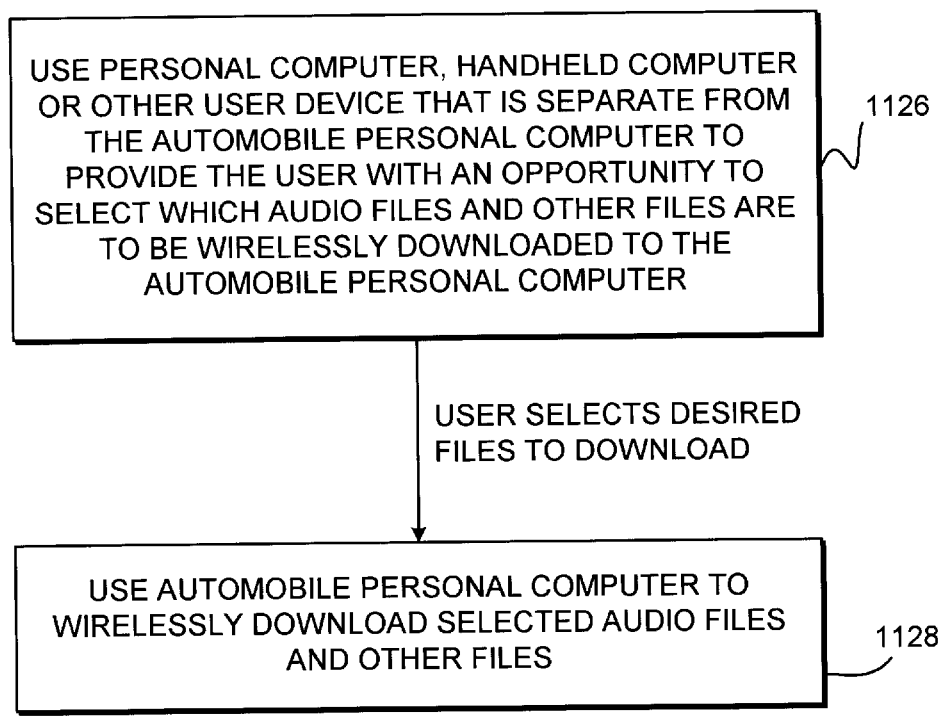
FIG. 108 is a flow chart of illustrative steps involved in allowing the user to arrange for the remote download of audio files or other files to the automobile personal computer in accordance with the present invention.

Digital audio files such as MP3 files may be downloaded to automobile personal computer 14. For example, the user may use a web browser running on automobile personal computer 14 to locate and download such files. The user may sometimes desire to download digital audio files to automobile personal computer 14 while the user is at a location that is remote from automobile personal computer 14. Illustrative steps involved in arranging for a download of digital audio files to automobile personal computer 14 from a location remote from automobile personal computer 14 are shown in FIG. 108.

At step 1126, a user device that is remote from automobile personal computer 14 may be used to arrange for the downloading of digital audio files to automobile personal computer 14. The user device may be a personal computer, a portable computer, a handheld computing device, an in-home electronic device, a cellular telephone, or any other suitable electronic device. At step 1126, the user device is used to provide the user with an opportunity to select which audio files or other files are to be wirelessly downloaded to automobile personal computer 14. For example, a list of available audio file titles may be displayed on the display of the user device. The user may use a pointing device or other user input arrangement to select certain files for downloading. The user may, for example, click on a desired MP3 audio file using an arrow. At step 1128, the selected files are wirelessly downloaded to automobile personal computer 14 over a wireless link. For example, a selected digital audio file may be downloaded to automobile personal computer 14 from a web site or other source implemented on a server connected to the Internet or the like over a remote wireless link. The digital audio file does not need to pass through the user device.

Figure 109:
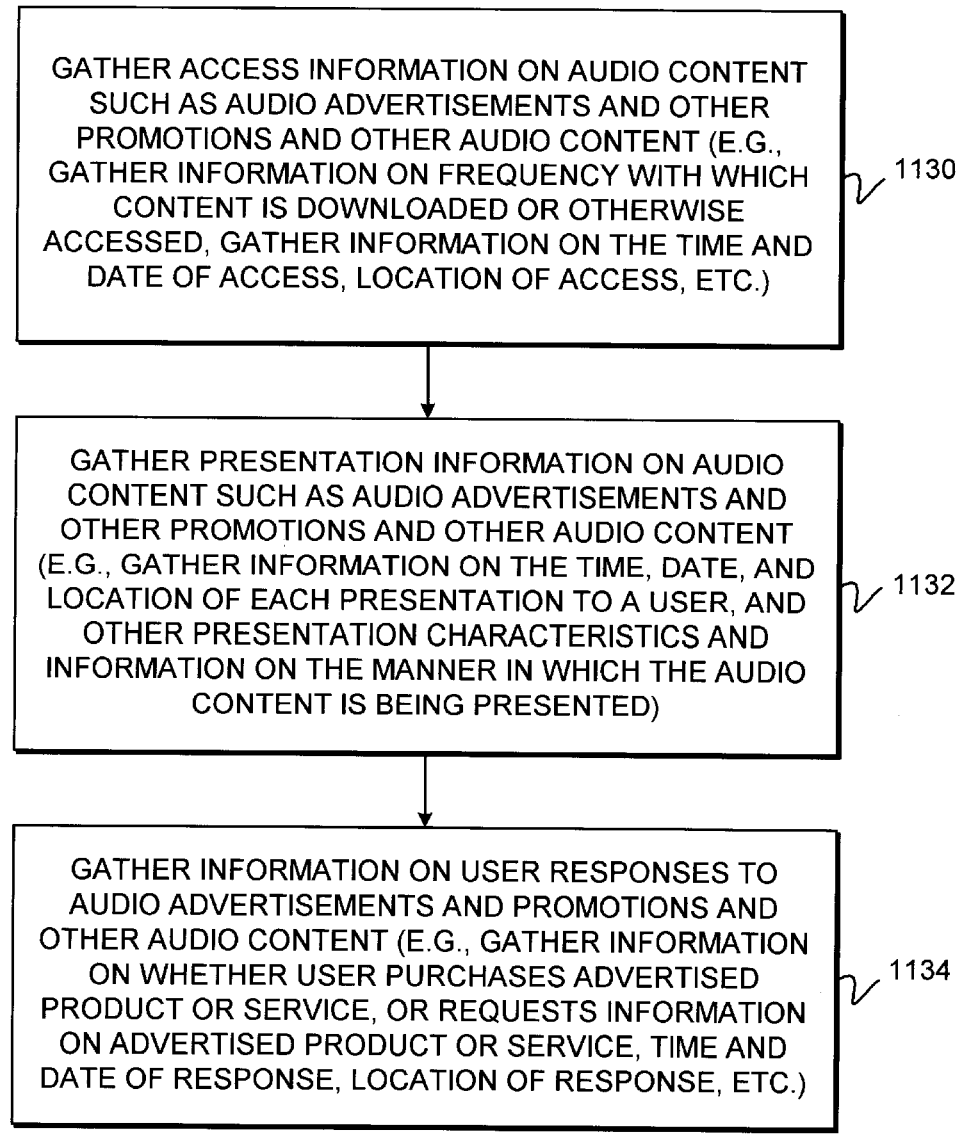
FIG. 109 is a flow chart of illustrative steps involved in gathering information on the accessing, presentation, and response to various content in accordance with the present invention.

It may be desirable to gather information on the use of interactive audio that is provided to the user. Illustrative steps involved in gathering such information are shown in FIG. 109. At step 1130, access information may be gathered. For example, information may be gathered on what materials are downloaded by the user or otherwise received by the user. This information may include information on the content of the materials, the date and time the materials were downloaded or otherwise accessed, the location of automobile 12 when the materials were accessed, etc.

At step 1132, presentation information may be gathered. Materials may not be presented to the user at the same time that the materials are first accessed. For example, a digital audio file may be downloaded one day and listened to the next day. Step 1132 involves monitoring when information is presented to the user (e.g., when the user listens to audio materials through the sound system of automobile 12). Information may be gathered on the time and date at which information was presented to the user. Information may also be gathered on the location of automobile 12 when the audio materials were presented, etc.

The user may or may not respond to the interactive components associated with the audio materials. At step 1134, response information may be gathered. For example, information may be collected on whether or not the user responded. If the user does respond to interactive materials, information may be collected on the time and date of the user's response. Information may be collected on the location of automobile 12 when the user responded. Information may also be collected on the nature of the user's response. For example, information may be collected indicating whether a product or service was purchased, how much the user spent, whether the user requested information, whether the user responded by requesting that the user be notified of certain events using reminders, etc.

These examples are merely illustrative. Any suitable information may be gathered regarding accessing, presenting, and responding to audio content. The monitoring activities of steps 1130, 1132, and 1134 may be performed as separate steps or may be performed together in any suitable combination. The information that is gathered at steps 1130, 1132, and 1134 may be provided to a remote server or the like over a remote wireless link. The information may be automatically provided to the remote server at regular intervals or may be provided to the remote server when the user makes an interactive purchase. If desired, a combination of these approaches or any other suitable approach may be used to provide the information to the remote server. The information may be analyzed at the remote server and used by service providers and sellers of advertisements. For example, the information may be used in setting and adjusting advertising rates and in collecting fees from advertisers. Analyzing the information may allow the effectiveness of a given advertising scheme to be improved.

An example of the monitoring approach of FIG. 109 involves the monitoring of the user's interactions with an MP3 music preview clip. Initially, the user downloads the preview clip. At step 1130, it may be determined that the user has downloaded the clip as part of a daily subscription to an MP3 preview clip service. The download may be performed using a remote wireless connection to a server that is remote from automobile personal computer 14. As step 1132, it may be determined that the user has listened to the preview as the user drives to work. The clip has an associated interactive component that provides the user with an opportunity to purchase a CD that was previewed during the clip. At step 1134, it may be determined whether or not the user purchases the CD.

If it is determined that the preview clip is not downloaded often, it may be necessary to provide more interesting content. If the clip is downloaded frequently, but is only infrequently listened to, the clip may be too long. If the clip is downloaded and listened to frequently, but the response rate to the interactive opportunities provided to the user is low, then it may be necessary to provide more interactive content (e.g., more interactive advertisements and interactive purchasing prompts and the like) or it may be necessary to lower prices.

Another example relates to interactive broadcast services. With these arrangements, audio broadcast materials with associated interactive components may be provided to users. Access and presentation information may be gathered using the same techniques that are used to gauge listenership for traditional radio stations (e.g., surveys, etc.). If a given broadcast service is offered on a subscription basis, access and presentation information may be deduced from information on the number of subscribers to the service. Information on the responses to the interactive components associated with the broadcast service may be gathered, for example, each time the user responds to an interactive advertisement or the like. This information may be gathered at a remote facility and used to set and justify advertising rates to advertisers and to charge advertisers for advertisements that have been sold on the basis of the number of responses that are received.

Because not all recipients of an interactive radio broadcast may have an automobile personal computer 14 with which to electronically respond to an interactive opportunity, interactive advertisements may be presented only to users with interactive equipment (e.g., automobile personal computer 14). If desired, both noninteractive and interactive advertisements may be provided with the broadcast. As an example, a satellite or terrestrial radio broadcast may be used to supply passive audio content with noninteractive advertisements. Automobile personal computer 14 may receive this broadcast while receiving interactive advertisements over a remote wireless Internet link. Both types of advertisements may be provided at the same time. Recipients without interactive equipment may be presented with the noninteractive advertisements, whereas the user at automobile personal computer 14 may be presented with the interactive advertisements by inserting the interactive advertisements in place of the noninteractive advertisements.

Figure 110:
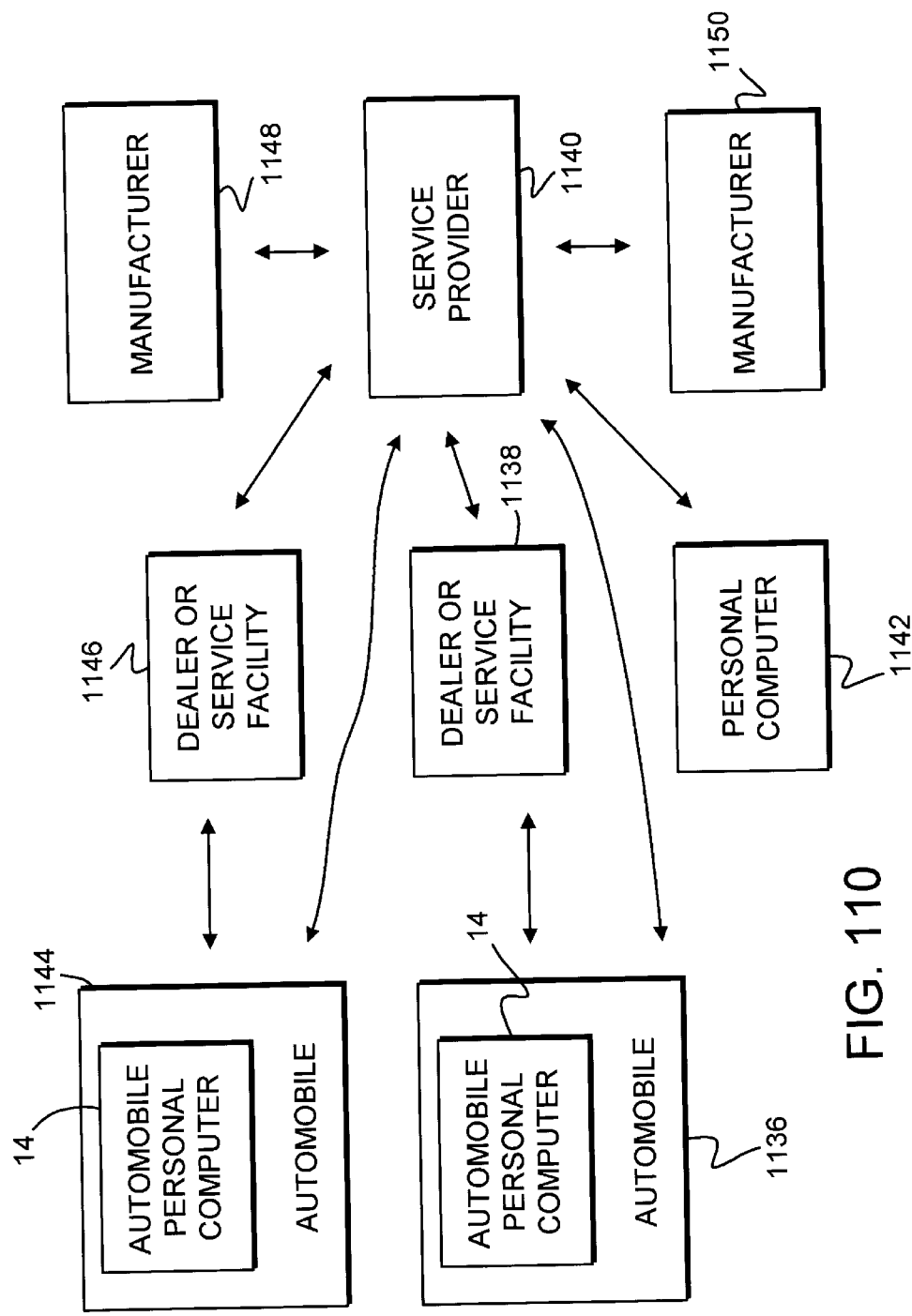
FIG. 110 is a schematic diagram showing how a dealer or other service station facility and a service provider may communicate with an automobile personal computer in accordance with the present invention.

The user may be presented with materials such as reminders, informative and promotional content, and interactive content from dealers and manufactures through a service provider. An illustrative service provider arrangement is shown in FIG. 110. A user at automobile 1136 with an automobile personal computer may communicate with a dealer or service facility 1138 and a service provider 1140. Dealer 1138 may also communicate with service provider 1140. The dealer or service facility may, for example, be the dealer at which the automobile was purchased and is serviced or another service facility at which the automobile is serviced. The service provider 1140 may provide information (e.g., in the form of custom web pages or the like) to personal computers such as personal computer 1142.

Service provider 1140 may support multiple owners and dealers. For example, an owner of automobile 1144 with an automobile personal computer who uses dealer 1146 may communicate with service provider 1140. Automobile 1144 may also communicate with dealer 1146. Service provider 1140 may provide services for multiple manufacturers 1148 and 1150.

During communications between automobiles and dealers (or other service facilities), diagnostic information and other vehicle information from each automobile that is gathered by the vehicle electronics 174 of that vehicle may be provided to the appropriate dealers. For example, information on engine performance, odometer readings, diagnostic codes and the like may be provided (e.g., over a physical connection, an IR link, a local wireless link, or a remote wireless link, or by a physical transfer of a storage media or any other suitable approach). The information may be provided using the automobile personal computer. If desired, some information (e.g., diagnostic codes) may be obtained by the dealer using diagnostic equipment that interfaces with the automobile's diagnostic system directly, without involvement of the automobile personal computer. Materials may also be provided from the dealer to the automobile (e.g., promotional materials, reminders and the like). Such materials may be provided to the automobile personal computer over any suitable link (e.g., over a physical connection, an IR link, a local wireless link, or a remote wireless link) or by a physical transfer of a storage media.

Automobiles may communicate with service provider 1140 over any suitable link (e.g., a remote wireless link). If desired, the service provider may communicate with the automobiles through the dealers or service facilities. The service provider may provide the automobiles with downloads of software and audio content and the like and may provide the automobiles with access to web content and the like. The automobiles may provide information to the service provider such as vehicle diagnostic codes, sensor readings, other vehicle characteristics, information on how the user is accessing, presenting, and responding to advertisements and other content, or any other suitable information.

Service provider 1140 may communicate with personal computers such as personal computer 1142 and other computing devices and in-home electronic devices over wireless or wired communications paths (e.g., over the Internet). Service provider 1140 may provide users at such devices with web pages and other material. This material may contain information on maintenance, promotions, advertisements, news and press releases from the manufacturers, recall information, information on sales, etc. Users may provide personal information regarding their automobiles and their automobile-related interests and the like.

Service provider 1140 may, if desired, communicate with multiple manufacturers over communications links such as the Internet, other network links, wireless links, or any other suitable communications paths. Manufacturers may supply service provider 1140 with information on new products to be promoted, news, press releases, manuals, answers to frequently asked questions, information on accessories and options for owners of existing automobiles, etc. This information may be made available to users at automobiles 1136 and 1144 and personal computer 1142.

One reason that the arrangement of FIG. 110 may be desirable is that it allows users to interact with different dealers and to obtain information from different manufacturers using a common service provider. Because the service provider has access to information such as diagnostic codes and readings from vehicle sensors and other information provided by automobiles and dealers and because service provider has access to information from multiple manufacturers, users may be provided with reminders, messages, promotions, advertisements, vehicle performance statistics, and various other services. For example, the user may be provided with service reminders at the automobile personal computer or other computing device based on the actual mileage of the user's automobile. The user may be provided with interactive opportunities to schedule service visits using the automobile personal computer or other computing device. The user may be provided with discounts, coupons, rewards points, and other promotions. These promotions may be sponsored by manufacturers or dealers. The promotions may be provided to the user by service provider 1140.

If desired, a dealer, service facility, manufacturer, the user, or other suitable entity may install dormant messages on the automobile personal computer. Dormant messages may include text, graphics, audio, and video. They may be provided through the automobile's sound system and displayed on the displays of automobile personal computer 14. Messages may be displayed as though they are incoming e-mail messages even though they may be provided from a local source (e.g., storage within automobile 12). The messages may include interactive content. The interactive content may allow the user to purchase products or services, schedule service visits, request information, etc. Remote or local wireless communications link may be used to initiate and consummate such transactions. The messages may be informative or commercial (e.g., advertisements) or may include a combination of such content. Any suitable act may be used to trigger the presentation of a dormant message. For example, messages may be presented upon reaching a give date, exceeding a threshold sensor value, etc.

Dormant messages may be installed in storage 80 of automobile personal computer 14 by any suitable entity. As an example, the manufacturer of the user's automobile may install a dormant advertisement. The advertisement may be triggered by reaching a certain calendar date or by reaching a certain mileage on the odometer. For example, when automobile personal computer 14 determines that the user has driven 15,000 miles, an audio message may be played or otherwise presented for the user that advises the user that a 15,000 mile check-up is recommended by the manufacturer. The advertisement may also inform the user that there will be a discount of 20% if the user has the automobile serviced within 200 miles or 10 days. The advertisement may provide the user with an interactive opportunity to schedule an appointment for a service visit. For example, the user may be provided with a prompt that asks the user to speak the voice command "schedule now" to schedule an appointment. The appointment may be scheduled automatically (e.g., by automatically sending a message to a server or other equipment at the dealer or other location that informs the dealer of the desired time for the appointment, or by establishing a remote wireless communications link between the automobile personal computer and the dealer that allows the-user to automatically interact with an automatic scheduler program running on a server or the like). The appointment may also be scheduled by using automobile personal computer to automatically place a call to a customer service representative who may assist the user in scheduling the appointment. A remote wireless communications link may be used to connect the automobile to the scheduling service.

Figure 111:
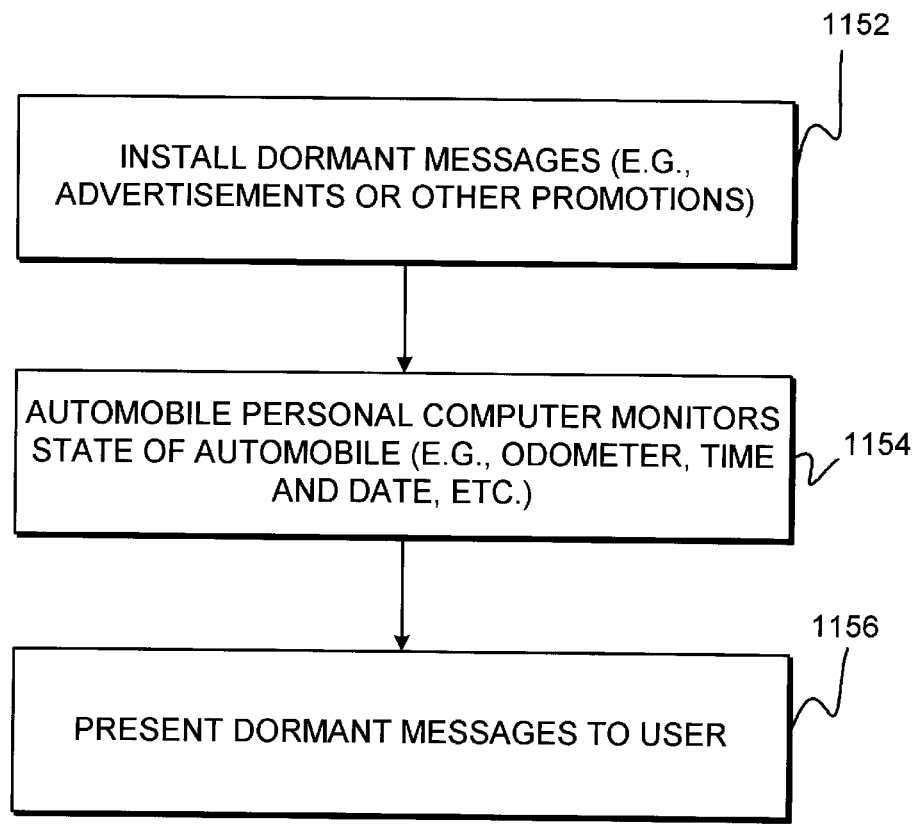
FIG. 111 is a flow chart of illustrative steps involved in providing dormant advertisements and other messages to a user in accordance with the present invention.

Illustrative steps involved in providing dormant advertisements and other such promotions and material to the user are shown in FIG. 111. At step 1152, a dealer, service facility, manufacturer, the user, or other suitable entity may install dormant messages on the automobile personal computer. The message may be installed in storage 80 or other suitable storage in automobile 12. At step 1154, automobile personal computer 14 may monitor the automobile's state using various sensors such as the sensors of vehicle electronics 174. The automobile's location may also be determined (e.g., using GPS receiver 112). Any suitable sensor readings, combination of sensor readings, vehicle performance statistics, location data, etc. may be used as a trigger for the presentation of the message. For example, a message may be presented when a certain mileage is reached (e.g., to advise the user of recommended maintenance), when a certain date is reached (e.g., to advertise a yearly special on service at the dealer), when the automobile's fuel tank is low (e.g., to advertise gasoline or to simply inform the user that fuel is running low—e.g., with an audio alert), when the historical gas mileage over the last month has dropped below a certain point (e.g., to inform the user of a potential problem), when the engine begins to run hot (e.g., to advise the user to seek service), when the exterior temperature of the automobile drops below a certain level (e.g., to advertise windshield wiper fluid), when the automobile's location moves beyond a certain substantial distance from the dealer for more than a month or two, indicating that the user has moved (e.g., to promote a local dealer in the area who can serve the user), when the user passes a high mileage (e.g., 100,000 miles) or a long time has passed (e.g., 5 or 10 years) (e.g., to recommend a new automobile and to allow a user to request a brochure—e.g., by responding "yes" verbally to an audio prompt asking the user whether the user would like such a new brochure), etc.

The user may be notified that a dormant advertisement or other message is available (e.g., by an audio tone, a message icon or other suitable indicator on a display, by indicating the presence of the message using the same notification techniques that are used to notify the user of an incoming e-mail or voice-mail message or the like, etc. Messages may also be presented to the user automatically, when the sound system in automobile 12 is on, by temporarily interrupting the playback of other content if desired. If the sound system is off, automobile personal computer 12 may turn the sound system on to present the message. Playing messages automatically is particularly appropriate when the message is a warning or alert. Such alerts may include, for example, alerts indicating that the fuel is low, that the doors are unlocked, that a door is ajar, etc. Warning messages such as these may be played as audio through the automobile's sound system. If desired, the user may record audio clips or assign audio files (e.g., MP3 files) for such warnings.

If desired, dormant advertisements and other such messages may be presented by pressing a dedicated button (e.g., a button on the front-panel of an in-dash automobile personal computer, etc.).

Messages such as advertisements and notifications or any other suitable material may also be provided using e-mail or the like. For example, when an automobile is sold to a user, the dealer (e.g., dealer 1138 of FIG. 110) or manufacturer (e.g., manufacturer 1150 of FIG. 11) or the user may notify a service provider (e.g., service provider 1140). After a certain time has elapsed from the date of sale (e.g., six months), the service provider, dealer, or manufacturer may send a message (e.g., in an e-mail format or any other suitable format) to the user's automobile personal computer or home e-mail address as a reminder that recommended service is due. Messages may be sent to the user's automobile personal computer using a remote wireless link (e.g., an Internet link or the like) or using any other suitable data path. Messages sent from the service provider, dealer, or manufacturer may include text, graphics, audio, and video. They may be automatically played through the automobile's sound system and displayed on the displays of automobile personal computer 14 when they are received or at some time after they are received, or they may be displayed in a list of incoming e-mail messages or the like. The messages may include interactive content. The interactive content may allow the user to purchase products or services, schedule service visits, request information, etc. Remote or local wireless communications links may be used to initiate and consummate such transactions. The messages may be informative or commercial (e.g., advertisements) or may include a combination of such content. Any suitable condition or set of conditions may be used to trigger the distribution of such messages to the user by the service provider, dealer, or manufacturer. For example, messages may be sent when a certain time has elapsed since the sale of the automobile or since the user's last service visit.

Figure 112:
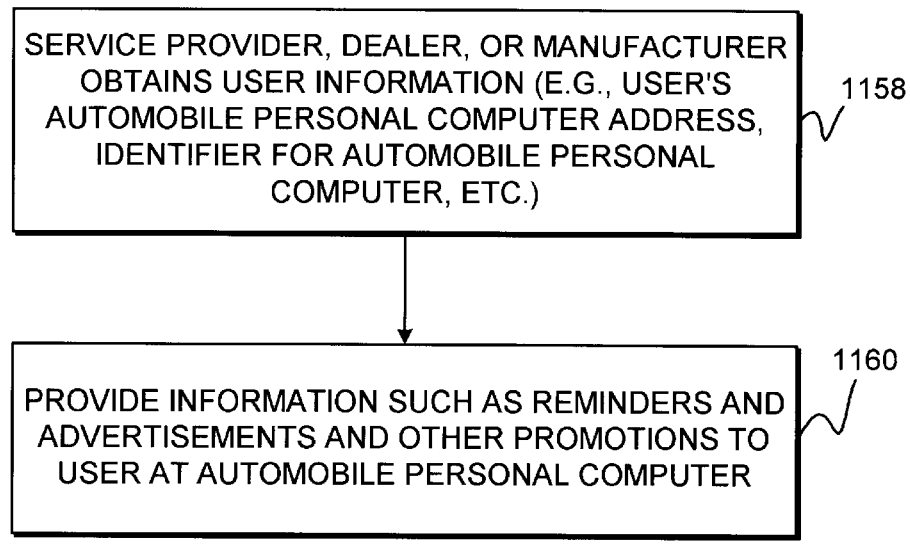
FIG. 112 is a flow chart of illustrative steps involved in providing e-mail advertisements and other notifications to a user from a service provider, dealer, or manufacturer in accordance with the present invention.

Illustrative steps involved in providing messages such as notifications and advertisements or any other suitable material to automobile personal computers and other user equipment from dealers or other service facilities, service providers, manufacturers, and other suitable entities are shown in FIG. 112. At step 1158, the dealer or other service facility, service provider, manufacturer, or other suitable entity may obtain information regarding the user and the user's automobile. Information may be obtained on the user's address, e-mail address, automobile personal computer e-mail address and identifying information, information on the make and model of the user's automobile, information on the user's household, etc. Such information may be gathered, for example, during the sale of the automobile by the dealer, when the user fills out a warranty registration, when the user signs up for a service with the service provider, from automobile personal computer 14, etc. Information may also be obtained on the state of the user's automobile as determined using various sensors such as the sensors of vehicle electronics 174. The automobile's location may be determined using GPS receiver 112 or other suitable location arrangement. Information that includes automobile-related data and sensor data may be gathered using any suitable technique. For example, such information may be gathered by the dealer during maintenance visits, using automobile personal computer 14 to provide information to the service provider over a remote wireless link, or by the manufacturer when the user completes an on-line survey, etc.

At step 1160, information such as reminders and advertisements and other promotions and material may be sent to the user's automobile personal computer 14 or other user equipment. Any suitable sensor readings, vehicle performance statistics, location information, personal user information, or the like may be used to determine when messages should be sent to the user. For example, a message may be sent to automobile personal computer 14 when a certain mileage is reached (e.g., to advise the user of recommended maintenance), when a certain date is reached (e.g., to advertise a yearly special on service at the dealer), when the automobile's fuel tank is low and the user is near a certain gas station (e.g., to advertise gasoline at that particular gas station), when the historical gas mileage over the last month has dropped below a certain point (e.g., to inform the user of a potential problem), when the engine has been running hot (e.g., to advise the user to seek service), when the automobile's location moves beyond a certain substantial distance from the dealer for more than a month or two, indicating that the user has moved (e.g., to promote a local dealer in the area who can serve the user), when the user has declined a recommended service at the last service visit such as a replacement air filter (e.g., to promote air filters), when the user passes a high mileage (e.g., 100,000 miles) or a long time has passed (e.g., 5 or 10 years) (e.g., to recommend a new automobile and to allow a user to request a brochure—e.g., by responding "yes" verbally to an audio prompt asking the user whether the user would like such a new brochure), etc.

If desired, interactive messages may provide the user with opportunities to obtain discounts. For example, a user may be asked to respond to a message within a fixed amount of time to set up a service visit. If the user responds within the fixed amount of time, the user may be awarded the discount. The user may use automobile personal computer 14 to respond to the messages by issuing voice commands, pressing buttons, or by interacting with on-screen options. The response may be communicated to the dealer, service facility, service provider, manufacture, or other entity from automobile personal computer 14 using a remote wireless link. The response may be communicated to the dealer, service facility, service provider, manufacture, or other entity from any other user device (e.g., a refrigerator-mounted web appliance or other in-home electronic device) using the Internet or any other suitable communications link.

If desired, custom driving directions may be transmitted to automobile personal computer 14 (e.g., from a computer over a remote wireless link). For example, an individual may send directions to the user describing how to get to the individual's home. The directions may contain a shortcut or unconventional route that computer-based navigational algorithms would not recommend or may contain information on landmarks that would not be included in a CD or DVD points-of-interest database. The individual's directions may be used in place of the driving directions that automobile personal computer 14 would otherwise have provided using its navigational capabilities. The voice-synthesis and off-route navigation capabilities of automobile personal computer 14 may be retained.

As another example, custom driving instructions may be sent by a company to the company's delivery trucks. Such custom instructions may involve circuitous routes calculated by complex optimization programs at the companies central facilities. Such routes may be sent to automobile personal computer 14 and played back to the user through the automobile's sound system (e.g., using voice synthesis). If, by design or accident, the driver goes off-route (i.e., the driver temporarily does not follow the driving directions being provided by the automobile personal computer), automobile personal computer 14 may use a map database (e.g., a CD or DVD map database in automobile 12 or a remote server database accessed over a remote wireless link) to recalculate directions from the driver's current location back onto the custom route. Because the custom route is provided to automobile personal computer 14, automobile personal computer 14 may display navigational directions for the custom route on displays such as a front-panel display that the driver may follow.

Because automobile personal computer 14 may use the same presentation paradigm for custom driving directions that is used to present driving directions generated by automobile personal computer 14 from a map database (e.g., a CD or DVD database), the user may only need to master a single type of automobile navigation system.

Figure 113:
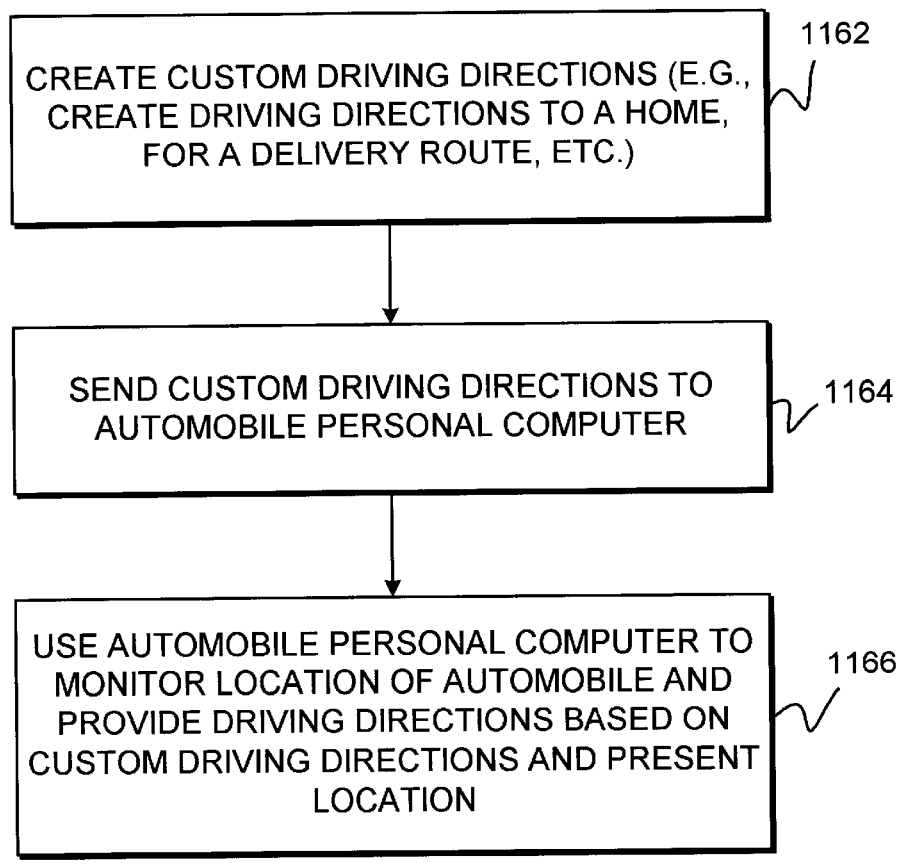
FIG. 113 is a flow chart of illustrative steps involved in using the automobile personal computer with custom driving directions in accordance with the present invention.

Illustrative steps involved in using automobile personal computer 14 to handle custom driving directions are shown in FIG. 113. At step 1162, custom driving directions may be created. The custom directions may be created by an individual or a company. To ensure compatibility with the driving direction format used by automobile personal computer 14, a driving directions application may be used that is configured to supply driving directions in a format recognized by automobile personal computer 14. The driving directions application may be implemented on equipment that is located at the direction creator's home or business or may be implemented using a remote server (e.g., a server affiliated with a navigation services provider). The driving directions application may use the same map database that is used by automobile personal computer 14 during navigation. To satisfy the need for complex routing solutions for certain businesses, the driving directions application may be configured to solve complex routing problems or may be configured to work with suitable routing programs.

If desired, the driving directions application may be provide the creator of the custom directions with the ability to record annotations to the directions or to provide text annotations. For example, annotations such as "don't miss the left turn at the big maple tree" or "leave package in garage" may be added. These annotations may be presented to the driver at the appropriate point during the presentation of the driving instructions to the driver.

After the custom driving directions have been created, they may be provided to automobile personal computer 14 at step 1164 over a remote wireless link, a local wireless link, or a physical link, or by physically transferring a removable storage media between the source facility and automobile personal computer 14.

At step 1166, the user may use automobile personal computer 14 to monitor the present location of the user's automobile and to provide driving directions that are based on the custom driving directions and the user's present location. The directions may be provided through the automobile's sound system using voice synthesis or by playing back any audio clips or other messages that were included with the driving directions.

Automobile personal computer 14 may be provided with interactive audio using various arrangements. For example, passive audio content may be provided on one wireless path or channel or link or stream and the interactive component or portion that is associated with that audio content may be provided on another wireless path or channel or the like. If desired, the interactive component or portion may use an Internet link.

Figure 114:
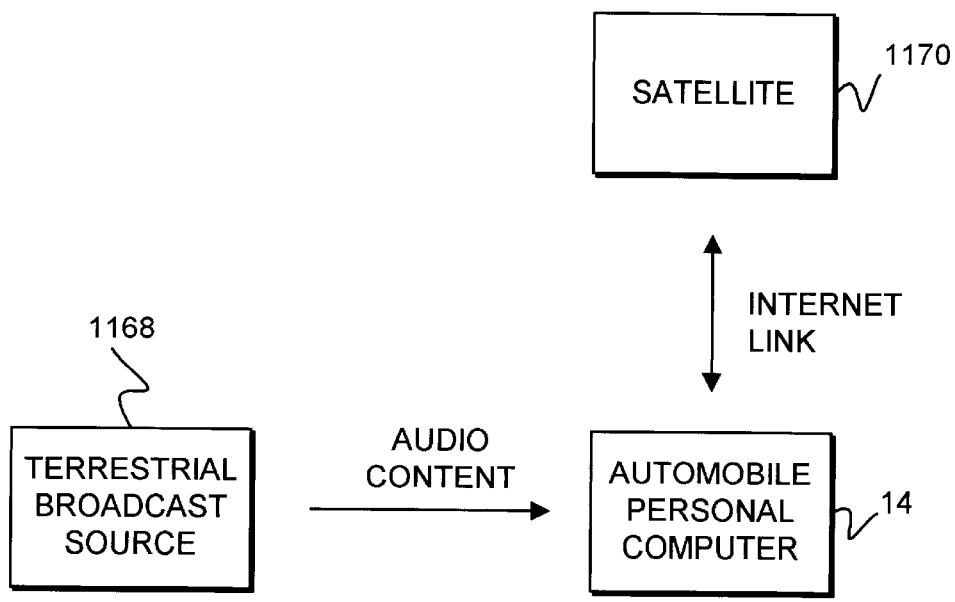
FIGS. 114–121 are schematic diagrams showing various illustrative arrangements for providing audio content and Internet links in accordance with the present invention.

As shown in FIG. 114, for example, automobile personal computer 14 may receive audio content from a terrestrial broadcast source 1168, while an interactive component that is associated with that content may be provided using an Internet link formed with satellite 1170. The audio content that is received from source 1168 may be provided as a passive audio broadcast from, for example, an FM source, and AM source, a digital audio broadcast, or any other such format. The communications link formed between satellite 1170 and automobile personal computer 14 may be an Internet link or any other suitable type of interactive communications link.

Figure 115:
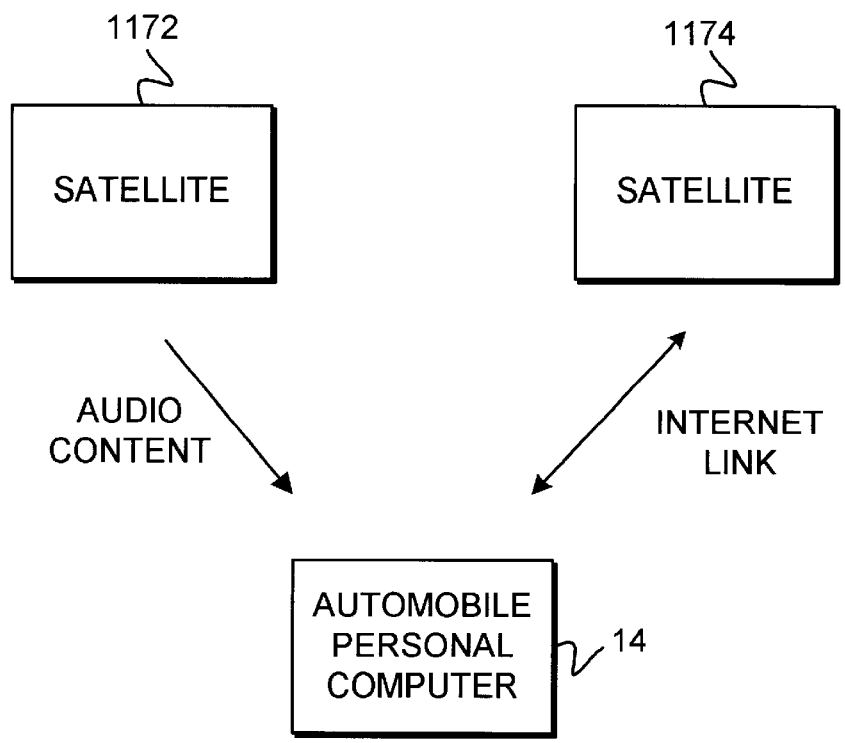

In the arrangement of FIG. 115, audio content may be received by automobile personal computer 14 from satellite 1172 and an Internet link may be formed using satellite 1174.

Figure 116:
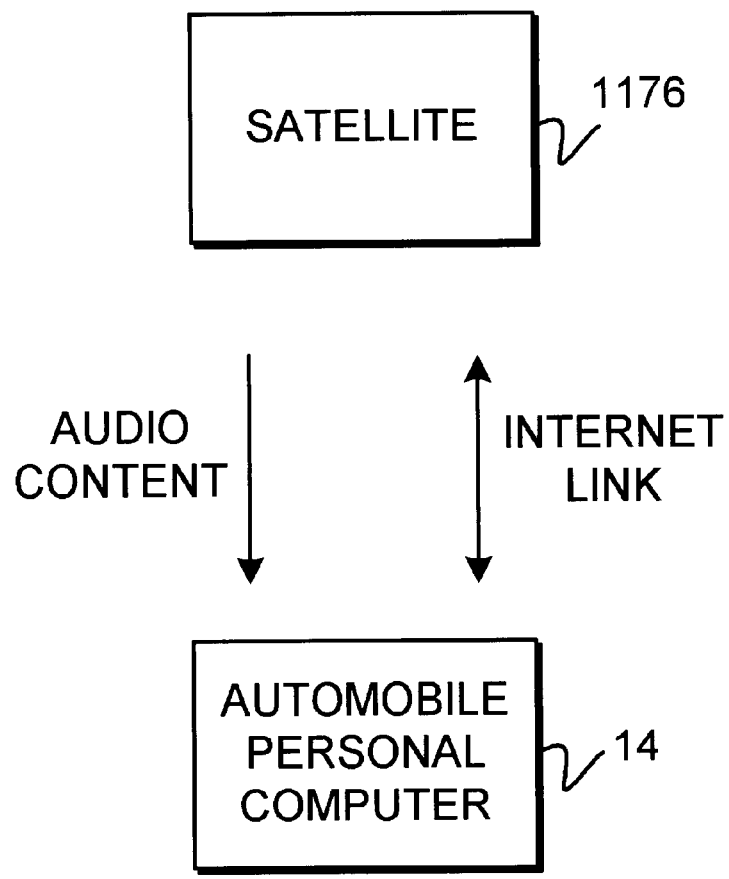

In the arrangement of FIG. 116, automobile personal computer 14 may receive audio content from satellite 1176. An interactive Internet link may be formed using the same satellite 1176.

Figure 117:
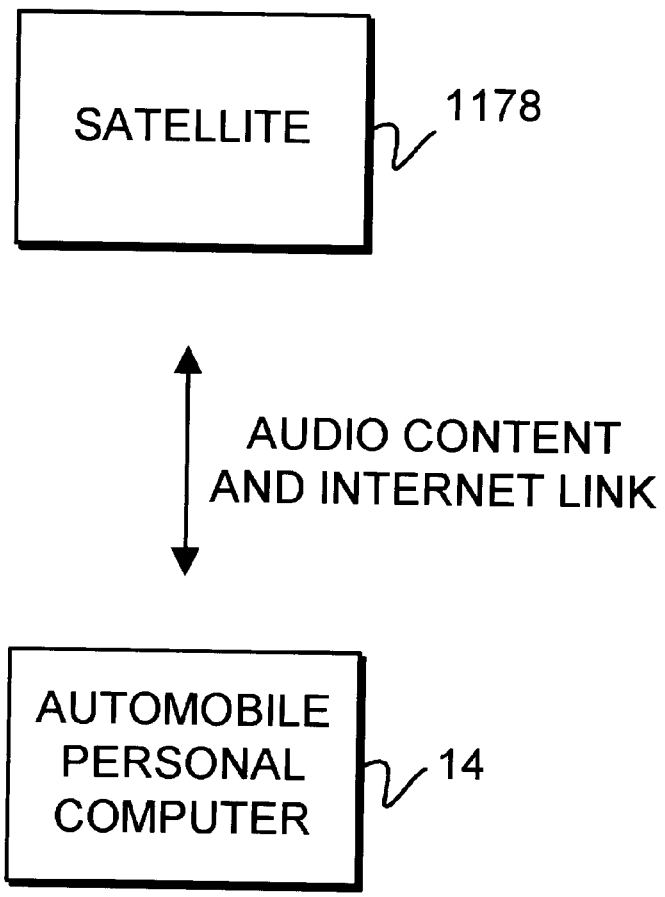

As shown in FIG. 117, both audio content and the Internet link may share the same communications path between satellite 1178 and automobile personal computer 14. For example, audio content may be provided as streaming Internet audio.

Figure 118:
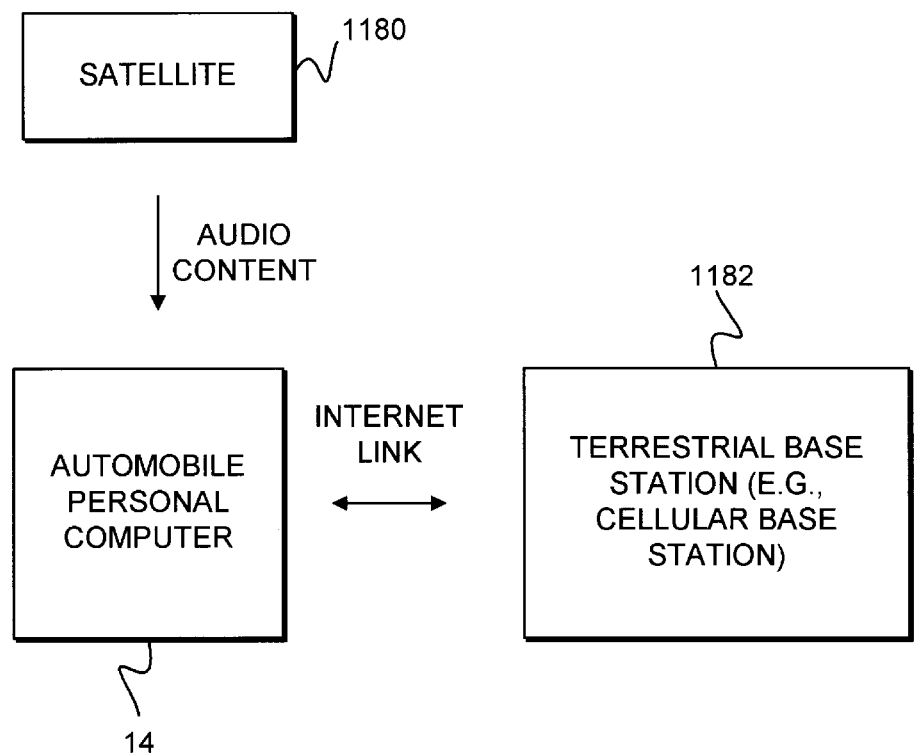

As shown in FIG. 118, an Internet link may be formed with automobile personal computer 14 using a terrestrial base station 1182 and audio content may be received from satellite 1180.

Figure 119:
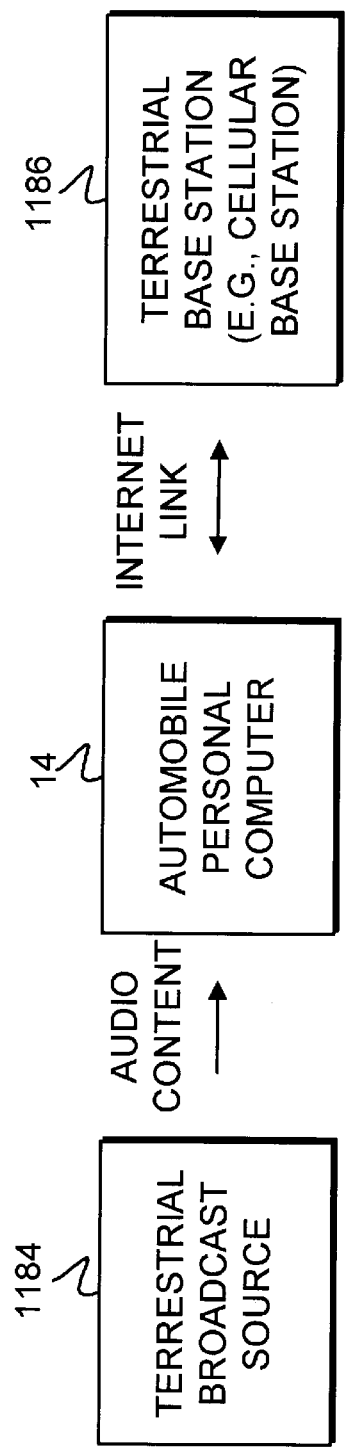

FIG. 119 shows how audio content may be received by automobile personal computer 14 from a terrestrial broadcast source 1184 and an Internet link may be formed with a terrestrial base station 1186.

Figure 120:
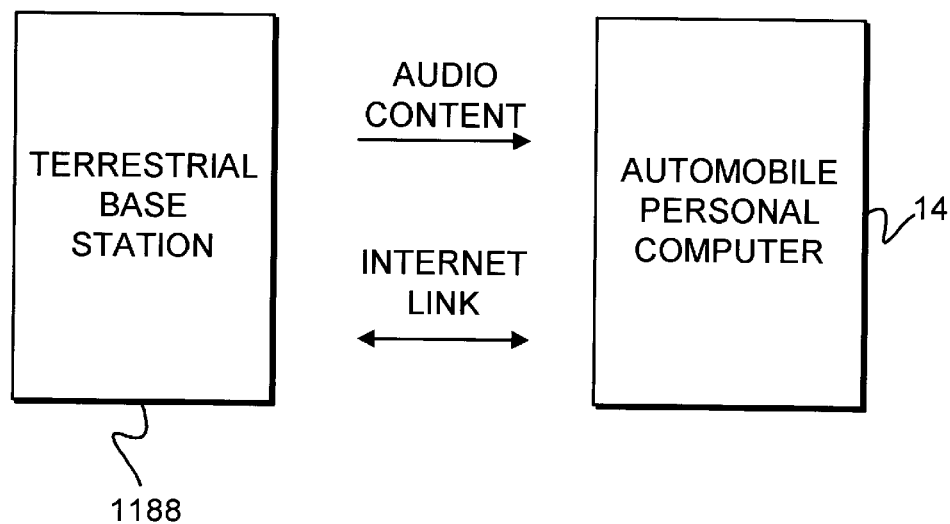

As shown in FIG. 120, audio content may be received by automobile personal computer 14 from a terrestrial base station 1188 and an Internet link may be formed with the same terrestrial base station.

Figure 121:
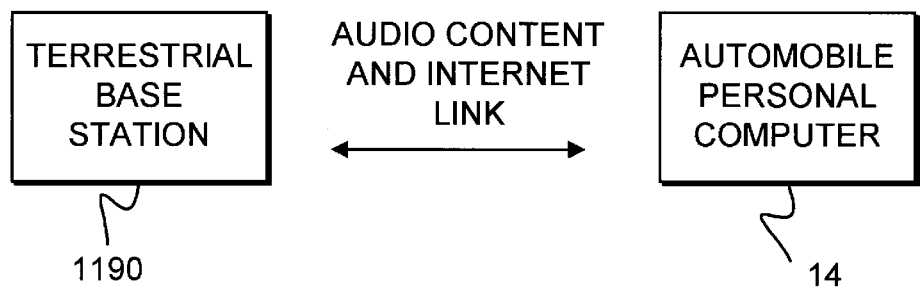

FIG. 121 shows how both audio content and the Internet link may share the same communications path between terrestrial base station 1190 and automobile personal computer 14. For example, audio content may be provided as streaming Internet audio.

In the examples of FIGS. 114–121, the audio content that is received by automobile personal computer 14 from terrestrial broadcast sources may be provided as a passive audio broadcast from, for example, an FM source, and AM source, a digital audio broadcast, or any other such format. Passive audio content may also be received from satellites. Interactive links, which may be Internet links or any other such suitable links, may be formed with either satellites or terrestrial base stations.

Audio may be provided on any of the Internet links. For example, audio may be provided as streaming Internet audio. Interactive content may be coordinated with passive audio content. For example, an interactive advertisement to buy a particular product may be coordinated with an audio segment provided over a broadcast link providing passive audio. If desired, interactive audio advertisements and the like that are provided over an Internet link may preempt passive audio (e.g., audio advertisements) that are being provided from a broadcast source.

If desired, the handheld computing devices described herein may be wrist devices. Such wrist devices may, for example, be used to transfer MP3 files or other information to automobile personal computer 14 over a local or remote wireless link. Wrist devices may also be used to receive e-mail and other messages (e.g., messages from a service provider regarding automobile 12, etc.) Wrist devices may be used to control automobile 12. Wrist devices may support IR communications, local RF wireless communications, and remote RF wireless communications (e.g., cellular communications). Wrist devices may store financial information such as credit card, debit card, and account information and may be used in place of local wireless cards or smart cards if desired (e.g., when purchasing gasoline or any other the like).

Although the invention has primarily been described in the context of automobile personal computers, aspects of the invention apply to any suitable vehicle computing system or device. Many of the features of the invention that have been illustrated in connection with the presentation of audio clips or audio information may be used for video clips or video information. For clarity, many features of the invention have been described separately. However, such features may be used in any suitable combination if desired. Moreover, not all features that have been described need be used on a single platform.

The foregoing is merely illustrative of the principles of this invention and various modifications can be made by those skilled in the art without departing from the scope and spirit of the invention.

What is claimed is:

1. An automobile computer system in an automobile that interacts with a wireless device of a merchant that is external to the automobile to allow a user to purchase a product from the merchant, comprising:

at least one processor that processes commands from the user;

a sound system with which the processor plays audio content for the user;

wireless communications circuitry that supports wireless communications for the processor over a bidirectional local wireless link and a remote wireless link that is separate from the local wireless link; and a global positioning receiver that determines the location of the automobile, wherein the processor uses the remote wireless link to obtain information on the merchant based on the location determined by the global positioning receiver and wherein the processor uses the local wireless link in interacting with the wireless device that is external to the automobile to purchase the product from the merchant.

2. The automobile computer system defined in claim 1 further comprising a microphone for receiving voice commands from the user, wherein the processor is further configured to process the voice commands.

3. The automobile computer system defined in claim 2 wherein the processor is further configured to allow the user to use the voice commands to direct the automobile computer system to purchase a product using the remote wireless link in response to the audio content.

4. The automobile computer system defined in claim 3 wherein the wireless communications circuitry comprises a satellite antenna.

5. The automobile computer system defined in claim 4 wherein the processor is configured to collect information on the performance of the automobile using vehicle electronics in the automobile.

6. The automobile computer system defined in claim 5 wherein the processor is configured to download audio content from the merchant over the local wireless link.

7. The automobile computer system defined in claim 6 wherein the performance information includes diagnostic codes and wherein the automobile computer system comprises memory that is configured to locally store the diagnostic codes that have been collected.

8. The automobile computer system defined in claim 7 wherein the processor and wireless communications circuitry are configured to wirelessly transfer the diagnostic codes to a server that is external to the automobile.

* * * * *